United States Patent
Wical

(10) Patent No.: US 6,199,034 B1
(45) Date of Patent: Mar. 6, 2001

(54) METHODS AND APPARATUS FOR DETERMINING THEME FOR DISCOURSE

(75) Inventor: Kelly Wical, Redwood Shores, CA (US)

(73) Assignee: Oracle Corporation, Redwood Shores, CA (US)

(*) Notice: Under 35 U.S.C. 154(b), the term of this patent shall be extended for 0 days.

(21) Appl. No.: 09/058,980

(22) Filed: Apr. 14, 1998

Related U.S. Application Data

(63) Continuation of application No. 08/455,484, filed on May 31, 1995.

(51) Int. Cl.[7] .............................. G06F 17/28; G06F 17/27
(52) U.S. Cl. ............................................. 704/9; 707/530
(58) Field of Search ...................... 704/1, 9, 10; 395/759, 395/760, 60, 54, 10; 707/530, 531

(56) References Cited

U.S. PATENT DOCUMENTS

| | | | |
|---|---|---|---|
| 4,864,502 | 9/1989 | Kucera et al. | 364/419 |
| 4,887,212 | 12/1989 | Zamora et al. | 364/419 |
| 4,914,590 | 4/1990 | Loatman et al. | 364/419 |
| 5,056,021 | 10/1991 | Ausborn | 364/419 |
| 5,083,268 | 1/1992 | Hemphill et al. | 395/12 |
| 5,182,708 | 1/1993 | Ejiri | 364/419 |
| 5,257,186 | 10/1993 | Ukita et al. | 364/419.1 |
| 5,371,807 | * 12/1994 | Register et al. | 704/9 |
| 5,383,120 | 1/1995 | Zernik | 364/419.08 |
| 5,384,703 | 1/1995 | Withgott et al. | 364/419.19 |
| 5,386,556 | 1/1995 | Hedin et al. | 395/600 |
| 5,424,947 | 6/1995 | Nagao et al. | 364/419.08 |
| 5,442,780 | 8/1995 | Takanashi et al. | 395/600 |
| 5,475,588 | 12/1995 | Schabes et al. | 364/419.08 |
| 5,497,319 | * 3/1996 | Chong et al. | 704/2 |
| 5,528,491 | 6/1996 | Kuno et al. | 364/419.08 |
| 5,555,169 | 9/1996 | Namba et al. | 364/419.08 |
| 5,689,716 | 11/1997 | Chen | 395/761 |
| 5,694,523 | 12/1997 | Wical | 395/12 |
| 5,708,822 | 1/1998 | Wical | 395/751 |
| 5,768,580 | 6/1998 | Wical | 395/613 |

OTHER PUBLICATIONS

U.S. patent application Ser. No.: 08/455,484, Appendix E entitled: Chaos Processor for Text.
U.S. patent application Ser. No.: 08/455,484, Appendix F entitled: Analysis Documentation..
U.S. patent application Ser. No.: 08/455,484, Appendix G entitled: Oracle ConText Linguistics Toolkit, Guide and Reference.
U.S. patent application Ser. No.: 08/455,484, Appendix H entitled: Creating a Virtual Bookshelf.

* cited by examiner

*Primary Examiner*—Forester W. Isen
*Assistant Examiner*—Patrick N. Edouard
(74) *Attorney, Agent, or Firm*—Fliesler, Dubb, Meyer & Lovejoy LLP

(57) ABSTRACT

A content processing system determines content of input discourse. The content processing system includes a theme vector processor that determines themes in the input discourse. The theme vector processor identifies themes, including identifying the relative importance of the themes in the input discourse by generating a theme strength. The theme strength indicates relative thematic importance for the theme in the input discourse. A knowledge catalog, which includes static ontologies arranged in a hierarchical structure, is also disclosed. The static ontologies are independent and parallel of each other, and contain knowledge concepts to represent a world view of knowledge. The theme vector processor utilizes the static ontologies to generate a theme concept for each theme by extracting a knowledge concept from a higher level node in the hierarchical structure of a static ontology.

11 Claims, 9 Drawing Sheets

Microfiche Appendix Included
(8 Microfiche, 430 Pages)

METHODS AND APPARATUS FOR DETERMINING THEME FOR DISCOURSE

This is a continuation of patent application Ser. No. 08/455,484 filed on May 31, 1995, which is expressly incorporated by reference.

MICROFICHE APPENDICES

Appendix A, entitled "Theme Parser Code" contains five microfiche with a total number of two hundred and eighty two (282) frames.

Appendix B, entitled "Code Heading" contains two microfiche with a total number of eighty five (85) frames.

Appendix C, entitled "Theme Vector Code" contains one microfiche with a total number of sixty three (63) frames.

COPYRIGHT NOTICE

Appendices A, B, C, contain material which is subject to copyright protection. The documents "Chaos Processor for Text", "Analysis Documentation", and "Creating a Virtual Bookshelf" also contain material which is subject to copyright protection. The copyright owner has no objection to the facsimile reproduction by any one of the Appendices A, B, C, as it appears in the United States Patent and Trademark patent files or records, but otherwise reserves all copyright rights whatsoever.

FIELD OF THE INVENTION

The present invention relates to the field of computational linguistics, and more particularly to determining and classifying theme for an input discourse.

BACKGROUND OF THE INVENTION

Discourse from a general standpoint is the capacity of orderly thought or procedure. In conversation, it is the orderly flow of ideas wherein certain topics are introduced and grouped in organized manners, and additional information expands on these topics by saying something about them. One example of a discourse is a book wherein the lowest level of a topic exists in sentences. Generally, a sentence is a grammatically self-contained language unit consisting of a word or a syntactically related group of words that express an assertion, a question, a command, a wish, or an exclamation; that in writing usually begins with a capital letter and concludes with appropriate ending punctuation; and that in speaking is phonetically distinguished by various patterns of stress, pitch and pause. Each sentence in a discourse can be said to have a topic, explicitly stated or implied, and a focus, or something that is being said about the topic.

In general, theme identifies which topic is really being discussed and what is being said about that topic. To understand the thematic information in a sentence, an analysis method is needed that is able to experience all of the subtle nuances that a writer conveys to a reader in less tangible ways. The human mind does not understand information by analyzing the grammatical content of a sentence. Many sentences are identical in grammatical context but are very different because of the specific selection of words and what additional facets of understanding the words add to the understanding of the sentence. The difference does not just influence the topics by introducing another different idea, but also influences the level of importance that each word has in the sentence by indicating new, extra-grammatical, thematic contexts. Therefore, prior art systems that determine the importance of theme by counting the number of times words appear in a document do not accurately determine theme.

SUMMARY OF THE INVENTION

A theme vector processor determines themes in an input discourse. The theme vector processor receives thematic tags for words and phrases in the input discourse, wherein the thematic tags indicate applicability of thematic constructions that define content of discourse. In addition, theme terms are identified based on the content carrying words of the input discourse. The theme vector processor identifies themes of the input discourse, including identifying the relative importance of the themes in the input discourse, based on the thematic tags and the theme terms. Specifically, the theme vector processor generates a theme strength for the theme terms. The theme strength indicates relative thematic importance for the theme terms in the input discourse.

In one embodiment, the theme vector processor generates theme concepts for each theme term in the input discourse through use of a knowledge catalog. The knowledge catalog includes independent and parallel static ontologies arranged in a hierarchical structure. The static ontologies contain knowledge concepts and present a world view of knowledge. The theme vector processor utilizes the static ontologies to generate a theme concept for a theme term by extracting a knowledge concept from a higher level node in the hierarchical structure of the static ontologies.

Other features and advantages of the present invention will be apparent from the accompanying drawings, and from the detailed description that follows below.

BRIEF DESCRIPTION OF THE DRAWINGS

The features and advantages of the present invention will be apparent from the following detailed description of the preferred embodiment of the invention with references to the following drawings.

DETAILED DESCRIPTION

Knowledge Catalog Overview

A knowledge catalog of the present invention provides a unique infrastructure to accurately represent concepts that define knowledge. The knowledge catalog includes a set of static ontologies to define knowledge. The knowledge catalog may be characterized as including several static ontologies because the knowledge catalog provides multiple views, characterizations, and organizations of concepts. As is explained below, the knowledge catalog contains a broad coverage of concepts to provide a world view of knowledge. The static ontologies are configured as hierarchical structures such that knowledge concepts are organized from high level generalized concepts down to more specific concepts. The static ontologies are parallel and independent of each other.

Figure 1A:
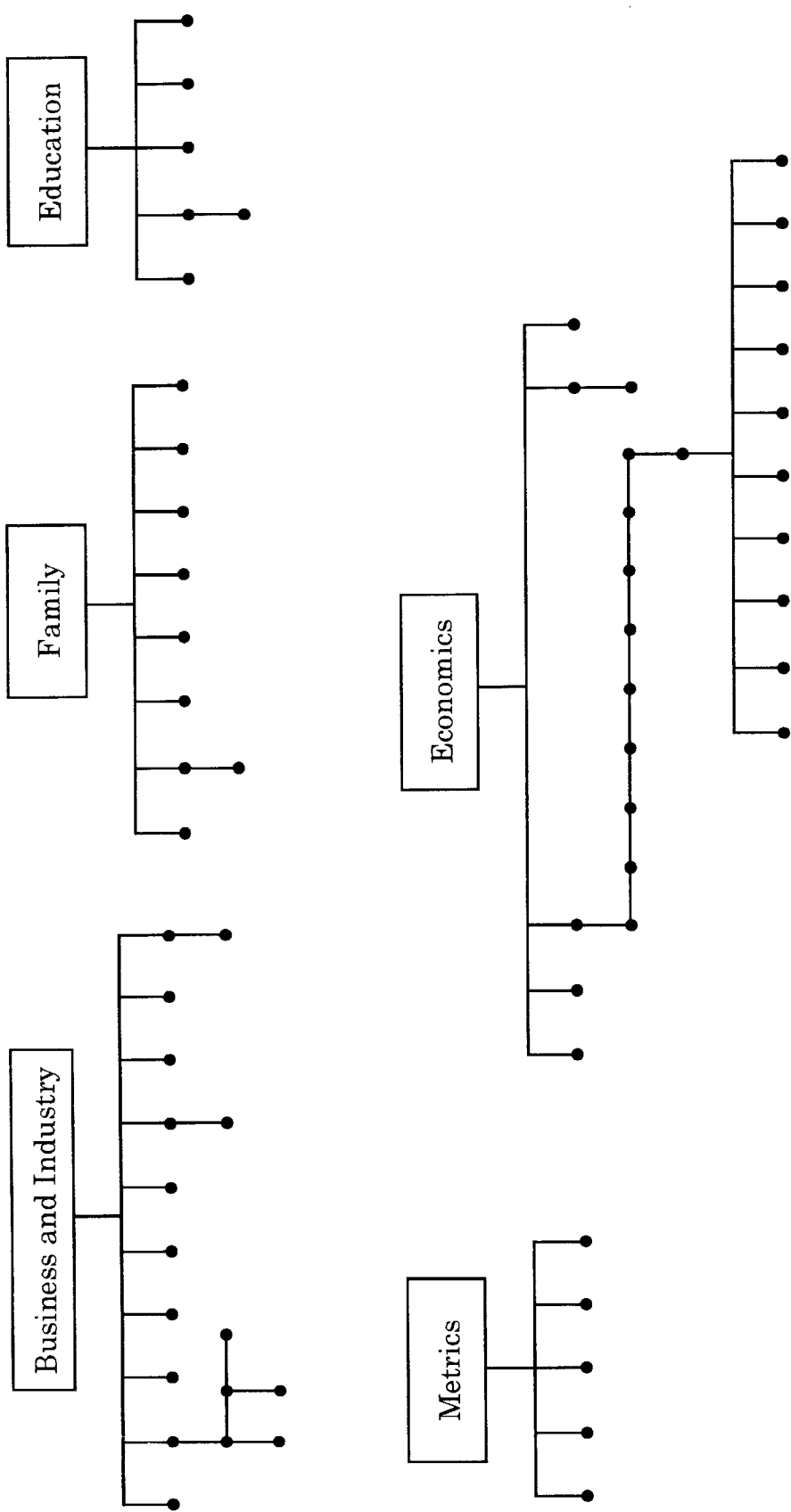
FIG. 1a illustrates several example static ontologies.

FIG. 1a illustrates several example static ontologies configured in accordance with one embodiment of the present invention. Specifically, FIG. 1a illustrates hierarchical structures for the "business and industry", "family", "education", "metrics", and "economics" static ontologies. As shown in FIG. 1a, each static ontology contains a plurality of concepts, illustrated as nodes in the hierarchical structures for the respective static ontologies. For purposes of simplicity, the specific "concepts" are illustrated only as nodes. However, the specific concepts contained within each static ontology hierarchical structure are set forth in the Static Ontologies. The Static Ontologies that follow include a plurality of static ontologies configured in accordance with the preferred embodiment of the present invention.

| category | |
|---|---|
| TT abstract_ideas_and_concepts | NT4 interiors@_internals@_insides_1788 |
| NT1 metrics | NT4 centrality@_being_at_the_center_1789 |
| NT2 area_measurement | NT4 layers@_stages_1790 |
| NT2 distance_measurement | NT4 coverings@_lids@_covering_1791 |
| NT2 mass_and_weight_measurement | NT4 skins@_jackets_1792 |
| NT2 volume_measurement | NT4 hair@_feathers_1793 |
| NT2 time_measurement | NT4 clothing@_garments_1794 |
| NT1 space_1348 | NT4 exposure@_undressing_1795 |
| NT2 space_in_general_1365 | NT4 environments@_encompassment_1796 |
| NT3 abstract_space_1425 | NT4 definitions@_restrictions_1797 |
| NT4 indefinite_spaces_1742 | NT4 boundaries@_parameters_1798 |
| NT3 specific_space_1426 | NT4 enclosures@_enclosed_places_1799 |
| NT4 regions@_areas_1743 | NT4 interpolation@between_two_things@_interposition_1800 |
| NT4 rural_areas_1745 | NT4 intrusions@_invasions_1801 |
| NT4 urban_dwellings@_cities_1746 | NT4 contraposition@_opposites_1802 |
| NT3 relative_space_1427 | NT4 front@_at_the_front_of@_frontward_locations_1803 |
| NT4 general_locations@_positioning@_emplacing_1747 | NT4 rear@_at_the_rear_of@_rearward_locations_1804 |
| NT4 dislocation@_removal_1748 | NT4 side@_at_the_side_of@_sideways_locations_1805 |
| NT3 existence_in_space_1428 | NT4 the_right_side@_starboard_1806 |
| NT4 presence@_being_there_1749 | NT4 the_left_side@_port_1807 |
| NT4 absence_1750 | NT2 structure_and_form_1367 |
| NT4 inhabiting_1751 | NT3 general_form_1432 |
| NT4 citizenship_1752 | NT4 structure@_composition@_architecture_1808 |
| NT4 populations@_communities_1753 | NT4 forms@_shapes_1809 |
| NT4 homes_1754 | NT4 chaos@_confusion_1810 |
| NT4 rooms@_chambers_1755 | NT4 balance@_harmony_1811 |
| NT4 containers@_receptacles_1756 | NT4 distortion@_mutilations_1812 |
| NT4 contents@_cargos_1757 | NT3 special_form_1434 |
| NT2 dimensions_1366 | NT4 straightness_1813 |
| NT3 general_dimensions_1429 | NT4 angularity@_angled_objects_1814 |
| NT4 smallness_of_size_1759 | NT4 curvature@_curved_objects_1815 |
| NT4 sizes@_largness_of_size_313967 | NT4 circularity@_circular_objects_1816 |
| NT4 expansions@_increases_in_size_313968 | NT4 convolution@_complex_circular_objects_1817 |
| NT4 contractions@_decreases_in_size_313969 | NT4 spheres@roundness_1818 |
| NT4 remoteness@_distances_313970 | NT3 superficial_form_1435 |
| NT4 nearness@_closeness_279932 | NT4 protuberances@_bulges_1819 |
| NT4 intervals@_spaces_between_313971 | NT4 concavity@_excavation_1820 |
| NT3 linear_directions_1430 | NT4 sharpness@_pointed_objects_1821 |
| NT4 breadth@_thickness_1767 | NT4 bluntness@_not_sharp_1822 |
| NT4 narrowness@_thinness_1768 | NT4 smoothness_1823 |
| NT4 filaments_1769 | NT4 roughness_1824 |
| NT4 lowness_1771 | NT4 notches_1825 |
| NT4 shallowness_1773 | NT4 grooves@_scratches_1826 |
| NT4 verticalness@_steepness_1776 | NT4 folds@_creases_1827 |
| NT4 horizontalness@_flatness_1777 | NT4 openings@_passages@_making_openings@_puncturing_1828 |
| NT4 pendency_1778 | NT4 closures@_barriers@obstacles@_closing_1829 |
| NT4 support@_supports@_braces@_furniture_1779 | NT2 motion_1368 |
| NT4 shafts@_poles_1780 | NT3 motion_in_general_1436 |
| NT4 parallelism_1781 | NT4 movement@_activity@generalized_motions_1830 |
| NT4 inclines@_diagonals_1782 | NT4 absence_of_motion_1831 |
| NT4 inversions@_reversals_1783 | NT4 speed@_velocity@_rate_of_motion_1832 |
| NT4 intercrossing@intersection_1784 | NT4 delay@_slowness@_slow_motions_1833 |
| NT4 weaving@_fabrics_1785 | NT3 change_of_place_1437 |
| NT4 sewing@knitting_1786 | NT4 transporting@_motions_of_transfer_1834 |
| NT4 length@_longness_279966 | NT4 vehicles_1835 |
| NT4 shortness@_brevity_313972 | NT4 traveling_1836 |
| NT4 height@_highness_284254 | NT4 travelers_1837 |
| NT4 depths@_deepness_313973 | NT3 motion_conjoined_with_force_1438 |
| NT4 tops@_topsides_313974 | NT4 striking_motions@_impacts_1844 |
| NT4 bottoms@_undersides_313975 | NT4 reactions@_replies_1845 |

-continued

| category |
|---|

NT3 external_and_internal_dimensions_1431
NT4 exteriority_1787
NT4 leverage@_mechanical_devices_of_moving_and_raising_1848
NT4 motions_of_attraction@_magnets_1849
NT4 motions_of_thrusting_away@_repelling_1850
NT3 motion_with_reference_to_direction_1439
NT4 compass_directions@_trends_1851
NT4 deviations@_motions_of_divergence_1852
NT4 leading_1853
NT4 following_1854
NT4 progress@_forward_motion_1855
NT4 regression@_return@_backwards_motion_1856
NT4 approaching@_motion_towards_1857
NT4 recessions@_withdrawals@_motion_away_from_1858
NT4 motions_of_convergence_1859
NT4 divergence@_motions_of_spreading_out@_deployments_1860
NT4 motions_of_arrival@_goals@_destinations_1861
NT4 departures@_motions_of_leaving_1862
NT4 entrances@_entering_1863
NT4 exits@_egress_1864
NT4 motions_of_insertion_1865
NT4 motions_of_extraction@_distilling_1866
NT4 reception@_taking_in_1867
NT4 eating@_drinking@_nutrition_1868
NT4 motions_of_expulsion_1871
NT4 excretions@_discharges_1872
NT4 secretions_1873
NT4 surplus@_excess_1874
NT4 shortages@_falling_short_1875
NT4 ascents@_upward_motions_1876
NT4 downward_motions@_descents_1877
NT4 raising@_lifting_1878
NT4 lowering@sinking@_depressing_1879
NT4 leaping_1880
NT4 plunging@_submerging_1881
NT4 circling@_orbiting@_meandering_1882
NT4 rotational_movements_1883
NT4 oscillations@_vibrations_1884
NT4 irregular_movement@_perturbations@_spasms_1885
NT1 physics_1052
NT2 heat_in_general_313822
NT3 heat_1369
NT4 heat@_temperature_1888
NT4 heating_1889
NT4 cold@_freezing_1892
NT2 light_1370
NT3 lights@_lightness_313807
NT4 lighting@_illumination_1894
NT4 light_sources_1895
NT4 darkness@_dimness_1896
NT4 shades@_filters_1897
NT4 transparency@_transparent_objects@_glasses_1898
NT4 semitransparency_1899
NT4 opaqueness_1900
NT2 mechanics_1372
NT3 mechanics@_machines_313809
NT4 automation_1907
NT4 friction@_wear@_polishing@_rubbing_1908
NT2 physical_properties_1373
NT3 properties_of_physical_objects_313810
NT4 lightness@_buoyancy_1911
NT4 density@_congestion_1912
NT4 hardness@_rigidity_1914
NT4 elasticity@_resilience_1916
NT4 sensations_of_touch_1978
NT2 taste_in_general_313817
NT3 taste_1380
NT4 the_sense_of_taste_1979
NT4 mouth-watering_tastes_1980
NT4 disagreeable_tastes_1981
NT4 lack_of_flavor_1982
NT4 sweetness_1983
NT4 sourness_1984
NT4 strong_flavor@_spiciness_1985
NT4 smell_in_general_313816

NT4 pushing_and_throwing_motions_1846
NT4 pulling_motions_1847
NT4 toughness@_strength_1917

NT4 brittleness@_fragility_1918
NT4 powderiness@_crumbliness_1919
NT4 texture@_surface_quality_313959
NT4 weightiness@_mass_313960
NT4 rarity@_insubstantiality_313961
NT4 softness@_pliancy_313962
NT2 color_1374
NT3 colors@_having_color_313804
NT4 white_colors@_whiteness_1922
NT4 black_colors@_blackness_1923
NT4 gray_colors@_grayness_1924
NT4 brown_colors@_brownness_1925
NT4 red_colors@_redness_1926

NT4 orange_colors@_orangeness_1927
NT4 yellow_colors@_yellowness_1928
NT4 green_colors@_greenness_1929
NT4 blue_colors@_blueness_1930
NT4 purple_colors@_purpleness_1931
NT4 colors@_colorfulness_313963
NT4 lack_of_color@_colorlessness_313964
NT4 variegation@_multicoloredness_313965
NT1 matter_1349
NT2 matter_in_general_1375
NT3 matter_in_general@_substance_313808
NT4 universe@_heavens_1933
NT4 materiality_1934
NT4 intangibles@_otherworldliness@_the_supernatural_1935
NT4 materials@_building_materials_1936
NT2 inorganic_matter_1376
NT3 liquids_1442
NT4 liquids@_fluids_1943
NT4 semiliquidiry_1944
NT4 pulpiness@_pastiness_1945
NT4 liquidization@_dissolving_1946
NT4 moisture@_humidity_1947
NT4 dryness@_aridness@_absence_of_water_1948
NT3 vapors_1443
NT4 vapors@_gases_1956
NT4 bubbles@_bubbling@_effervescence_1959
NT2 organic_matter_1377
NT3 virality_1445
NT4 life@_living_1961
NT4 death@_dying_1962
NT4 killing@_bloodshed_1963
NT4 burials@_funerals@_burying_1964
NT3 mankind_1448
NT4 mankind@_humanity_1969
NT4 races@_cultures_1970
NT3 male_and_female_1449
NT4 sexes@_genders_1971
NT4 masculinity_1972
NT4 femininity_1973
NT1 sensation_1350
NT2 sensation_in_general_1378
NT3 feelings_in_general@_sensations_313815
NT4 sensations@_feelings_1974
NT4 lack_of_physical_feelings_1975
NT4 pain@_suffering_1976
NT2 touch_in_general_313818
NT3 touch_1379
NT4 the_sense_of_touch@_touching_1977
NT4 intellectuals@_scholars_2025
NT4 ignorance_the_unknown_2026
NT3 functions_of_the_mind_1457
NT4 thoughts@_ideas@_thinking@_reasoning_2027
NT4 ideas@_notions@impressions_2028
NT4 absence_of_thought_2029
NT4 intuition@_insight_2030
NT3 reasoning_processes_1458
NT4 reasoning@_logic_2031
NT4 sophistry@_deceptive_reasoning_2032
NT3 consideration_1459

-continued category

NT3 smell__1381
NT4 odors__1987
NT4 fragrances@__perfumes__1988
NT4 bad__smells__1989
NT4 odorlessness__1990
NT2 sight__in__general__313821
NT3 sight__1382
NT4 sense__of__sight__1991
NT4 defective__vision@__blindness__1992
NT4 blindness__1993
NT4 witnesses@__audiences@__onlookers__1994
NT4 visibility@__capable__of__being__seen__1995
NT4 invisibility__1996
NT4 appearances__1997
NT4 disappearance__1998
NT2 hearing__1383
NT3 perception__of__sound__1450
NT4 sense__of__hearing__1999
NT4 deafness__2000
NT3 sound__1451
NT4 sounds@__noises__2001
NT4 silence__2002
NT4 faintness__of__sound__2003
NT4 loudness__2004
NT3 specific__sounds__1452
NT4 resonance__2005
NT4 repeated__sounds__2006
NT4 explosive__noises__2007
NT4 hissing__sounds__2008
NT4 shrill__sounds@__harsh__sounds__2009
NT4 cries@__calls@__exclamations__2010
NT4 animal__sounds__2011
NT3 unmusical__sounds__1453
NT4 dissonant__sounds@__out__of__tune@__sounds__that__clash__2012
NT3 musical__sounds__1454
NT4 music__1148
NT4 harmonics@__music__theory__2013
NT1 intellect__1351
NT2 intellectual__faculties__and__processes__1384
NT3 faculties__1455
NT4 intellect@__reason__2015
NT4 intelligence@__wisdom__2016
NT4 philosophers@__thinkers__2017
NT4 stupidity@__acting__unintelligently@__mental__retardation__2018
NT4 foolishness__2019
NT4 fools__2020
NT4 healthy__minds__2021
NT4 unhealthy__minds__2022
NT4 eccentricities@__idiosyncrasies__2023
NT3 comprehension__1456
NT4 knowledge@__information__2024
NT4 attitudes@__viewpoints@__moods__2073
NT4 broad-mindedness__2074
NT4 bigotry@__prejudice__2075
NT4 curiosity__2076
NT4 boredom@__detachment@__lack__of__curiosity__2077
NT4 attentiveness@__concern@__undivided__attention__2078
NT4 thoughtlessness@__negligence__2079
NT4 distraction@__confusion__2080
NT4 carefulness@__vigilance@__thoroughness__2081
NT4 neglect@__carelessness__2082
NT3 creative__thought__1469
NT4 creative__thought@__imagination@__originality__2083
NT4 lack__of__imagination@__practicality__2084
NT3 recollection__1470
NT4 remembering@__memories__2085
NT4 forgetfulness__2086
NT3 anticipation__1471
NT4 expectations@__optimism__2087
NT4 surprise@__astonishment__2088
NT4 frustrations@__defeats@__disappointments__2089
NT4 looking__ahead@__prudence@__foreknowledge__2090
NT4 predictions@__forecasts__2091
NT4 warnings@__omens__2092
NT2 communication__of__ideas__1386

NT4 topics@__subjects__2033
NT4 questioning@__examinations@__investigations@__surveillance__2034
NT4 answers@__replies__2035
NT4 solutions@__outcomes__2036
NT4 discoveries@__discovering__2037
NT3 assessment__3460
NT4 experiments@__tests@__experimental__methods__2038
NT4 measurements@__estimations@__measuring__2039
NT4 comparisons@__correlations__2040
NT4 powers__of__analysis@__distinctions__2041
NT4 casual__judgements@__imprudence__2042
NT3 conclusion__1461
NT4 judgements@__opinions@__appraisals__2043
NT4 prejudgements@__prejuding@__preconceptions__2044
NT4 misjudgments__2045
NT4 overestimation@__exaggeration__2046
NT4 underestimation@__depreciation__2047
NT3 theory__1462
NT4 theories@__suppositions@__speculations__2048
NT4 philosophy__26
NT3 belief__1463
NT4 beliefs@__hopes@__systems__of__belief__2049
NT4 credulity@__blind__faith__2050
NT4 unbelief@__denial@__disbelief__2051
NT4 skepticism__2052
NT3 grounds__for__belief__1464
NT4 evidence@__roof__2053
NT4 disproving@__rebuttals__2054
NT3 qualifications__1465
NT4 limitations@__specifications__2055
NT4 explicitness__2056
NT4 possibility@__likelihood@__feasibility__2057
NT4 impossibility__2058
NT4 probability@__expectations__2059

NT4 improbability__2060
NT4 certainty@__truth__2061
NT4 uncertainty@__chance__2062
NT4 gambles@__risks@__gambling__2063
NT3 conformity__to__fact__1466
NT4 truth@__reality__2064
NT4 maxims@__proverbs__2065
NT4 errors@__illusions__2066
NT4 illusions@__deceptions__2067
NT4 disillusionment__2068

NT3 acceptance__1467
NT4 assent@__agreement__2069
NT4 dissent@__diversity@__objections__2070
NT4 assertions@__declarations@__guarantee__2071
NT4 negations@__denials__2072
NT2 states__of__mind__1385
NT3 mental__attitudes__1468
NT1 style@__mode__of__expression__1479
NT4 rhetoric__2135
NT4 clear__language__usage__2136
NT4 unclear__language__use__2137
NT4 plain__speech__2138
NT4 economy__of__language@__abbreviations@__epigrams__2139
NT4 wordiness@__verbosity__2140
NT3 spoken__language__1480
NT4 oral__language@__talking__2141
NT4 talkativeness__2143
NT4 conversations@__discussions__2144
NT4 soliloquies@__monologues__2145
NT4 public__speaking@__oratory__2146
NT4 speaking__well@__eloquence__of__speech__2147
NT4 pompous__remarks__2148
NT3 written__language__1481
NT4 correspondence@__letters__2 151
NT3 uncommunicativeness@__secrecy__1483
NT4 uncommunicativeness__2157
NT4 secrecy@__privacy__2158
NT4 hiding@__hiding__places__2159
NT3 falsehood__1484
NT4 lies@__insincerity@__dishonesty@__hypocrisy__2160
NT4 exaggerations@__exaggerating__2161

-continued

| category |

NT3 nature_of_ideas_communicated_1472
NT4 significance@_meaning_2093
NT4 implications@_inferences_2094
NT4 nonsense_2095
NT4 intelligibility_2096
NT4 complexity@_obscurity@_enigmas_2097
NT4 double_meanings_2098
NT4 figures_of_speech_2099
NT4 interpretations@_versions_2100
NT4 distortions@_errors_2101
NT3 modes_of_communication_1473
NT4 communication@_exchange_of_ideas_2102
NT4 manifestations@_displays_2103
NT4 disclosures@_confessions_2104
NT4 information@_data@_inside_information_2105
NT4 publications@_announcements@_statements_2107
NT4 messengers@_announcers_2109
NT3 education_135
NT4 instructions@_directions@_teaching_2110
NT4 misteaching@_propaganda_2111
NT4 learning@_education_2112
NT4 teachers@_masters@_instructors_2113
NT4 students@_disciples_2114
NT3 indication_1474
NT4 indications@_signs@_indicators_2116
NT4 badges@_emblems@_uniforms_2117
NT4 records@_documents@_reports@_logbooks_2118
NT4 recorders@_librarians@_historians_2119
NT3 representation_1475
NT4 representations@_depictions_2120
NT4 misrepresentations@_injustices_2121
NT3 language_1478
NT4 languages@_speech_acts@_language_2127
NT4 letters@_characters_2128
NT4 words_2129
NT4 terminology@_assigning_names_2130
NT4 anonymity_2131
NT4 phrases@_expressions_2132
NT4 informality_2190
NT3 motive_1492
NT4 motivations@_inducements_2191
NT4 pretexts@_excuses_2192
NT4 allurements@_enticements_2193
NT4 bribery_2194
NT4 warnings@_warning@_intimidation@_talking_out_of_2195
NT3 purpose_1493
NT4 intentions@_objectives_2196
NT4 plans@_arrangements_2197
NT4 hunting@_tracking_2198
NT4 activities@_occupations@_hobbies_2199
NT3 ways_and_means_1494
NT4 routes@_methods_2200
NT4 resources@_tools_2201
NT4 provisioning@_equipping@_providing_2202
NT4 storage@_laces_of_storage_2203
NT4 enough@_plenty@_abundance_2204
NT4 inadequacy@_shortage@_not_enough_2205
NT4 excess@_saturation@_too_much_2206
NT4 overdose@_saturation@_much_too_much_2207
NT3 use_1495
NT4 uses@_applications_2208
NT4 consumption@_depletion@_expenditures_2209
NT4 misuse@_abuse_2210
NT4 obsolescence@_castoffs@_throwaways_2211
NT4 uselessness@_garbage_2212
NT2 conditions_1388
NT3 adaptation_to_ends_1496
NT4 expedience@_means_to_an_end_2213
NT4 wrongness@_disadvantages_2214
NT4 importance@_significance_2215
NT4 trivia@_insignificance_2216
NT4 goodness_2217
NT4 badness_2218
NT4 afflictions@_torments@_poisons_2219
NT4 perfection_2220

NT4 deceptions@_illusions_2162
NT4 deceivers@_imposters_2163
NT4 dupes_2164
NT1 volition_1352
NT2 volition_in_general_1387
NT3 will_in_general_313820
NT4 will_1485
NT4 willingness_2165
NT4 unwillingness_2166
NT3 resolution@_determination_1486
NT4 resolve@_tenacity@_will-power_2167
NT4 perseverance@_stamina_2168
NT4 stubbornness_2169
NT3 irresolution@_caprice_1487
NT4 indecisiveness_2170
NT4 second-thoughts@_flip-flops_2171
NT4 caprice@_on_the_spur_of_the_moment_2172
NT4 impulses@_urges@_automatic_responses_2173
NT3 evasion_1488
NT4 avoidance@_evasion_2174
NT4 escapes@_loopholes_2175
NT4 abandonment@_surrendering_2 176
NT3 inclincation_1489
NT4 desires@_references_2177
NT4 eagerness_2178
NT4 indifference@_apathy_2179
NT3 choice_1490
NT4 choices@_options_2180
NT4 rejections@_denials_2181
NT4 requirements@_necessity@_inevitability_2182
NT4 predestination@_fate@_determinism_2183
NT4 plans@_schedules_2184
NT3 custom_1491
NT4 customs@_habits_2185
NT4 inexperience_2186
NT4 fashions@_novelties@_fads_2187
NT4 social_conventions_2188
NT4 formalities@_ceremonies@_rituals_2189
NT4 remedies@_medicinal_drugs_2229
NT4 therapy@_treatments_2231
NT2 voluntary_actions_1389
NT3 action_1501
NT4 actions@_operations@_voluntary_actions_2247
NT4 inaction@_inertia@_voluntary_inaction_2248
NT4 activity@_proceedings@_doers_2249

NT4 inactivity@_inaction@_nonworkers_2250
NT4 haste@_speed_2251
NT4 leisure@_repose_2252
NT4 relaxation@_vacations_2253
NT4 sleeping@_hypnosis_2254
NT4 wakefulness@_insomnia_2255
NT3 exertion@_endeavor_1502
NT4 endeavors@_trying_one's_best_2256
NT4 projects@_ventures@_missions_2257
NT4 exertion@_energy_2258
NT4 fatigue@_strain_2259
NT4 workers@_doers_2260
NT4 places_of_employment@_workshops_2261
NT3 preparation_1503
NT4 preparation@_planning_2262
NT4 vulnerability@_negligence_2263
NT3 accomplishment_1504
NT4 accomplishment@_completion_313801
NT4 leaving_it_undone@_loose_ends@_noncompletion_2264
NT4 success@_victory_2265
NT4 failures@_defeats_2266
NT4 victories@_conquests_2267
NT4 defeats@_collapses@_defeating_2268
NT4 prosperity@_success_2269
NT4 adversity@_disaster_2270
NT4 hindrance@_resistance@_hindering_2271
NT4 difficulties@_troubles_2272
NT4 ease_of_accomplishment@_effortlessness_2273
NT3 adroitness_1505
NT4 skills@_abilities_2274

-continued

| category |
|---|

NT4 imperfection__2221
NT4 blemishes@__deformities__2222
NT4 mediocrity__2223
NT3 wholesomeness__1497
NT4 cleanness@__sanitation@__washing__2224
NT4 dirtiness@__squalor__2225
NTA hygiene__2226
NT3 physical__progress__1499
NT4 improvements@__progress@__reforms__2233
NT4 impairment@__deterioration__2234
NT4 destruction@__ruin__2235
NT4 restoration@__improvement__2236
NT4 rejuvenation@__renewal__2237
NT4 relapses@__setbacks__2238
NT3 security__1500
NT4 dangers@__crises__2239
NT4 safety@__security__2240
NT4 safekeeping@__insurance@__protection__2241
NT4 sanctuaries@__shelters__2242
NT4 preservation@__conservation__2243
NT4 rescue@__release__2244
NT4 warnings@__notices__2245
NT4 alarms@__alerts__2246
NT3 health__48855
NT4 health@__fitness@__wellness__2228
NT3 constraint__1511
NT4 compulsion@__necessity__2296
NT4 strictness@__discipline__2297
NT4 laxness@__imprecision__2298
NT4 leniency@__mercy@__indulgence__2299
NT3 restraint__1512
NT4 restraint@__inhibition__2300
NT4 confinement@__isolation__2301
NT3 unrestraint__1513
NT4 freedom@__rights__2302
NT4 liberation@__rescue__2303
NT3 subjugation__1514
NT4 domination@__control__2304
NT3 compliance__1515
NT4 submission@__compliance__2305
NT4 obedience@__service__2306
NT4 disobedience@__rebelliousness__2307
NT4 observance@__practice@__compliance__2308
NT4 nonobservance__2309
NT3 pledge__1516
NT4 promises@__assurances__2310
NT4 contracts@__agreements@__understandings__2311
NT4 guarantees@__deposits@__pledges__2312
NT3 proposal__1517
NT4 offers@__bids__2313
NT4 requests@__petitions__2314
NT3 consent__1518
NT4 consenting@__agreement@__willingness@__permission__2315
NT4 refusal@__rejection@__repudiation__2316
NT4 permission@__authorization__2317
NT4 forbidding@__refusing@__prohibition__2318
NT4 repealing@__rescinding@__cancellation__2319
NT3 commission__1519
NT4 commissioning@__delegating__2320
NT4 deputies@__agents@__proxies__2321
NT4 promotions@__upgrades__2322
NT4 demotions@__downgrades__2323
NT4 retirement__from__position__of__authority__2324
NT2 support__and__opposition__1391
NT3 support__1520
NT4 aid@__support@__patronage__2325
NT4 cooperation@__harmony__2326
NT4 associates@__companions__2327
NT4 associations@__societies@__coalitions__2328
NT3 opposition__1521
NT4 opposition@__contention@__hostility__2330
NT4 opponents@__adversaries@__enemies__2331
NT4 resistance@__defiance__2332
NT4 defiance@__arrogance__2333
NT3 concord__1522
NT4 accord@__rapport@__harmonious__relationships__2334
NT4 disharmony@__conflicts@__strained__relationships__2335

NT4 incompetence@__ignorance@__inexperience__2275
NT4 cleverness@__strategies__2276
NT4 naivety@__innocence__2277
NT3 conduct__1506
NT4 behavior__2278
NT4 misbehavior__2279
NT2 authority@__control__1390
NT3 prerogative__1507
NT4 authority@__competence__2280
NT4 lawlessness@__anarchy__2281
NT3 politics__and__government__1508
NT4 government@__management__2282
NT4 politics__556
NT4 politicians__2286
NT3 direction__1509
NT4 direction@__management__2287
NT4 directors@__overseers@__guidebooks__2288
NT4 masters@__patrons@__rulers@__military__officers__2289
NT4 servants@__employees__2290
NT3 directions__1510
NT4 precepts@__rules__2291
NT4 commands@__orders__2292
NT4 demands@__stipulations__2293
NT4 advice@__proposals@__suggestions__2294
NT4 councils@__committees__2295
NT4 mediation@__intervention@__peacemakers__2344
NT3 mid-course__1525
NT4 neutrality@__impartiality__2345
NT4 compromises@__settlements@__give-and-take__2346
NT2 possessive__relations__1392
NT3 possession__1526
NT4 possessing@__owning@__ownership__2347
NT4 possessors@__owners__2348
NT4 property@__real__estate__2349
NT4 acquisition@__profits__2350
NT4 loss@__losses@__waste__2351
NT4 retention@__keeping__2352
NT4 relinquishment@__disposal__2353
NT3 sharing__1527
NT4 participation@__sharing@__partnership__2354
NT4 apportionment@__budgeting@__earmarking__2355
NT3 transfer__of__property__1528
NT4 transfer__of__property__or__right__313819
NT4 donations@__endowments@__giving__2356
NT4 receiving@__getting@__inheritance__2357
NT4 lending@__loans__2358
NT4 borrowing@__money-raising__2359
NT3 appropriation__1529
NT4 taking@__takeovers__2360
NT4 restitution@__reparations__2361
NT4 theft__2362
NT4 thieves__2363
NT4 illicit__businesses@__blackmarkets@__organized__crime__2364
NT3 interchange__of__property__1530
NT4 commerce@__economics__2365
NT4 purchases@__buying__2366
NT4 sales@__selling@__merchandising@__marketing__2367
NT3 monetary__relations__1531
NT4 money@__currency__2373
NT4 finances@__investments__2374
NT4 wealth@__riches__2375
NT4 poverty__2376
NT4 financial__credit@__borrowing__power__2377
NT4 debts@__liabilities__2378
NT4 payments@__settlements__2379
NT4 nonpayment@__defaulting@__bankruptcy__2380
NT4 expenditures@__disbursements@__spending__2381
NT4 receipts@__income__2382
NT4 accounts@__assets__2383
NT4 prices@__fees@__taxes__2384
NT4 discounts@__reductions__2385
NT4 expensiveness@__high__prices__2386
NT4 cheapness@__low__prices__2387
NT4 no__charge@__gifts__2388
NT4 economy@__cost-effectiveness__2389
NT4 stinginess@__hoarding__2390
NT4 generosity__2391

-continued category

NT3 contention__1523
NT4 contention@__competition@__martial__arts__2336
NT4 warfare__1256
NT4 attacks@__assaults@__offensive__warfare__2337
NT4 defenses@__defensive__warfare__2338
NT4 combatants__2339
NT4 battlegrounds@__theaters__of__operations__2341
NT3 peace__1524
NT4 peace@__nonviolence__2342
NT4 pacification@__disarmament@__demilitarization__2343
NT4 calmness@__nerves__of__steel__2398
NT4 patience__2399
NT4 impatience__2400
NT3 pleasure__and__pleasurableness__1534
NT4 pleasantness__2401
NT4 unpleasantness__2402
NT4 pleasure@__enjoyment@__happiness__2403
NT4 discontent@__unhappiness@__torture__2404
NT4 hatred@__loathing@__disapproval__2405
NT4 contentment__2406
NT4 discontent@__dissatisfaction__2407
NT4 cheerfulness__2408
NT4 solemnity@__seriousness__2409
NT4 sadness__2410
NT4 sorrow@__regretting__2411
NT4 unregretfulness__2412
NT4 lamentation@__grieving__2413
NT4 rejoicing@__laughing__2414
NT4 celebrating@__festivities__2415
NT4 amusements@__entertainments@__sports@__games__2416
NT4 dancing__2417
NT4 humor__2418
NT4 wit@__humor__2419
NT4 joking@__kidding@__teasing__2420
NT4 dullness@__unoriginality@__cliches__2421
NT4 tedium@__monotony__2422
NT4 aggravations__2423
NT4 relief@__feelings__of__relief__2424
NT4 comfort@__contentment__2425
NT3 anticipative__emotions__1535
NT4 hopes@__desires@__hopefulness__2426
NT4 hopelessness__2427
NT3 concern__1536
NT4 anxiety__2428
NT4 fears@__misgivings__2429
NT4 cowardice__2430
NT4 courage__2431
NT4 rashness@__recklessness__2432
NT4 caution@__cautiousness__2433
NT3 discriminative__affections__1537
NT4 exacting@__fussy@__perfectionism__2434
NT4 good__taste@__tastefulness__2435
NT4 vulgarity@__rudeness__2436
NT4 ugliness__2437
NT4 beauty@__charm__2438
NT4 ornamentation@__decorations@__ornaments__2439
NT4 plainness@__naturalness@__simplicity__2440
NT4 affectation@__pretense@__hypocrisy__2441
NT4 ostentation@__showiness@__luxuriousness__2442
NT3 affections__of__ego__313814
NT4 pride__1538
NT4 humility@__humiliation__2443
NT4 servility@__submissiveness@__ingratiation__2444
NT4 modesty__2445
NT4 vanity@__egotism__2446
NT4 boasting__2447
NT4 blustering@__bravado__2448
NT4 arrogance__2449
NTA insolence__2450
NT3 esteem__1539
NT4 reputation@__fame__2451
NT4 dishonor@__degradation__2452
NT3 moral__sentiments__1552
NT4 respect@__appreciation__2501
NT4 disrespectfulness@__ridicule__2502
NT4 contempt__2503

NT4 overgenerosity@__wastefulness__2392
NT1 affections__1353
NT2 personal__affections__1393
NT3 emotion__1532
NT4 feelings@__emotions__2393
NT4 lack__of__feelings__2394
NT3 exitability__1533
NT4 excitement@__exhilaration@__thrills__2395
NT4 inexcitability@__stoicism__2396
NT4 nervousness__2397
NT4 honor@__glory__2453
NT4 titles@__honors@__academic__degrees__2454
NT4 the__aristocracy__2455
NT4 the__common__person__2456
NT3 comtemplative__esteem__1540
NT4 sense__of__wonder__2457
NT4 composure__2458
NT2 sympathetic__affections__1394
NT3 social__relations__1541
NT4 friendliness__2459
NT4 unfriendliness__2460
NT4 seclusion@__withdrawal@__solitude__2461
NT4 hospitality@__greetings__2462
NT4 inhospitality__2463
NT3 social__affection__1542
NT4 friendship__2464
NT4 friends__2465
NT4 enmity@__hatred__2466
NT4 hatred@__bigotry__2467
NT4 love@__affection@__devotion__2468
NT4 lovemaking__2469
NT4 marriage__2470
NT4 celibacy__2471
NT4 loss__of__a__spouse__2472
NT3 civility__1543
NT4 courtesy__2473
NT4 discourtesy@__rudeness__2474
NT3 benevolence__1544
NT4 kindness@__acts__of__kindness__2475
NT4 brutality@__acts__of__brutality@__cruelty__2476
NT4 antisocial__attitudes__2477
NT4 public__spirit@__citizenship__2478
NT4 benefactors@__liberators__2479
NT4 criminals@__delinquents__2480
NT3 sympathy__1545
NT4 pity@__sympathy__2481
NT4 lack__of__pity@__ruthlessness__2482
NT4 comforting@__sharing__of__grief__2483
NT4 forgiveness@__kindness__2484
NT4 congratulations@__compliments@__good__wishes__2485
NT3 gratefulness__1546
NT4 gratitude__2486
NT4 ungratefulness__2487
NT3 ill__humor__1547
NT4 ill__humor@__grumpiness__2488
NT4 resentment@__anger__2489
NT3 selfish__resentment__1548
NT4 jealousy__2490
NT4 envy__2491
NT3 reprisal__1549
NT4 retaliation__2492
NT4 revenge__2493
NT2 morality__1395
NT3 morals__1550
NT4 ethics@__morals__2494
NT4 the__right__thing@__goodness@__decorum@__human__rights__2495
NT4 wrong__2496
NT3 moral__obligation__1551
NT4 entitlements@__what__one__deserves__2497
NT4 false__claims@__what__one__does__not__deserve__2498
NT4 duty@__moral__obligations__2499
NT4 impositions@__demands__2500
NT4 atheism@__agnosticism__2568
NT3 religious__practice__1561
NT4 worship@__devotion__2569
NT4 idolatry@__paganism__2570

-continued

| category |
|---|

NT4 ridicule__2504
NT4 approval@__endorsement@__compliments__2505
NT4 disapproval@__censure@__criticism__2506
NT4 flattery__2507
NT4 disparagement@__verbal__abuse__2508
NT4 curses@__oaths@__obscene__language__2509
NT4 threats@__menaces__2510
NT3 moral__conditions__1553
NT4 honesty@__integrity@__loyalty__2511
NT4 dishonesty@__treachery@__unfaithfulness__2512
NT4 justice@__fairness@__impartiality__2513
NT4 injustice@__unfairness@__favoritism__2514
NT4 selfishness__2515
NT4 unselfishness@__altruism__2516
NT4 virtues@__morals__2517
NT4 vice@__evil__2518
NT4 wrongdoing@__misconduct@__sin__2519
NT4 guilt__2520
NT4 innocence__2521
NT4 good__people@__gentlemen@__ladies__2522
NT4 bad__people@__criminals__2523
NT3 moral__practice__1554
NT4 sensuality__2524
NT4 sexual__innocence__2525
NT4 promiscuity@__loss__of__sexual__innocence__2526
NT4 indecency@__immodesty@__earthiness@__obscene__2527
NT4 asceticism@__self-denial__2528
NT4 self-restraint@__self-control@__alcohol-free__2529
NT4 self-indulgence__2530
NT4 greed__2531
NT4 fasting__2532
NT4 intoxication@__drunkenness@__alcoholic__beverages__2533
NT4 sobriety__2534
NT3 moral__observance__1555
NT4 accusations@__complaints@__indictments__2542
NT4 justification@__vindication__2543
NT4 acquittal@__exoneration__2544
NT4 condemnation@__guilty__verdicts__2545
NT4 penalties@__punishments__2546
NT4 disciplinary__measures@__punishment__2547
NT4 atonement@__reparation@__restitution__2549
NT2 religion__30
NT3 supernatural__beings__1556
NT4 deities@__god__2550
NT4 angels@__saints__2552
NT4 evil__spirits__2553

NT4 ghosts__2554
NT3 religious__beliefs__1558
NT4 theology@__religion__2560
NT4 orthodoxy@__traditionalism__2561
NT4 unorthodoxy@__heresy__2562
NT3 religious__quality__1559
NT4 sanctity@__holiness__2563
NT4 the__profane__2564
NT3 religious__sentiments__1560
NT4 piety@__religion__2565
NT4 sanctimony@__hypocrisy__2566
NT4 impiety@__atheism__2567
NT4 cohesion@__consistency@__tenacity__1613
NT4 noncohesion@__looseness__1614
NT4 combinations@__unions__1615
NT4 disintegration@__decay__1616
NT3 wholeness__1407
NT4 portions@__segments__1618
NT4 completeness@__thoroughness__1619
NT4 incompleteness@__deficiencies@__immaturity@__shortages__1620
NT4 organizing@__structuring__1621
NT4 totality@__the__whole__amount__313920
NT2 order__1358
NT3 order__in__general__1408
NT4 order@__harmony@__regularity__1622
NT4 placement@__arrangement__1623
NT4 classifications@__ratings__1624
NT4 chaos@__confusion@__disorder__1625
NT4 disarrangement@__disorganization__1626
NT3 consecutive__order__1409

NT3 supernaturalism__1562
NT4 occultism__2571
NT4 sorcery@__magic__2572
NT4 magic__spells@__charms__2573
NT3 churchdom__1563
NT4 laity__2576
NT4 religious__rites__2577
NT3 supernatural__regions__1557
NT1 abstract__relations__1355
NT2 relation__1356
NT3 absolute__relation__1401
NT4 relationships@__relevance@__pertinence__1572
NT4 unrelatedness@__irrelevance@__inapplicability__1573
NT4 family__relationships__1574
NT4 marital__relationships__1575
NT4 correlations@__interrelationships__1576
NT4 identity@__indistinguishability@__carbon__copy__1577
NT4 opposition@__opposites__1578
NT4 differences@__differentiations@__distinctions__1579
NT4 uniformity@__homogeneity__1580
NT4 nonuniformity@__diversification__1581
NT4 variety@__diversity__1582
NT3 partial__relation__1402
NT4 similarities@__approximations__1583
NT4 dissimilarities@__contrasts__1584
NT4 imitations@__counterfeits__1585
NT4 originality@__newness@__uniqueness__1586
NT4 representations@__reproductions@__duplicates__1587
NT4 models@__patterns@__examples__1588
NT3 correspondence__of__relationship__1403
NT4 agreements@__cooperation@__consensus__1589
NT4 disagreements@__inconsistencies@__incongruities__1590
NT2 quantity__1357
NT3 simple__quantity__1404
NT4 quantities@__amounts__1591
NT4 degrees@__ranks@__levels@__proportions__1592
NT3 comparative__quantity__1405
NT4 equality@__parity__1593
NT4 inequalities@__disparities__1594
NT4 midpoints@__mediocrity__1595
NT4 reparations@__counterbalances__1596
NT4 greatness__1597
NT4 smallness__1598
NT4 excellence@__expertise@__leadership__1599
NT4 insignificance@__incompetence@__subservience__1600
NT4 increases@__augmentations@__proliferations@__intensifications__1601
NT4 decreases@__declines@__reductions@__curtailments__1602
NT3 conjunctive__quantity__1406
NT4 additions@__annexations__1603
NT4 adjuncts@__additions@__annexes__1604
NT4 subtractions@__reductions@__deletions@__amputations__1605
NT4 remainders@__balances@__leftovers__1606
NT4 mixtures@__mergers@__blends__1607
NT4 simplicity@__the__basics__1608
NT4 complexity@__complications@__entanglements__1609
NT4 connections@__junctions@__fasteners@__joining__1610
NT4 analysis@__dissections__1611
NT4 separation@__removal@__severance@__dismantlement__1612
NT4 unspecified__large__numbers__1664
NT4 fewness__1665
NT4 repetitions__1666
NT4 infinity__1667
NT2 time__1360
NT3 absolute__time__1416
NT4 time@__passage__of__time__1668
NT4 eternity__1669
NT4 intervals__of__time__1670
NT4 spells@__periods__of__duty__1671
NT4 interludes__1672
NT4 longevity@__durability__1673
NT4 transience@__short__durations__1674
NT4 perpetuity@__forever__1675
NT4 instants@__minute__durations__of__time__1676
NT4 measurement__of__time__1677
NT4 anachronisms__1678
NT3 relative__time__1417 category

NT4 priorities__1627
NT4 logical_sequences@__progressions__1628
NT4 forerunners@__guides@__leaders@__introductions__1629
NT4 sequels@__logical_continuations__1630
NT4 beginnings__1631
NT4 middles__1632
NT4 ends__1633
NT4 continuity@__uninterrupted__progressions__1634
NT4 interruptions@__interrupted_sequences__1635
NT3 collective_order__1410
NT4 togetherness@__communities@__escorts__1636
NT4 groups@__assemblies__1637
NT4 decentralization__1638
NT3 distributive__order__1411
NT4 inclusion@__involvement__1639
NT4 exclusion__1640
NT4 foreignness@__newcomers__1641
NT4 generalizations@__prevalence__1642
NT4 specifics@__uniqueness@__specifications__1643
NT4 areas__of__expertise@__experts__1644
NT3 conformity__to__rule__1412
NT4 conformity__1645
NT4 nonconformity@__nonconformists__1646
NT4 normality@__the__usual__1647
NT4 abnormality@__the__unusual__1648
NT2 number__1359

NT3 number__in__general__1413
NT4 numbers@__mathematics__1649
NT4 numeration@__assignment__of__numbers__1650
NT4 lists__1651
NT3 determinate__number__1414
NT4 unity__1652
NT4 divisions__and__multiples__of__two__1653
NT4 duplication@__repetition__1654
NT4 bisection@__halving@__dichotomies__1655
NT4 threesomes__1656
NT4 triplication__1657
NT4 trisection__1658
NT4 foursomes__1659
NT4 quadruplication__1660
NT4 quadrisection__1661
NT4 five__and__over__1662
NT3 indeterminate__number__1415
NT4 pluralities@__majorities__1663
NT2 causation__1363
NT3 causes@__effects__313802
NT4 causes@__stimuli@__explanations__1716
NT4 effects@__results@__consequences__1717
NT4 attribution@ __placing_responsibility__1718
NT4 chance@__luck__1719
NT2 power__1364
NT3 power__in__general__1421
NT4 power@__force@__ability__1720
NT4 ineffectiveness@__lack__of__power@__power__vacuums__1721
NT4 strength@__force@__strengthening__1722
NT4 weakness__1723
NT4 energy@__vigor__1724
NT4 violence@__rage@__explosions@__extreme__measures__1725
NT4 moderation@__control__1726
NT3 power__in__operation__1422
NT4 operation@__management@__making__it__work__1727
NT4 productivity__1728
NT4 nonproductivity__1729
NT4 manufacturing@__childbearing__1730
NT4 products@__creations__1731
NT4 procreation__1732
NT4 ancestry@__lineage__1733
NT4 posterity@__descendants__1734
NT3 indirect__power__1423
NT4 influence@__authority__1735
NT4 lack__of__influence__1736
NT4 tendencies@__inclinations__1737
NT4 likelihood__of__occurrence@__the __odds__1738
NT4 commitments@__making__commitments__1739
NT3 combination__of__forces__1424

NT4 previous__times@__formerly__1679
NT4 later__times@__afterwards__1680
NT4 simultaneity__1681
NT4 former__times@__memories@__history__1662
NT4 the__here__and__now__1683
NT4 future__times@__expectations@__prospects__1684
NT3 time__with__reference__to__age__1418
NT4 newness@__innovation__1685
NT4 the__ancient@__traditions@__archaeology__1686
NT4 childhood@__adolescence__1687
NT4 young__people@__plants@__animals@__insects__1686
NT4 age@__maturity__1689
NT4 adults__1690
NT3 time__with__reference__to__season__1419
NT4 seasons__of__the__year__1691
NT4 timeliness@__the__right__time__1692
NT4 untimeliness@__the__wrong__time__1693
NT4 earliness@__anticipation__1694
NT4 delays@__postponements__1695
NT4 mornings@__days__1696
NT4 evenings@__nights__1697
NT3 recurrent__time__1420
NT4 common__occurrences@__the__usual@__the__expected__1698
NT4 uncommon__occurrences@__the__unusual@__the__unexpected__1699
NT4 clockwork__regularity@__predictable__cycles__1700
NT4 irregularity__of __recurrence@__the__sporadic@__non-predictable__cycles__1701
NT2 change__1361
NT3 change@__states__of__change__313803
NT4 changes@__alterations__1702
NT4 permanence@__the__unchanging__1703
NT4 flexibility@__the__capacity__to __change__1704
NT4 stability@__security@__reliability__1705
NT4 continuation__of__actions__1706
NT4 cessation__of__actions__1707
NT4 changes@__switching__to__something__different__1708
NT4 reversion@__regression@__about-faces__1709
NT4 major__changes__1710
NT4 developmental__changes__1711
NT4 substitutions__1712
NT4 interchanges@__exchanges@__trading__1713
NT2 events__79925
NT3 events@__imminence__313806
NT4 events@__occurrences__1714
NT4 forthcoming__events__1715
NT3 machinery__manufacturers
NT2 industrialist__and__financiers
NT2 international__trade__and__finance
NT2 labor__and__unions
NT3 employment__agencies
NT2 manufacturing
NT2 marketing
NT2 office__products
NT1 economics
NT2 economists NT2 finance__and__investment
NT3 banking
NT3 credit__cards
NT3 currencies
NT3 financial__news__services
NT3 insurance__industry
NT3 precious__metals__market
NT3 real__estate__industry
NT3 stocks@__bonds@__and__commodities
NT4 mutual__funds
NT5 balanced__funds
NT5 foreign__stock__funds
NT5 global__bond__funds
NT5 global__stock__funds
NT5 junk__bond__funds
NT5 municipal__bond__funds
NT5 stock__funds
NT5 tax-free__money__funds
NT5 taxable__bond__funds
NT5 taxable__money__funds
NT2 taxes__and__tariffs -continued

| category | |
|---|---|
| NT4 teamwork__1740 | TT general__classification |
| NT4 lack__of__teamwork@__conflicts@__interferences__1741 | TT geography |
| NT2 existence__1354 | NT1 cartography |
| NT3 being__in__the__abstract__1396 | NT2 explorers |
| NT4 existence@__reality__1564 | NT1 political__geography |
| NT4 nonexistence@__nothing__1565 | NT2 Africa |
| NT3 being__in__the__concrete__1398 | NT3 Central__Africa |
| NT4 substantiality@__substances__1566 | NT4 Angola |
| NT4 unsubstantiality@__intangibility__1567 | NT4 Burundi |
| NT3 formal__existence__1399 | NT4 Central__African__Republic |
| NT4 essence@__gist__1568 | NT4 Congo |
| NT4 nonessentials@__extraneousness__1569 | NT4 Gabon |
| NT3 modal__existence__1400 | NT4 Kenya |
| NT4 status@__conditions__1570 | NT4 Malawi |
| NT4 circumstances@__occurrences__1571 | NT4 Rwanda |
| TT business__and__economics | NT4 Tanzania |
| NT1 business__and__industry | NT4 Uganda |
| NT2 business__services__industry | NT4 Zaire |
| NT2 commerce__and__trade | NT4 Zambia |
| NT3 retail__trade__industry | NT3 North__Africa |
| NT4 convenience__stores | NT4 Algeria |
| NT3 wholesale__trade__industry | NT4 Chad |
| NT2 consulting__industry | NT4 Djibouti |
| NT2 customer__service | NT4 Egypt |
| NT2 corporations__and__business__practices | NT4 Ethiopia |
| NT3 corporate__and__industrial__management | NT4 Libya |
| NT2 diversified__companies | NT4 Motocco |
| NT2 entrepreneurship | NT4 Somalia |
| NT2 industrial__engineering | NT4 Sudan |
| NT3 production__methods | NT4 Tunisia |
| NT2 industrial__goods__manufacturing | NT3 Southern__Africa |
| NT4 Botswana | NT4 Thailand |
| NT4 Lesotho | NT4 Vietnam |
| NT4 Nozambique | NT2 Atlantic__area |
| NT4 Namibia | NT3 Azores |
| NT4 South__Africa | NT3 Bermuda |
| NT4 Swaziland | NT3 Canary Islands |
| NT4 Zimbabwe | NT3 Cape__Verde |
| NT3 West__Africa | NT3 Falkland__Islands |
| NT4 Benin | NT2 Caribbean |
| NT4 Burkina | NT3 Antigua__and__Barbuda |
| NT4 Cameroon | NT3 Bahamas |
| NT4 Equatorial__Guinea | NT3 Barbados |
| NT4 Gambia | NT3 Cuba |
| NT4 Ghana | NT3 Dominica |
| NT4 Guinea | NT3 Dominican__Republic |
| NT4 Guinea-Bissau | NT3 Grenada |
| NT4 Ivory__Coast | NT3 Haiti |
| NT4 Liberia | NT3 Jamaica |
| NT4 Mali | NT3 Netherlands__Antilles |
| NT4 Mauritania | NT3 Puerto__Rico |
| NT4 Niger | NT3 Trinidad__and__Tobago |
| NT4 Nigeria | NT2 Central__America |
| NT4 Sao__Tome__and__Principe | NT3 Belize |
| NT4 Senegal | NT3 Costa__Rico |
| NT4 Sierra__Leone | NT3 El__Salvador |
| NT4 Togo | NT3 Guatemala |
| NT2 Antarctica | NT3 Honduras |
| NT2 Arctic | NT3 Nicaragua |
| NT3 Greenland | NT3 Panama |
| NT3 Iceland | NT2 Europe |
| NT2 Asia | NT3 Eastern__Europe |
| NT3 Central__Asia | NT4 Albania |
| NT4 Afghanistan | NT4 Armenia |
| NT4 Bangladesh | NT4 Azerbaijan |
| NT4 Bhutan | NT4 Belarus |
| NT4 India | NT4 Bulgaria |
| NT4 Kazakhstan | NT4 Czech__Republic |
| NT4 Kyrgyzstan | NT4 Czechoslovakia |
| NT4 Nepal | NT4 Estonia |
| NT4 Pakistan | NT4 Greece |
| NT4 Tajikstan | NT4 Hungary |
| NT4 Turkmenistan | NT4 Latvia |
| NT4 Uzbekistan | NT4 Lithuania |
| NT3 East__Asia | NT4 Moldava |
| NT4 China | NT4 Poland |
| NT4 Hong__Kong | NT4 Republic__of__Georgia |

-continued

| category | |
|---|---|
| NT4 Japan | NT4 Romania |
| NT4 Macao | NT4 Russia |
| NT4 Mongolia | NT4 Slovakia |
| NT4 North_Korea | NT4 The_Soviet_Union |
| NT4 South_Korea | NT4 Ukraine |
| NT4 Taiwan | NT4 Yugoslavia |
| NT3 Southeast_Asia | NT5 Bosnia_and_Herzegovina |
| NT4 Brunei | NT5 Croatia |
| NT4 Indonesia | NT5 Macedonia |
| NT4 Kampuchea | NT5 Montenegro |
| NT4 Laos | NT5 Serbia |
| NT4 Malaysia | NT5 Slovenia |
| NT4 Myanmar | NT3 Western_Europe |
| NT4 Papua_New_Guinea | NT4 Austria |
| NT4 Philippines | NT4 Belgium |
| NT4 Singapore | NT4 Denmark |
| NT4 Germany | NT4 Delaware |
| NT4 Faeroe_Island | NT4 Florida |
| NT4 Finland | NT4 Hawaii |
| NT4 France | NT4 Idaho |
| NT4 Iberia | NT4 Illinois |
| NT5 Andorra | NT4 Indiana |
| NT5 Portugal | NT4 Iowa |
| NT5 Spain | NT4 Kansas |
| NT4 Ireland | NT4 Kentucky |
| NT4 Italy | NT4 Louisiana |
| NT4 Liechtenstein | NT4 Maine |
| NT4 Luxembourg | NT4 Maryland |
| NT4 Monaco | NT4 Massachusetts |
| NT4 Norway | NT4 Michigan |
| NT4 San_Marino | NT4 Minnesota |
| NT4 Sweden | NT4 Mississippi |
| NT4 Switzerland | NT4 Missouri |
| NT4 The_Netherlands | NT4 Montana |
| NT4 United_Kingdom | NT4 Nebraska |
| NT5 England | NT4 Nevada |
| NT5 Northern_Ireland | NT4 New_Hampshire |
| NT5 Scotland | NT4 New_Jersey |
| NT5 Wales | NT4 New_Mexico |
| NT2 Indian_Ocean_area | NT4 New_York |
| NT3 Comoros | NT4 North_Carolina |
| NT3 Madagascar | NT4 North_Dakota |
| NT3 Maldives | NT4 Ohio |
| NT3 Mauritius | NT4 Oklahoma |
| NT3 Seychelles | NT4 Oregon |
| NT3 Sri_Lanka | NT4 Pennsylvania |
| NT2 Mediterranean | NT4 Rhode_Island |
| NT3 Corsica | NT4 South_Carolina |
| NT3 Cyprus | NT4 South_Dakota |
| NT3 Malta | NT4 Tennessee |
| NT3 Sardinia | NT4 Texas |
| NT2 Middle_East | NT4 Utah |
| NT3 Bahrain | NT4 Vermont |
| NT3 Iran | NT4 Virginia |
| NT3 Iraq | NT4 Washington |
| NT3 Israel | NT4 Washington_D.C. |
| NT3 Jordan | NT4 West_Virginia |
| NT3 Kuwait | NT4 Wisconsin |
| NT3 Lebanon | NT4 Wyoming |
| NT3 Oman | NT2 Pacific_area |
| NT3 Qatar | NT3 American_Samoa |
| NT3 Saudi_Arabia | NT3 Australia |
| NT3 Socotra | NT4 Tasmania |
| NT3 Syria | NT3 Cook_Islands |
| NT3 Turkey | NT3 Fiji |
| NT3 United_Arab_Emireces | NT3 French_Polynesia |
| NT3 Yemen | NT3 Guam |
| NT2 North_America | NT3 Kiribati |
| NT3 Canada | NT3 Mariana_Islands |
| NT3 Mexico | NT3 Marshall_Islands |
| NT3 United_States | NT3 Micronesia |
| NT4 Alabama | NT3 Nauru |
| NT4 Alaska | NT3 New_Caledonia |
| NT4 Arizona | NT3 New_Zealand |
| NT4 Arkansas | NT3 Palau |
| NT4 California | NT3 Solomon_Islands |
| NT4 Colorado | NT3 Tonga |

-continued

| category | |
|---|---|
| NT4 Connecticut | NT3 legal_bodies |
| NT3 Tuvalu | NT3 legal_customs_and_formalities |
| NT3 Vanuatu | NT3 legal_judgments |
| NT3 Western_Samoa | NT3 legal_people |
| NT2 South_America | NT3 legal_proceedings |
| NT3 Argentina | NT3 prisons_and_punishments |
| NT3 Bolivia | NT2 municipal_government |
| NT3 Brazil | NT3 cities |
| NT3 Chile | NT4 cities@_towns@_and_environs |
| NT3 Colombia | NT4 urban_phenomena |
| NT3 Ecuador | NT4 urban_structures |
| NT3 French_Guiana | NT3 municipal_infrastructure |
| NT3 Guyana | NT2 politics |
| NT3 Paraguay | NT3 elections_and_campaigns |
| NT3 Peru | NT3 political_parties |
| NT3 Suriname | NT3 political_practices_and_functions |
| NT3 Uruguay | NT3 political_principles_and_philosophies |
| NT3 Venezuela | NT3 politicians_and_activists |
| NT1 physical_geography | NT3 revolution_and_subversion |
| NT2 bodies_of_water | NT2 postal_communications |
| NT3 lakes | NT2 public_facilities |
| NT3 oceans | NT2 state_government |
| NT3 rivers | NT1 military |
| NT2 land_forms | NT2 air_force |
| NT3 continents | NT2 armored_clothing |
| NT3 deserts | NT2 army |
| NT3 islands | NT2 cryptography |
| NT3 mountains | NT2 military_buildings |
| TT government_and_military | NT2 military_equipment |
| NT1 government_and_law | NT2 military_honors |
| NT2 acts@_powers@_and_procedures | NT2 military_intelligence |
| NT2 county_government | NT2 military_leaders |
| NT2 forms_and_philosophies_of_government | NT2 military_ranks |
| NT2 government_bodies_and_institutions | NT3 army@_air_force@_and_marine_ranks |
| NT3 executive_branch | NT3 navy_and_coast_guard_ranks |
| NT4 cabinet | NT2 military_wars |
| NT4 U.S._residents | NT3 American_Civil_War |
| NT3 judiciary_branch | NT3 American_Revolution |
| NT4 supreme_court | NT3 warfare |
| NT5 chief_justices | NT3 World_War_I |
| NT5 landmark_cases | NT3 World_War_II |
| NT3 legislative_branch | NT2 military_weaponry |
| NT4 house_of_representatives | NT3 bombs_and_mines |
| NT4 senate | NT3 chemical_and_biological_warfare |
| NT2 government_officials | NT3 military_aircraft |
| NT3 famous_leaders | NT3 missiles@_rockets@_and_torpedoes |
| NT3 royalty_and_aristocracy | NT3 nuclear_weaponry |
| NT2 government_programs | NT3 space-based_weapons |
| NT3 social_programs | NT2 navy |
| NT4 welfare | NT3 warships |
| NT2 international_relations | NT2 service_academies |
| NT3 Cold_War | TT science@_technology@_and_education |
| NT3 diplomacy_and_diplomats | NT1 communications |
| NT3 immigration | NT2 advertising_industry |
| NT2 law | NT2 journalism |
| NT3 courts | NT3 broadcast_journalism |
| NT3 crimes_and_offenses | NT3 journalist |
| NT4 substance_abuse | NT3 print_journalism |
| NT3 criminals | NT4 newspapers |
| NT3 law_enforcement | NT2 publishing_industry |
| NT3 law_firms | NT3 printing |
| NT3 law_systems | NT3 types_of_publications |
| NT4 constitutional_law | NT6 grooming_aids |
| NT4 books | NT5 nutrition |
| NT2 speech_communications | NT6 vitamins |
| NT1 education | NT5 treatments_and_activities |
| NT2 colleges_and_universities | NT4 healthcare_industry |
| NT3 academic_degrees | NT5 medical_business_and_practices |
| NT2 curricula_and_methods | NT5 medical_equipment_manufactures |
| NT2 schools | NT4 injuries |
| NT2 teachers_and_students | NT4 medical_disciplines_and_specialties |
| NT1 hard_sciences_and_technology | NT5 dentistry |
| NT2 aerospace_industry | NT5 medical_personnel |
| NT3 satellite_technology | NT5 ophthalmology |
| NT3 space_exploration | NT4 medical_equipment |
| NT4 space_explorers | NT4 medical_facilities |
| NT4 spacecraft_and_space_stations | NT4 medical_procedures |

-continued

| category | |
|---|---|
| NT2 astronomy | NT5 medical_diagnosis |
| NT3 astronomers | NT6 medical_imaging |
| NT3 celestial_bodies | NT5 surgery |
| NT4 comets | NT4 medical_treatments |
| NT4 constellations | NT4 pharmacology |
| NT4 galaxies | NT5 anesthetics |
| NT4 moons | NT6 general_anesthetics |
| NT4 nebulae | NT6 local_anesthetics |
| NT4 planets | NT5 antagonist_and_antidotes |
| NT4 celestial_stars | NT5 antigout_agents |
| NT3 celestial_phenomena | NT5 antimicrobials_and_antiparasitics |
| NT2 biology | NT6 amebicides_and_antiprotozoals |
| NT3 biologists | NT6 aminoglycosides |
| NT3 biological_evolution | NT6 anthelmintics |
| NT3 biotechnology | NT6 antifungals |
| NT4 genetic_engineering | NT6 antimalarials |
| NT5 genetics_and_heredity | NT6 antituberculars_and_antileprotics |
| NT3 botany | NT6 antivirals |
| NT4 botanists | NT6 cephalosporins |
| NT4 plant_diseases | NT6 penicillins |
| NT4 plant_physiology | NT6 quinolones |
| NT5 plant_parts | NT6 sulfonamides |
| NT5 plant_development | NT6 tetracyclines |
| NT4 plant_kingdom | NT5 antineoplastic_agents |
| NT5 ferns | NT6 alkylating_agents |
| NT5 mosses | NT6 antibiotic_antineoplatics_agents |
| NT5 non-flowering_plants | NT6 antimetabolites |
| NT6 conifers | NT6 antineoplastic_hormone_drugs |
| NT5 flowering_plants | NT5 autonomic_nervous_system_drugs |
| NT6 cacti | NT6 adrenergic_blockers |
| NT6 grasses | NT6 adrenergics |
| NT6 deciduous_plants | NT6 anticholinergics |
| NT6 palm_trees | NT6 cholinergics |
| NT6 trees_and_shrubs | NT6 neuromuscular_blockers |
| NT3 ecology | NT6 skeletal_muscle_relaxants |
| NT4 conservation | NT5 blood_drugs |
| NT4 environmental_pollution | NT6 anticoagulants |
| NT3 health_and_medicine | NT6 blood_derivatives |
| NT4 afflictions_and_conditions | NT6 hematinics |
| NT4 artificial_limbs_and_organs | NT6 hemostatics |
| NT4 carcinogens | NT6 thrombolytic_enzymes |
| NT4 defects_and_disabilities | NT5 cardiovascular_drugs |
| NT4 diseases | NT6 antianginals |
| NT4 dressings_and_supports | NT6 antiarrhythmics |
| NT4 fitness_and_health | NT6 antihypertensives |
| NT5 fitness_equipment | NT6 antilipemics |
| NT5 fitness_technology | NT6 inotropics |
| NT5 grooming | NT4 algae |
| NT6 vasodilators | NT4 bacteria |
| NT5 central_nervous_system_drugs | NT4 fungi |
| NT6 antianxiety_agents | NT5 ascomycota |
| NT6 anticonvulsants | NT5 basidiomycota |
| NT6 antidepressants | . NT5 deuteromycota |
| NT6 antiparkinsonian_agents | NT5 zygomycota |
| NT6 antipsychotics | NT4 viruses |
| NT6 cerebral_stimulants | NT3 physiology |
| NT6 narcotic_and_opioid_analgesics | NT4 anatomy |
| NT6 nonnarcotic_analgesics_and_antipyretics | NT5 cardiovascular_systems |
| NT6 nonsteroidal_anti-inflammatory_drugs | NT5 digestive_systems |
| NT6 sedative-hypnotics | NT5 extremities_and_appendages |
| NT5 dermatomucosal_agents | NT5 glandular_systems |
| NT6 scabicides_and_pediculicides | NT5 head_and_neck |
| NT6 topical_corticosteroids | NT6 ears |
| NT5 digestive_system_drugs | NT6 eyes |
| NT6 antacids@_adsorbents@_and_antiflatulents | NT6 mouth_and_teeth |
| NT6 antidiarrheals | NT5 immune_systems |
| NT6 antiemetics | NT6 antigens_and_antibodies |
| NT6 antiulcer_agents | NT5 lymphatic_systems |
| NT6 digestants | NT5 muscular_systems |
| NT6 laxatives | NT5 nervous_systems |
| NT5 eye@_ear@_nose@_and_throat_drugs | NT5 reproductive_systems |
| NT6 nasal_agents | NT5 respiratory_systems |
| NT6 ophthalmics | NT5 skeletal_systems |
| NT7 ophthalmic_anti-infectives | NT5 tissue_systems |
| NT7 ophthalmic_anti-inflammatory_agents | NT5 torso |
| NT7 ophthalmic_vasoconstrictors | NT5 urinary_systems |
| NT7 miotics | NT4 cell_structure_and_functions |

| category |
|---|
| NT7 mydriatics |
| NT6 otics |
| NT5 fluid_and_electrolyte_drugs |
| NT6 diuretics |
| NT6 electrolytes |
| NT5 gold_salts |
| NT5 hormonal_agents |
| NT6 androgens_and_anabolic_steroids |
| NT6 antidiabetic_agents_and_glucagon |
| NT6 corticosteroids |
| NT6 estrogens_and_progestins |
| NT6 gonadotropins |
| NT6 parathyroid-like_agents |
| NT6 pituitary_hormones |
| NT6 thyroid_hormone_antagonists |
| NT6 thyroid_hormones |
| NT5 immune_system_drugs |
| NT6 antitoxins_and_antivenins |
| NT6 biological_response_modifiers |
| NT6 immune_serums |
| NT6 immunosuppressants |
| NT6 vaccines_and_toxoids |
| NT5 oxytocics |
| NT5 pharmaceutical_industry |
| NT5 respiratory_drugs |
| NT6 antihistamines |
| NT6 bronchodilators |
| NT6 expectorants_and_antitussives |
| NT5 spasmolytics |
| NT5 topical_agents |
| NT5 toxins |
| NT4 veterinary_medicine |
| NT3 lower_life_forms |
| NT6 honey_eaters |
| NT6 honeycreepers |
| NT6 honeyguides |
| NT6 hoopoes |
| NT6 hornbills |
| NT6 hummingbirds |
| NT6 jacamars |
| NT6 jays@_crows@_and_magpies |
| NT6 kingfishers_and_motmots |
| NT6 larks |
| NT6 manakins |
| NT6 mimic_thrushes |
| NT6 moundbirds |
| NT6 nightjars |
| NT6 nuthatches_and_creepers |
| NT6 ovenbirds_and_allies |
| NT6 parrots_and_parakeets |
| NT6 penguins |
| NT6 pigeons_and_doves |
| NT6 pipits_and_wagtails |
| NT6 pittas |
| NT6 potoos |
| NT6 puffbirds |
| NT6 shrikes |
| NT6 silky_flycatchers |
| NT6 starlings |
| NT6 swallows |
| NT6 swifts |
| NT6 tanagers |
| NT6 thrushes |
| NT6 tinamous |
| NT6 titmice_and_chickadees |
| NT6 toucans |
| NT6 trogons |
| NT6 vireos |
| NT6 warblers_and_sparrows |
| NT6 water_birds |
| NT7 albatrosses |
| NT7 auks_and_puffins |
| NT7 cormorants_and_anhingas |
| NT7 ducks@_geese@_and_swans |
| NT7 frigatebirds |
| NT7 gannets_and_boobies |
| NT7 grebes |
| NT4 enzymes |
| NT4 hormones |
| NT4 reproduction_and_development |
| NT3 zoology |
| NT4 invertebrates |
| NT5 arachnids |
| NT5 crustaceans |
| NT5 insects |
| NT5 mollusks_and_aquatic_invertebrates |
| NT5 worms |
| NT4 prehistoric_animals |
| NT5 dinosaurs |
| NT4 vertebrates |
| NT5 amphibians |
| NT5 birds |
| NT6 accentors |
| NT6 antbirds |
| NT6 bee_eaters |
| NT6 birds_of_paradise |
| NT6 birds_of_prey |
| NT7 owls |
| NT6 blackbirds_and_orioles |
| NT6 bowerbirds |
| NT6 bulbuls |
| NT6 cotingas_and_becards |
| NT6 cuckoos_and_anis |
| NT6 dippers_and_ouzels |
| NT6 finches |
| NT6 flycatchers |
| NT6 frogmouths |
| NT6 game_birds |
| NT7 chickens |
| NT6 carnivores |
| NT7 cats |
| NT7 dogs |
| NT6 elephants |
| NT6 even-toed_hoofed_mammals |
| NT7 cattle |
| NT7 goats |
| NT7 pigs |
| NT7 sheep |
| NT6 hyraxes |
| NT6 monotremes |
| NT6 marsupials |
| NT6 odd-toed_hoofed_mammals |
| NT7 horses |
| NT6 primates |
| NT7 lemurs |
| NT6 rabbits_and_hares |
| NT6 rodents |
| NT6 seals_and_walruses |
| NT7 manatees |
| NT6 whales_and_porpoises |
| NT5 reptiles |
| NT6 crocodilians |
| NT6 lizards |
| NT6 snakes |
| NT6 turtles |
| NT2 chemistry |
| NT3 branches_of_chemistry |
| NT4 chemists |
| NT3 chemical_constants@_theories@_and_values |
| NT3 chemical_elements |
| NT3 chemical_measures |
| NT3 chemical_particles_and_molecular_structures |
| NT3 chemical_products |
| NT4 chemical_explosives |
| NT4 plastics_and_rubber |
| NT4 synthetic_textiles |
| NT3 chemical_properties_and_reactions |
| NT3 chemical_tests |
| NT3 chemicals |
| NT3 chemistry_tools |
| NT2 civil_engineering_and_architecture |
| NT3 architects |
| NT3 construction_industry |
| NT4 building_components |

| category |
|---|
| NT7 gulls_and_terns
NT7 loons
NT7 pelicans
NT7 rails@_gallinules@_and_coots
NT7 shearwaters_and_petrels
NT7 shorebirds
NT7 tropicbirds
NT7 wading_birds
NT6 waxwings
NT6 weavers_and_weaver_finches
NT6 woodcreepers
NT6 woodpeckers
NT6 wrens
NT5 fish
NT5 mammals
NT6 anteaters_and_sloths
NT7 aardvarks
NT6 bats
NT4 construction_equipment
NT4 construction_materials
NT5 paneling_and_composites
NT5 surfaces_and_finishing
NT4 construction_workers
NT4 types_of_buildings
NT5 dwellings
NT5 outbuildings
NT4 types_of_construction
NT3 civil_engineers
NT3 schools_of_architecture
NT2 computer_industry
NT3 computer_hardware_industry
NT4 computer_components
NT5 computer_memory
NT5 computer_sound
NT5 microprocessors
NT4 computer_peripherals
NT5 computer_video
NT5 data_storage_devices
NT4 types_of_computers
NT5 hand-held_computers
NT5 laptops
NT5 mainframes
NT5 personal_computers
NT5 work-stations
NT3 computer_multimedia
NT3 computer_networking
NT4 Internet_technology
NT3 computer_science
NT4 artificial_intelligence
NT4 natural_language_processing
NT3 computer_software_industry
NT4 CAD-CAM
NT4 client-server_software
NT4 computer_programming
NT5 programming_development_tools
NT5 programming_languages
NT4 databases_and_spreadsheets
NT4 document_management_and_workflow_software
NT5 desktop_publishing_and_word_processing
NT4 computer_viruses_and_protection
NT4 graphics_software
NT4 operating_systems
NT3 computer_standards
NT3 voice_recognition_technology
NT2 electronics
NT3 electrical_and_electronic_engineering
NT3 electronic_circuits_and_components
NT3 microelectronics
NT3 radar_technology
NT3 retail_electronics_industry
NT3 semiconductors_and_superconductors
NT3 telecommunications_industry
NT4 data_transmission
NT4 fiber_optics
NT4 voice_transmission_and_telephony
NT2 energy_industry
NT3 electric_power_industry
NT5 exterior_structures
NT6 entryways_and_extensions
NT6 landscaping
NT6 ornamental_parts
NT6 roofs_and_towers
NT6 structural_framework
NT6 windows@_walls@_and_facades
NT5 interior_structures
NT6 building_foundations
NT6 building_systems
NT7 electrical_systems
NT7 fireproofing_and_insulation
NT7 plumbing
NT6 rooms
NT7 interior_structural_parts
NT7 room_parts
NT4 carpentry
NT5 coal_industry
NT5 petroleum_products_industry
NT4 nuclear_power_industry
NT2 environment_control_industries
NT3 heating_and_cooling_systems
NT3 pest_control
NT3 waste_management
NT2 explosives_and_firearms
NT3 firearm_parts_and_accessories
NT3 recreational_firearms
NT2 geology
NT3 ages_and_eras
NT3 branches_of_geology
NT4 geologists
NT3 geologic_formations
NT3 geologic_substances
NT4 minerals
NT5 gemstones
NT4 rocks
NT5 igneous_rocks
NT5 metamorphic_rocks
NT5 sedimentary_rocks
NT3 meteorology
NT4 atmospheric_science
NT4 clouds
NT4 cyclical_events
NT4 storms
NT4 weather_modification
NT4 weather_phenomena
NT4 winds
NT3 oceanography
NT3 seismology
NT3 vulcanology
NT2 inventors
NT2 materials_technology
NT3 industrial_ceramics
NT3 metal_industry
NT4 aluminum_industry
NT4 metallury
NT4 steel_industry
NT3 mining_industry
NT2 mathematics
NT3 algebra_and_arithmetic
NT4 linear_algebra
NT3 calculus
NT3 geometry
NT4 analytic_geometry
NT3 math_tools
NT3 mathematicians
NT3 number_theory
NT3 statistics
NT3 symbolic_logic
NT3 trigonometry
NT2 mechanical_engineering
NT3 machine_components
NT3 robotics
NT3 types_of_machines
NT4 internal_combustion_engines
NT2 physics
NT3 acoustics |

| category |
|---|

NT3 energy_sources
NT4 alternative_energy_sources
NT4 fossil_fuels_industry
NT3 heat_physics
NT3 motion_physics
NT3 nuclear_and_radiation_physics
NT4 subatomic_articles
NT3 optical_technology
NT4 holography
NT4 laser_technology
NT5 high-energy_lasers
NT5 low-energy_lasers
NT4 optical_instruments
NT2 textiles
NT2 tools_and_hardware
NT3 adhesives_and_binders
NT3 hand_and_power_tools
NT4 digging_and_lifting_tools
NT4 drills_and_bits
NT4 edged_and_pointed_tools
NT4 fasteners
NT4 gripping_and_tightening_tools
NT4 hammers
NT4 measuring_and_marking_tools
NT4 power_tools_manufacturers
NT4 smoothing_and_shaping_tools
NT4 wrenches
NT4 machine_tools
NT1 social_sciences
NT2 anthropology
NT3 archeology
NT4 ages_and_periods
NT4 prehistoric_humanoids
NT3 branches_of_anthropology
NT4 anthropologists
NT3 customs_and_practices
NT3 kinship_and_marriage
NT3 peoples
NT3 races_of_people
NT2 history
NT3 ancient_history
NT3 ancient_Rome
NT4 Roman_emperors
NT3 historians
NT3 historical_eras
NT3 U.S._history
NT4 slavery_in_the_U.S.
NT2 human_sexuality
NT2 linguistics
NT3 descriptive_linguistics
NT4 grammar
NT5 parts_of_speech
NT4 phonetics_and_phonology
NT3 historical_linguistics
NT3 languages
NT3 linguistic_theories
NT3 linguists
NT3 rhetoric_and_figures_of_speech
NT3 sociolinguistics
NT4 dialects_and_accents
NT3 writing_and_mechanics
NT4 punctuation_and_diacritics
NT4 writing_systems
NT2 psychology
NT3 psychological_disorders
NT4 Celtic_gods
NT4 Egyptian_gods
NT4 Greek_gods
NT4 Japanese_gods
NT4 Mesopotamian_gods
NT4 Norse_and_Germanic_gods
NT4 Roman_gods
NT3 myths_and_legends
NT3 utopias
NT2 philosophy
NT3 philosophers
NT3 philosophical_ideas
NT3 cosmology
NT3 electricity_and_magnetism
NT4 manias
NT4 phobias
NT3 psychological_tools_and_techniques
NT3 schools_and_doctrines_or_psychology
NT4 psychologists
NT3 states_and_behaviors
NT2 sociology
NT3 attitudes_and_behavior
NT3 social_movements_and_institutions
NT4 civil_rights
NT4 feminism
NT3 social_structures
NT3 social_types
NT4 senior_citizens
NT4 social_stereotypes
NT1 transportation
NT2 aviation
NT3 aircraft
NT4 aircraft_parts
NT3 airlines
NT4 airline_companies
NT3 airports
NT3 aviation_occupations
NT3 avionics_and_instrumentation
NT3 freight_and_shipping
NT3 trucking_industry
NT3 package_delivery_industry
NT2 ground_transportation
NT3 animal_powered_transportation
NT3 automotive_industry
NT4 car_rentals
NT4 automobiles
NT4 automotive_parts
NT4 automotive_repair
NT4 motorcycles
NT4 trucks_and_buses
NT5 bus_companies
NT3 human_powered_vehicles
NT3 rail_transportation
NT4 railroad_industry
NT5 railroad_cars
NT5 railroad_jargon
NT5 railroad_personnel
NT5 trains
NT4 subways
NT3 roadways_and_driving
NT3 sleds_and_sleighs
NT2 marine_transportation
NT3 boat_parts
NT3 boats_and_ships
NT3 nautical_occupations
NT3 seamanship
NT3 waterways
TT social_environment
NT1 belief_systems
NT2 folklore
NT2 mythology
NT3 mythological_beings
NT4 mythological_creatures
NT4 mythological_humans
NT3 mythological_gods
NT4 Aztec_gods
NT4 dresses_and_skirts
NT4 pants_and_shorts
NT4 shirts_and_tops
NT4 sporting_wear
NT4 suits_and_uniforms
NT4 sweaters_and_vests
NT3 sewing_terms
NT3 undergarments
NT4 hosiery
NT4 lingerie_and_support
NT4 men's_underwear
NT4 nightclothes_and_deshabille
NT2 cosmetics

| category |
|---|
| NT3 schools_of_philosophy |
| NT2 religion |
| NT3 doctrines_and_practices |
| NT3 God_and_divinity |
| NT3 history_of_religion |
| NT3 neo-Paganism |
| NT4 astrology |
| NT5 signs_of_zodiac |
| NT3 religious_institutions_and_structures |
| NT3 religious_personnel |
| NT3 sacred_texts_and_objects |
| NT3 world_religions |
| NT4 Christianity |
| NT5 Bible |
| NT5 Christian_denominations |
| NT5 Christian_heresies |
| NT5 Christian_theologians |
| NT5 evangelism |
| NT5 liturgical_garments |
| NT5 protestant_reformation |
| NT5 Roman_Catholicism |
| NT6 religious_orders |
| NT6 popes |
| NT4 eastern_religions |
| NT5 Buddhism |
| NT5 Hinduism |
| NT6 Hindu_deities |
| NT4 Islam |
| NT4 Judaism |
| NT4 sects |
| NT1 clothing_and_appearance |
| NT2 clothing |
| NT3 clothing_accessories |
| NT4 belts |
| NT4 functional_accessories |
| NT4 gloves |
| NT3 fabrics |
| NT4 cloth |
| NT4 laces |
| NT4 leather_and_fur |
| NT3 footwear |
| NT3 garment_arts |
| NT3 garment_fasteners |
| NT4 garment_trim |
| NT3 headgear |
| NT4 hats |
| NT3 helmets_and_headdresses |
| NT3 neckwear |
| NT3 outer_garments |
| NT4 coats_and_jackets |
| NT3 seafood |
| NT2 nuts_and_seeds |
| NT2 pastas |
| NT2 prepared_foods |
| NT3 breads_and_crackers |
| NT3 candies |
| NT3 desserts |
| NT4 cakes |
| NT4 cookies |
| NT4 pies |
| NT3 pastries |
| NT3 sauces |
| NT3 soups_and_stews |
| NT2 ranching |
| NT2 soil_management |
| NT2 spices_and_flavorings |
| NT3 sweeteners |
| NT2 supermarkets |
| NT1 home |
| NT2 home_furnishings |
| NT3 beds |
| NT3 carpets_and_rugs |
| NT3 cases@_cabinets@_and_chests |
| NT3 chairs_and_sofas |
| NT3 curtains@_drapes@_and_screens |
| NT3 functional_articles |
| NT3 home_appliances |
| NT3 cosmetics_industry |
| NT3 facial_hair |
| NT3 hair_styling |
| NT2 jewelry |
| NT1 family |
| NT2 contraception_and_fertility |
| NT2 death_and_burial |
| NT3 funeral_and_burial_industry |
| NT2 infancy |
| NT2 kinship_and_ancestry |
| NT2 marriage_and_divorce |
| NT2 pregnancy_and_birth |
| NT2 upbringing |
| NT1 food_and_agriculture |
| NT2 agricultural_equipment |
| NT2 agricultural_technology |
| NT3 fertilizers |
| NT3 pesticides |
| NT4 fungicides |
| NT4 herbicides |
| NT2 aquaculture |
| NT2 cereals_and_grains |
| NT2 condiments |
| NT2 dairy_products |
| NT2 drinking_and_dining |
| NT3 alcoholic_beverages |
| NT4 beers |
| NT4 liqueurs |
| NT4 liquors |
| NT4 mixed_drinks |
| NT4 wines |
| NT5 wineries |
| NT3 meals_and_dishes |
| NT3 non-alcoholic_beverages |
| NT4 soft_drinks |
| NT2 farming |
| NT2 fats_and_oils |
| NT2 food_and_drink_industry |
| NT3 foodservice_industry |
| NT3 meat_packing_industry |
| NT2 forestry |
| NT3 forest_products |
| NT2 fruits_and_vegetables |
| NT2 mariculture |
| NT2 meats |
| NT3 beef |
| NT3 pate_and_sausages |
| NT3 pork |
| NT3 poultry |
| NT5 fiction |
| NT6 horror_fiction |
| NT6 mystery_fiction |
| NT5 non-fiction |
| NT6 biographers |
| NT6 biographies |
| NT6 reference_books |
| NT5 satire |
| NT4 styles_and_schools_of_literature |
| NT3 performing_arts |
| NT4 dance |
| NT5 ballet |
| NT5 dancers_and_choreographers |
| NT5 folk_dances |
| NT5 modern_dance |
| NT4 drama |
| NT5 drama_types |
| NT5 dramatic_structure |
| NT5 dramatists |
| NT5 stage_actors |
| NT5 stagecraft |
| NT4 music |
| NT5 blues_music |
| NT5 classical_music |
| NT5 classical_composers |
| NT6 opera_and_vocal |
| NT5 composition_types |
| NT5 folk_music |

| category |
|---|
| NT3 lamps_and_mirrors
NT3 linens_and_fabrics
NT3 ornamental_objects
NT3 stools_and_stands
NT3 tables_and_desks
NT2 kitchen
NT3 cookers
NT3 cooking
NT3 fine_china
NT3 flatware
NT3 glassware
NT3 kitchen_appliances
NT3 kitchen_utensils
NT3 pots_and_pans
NT3 serving_containers
NT2 hotels_and_lodging
NT1 leisure_and_recreation
NT2 arts_and_entertainment
NT3 cinema
NT4 movie_people
NT4 movie_stars
NT4 movie_terms
NT4 movie_tools_and_techniques
NT3 entertainments_and_spectacles
NT4 entertainers
NT4 theater_types
NT3 literature
NT4 authors
NT4 classical_literature
NT4 literary_devices_and_techniques
NT4 poetry
NT5 classical_poetry
NT5 poetic_styles_and_techniques
NT5 poets
NT4 prose
NT2 games
NT3 indoor_games
NT4 board_games
NT4 card_games
NT4 video_games
NT3 outdoor_games
NT2 gaming_industry
NT3 gambling
NT2 gardening
NT3 gardens
NT2 hobbies
NT3 crafts
NT3 pets
NT2 outdoor_recreation
NT3 hunting_and_fishing
NT2 restaurant_industry
NT2 smoking_and_tobacco
NT2 sports
NT3 baseball
NT3 basketball
NT3 bicycling
NT3 bowling
NT3 boxing
NT3 equestrian_events
NT4 horse_racing
NT3 football
NT3 golf
NT3 hockey
NT3 martial_arts
NT3 motor_sports
NT3 skiing
NT3 soccer
NT3 sports_equipment
NT3 swimming_and_diving
NT3 tennis
NT3 track_and_field
NT2 tourism
NT3 places_of_interest
NT3 resorts_and_spas
NT3 cruise_lines
NT2 toys
NT5 jazz_music
NT5 music_industry
NT5 music_terminology
NT5 musical_instruments
NT6 keyboard_instruments
NT6 percussion_instruments
NT6 string_instruments
NT6 wind_instruments
NT7 brass_instruments
NT7 woodwinds
NT5 musicians_and_groups
NT5 popular_music_and_dance
NT3 television_and_radio
NT3 cartoons@_comic_books@_and_superheroes
NT3 science_fiction
NT3 visual_arts
NT4 photography
NT5 cameras
NT5 photographic_lenses
NT5 photographers
NT5 photographic_processes
NT5 photographic_techniques
NT5 photographic_tools
NT4 art_galleries_and_museums
NT4 graphic_arts
NT4 painting
NT5 painters
NT5 painting_tools_and_techniques
NT5 painting_types
NT5 styles_and_schools_of_art
NT4 sculpture
NT5 sculptors
NT5 sculpture_tools_and_techniques
NT5 sculpture_types |

Although Static Ontologies provides a set of static ontologies for the preferred embodiment, modifications to the classification or concepts may be made without deviating from the spirit or scope of the invention.

Each ontology shown in FIG. 1a contains a plurality of levels that form the hierarchical structure. For example, the "business and industry" static ontology contains three levels of concept classifications under the highest level concept, and the "economics" contain four levels of concept classifications. Generally, the static ontologies of the present invention includes no more than six levels.

The actual configuration, structure and orientation of a particular ontology is dependent upon the subject matter or field of the ontology. Therefore, each ontology in the set of static ontologies of the present invention contain a different point of view. The different points of view for the static ontologies result in different approaches or different ways of viewing the knowledge concepts in the different static ontologies. Consequently, the organization of the knowledge concepts in each ontology is not consistent. As is explained below, the different points of view for the ontologies permit combining "like" forms of knowledge with "unlike" forms of knowledge through linking of one or more static ontologies.

Although the set of static ontologies are broad to cover a wide range of concepts, they are not extremely detailed. In addition, the set of static ontologies do not contain concepts that are extremely volatile. For an example ontology, a classification for "computers", may contain a sub classification for "operating systems." However, particular types of operating systems, such as "Windows" and "OS/2", are too volatile, and therefore would not be contained in the example computer ontology. Because the static ontologies define a broad range of concepts but not in great detail, they remain relatively stable over time. Therefore, the static ontologies do not require frequent updates.

The ontologies contained within the knowledge catalog of the present invention are organized such that the concepts are independent of language and culture. Therefore, the set of static ontologies in the knowledge catalog of the present invention provide a world view of knowledge. The knowledge concepts in the static ontologies are applicable to all cultures and languages. For example, in the "business and industry" ontology, the concept "commerce and trade" is a sub classification of the top level "business and industry" concept. Under the concept "commerce and trade", the ontology includes the concepts "marketing", "retail trade industry", and "wholesale trade industry." For this example, all cultures engaging in commerce and trade have concepts in marketing, retail trade industry, and wholesale trade industry. Although different words in different languages are used to describe the concepts of "marketing", "retail trade industry", and "wholesale trade industry", these concepts exist in all cultures. Therefore, the "business and industry" ontology, similar to all of the static ontologies, is not dependent on language or culture.

The "business and industry" ontology hierarchy shown in FIG. 1a contains three levels of concepts in the hierarchical structure. With only three levels, the "business and industry" ontology does not contain too much detail by including low level concepts or words that are specific to the business and industry field. For example, an additional category for "Wallmart" may be desired to more specifically classify knowledge beyond the concept of "convenience stores." However, the concept of "Wallmart" is too detailed for the business and industry static ontology because "Wallmart" does not translate across cultures and languages. For this example, in order to classify "Wallmart", the concept is placed in a dynamic level as is explained below.

The static ontologies in the knowledge catalog are in essence a new type of book. For example, a thesaurus provides words with their linguistic connotations. However, a thesaurus does not provide real world culturally independent knowledge concepts, including both semantic and linguistic derivatives of the knowledge concepts. Similarly, a dictionary, which provides definitions and origins of words, does not provide such an organization of knowledge concepts. Also, an encyclopedia, which provides detailed information on a variety of subject matters, does not provide a world view of knowledge as the knowledge catalog of the present invention.

Figure 1B:
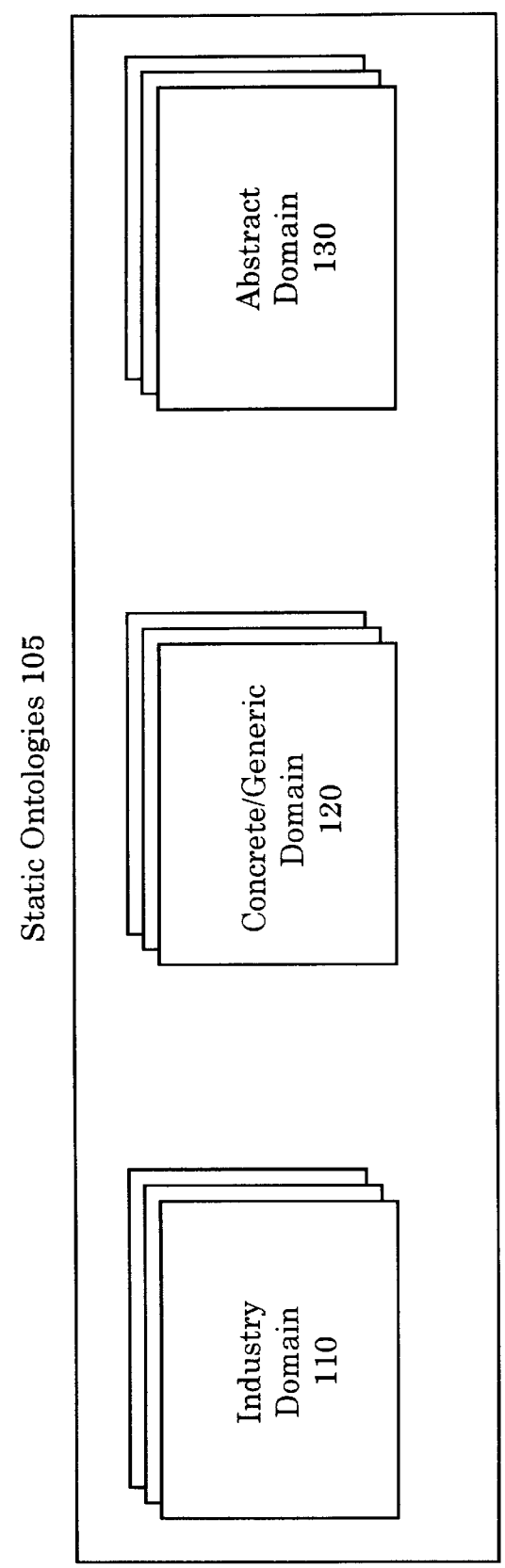
FIG. 1b illustrates a high level conceptualization for a set of static ontologies.

A high level conceptualization for a set of static ontologies are shown in FIG. 1b. For this embodiment, a set of static ontologies 105 are organized in an industry domain 110, a concrete/generic domain 120, and an abstract domain 130. The industry domain 110 includes a plurality of the static ontologies to represent words that define concrete terminology specific to one or more industries or fields of study. There are different types of industry domain 110 ontologies. For example, a classification for "electronics" includes sub-classifications for "computers" and "micro electronics." Other classifications, such as "geography", are separated into two high level classifications, "political" and "physical" geography. The industry domain 110 separates the political and physical geography classifications because the concepts of political and physical geography are very different, and each classification includes different sub-classifications beneath them.

Some of the set ontologies in the industry domain 110 are not as much industries but rather concrete concepts. For example, "clothing" represents a specific concrete ontology. In the hierarchical structure, some sub-classifications provide factual information for the higher level or parent classification, while other sub-classifications provide more richness to the parent classification. For example, the term "computer program" provides more richness to the parent classification "computer industry." However the term "California avocados" provides factual information for the parent classification "avocados" by representing that the avocados are from California.

As shown in FIG. 1b, for the preferred embodiment, the static ontologies 105 further include the concrete/generic domain 120 and abstract domain 130. The concrete/generic domain 120 contains static ontologies to represent knowledge concepts that have concrete definitions, but may be applicable to one or more specific industries or categories (e.g. the terms are generic). For example, the word "plant", when used to describe a manufacturing plant, is a concrete term that applies to many industries. Therefore, a classification for "plant" is located in the concrete/generic domain 120. The abstract domain 130 contains representations of words that are not concrete, but rather describe abstract concepts. For example, the concepts of "knowledge" and "methods" do not describe material items, but are "abstract" concepts. Although the present invention is described in conjunction with a specific domains (e.g. industry, concrete/generic, and abstract domains), other organizations may be used to define the static ontologies without deviating from the spirit and scope of the invention.

The static ontologies of the present invention are relational such that the linking of one or more static ontologies, or portions thereof, result in a very detailed organization of knowledge concepts. As described above, each static ontology provides a high level view of a particular subject;

however, linking or cross referencing among two or more static ontologies results in many combinations of knowledge hierarchical structures. For example, for the static ontologies shown in FIG. 1a, if a particular classification included concepts in "business and industry" and "economics", then the combination of the "business and industry" and "economics" ontologies provides seven hierarchical levels for that classification. Therefore, the parallel and independent nature of static ontologies, when linked or cross referenced, provides an extremely detailed and comprehensive coverage of knowledge concepts. In order to provide a complete classification hierarchy without cross referencing the independent and parallel ontologies of the present invention, it would require developing a hierarchy that anticipated every combination of knowledge concepts. As can be realized, if this approach is taken for each subject, then setting forth every conceivable breakdown becomes impossible. The groupings of independent and parallel ontologies provide a relational knowledge catalog.

The parallel and independent ontologies of the present invention allow for the greatest amount of flexibility in developing a detailed classification breakdown. For example, a first ontology may include a concept for "geography", and a second ontology may include a concept for "computers." Geography and computers are very different topics, and seemingly unrelated. The "geography" and the "computers" concepts are located in different ontologies due to the very different nature of the subject matter. However, the cross referencing of the "geography" and the "computers" ontologies permits linking the two different subject matters. For example, for the document classification application, a document may be about how different computers are used in different geographical areas.

The hierarchically structured concepts contained within the static ontologies may be semantic derivatives and/or linguistic derivatives of the high level concept. For example, a classification hierarchy may associate a "house" with articles placed within a house, such as dining room tables, chairs, bedroom furniture, etc. For this example, a classification hierarchy that includes semantic derivative concepts based on the "house" concept is desirable. However, for a purely linguistic classification hierarchy, the house "concept" may include types of houses, such as a ranch style house, a contemporary house, etc. The knowledge catalog of the present invention provides the framework or structure to generate hierarchical classifications including both semantic derivatives and/or linguistic derivatives of high level concepts. Utilizing the static ontologies of the present invention, a knowledge map may be generated that links both concepts representing articles placed within a house and concepts representing types of houses to the higher level "house" concept. Consequently, the flexibility provided by the structure of the knowledge catalog permits generation of a true knowledge map.

Content Processing System

Figure 2:
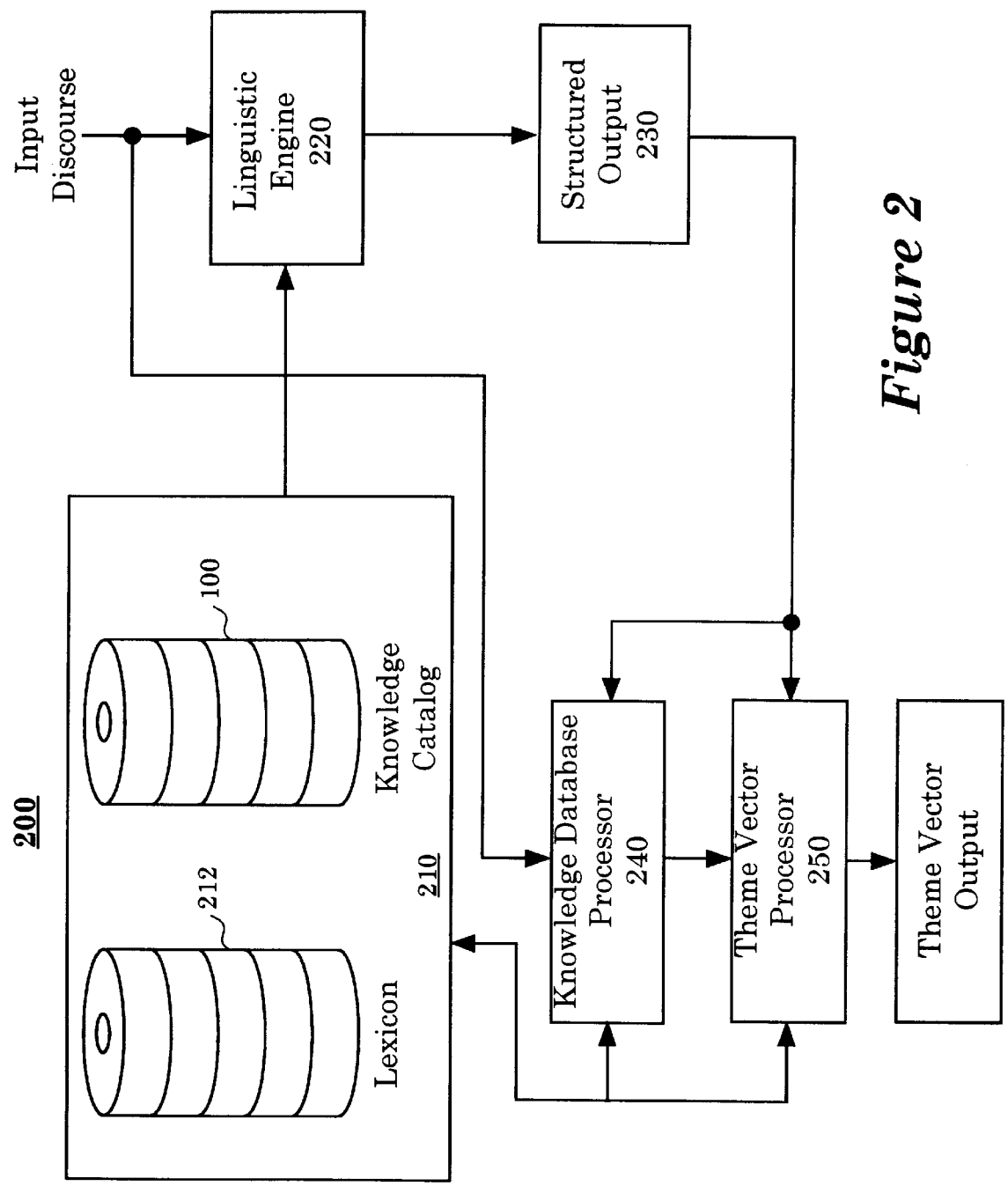
FIG. 2 is a block diagram illustrating a content processing system for input discourse.

FIG. 2 is a block diagram illustrating a content processing system of the present invention. In general, a content processing system 200 receives input discourse, and generates, as output, a theme vector. The content processing system 200 contains a morphology section 210 coupled to a linguistic engine 220. The linguistic engine 220 receives the input discourse for processing. In general, the linguistic engine 220 processes the input discourse by analyzing the grammatical or contextual aspects, as well as the stylistic and thematic attributes of the input discourse. Specifically, the linguistic engine 220 generates contextual, thematic, and stylistic tags that characterize the input discourse. As shown in FIG. 2, the linguistic engine 220 generates a structured output 230 containing, in part, the contextual, thematic, and stylistic tags. Furthermore, the linguistic engine 220 extracts the topic and content for each sentence in the input discourse.

The morphology 210 includes a lexicon 212 and the knowledge catalog 100 of the present invention. In general, the lexicon 212 contains definitional characteristics for a plurality of words and terms. For example, the lexicon 212 defines whether a particular word is a noun, a verb, an adjective, etc. The linguistic engine 220 utilizes the definitional characteristics stored in the lexicon 212 to generate the contextual, thematic, and stylistic tags in the structured output 230. The generation of thematic tags is described more fully below. The following section, entitled "Lexicon Documentation", provides a description of the definitional characteristics in accordance with one embodiment.

PARTS OF SPEECH FLAGS

The definitions of the PARTS OF SPEECH flags are similar to those used in a traditional linguistic approach. When you are assigning a PART OF SPEECH flag, a good dictionary is always a good place to start. But it is only the starting point. The final PART OF SPEECH settings should always be based on the results of the sentence syntax in the IC analysis. For example:

"His" is listed in most dictionaries as being both an ADJECTIVE and a PRONOUN. In Griff, "his" is only flagged as being an ADJECTIVE.

The possessive pronoun aspects of "his" are captured through other flags and combinations of flag settings. Although this setting of "his" as only an ADJECTIVE may be counter-intuitive, thousands of test sentences have demonstrated that "his" functions best when it does not have the PRONOUN PART OF SPEECH flag set.

Do not set a PART OF SPEECH flag on a word to get an inflection. For Example:

"Rich" should have the following flags set:
ADJECTIVE and NOUN PROMOTION
Do not set COMMON NOUN on "rich" just to get the plural noun inflection "riches." "Riches" should be entered into the lexicon as its own entry.
COMMON NOUN
System Techniques for NOUN/ADJECTIVE relationships.

When you set the COMMON NOUN flag on a word, you need to keep in mind the word's relationship to the ADJECTIVE and the NOT ADJECTIVE flags.

A COMMON NOUN is considered to be strongly adjectival by Griff when the COMMON NOUN flag and the ADJECTIVE flag are both set.

A COMMON NOUN will normally not be raised to adjective status before a plural noun unless there is a predeterminer present (such as cardinal), which forces Griff to allow it as a Plural Adjective.

A word has a neutral setting when the COMMON NOUN flag is set and the ADJECTIVE flag is not set.

Griff will make the COMMON NOUN an ADJECTIVE as he sees fit. COMMON NOUNS that are COMMON NOUN-COUNT become adjectives easier than pure mass nouns. (Pure mass nouns have the COMMON NOUN-MASS flag set but the COMMON NOUN-COUNT flag is not set.)

A COMMON NOUN is considered to be strongly unadjectival by Griff when the COMMON NOUN flag and the NOT ADJECTIVE flag are both set.

Griff will not read it as an Adjective except under rare instances. But this usually occurs when an error has been made in the text and Griff is forced into understanding the word as an ADJECTIVE.

NOT ADJECTIVE also can be used on words that are Potential COMMON NOUNS, and Potential VERBS to help Griff decide if the word does not readily form into an ADJECTIVE.

Any COMMON NOUN that can also be used as an adjective cannot have the COMMON NOUN NUMBER PLURAL flag set as the only COMMON NOUN NUMBER flag. This flag blocks the adjective use of the COMMN NOUN because Griff will set the not ADJECTIVE flag. If you should need to set the COMMON NOUN NUMBER PLURAL flag, and the word can be used adjectively than you need to set the ADJECTIVE flag on the word yourself.

To set up a COMMON NOUN properly the following flags must be set:

---

Appropriate Part of Speech Flag(s)
    COMMON NOUN
Appropriate Common Noun Grammar General Flag(s)
    COMMON NOUN-COUNT
    COMMON NOUN-MASS
Appropriate Common Noun Gender Flag(s)
    COMMON NOUN-MALE
    COMMON NOUN-FEMALE
    COMMON NOUN-COMMON
    COMMON NOUN-NEUTER
    COMMON NOUN-DUAL
    COMMON NOUN-COLLECTIVE
Appropriate Common Noun Number Flag(s)
    COMMON NOUN-SINGULAR
    COMMON NOUN-PLURAL
Appropriate Common Noun Semantic Flags
    COMMON NOUN-CONCRETE
    COMMON NOUN-ANIMATE
    COMMON NOUN-HUMAN
    COMMON NOUN-NON-HUMAN

---

The other classes of COMMON NOUN flags or individidual COMMON NOUN flags not listed above are special function COMMON NOUN flags that specify additional information about the noun that limits or expands its semantic, syntactic or pragmatic capabilities. In that sense they are optional settings since their ommission does not prevent the word from fully functioning as a noun. But if any of the obligatory COMMON NOUN flags are not set, the word will not fully function as a noun.

PROPER NOUN

In the present system, a word is considered a PROPER NOUN when it is a capitalized noun.

Unless there is a special reason for doing so, Proper Nouns do not need to be set up in the system. The defaults will handle most Proper Nouns correctly. Special reasons include:

The need to identify, describe, and specify syntactic requirements for "A" CORE application uses.

The PROPER NOUN may need a special syntactic restriction such as a restriction of gender (to neuter for company names, male for a name that is limited to a male referent), restriction of the referent to non-human or human referent only, restriction of the referent to number (singular or plural only).

Specification of the referent as being a COMMON NOUN-SPEECH ACT, or COMMON NOUN-EVENTIVE, or COMMON NOUN-TIME or other COMMON NOUN GRAMMAR SPECIAL FLAGS. Aardvark Day would need to be +COMMON NOUN-TIME.

Specification of the concept of the PROPER NOUN for the "B" CORE applications. For Example:

Duncanville Bank would be assigned the concept of "financial institution."

House of Lords would be assigned the concept of "legislature."

Aardvark Day would be assigned the concept of "holiday."

But if you set up a Proper Noun the following flags are obligatory:

---

The appropriate Part of Speech flag(s).
    PROPER NOUN
The appropriate Proper Noun Number flag(s)
    PROPPER NOUN-SINGULAR
    PROPER NOUN-PLURAL
The appropriate Common Noun Number flag(s)
    COMMON NOUN-SINGULAR
    COMMON NOUN-PLURAL

---

The two sets should match. There is a redundancy built into the system. Whatever Number and Gender flags that you set on a PROPER NOUN also must be set on the Common Noun Number and Common Noun Gender flags. This redundancy exists to allow flexibility and precision for identifying special PROPER NOUN functions for applications. The PROPER NOUN NUMBER FLAGS do not activate any IC linguistic core analysis attractors. The COMMON NOUN NUMBER FLAGS are the set of flags which set the linguistic core analysis flags for COMMON NOUN NUMBER and PROPER NOUN NUMBER.

---

The appropriate Proper Noun Gender flag(s)
    PROPER NOUN-MALE
    PROPER NOUN-FEMALE
    PROPER NOUN-COMMON
    PROPER NOUN-NEUTER
    PROPER NOUN-DUAL
    PROPER NOUN-COLLECTIVE
The appropriate Common Noun Gender flag(s)
    COMMON NOUN-MALE
    COMMON NOUN-FEMALE
    COMMON NOUN-COMMON
    COMMON NOUN-NEUTER
    COMMON NOUN-DUAL
    COMMON NOUN-COLLECTIVE

---

The two sets should match. There is a redundancy built into the system. Whatever Number and Gender flags that you set on a Proper Noun also must be set on the Common Noun Number and Gender flags. This redundancy may be exploited for future versions and applications.

---

The appropriate Common Noun Semantic Flag(s)
    COMMON NOUN-CONCRETE
    COMMON NOUN-ANIMATE
    COMMON NOUN-HUMAN
    COMMON NOUN-NON-HUMAN
The appropriate Common Noun Grammar General flag(s)
    COMMON NOUN-COUNT
    COMMON NOUN-MASS
        (Most Proper Nouns need both COMMON NOUN-COUNT and
        COMMON NOUN-MASS flags set.)

---

Other COMMON NOUN flags can be set on PROPER NOUNS as they apply. But the obligatory flags must be set for the word to properly function as a PROPER NOUN.

PROPER NOUN AND COMMON NOUN PART OF SPEECH

Some words that are Proper Nouns may also have a Common Noun referent.

"Bob" is a persons name.

"Bob" is a COMMON NOUN and also a VERB "to bob."

This overlapping of functions car cause problems when the word occurs first in the sentence.

"God gave him his walking papers."

"God" is a PROPER NOUN and hence is +COMMON NOUN-COUNT and is +COMMON NOUN MASS.

"God" is a common noun and is just count.

This sentence could cause false messages since the system reads "God" as the COMMON NOUN "god." A workable solution in the lexicon is to set "god" as COUNT and MASS which will stop the false messages from appearing. Implimentation of this solution causes "god" to lose its COMMON NOUN-COUNT only personality. Another solution (which allows "god" to retain its COMMON NOUN-COUNT only personality) is to bypass certain error messages when a word is both PROPER NOUN and COMMON NOUN in the System. This allows "god" to keep its COUNT personality intact except when it appears in the sentence initial position.

This problem only occurs when the Proper Noun occurs sentence initial and it is the first time it is refered to as a PROPER NOUN in the document. If "God" had been used earlier in the document, Griff would read it as the proper noun "God" and not as the common noun "god."

NOTE: the first word will be looked at in the proper noun stack.

The basis of the capitalization rules is to impart importance, emphasis, and distinctiveness. PROPER NOUNS (capitalized words) impart a special significance to the noun.

PRONOUN

This flag corresponds closely with the traditional definition of pronoun. But there are some differences. The personal pronouns "his" and "her", for example, while they do have PRONOUN flags set for case, number, gender, and other special grammatical categories do not have the PRONOUN part of speech flag set. They are heavily adjectival and function as determiners. The attractors recognize them functioning as personal pronouns in some respects but give a heavier weight to the determiner function and will analyze "his" and "her" as being ADJECTIVE when premodifying a noun.

Some relative pronouns also may not be flagged as a PRONOUN part of speech especially when they are part of a phrase or when they function more as subordinate conjunctions with pronoun characteristics than as pure pronouns. This is because the -wh pronouns are also SUBORDINATORS and introduce noun and adjective clauses.

Examples of -wh settings and that do not have the pronoun part of speech set include:

"Of which," "in which," and "from which." They are flagged as +CONJUNCTION, -PRONOUN. But they also have the Pronoun Grammar General flags of INTERROGATIVE and RELATIVE WHEN set to allow for adjective and noun clause formation.

The PRONOUNS in the system are a closed class. This includes words that are single, as well as those that needed to be phrased. There are about 150 words with the pronoun part of speech set. This includes: (the following examples are not an exhaustive list)

phrases: she was a woman who, he is a man who, a dozen incorrect forms: their's, ours' slang: youse, we all, you all archiac pronouns: thee, thy, yon, aught

Pronoun flags may work as cross cutters with other parts of speech that have a syntactical requrement for:

Case-contrast: Pronoun Case flags.

Person distinction: Pronoun Person flags.

Gender constrast: Pronoun Gender flags.

Class Identification: This includes the Pronoun Grammar General flags and the Pronoun Grammar Indefinite flags.

As a working rule of thumb, words that are PRONOUNS are usually not also flagged as COMMON NOUN. This is especially true if the COMMON NOUN is +COMMON NOUN-COUNT and +COMMON NOUN-MASS (a count/mass noun) or is +COMMON NOUN-MASS (a pure mass noun). One notable exception is "one." Pure count nouns that are also pronouns may need the COMMON NOUN part of speech set.

Words that are +PRONOUN tend to be complex words that belong to numerous and differing subclasses of words. They should not be copied from another PRONOUN or used as a template word. They need to be set up individually.

Pronouns have special syntactic functions:

They can replace nouns or entire noun phrases. They cannot co-occur with determiners, articles, or predeterminers. They are self exclusive.

VERB

To set up a regular VERB the following flags are obligatory.

VERB

VERB-FIRST PERSON

VERB-SECOND PERSON

VERB-THIRD PERSON

VERB-PLURAL

PRESENT HABITUAL

The appropriate Transitivity Flags

The appropriate Semantic Flags

The verb "personalize" can be used as a basic VERB template. "Personalize" and its inflected forms have been set up. You can use it as a start for entering a new verb in the lexicon, but you will have to adjust transitivity and semantic flags to fit the particular word that you are entering.

ADVERB

When you want a word to be almost invisible, set the ADVERB flag by itself. The ADVERB flag alone without other adverbial specifications will allow the word to function almost as a free-floating particle. At times words need the invisible adverb flag to allow it to function properly.

Examples are: "of which," "that which," and "half." They may have other flags set as well, but the invisible adverb use stops false messages and allows Griff the freedom he needs to make an analysis that is practical.

Most adverbs do not need to be set up in the system as the default will handle the typical -ly adverb. The defaults are set to read the adverb as:

+ADVERB-ADJUNCT

+ADVERB-PROCESS

+ADVERB-MANNER

+ADVERB GRADABLE

If the adverb functions as a DISJUNCT or a CONJUNCT or an adverb other then a manner adjunct, the word should be entered into the lexicon. Most special cases of adverb will need to be handled on an individual basis and tested.

A word that is +ADVERB can belong to more than one part of speech or it can be more than one type of ADVERB. It can be adjunctive, disjunctive, or conjunctive depending on its context and usage.

"Yet" is +ADVERB-ADJUNCT:

I have been waiting outside his door the whole day.

I have not seen him yet (so far).

"Yet" is +ADVERB-CONJUNCT:

I have been waiting outside his door the whole day.

Yet, (nevertheless) I have not seen him.

"Yet" is +CONJUNCTION:

I have been waiting outside his door the whole day, yet (but) I have not seen him.

ADJECTIVE

When setting up a word that is an adjective, just set two flags. ADJECTIVE and DESCRIPTIVE. Griff will do the rest. If there is nothing special about the adjective this is all that is required. The other ADJECTIVE flags are used for special core analysis functions and class identification for applications.

When words are +ADJECTIVE and +VERB, this dual setting can create analysis difficulties for Griff.

Consider the word "lay." This is a complicated irregular verb that provides the base form of "lay/layed" and the past tense form "lie/lay."

It also can be used in special cases as an adjective. A lay preacher. A lay opinion. When the ADJECTIVE flag was set on "lay," it caused problems in sentences like:

The bodies of Somerset and Clifford lay naked in the street.

The man lay unprotected on the street.

Griff fired false PowerEdit messages on the first sentnece. The IC analysis was also overly complicated. Removing the ADJECTIVE flag solves the IC complexity problem and stops the unnecessary messages from firing.

The use of "lay" as an ADJECTIVE will have to be phrased. (lay preacher=preacher) But watch out for logic breakes as in "I will lay preacher Smith on the bed."

This will not occur frequently (and problably only in the south) so it is a viable to phrase "lay preacher."

If a noun is used often before plural nouns as a descriptive word, the ADJECTIVE flag should be set. The core will promote nouns to adjectives but it will not do so in front of plural nouns unless a cardinal or ordinal number is present.

Griff will not allow a COMMON NOUN that does not have the ADJECTIVE part of speech flag set to become an ADJECTIVE before a word that is +COMMON NOUN and +VERB and is a plural form of the COMMON NOUN.

We have hotel rooms available.

Hotel will be analyzed as a COMMON NOUN unless the ADJECTIVE part of speech flag is set on "hotel."

The ADJECTIVE Part of Speech flag needs to be set on words that are used as determiners. ADJECTIVE activates the determiner attractors.

PREPOSITION

Prepositions are closed-class relational words that define a relationship between the complement of the preposition and what preceeded the prepositional phrase. The prepositional complement is a nominial realized by:

A noun phrase with a common noun as the prepositional complement.

A noun phrase with a proper noun as the prepositional complement.

A noun phrase with a pronoun in the objective case as the prepositional complement.

A noun clause introduced by RELATIVE WHAT word.

A noun clause introduced by a present participle.

Subordinate noun clauses which are introduced by RELATIVE THAT words or the infinitive cannot be a prepositional complement.

Pronouns in the nominative case cannot serve as a prepositional complement.

The relationship the preposition expresses is determined by the possible meaning(s) of the preposition.

Words that are +PREPOSITION are often other parts of speech as well usually ADVERB and/or CONJUNCTION. For example, "after" and "before" are both +PREPOSITION and +CONJUNCTION. "Up" and "down" are both +PREPOSITION and +ADVERB.

Words that are +PREPOSITION may be other parts of speech as well.

The PREP-COMPLEX "out of" also has the ADJECTIVE flag set to place "figure" numbers in the same noun phrase as the head noun. For example:

4 (ADJECTIVE) out of (ADJECTIVE) five (ADJECTIVE) men (COMMON NOUN) are large.

The setting normally would trigger em/21/1 and 246/1 but these messages are bypassed if followed by a possible preposition.

The correct form of the sentence (Four out of five men are large.) does not cause Griff any trouble when "out of" is not flagged in the lexicon as an ADJECTIVE. Sentences that start with a number need to have the number spelt.

Generally, words that are also -ing particples (such as excepting, barring, concerning, considering, following, including, pending) should not have the PREPOSITION part of speech set on them. Griff will provide a reasonable analysis with only the VERB part of speech set.

CONJUNCTION

Removing a CONJUNCTION flag from a word in the lexicon requires that care should be taken to remove not only the CONJUNCTION part of speech flag, but also the other conjunction flags that were set. The conjunction flags are powerful flags that will influence the IC analsis and also PowerEdit applications whether the CONJUNCTION part of speech flag is set or not set.

There is no template word for CONJUNCTIONS. CONJUNCTIONS need to be individually entered into the lexicon.

Quasi-coordinators are words that have a vaired personality without substantially changing their meaning. At times they act like COORDINATING CONJUNCTIONS and other times they act like SUBORDINATORS or PREPOSITIONS. Examples are:

as well as, asmuchas, ratherthan, morethan (not phrased in the present system), letalone.

Coordinator function: He publishes aswellas prints his own book.

Prepositional function: As well as printing the books, he publishes them.

They are not fully COORDINATING CONJUNCTIONS because when they "coordinate" two noun phrases they do not cause plural concord unless the first noun phrase is plural. This gives them the personality of prepositions such as "with" or "inadditionto" rather than a CONJUNCTION-PURE COORDINATING such as "and."

John aswellas his brothers was responsible for the disaster. ** John aswellas his brothers were responsible for for the disaster.

Non-restrictive relative clauses are semantically equivalent to coordinate clauses.

John did not go to the show, which was a pity.
John did not go to the show, and that was a pity.

INTERJECTION

INTERJECTION words are emotive words that and has the ability to either stand alone or initiate an utterance.

In the present system INTERJECTION as a part of Speech is only used by the PowerEdit application.

Examples of INTERJECTIONS are:

Oh (surprise); Wow (a big surprise); Aha(satisfaction, recognition)

Drat (regret)

NOT ADJECTIVE

NOT ADJECTIVE is a powerful flag which will prevent a noun from being used as an adjective. It can also prevent an -ing or -ed participle from becoming an adjective if set on the word's base, -ing, or -ed form.

NOT ADJECTIVE is a powerful flag that should be set with care on words that are singular nouns. But if a word is a possible COMMON NOUN and a possible VERB the NOT ADJECTIVE flag often helps Griff correctly assign the proper part of speech. For example: "name" and "make."

The rule of thumb for setting NOT ADJECTIVE is:

Assume that all nouns can be used as adjectives. If there is an analysis of a sentence that proves that the noun does not have a strong adjectival use, then consider adding the NOT ADJECTIVE flag to the word. Before adding the flag, evaluate how heavy the adjectival use is and consider how many potential phrases that may need to be placed in the lexicon since Griff will not allow the word to function as an adjective. For example: If "reader" is +NOT ADJECTIVE then for the sentence (He has a reader recognition problem.) "reader recognition" will need to be phrased (readerrecognition) for Griff to analyze it correctly.

Griff will not normally analyze a NOT ADJECTIVE word as an ADJECTIVE. But there are cases where he will call a NOT ADJECTIVE word an ADJECTIVE.

Nouns that end in -s will default to NOT ADJECTIVE. If you set up a COMMON NOUN that is a COMMON NOUN-PLURAL only COMMON NOUN, set the NOT ADJECTIVE flag. It is not absolutely necessary to do so as Griff will set it on the fly, but it simplifies the decisions and speeds things along.

COMMON NOUN SYNTAX FLAGS

CAPITALIZED

CAPITALIZED is an application flag for PowerEdit. When CAPITALIZED is set on PROPER NOUNS it will serve as the triger for a PowerEdit message which serves as a reminder to capitalize the Proper Noun.

Words like "Mrs." and "Mr." need to be put in capitals and in small letters, for sentence initial considerations.

To activate the PowerEdit message the PROPER NOUN part of speech flag needs to be set on the word. If PROPER NOUN is not set then the PowerEdit "CAPITALIZATION OF PROPER NOUNS" message will not fire. When the word is entered into the lexicon the non-capitalized form of the word should have CAPITALIZED set. This is the only instance of entering a word into the lexicon as a PROPER NOUN without the PROPER NOUN being capitalized.

Examples words are: excellency, emperorNapoleon.

If you set this flag on a PROPER NOUN that is already capitalized you will remind yourself to do what you have already done.

"i" is set with all of the PRONOUN flags of I, except the TAKES PLURAL flag has been deleted. Only the PROPER NOUN flag part of speech is set. If the PRONOUN part of speech flag is also set the PowerEdit "CAPITALIZATION OF PROPER NOUNS" message will not fire any time that Griff decides that "i" is a PRONOUN and not a PROPER NOUN.

ALL-CAPITALIZED

Functions just like CAPITALIZED except it refers to Proper Nouns that need the entire word capitalized.

Only set ALL-CAPITALIZED on words that you or your clients forget to capitalize correctly frequently. ALL-CAPITALIZED is more of a reminder flag than an analytical one.

Presently if the form you enter starts with a capital letter (ie., B.c.) Griff will call it a PROPER NOUN and not recognize the error.

To make the PowerEdit "CAPITALIZATION OF PROPER NOUNS" message fully functional all permutations of the word and its possible capitalizations need to be entered into the system.

B.C. alone requires Bc.; B.c.; Bc.; b.C.; and the rest of its permutations.

COMMON NOUN-REGULAR

The Core will set COMMON NOUN-REGULAR as a default if the COMMON NOUN IRREGULAR flag is not set. It tells the system to use the regular attractors for inflections and derivations of the root noun.

COMMON NOUN-REGULAR is not presently being set in the lexicon. It is a default flag that the core will set automatically.

If the COMMON NOUN-REGULAR word takes -es as its plural, than both forms of the noun (singular) and (plural) should be entered into the lexicon seperately. The singular noun lexical entry should have n (space) the plural form of the noun in the ROOT WORD screen.

The plural noun lexical entry should have n (space) the singular form of the noun in the ROOT WORD screen).

The lexical entry "wish" should have: "n wishes" in its ROOT WORD screen.

The lexical entry "wishes" should have: "n wish" in its ROOT WORD screen.

This techinque allows the automatic corrections to work.

RULES FOR PLURAL FORMATION

Most nouns form the plural by adding the suffix -s.

Words ending in f or fe can:

| 1. Change f to v and add -es or -s. | |
|---|---|
| knife/knives | v + -s. |
| wife/wives | v + -s |
| life/lifes | f + -s |
| self/selves. | v + -es. |

Nouns that end in -y. form the plural by:

1. Change -y to ies after a consonant. spy/spies.
2. After a vowel add s. day/days. monkey/monkeys.
3. After nouns in quy/kwi form plural by change y to -ies. soliloquy/soliloquies.
4. After Proper Nouns. y+s. Germany/Germanys.
5. Compound hyphenated nouns. add y+s. Stand-by/Stand-bys.

Nouns ending in -o using non-foreign plursl add -es: tomato/tom atoes hero/heroes.

Nouns ending in -s; -ss; -sh; -ch; -x; -z. add -es.

lens/lenses business/businesses
wish/wishes
church/churches
tax/taxes
waltz/waltzes
Nouns ending in z double the z before adding -es.
quiz/quizzes
COMMON NOUN-REGULAR should not be used as a crosscutter on any word that can possibly be promoted by Griff to a noun.
COMMON NOUN-IRREGULAR
This flag identifies irregular nouns in the system. Irregular nouns are those which have either:
 1. No hard and fast rules or plural formation and require memorization.
    child/children
    foot/feet
    manservant/menservant
 2. Keep the same form for the singular and the plural.
    sheep/sheep
    fish/fish
 3. Use a foreign plural. Note: Many foreign plural nouns also use a regular plural as the primary or secondary alternative for plural formation.
    larva/larvas/larvae.
    radius/radiuses/radii.
 4. Occur only in the plural. ie. knickers.
 5. The word "now."
There are over 250 words that are +COMMON NOUN IRREGULAR in the present system.

When entering a COMMON NOUN-IRREGULAR noun into the lexicon, both forms of the COMMON NOUN (singular and plural) need to entered into the lexicon. The singular form of the irregular COMMON NOUN should have "n (plural form)" in the ROOT WORD SCREEN (n children). The plural form of the irregular COMMON NOUN should have "n (singular form) in the ROOT WORD SCREEN(n child).

This allows the automatic corrections and other applications to function.

The PowerEdit "NON-STANDARD ENGILSH WORD" message will appear on each incorrect plural formation of an irregular common noun.
 **The childs have a red baloon.
 **His foots are large.

Each form of the noun which is irregular must be entered into the lexicon. When an incorrect form of an irregular common noun (such as "knifes") is a correct form of the word as an -s singular verb, (such as knife/knives/knifes) all three forms of the word need to be entered into the lexicon.
 "Knife" is +COMMON NOUN and +VERB.
 "Knives" is +COMMON NOUN and does not have the VERB part of speech flag set.
 "Knifes" is +VERB and does the COMMON NOUN part of speech flag set.
 If you should set the COMMON NOUN-IRREGULAR flag on "knife" then, "knifes" (even though it is +VERB and -COMMON NOUN) will fire the PowerEdit "NON-STANDARD ENGLISH WORD" message. To prevent this, "knifes" must be set in the lexicon as a seperate entry.

COMMON NOUN-TAKES NO ARTICLE
The main function of COMMON NOUN-TAKES NO ARTICLE is to prevent the PowerEdit "NOUN WITHOUT DETERMINER" message from firing.

COMMON NOUN-TAKES NO ARTICLE may be set on words such as "headcoach," "judge," and "governor" that designate offices or positions of status. When refering to the office, the COMMON NOUN does not need the definite article as a premodifier.
 She ran for (the office of) governor, and she was elected.
    When these functionary nouns refer to the person in office, they are COMMON NOUN-COUNT and require an article as a premodifier.
 The governor carried the state easily.
    ** Governor carried the state easily.

The COMMON NOUN-TAKES NO ARTICLE flag tells the system that an article is not allowed on a PROPER NOUN (except in special cases).

Words that are +PROPER NOUN that do not use an article normally are:
 Personal names (title or without title)
 Festivals and holidays
 Months and days of the week
 Geographical names
 A Name plus a common noun that is part of the name
    Windsor Castle (castle is normally a count noun).

A noun that is +PROPER NOUN normally does not have this flag set. COMMON NOUN-TAKES NO ARTICLE should only be set on PROPER NOUNS that you want to identify as never allowing an article to premodify it.

The COMMON NOUN-TAKES NO ARTICLE flag tells the system that an article is not required on a COMMON NOUN.

WORDS THAT ARE +COMMON NOUN-TAKES NO ARTICLE INCLUDE:
 congress, television, parallel, maharanee, promotion, duke, scholar, light, spokesman, strike, datatransfer, drunkas a skunk, captain, vacation, newswoman, head coach, mama, sabatical, office, subphylum, mayor, a rarity, maharani, senator, hangman, ones, marquise, congressman, judge, husband, sale, telephone, newspaperwoman, senator-elect, leave, mamma, bridesmaid, drunk, belief.

COMMON NOUN-TAKES NO ARTICLE provides an alternative way for describing a COMMON NOUN-COUNT noun that sometimes functions as if it were a COMMON NOUN-MASS noun. To set both +COMMON NOUN-COUNT and +COMMON NOUN-MASS would be to powerful for the IC analysis, which would allow the COMMON NOUN to have COMMON NOUN-MASS characteristics and could have an effect in choosing the part of speech flag a word should have. The COMMON NOUN-TAKES NO ARTICLE allows the core to treat the COMMON NOUN as a COMMON NOUN-COUNT noun but stops the PowerEdit "NOUN WITHOUT DETERMINER" messages.

Words that are +COMMON NOUN-COUNT and +VERB and (under restricted circumstances and contexts) can function as if they were +COMMON NOUN-MASS (such as "telephone") are also candidates for COMMON NOUN-TAKES NO ARTICLE. For example:
 "Telephone" as a COMMON NOUN can only function without determiner premodification in certain select prepositional phrases. This gives "telephone" a mass quality about it. But as a COMMON NOUN it requires the determiner premodification of an article to function as the direct object.
 **I put telephone on the table.
 I put the telephone on the table.

I called him by telephone. (I used a telephone to call him)
I called him by the telephone (ambiguous)
(Changing a verb to a noun)

The COMMON NOUN-TAKES NO ARTICLE flag has the ability to change a word from a VERB to a COMMON NOUN if the conditions are right. The only time this can happen is when a word that is flagged with COMMON NOUN-TAKES NO ARTICLE occurs in the position imediately after "to" which can function as the sign of an infinitive and as a PREPOSITION part of speech. The COMMON NOUN-TAKES NO ARTICLE flag will change the sign of the infinitive "to" (which will be analyzed as a CONJUNCTION) to the prepositional "to" (+PREPOSITION) on a COMMON NOUN-COUNT noun that does not have an article present. For example:

Nothing has emerged from our analysis to date that has determined that the project is large.

When COMMON NOUN-TAKES NO ARTICLE is not set on "date", "to date" is analyzed as CONJUNCTION (to) followed by an infinitive (date).

When COMMON NOUN-TAKES NO ARTICLE is set on date, "to date" is analyzed as a prepositional phrase. ("to is analyzed as +PREPOSITION and "date" is +COMMON NOUN)

COMMON NOUN-TAKES NO ARTICLE is not available for use as a crosscutter.

USE DEFINITE ARTICLE

Used to allow certain words such as "father, mother, president, leader . . . " to be used in apposition following a comma without an article.

Ex. He is a man, leader of his nation.

USE "A"

USE "A" is set on words that must use the "A" form of the indefinite article. Griff will set this flag for you based on the letter that is word initial.

Vowels get the USE "AN" flag set.
Consonants get the USE "A" flag set.

WORDS THAT HAVE USE 'A' SET INCLUDE:

Figure ordinal numbers except 11,18 and 80–89. one, use, one-sided, hotel, utensil, one-shot, user friendly, usurper, union, one-up, not a (is a negative "a."), unionized, once, utilitarianism, ureter uniformity, unified, uterus, unipersonal, unitive, utilize, univalve, universe, narry a, uremia, unionism, urethra, some (also has USE 'AN' set), unisex, uric, euphemism, useless, many a, used, unique, eunuch, universality, universal, unionization, ubiquitous, uniform, one percent, uvular, one-man, useful, eulogy, useable, ukulele, Univac, unicycle, unidirectional, usurer, unit, uterine, urinary, united, any (also has USE AN set), euphonic, uniformly, uselessly, United States, utiliztion, nm, utility, nm, usage, one-woman, universalize, usable, urine, euphoric, euphoria, unanimous, euthanasia, a, unipolar, urology, urea, uniplanar, unitary, uniformness, utile, unity, usual, one-time, unilateral, 100, unisexuality, uninucleate, usury, euphony, user, UFO, euphemistically, one-person, uvula, urinal, euphemistic, one-to-one, univocal, utricular, utopia, utopian, univalent, oneness, unicorn, unison, urethane, unionize, utricle, urination, utilized, university, University, utilitarian, one-track, Eurodollar, once-over, Unitarian, U-boat, utopianism, usance, universalism, universalist, unisexual, uranium, urinate, European.

Unless the word is one of the problem words beginning with (h), (u), (eu), (o), or (x), the system will set the correct flag for you. Only problematic words that have a conflict between spelling and pronunciation need to entered. For example: "Universe."

If a word is a possible COMMON NOUN, PROPER NOUN, ADJECTIVE, or ADVERB and has a conflict between spelling and pronunciation, USE "A" should be set. For Example:

It was a universally known truth.

"Universally" needs USE "A" set (even though it is an ADVERB) because:

1. It is included in a noun phrase.
2. "Universally" sounds as if it begins with the consonant "y" rather than with the vowel "u."

If the indefinite article is improperly used the PowerEdit "USE 'A' FOR 'AN'" or "USE 'AN' FOR 'A'" message will fire.

The general rule is:

Use "a" before a consonant. Use "an" before a vowel. But it is not the spelling which governs whether or not the letter is a vowel or a consonant. It is the pronunciation which governs. The problem words are confined to five letters.

| | |
|---|---|
| "h" | an hour but a hotel |
| "u" | a universe but an underhanded throw |
| "eu" | a euphamism (eu always takes "a") |
| "o" | a one-to-one talk but an only child |
| "x" | a xenon derivitive, but an x-ray |

USE "A" is not available for use as a crosscutter.

USE "AN"

USE "AN" is set on words that must use the "AN" form of the indefinite article. The core will set this flag for you based on the letter that is word initial. Vowels get the USE "AN" flag set. Consonants get the USE "A" flag set. Only problematic words need to be set up in the lexicon.

WORDS THAT HAVE USE 'AN' SET INCLUSED:

hour's, 86, X-ray, 81, X-rated, heirloom, honorarium, 87, hourglass, 88, honor, Xmas, honestly, 83, some (set for internal reasons), 89, many an (set for internal reasons), honorifics, x-axis, x-ray, 84, x-height, hors, an (set for internal reasons), any (set for internal reasons), honored, honoere, honoree, nm, 85, nb, hour, 80, hiership, honesty, honest, 11, 18, 82, heir, x, hourly, 8 , honorable.

If you set either USE "A" or USE "AN" be careful that you adjust the setting when you copy from that word.

Words that have the DETERMINER-INDEFINITE flag set need to have both USE 'A' and USE 'AN' set. The program needs these two flags set to function properly in catching multiple determiners of the same class.

The execptions are "a" and "an." "A" has only the USE "A" flag set. "An" has only the USE "AN" flag set.

USE 'AN' is not available as a crosscutter.

COMMON NOUN GRAMMAR GENERAL

COMMON NOUN-COUNT

Nouns that are +COMMON NOUN-COUNT can be perceived as individual items that can be counted and numbered.

Nouns that are +COMMON NOUN-COUNT can be premodified by cardinal and ordinal adjectives.

The COMMON NOUN-COUNT flag interacts heavily with:

Determiner system rules

Adjective formation (Words that are +COMMON NOUN-COUNT become adjectives easier than pure mass nouns.)

A word that is +COMMON NOUN-COUNT and -COMMON NOUN-MASS can become an adjective before a plural noun. It takes the core some time to come to this conclusion but it will do so. For example:.

Its diet is mostly prairie dogs.

"Prairie" is analyzed as an adjective.

Singular count nouns need an article to be used correctly. Exceptions are:

1. idioms that usually occur in preositional phrases.
    Example: He came here by car. (modes of transportation that are normally count nouns often drop the article in a prepositional phrase after by.)
2. Parallel structures:
    Man or beast, he still can't wrestle.
3. Vocatives: Come here girl!

COMMON NOUN-MASS

Pure mass nouns (+COMMON NOUN-MASS and -COMMON NOUN-COUNT) cannot usually be directly premodified by an indefinite article.

**I have an information for you.

**We will cut a pork for you.

**She served him a milk.

Pure mass nouns do not readily accept a plural form.

**I have the informations for you.

**We will cut the porks for you.

**She poured the milks on his head.

We sailed the waters of the ocean. (Waters is restricted to descriptions to a body of water at a spa or the ocean)

Pure mass nouns cannot usually be directly premodified by a cardinal or ordinal adjective.

** I have six rices in my bowl.

** The six information created a misunderstanding.

** That is the sixth bacon from the left.

Pure mass nouns do not require the definite article when they are the prepositional complement.

I would do anything for water.

We are drowning in information.

He ate a mountain of rice.

Pure mass nouns can fully function as a count noun when preceded by a factive (sometimes referred to as a partative).

I need those six pieces of information.

I have five slabs of bacon for you.

That is the sixth hunk of bacon from the left.

Give me a glass of water.

Pure Mass nouns function syntactically like an adverb. "East" (+COMMON NOUN-MASS +COMMON NOUN-COUNT +ADVERB-PLACE) functions as an adverb of place. When necessary the ADVERB flag can be deleted from a pure mass noun word that has a complexity problem with its IC analysis.

Nouns that are have both COMMON NOUN-COUNT and COMMON NOUN-MASS characteristics should have both flags checked. For Example: "cake" and "fish."

COMMON NOUN-MASS is not available as a crosscutter.

COMMON NOUN-GRADABLE

COMMON NOUN-GRADABLE is not set by the lexicologist on lexical entries. But Griff will set this flag by default on all COMMON NOUNS.

Nouns can be premodified by very (without an intervening adjective) but only when the noun is premodified by the definite article.

He is a very good man.

** He is a very man.

He is the very man for the job.

This flag could be discontinued. Originally it was meant to capture the observation that count nouns and mass nouns are gradable with respect to quality and quantity.

Pure mass nouns require a factive (partative) to be gradable in quantity. (I have six pieces of bacon) Count nouns and nouns that are +COMMON NOUN-COUNT and +COMMON NOUN-MASS do not require a factive to indicate quantity.

Gradability of quality requires a factive for all COMMON NOUNS regardless of their count/mass status.

He wrote a new kind of book.

He developed a new kind of ink.

COMMON NOUN-GRADABLE does activate IC linguistic core analysis attractors and is not available for crosscutter use.

COMMON NOUN-NON GRADABLE

COMMON NOUN-NON GRADABLE is not presently being used.

COMMON NOUN-NON GRADABLE activates IC linguistic core analysis attractors and is not available for general application use.

COMMON NOUN-INVARIABLE

COMMON NOUN-INVARIABLE identifies a noun as one which does not form a plural. For example:

Words such as; marketability, foolishness, baseness, lumbago, repugnance, information, health, weather, advice, pork.

Words that are +COMMON NOUN and +VERB and +COMMON NOUN-INVARIABLE (such as "weather") require special handling. "Weather" needs to be entered into the lexicon as a word that is +COMMON NOUN (with the appropriate COMMON NOUN flags set, including COMMON NOUN-INVARIABLE) and +VERB (with the appropriate VERB flags set for a REGULAR VERB).

"Weathers" also needs to be entered into the lexicon as a seperate entry as +VERB (with the appropriate flags set for a third person singular verb) and -COMMON NOUN.

If "weathers" is not entered into the lexicon as a seperate entry, the PowerEdit "NON-STANDARD ENGLISH WORD" message will fire on a correct use of "weathers" as a VERB.

Words that accept numbers as adjectives (both singular and plural numbers) but do not themselves occur as COMMON NOUN-PLURAL require special handling. This applies to words such as "percent."

"Percent" needs to be:

+COMMON NOUN-COUNT

+COMMON NOUN-MASS

+COMMON NOUN-SINGULAR

+COMMON NOUN-PLURAL

+COMMON NOUN-INVARIABLE

When "percent" is entered with the above key flags it will properly handle:

One percent of the man is burned.

Two percent of the men are burned.

** Two percents of the men are burned.

Some words that appear to be +COMMON NOUN-INVARIABLE have a plural form that is used by a specific industry. "Water," for example, is normally an invariable noun. But in the health care industry (especially spas and health resorts), the Merchant Marine and Navy, "waters" is often used in the plural.

The waters of the spa cured his bad back.

The southern waters are dangerous at this time of year.

This requires a decision to make "water" as +COMMON NOUN-INVARIABLE and/or a pure mass noun, or a +count/mass noun.

COMMON NOUN-INVARIABLE is not available as a crosscutter.

COMMON NOUN-INVARIABLE activates IC linguistic core analysis attractors.

COMMON NOUN-CARDINAL

COMMON NOUN-CARDINAL should be set on words that are on cardinal numbers whether spelt with letters (four) or figure form (4). Examples of +COMMON NOUN-CARDINAL words are:

one, two, three, 1, 2, 3, . . .

When COMMON NOUN-CARDINAL is set, ADJECTIVE, and DETERMINER-CARDINAL also should be set.

To set up a COMMON NOUN CARDINAL the word "four" may be used as a template.

The cardinal numbers (figure form and letter form) have been set up in present system for the numbers 1 to 100.

COMMON NOUN-CARDINAL activates IC linguistic core analysis attractors.

COMMON NOUN-CARDINAL is not available for use as a crosscutter.

COMMON NOUN-ORDINAL

COMMON NOUN-ORDINAL should be set on words that are ordinal numbers whether spelt with letters (fourth) or figure form, (4th).

The ordinals have been set up in the present system from. "first" to "thirty-first."

The figure-form ordinals have been set up from "1st" to "100th."

A word +COMMON NOUN-ORDINAL also needs to have the ADJECTIVE and DETERMINER-ORDINAL flags set.

COMMON NOUN-ORDINAL activates IC linguistic core analysis attractors.

COMMON NOUN-ORDINAL is not available as a crosscutter.

COMMON NOUN GRAMMAR BLEND FLAGS

COMMON NOUN-DEVERBAL

COMMON NOUN-DEVERBAL tells the core that the -ing participle has strong noun features (gerund) and it may take premodification. The abscence or presence of a COMMON NOUN-DEVERBAL flag does not influence the IC analysis. The COMMON NOUN-DEVERBAL flag is used for lexical class assignments and class identification only.

We have started a major undertaking. ("Undertaking" is +DEVERBAL)

**We have started a major pertaining. ("Pertaining" is -DEVERBAL)

The core will not set this flag on any participle that is derived from a regular verb. COMMON NOUN-DEVERBAL must be placed on the present participle by hand.

If you do want this flag to function on a participle you must:

(1.) Set up the participle form of the verb and (2.) add the COMMON NOUN-DEVERBAL flag.

If you copy a verb make sure that COMMON NOUN-DEVERBAL is not being set without your knowing it. The verb you copy from could have this flag set. If you copy a verb from its base form with the automatic copy feature. COMMON NOUN-DEVERBAL will be set automatically. If you do not want COMMON NOUN-DEVERBAL to be set, you must reopen the word and remove the flag.

COMMON NOUN-DEVERBAL is considered to be a nominalization flag for PowerEdit.

COMMON NOUN-DEVERBAL does not include the class of nouns ending in -ing (waiting) which are designated as COMMON NOUN-VERBAL nouns. The difference between a COMMON NOUN-DEVERBAL noun and a COMMON NOUN-VERBAL noun is that the DEVERBAL noun (painting) also has a plural form (paintings). A VERBAL noun does not inflect (** waitings)."

In the present system COMMON NOUN-DEVERBAL nouns such as "painting" need to have their plural form ("paintings") as a seperate lexical entry. Note that "painting" will not have a +COMMON NOUN flag set. It will only have the +VERB part of speech flag set. Griff has the ability to determine when a present participle functions as a noun. "Paintings" will be +COMMON NOUN and -VERB.

COMMON NOUN-DEVERBAL is used by PowerEdit Index.

COMMON NOUN-DEVERBAL activates IC linguistic core analysis attractors.

COMMON NOUN-DEVERBAL is not available for a crosscutter.

COMMON NOUN-VERBAL

COMMON NOUN-VERBAL currently is not an active flag that is being set or used. It could be activated to identify present -ing participles that do not exist in a plural form. (Words such as "waitings" and "actings")

Currently, there are no words in the lexicon with COMMON NOUN-VERBAL set.

COMMON NOUN-VERBAL is used by PowerEdit Index.

COMMON NOUN-VERBAL is referenced by PowerEdit messages.

COMMON NOUN-VERBAL does not independently activate any IC linguistic core analysis attractors.

COMMON NOUN-NOMINALIZED ADJECTIVE

COMMON NOUN-NOMINALIZED ADJECTIVE nouns are derived from adjectives. They are words such as:

elasticity (elastic)

rapidity (rapid)

sanity (sane)

happiness (happy)

usefulness (useful)

kindness (kind)

selfishness (selfish)

Common nouns that are +NOMINALIZED ADJECTIVE also tend to be:

+COMMON NOUN-MASS

−COMMON NOUN-COUNT

+COMMON NOUN-INVARIABLE

+COMMON NOUN-ABSTRACT

−COMMON NOUN-EVENTIVE

Common nouns that have the suffixes "-ness" or "-ity" are prime candidates for COMMON NOUN-NOMINALIZED ADJECTIVE.

(NOMINALIZED ADJECTIVES AS WEAK WORDS)

Words that are +COMMON NOUN-NOMINALIZED ADJECTIVE are considered to be weak words by the PowerRead reduction program. They need premodification or postmodification of a prepositional phrase to provide the topical content. The reduction program will not delete the premodifiers nor a postmodifying prepostional phrase associated with a +COMMON NOUN-NOMINALIZED VERB word.

COMMON NOUN-NOMINALIZED ADJECTIVE is not available for crosscutter use.

COMMON NOUN-NOMINALIZED ADJECTIVE is used by PowerEdit Index.

COMMON NOUN-NOMINALIZED ADJECTIVE does not independently activate IC linguistic core analysis attractors.

COMMON NOUN-NOMINALIZED VERB

COMMON NOUN-NOMINALIZED VERB words are nouns derived from verbs. They are words such as:

Observation (observe)
discouragement (discourage)
refusal (refuse)
leverage (lever)

+COMMON NOUN-NOMINALIZED VERB words may have one of the following suffexes:

| | |
|---|---|
| -age | (leverage) |
| -al | (refusal) |
| -ant | (informant) |
| -er | (worker) |
| -ee | (employee) |
| -ation | (observation) |
| -ment | (discouragement) |

Just because a COMMON NOUN has a nominalized verb suffix does not indicate that it deserves an automatic +COMMON NOUN-NOMINALIZED VERB flag set.

Common nouns that refer to people (such as worker, employee and informant) or to commonly used industry words (such as leverage) may not have this flag set. In the present system these words do not have a +COMMON NOUN-NOMINALIZED VERB flag set.

COMMON NOUN-NOMINALIZED VERB is primarily an application flag for PowerEdit to encourage clear consise writing. It is not a linguistic flag to identify derived words.

Common nouns that are +COMMON NOUN-NOMINALIZED VERB also tend to have the following flags set:

+COMMON NOUN-MASS
+COMMON NOUN-ABSTRACT
+COMMON NOUN-EVENTIVE (always set on +COMMON NOUN-NOMINALIZED VERB words)
+COMMON NOUN-HUMAN NOUN
+COMMON NOUN-NON-HUMAN (These two flags working together indicate personification)

If the NOT ADJECTIVE flag is not set on a word that has the COMMON NOUN-NOMINALIZED VERB flag set, GRIFF will allow the word to become an ADJECTIVE when it appears before a plural noun that is also a possible VERB part of speech. Griff will set the ADJECTIVE flag for you. The ADJECTIVE part of speech flag does not need to be set on words that are +COMMON NOUN-NOMINALIZED VERB. But this does not preclude you from setting the ADJECTIVE flag if you so desire.

The basis of the capiatlization (ADJECTIVE) rules is to impart importance, emphasis, and distinctiveness.

(NOMINALIZED VERBS AS WEAK WORDS)

Words that are +COMMON NOUN-NOMINALIZED VERB are considered to be weak words by the PowerRead reduction program. They need premodification or postmodification of a prepositional phrase to provide the topical content. The reduction program will not delete the premodifiers nor a postmodifying prepositional phrase associated with a +COMMON NOUN-NOMINALIZED VERB word.

COMMON NOUN-REDUCED CLAUSE

COMMON NOUN-REDUCED CLAUSE uses "reduced relative nominal noun" as its program variable name.

COMMON NOUN-REDUCED CLAUSE is not being used presently. There are no words in the lexicon with this flag set. It never has been used by the system. It has no IC linguistic core analysis functions and no application functions.

COMMON NOUN-REDUCED CLAUSE is available for application use.

HYPHENATED

This is a core flag set on hyphenated nouns that are not entered into the lexicon. The default for a hyphenated word is to consider it a possible COMMON NOUN and a possible ADJECTIVE.

No words have this flag set in the lexicon. Griff will set it for you when a hypenated word occurs.

HYPHENATED identifies hyphenated words such as "child-proof" and assigns COMMON NOUN and ADJECTIVE flags it.

Hyphenated words that are not nouns or adjectives need to be entered into the lexicon.

HYPHENATED activates IC linguistic core analysis attractors.

HYPHENATED is not available for use as a crosscutter.

COMMON NOUN-POSSESSIVE

COMMON NOUN POSSESSIVE is an IC linguistic core analysis flag that Griff sets. If the noun you are setting up is a possessive, COMMON NOUN-POSSESSIVE needs to be set for Griff to read it as a possessive. But for general use, if the word ends with the marker of the possessive (-'s or -s'), Griff will set the COMMON NOUN-POSSESSIVE flag for you.

COMMON NOUN-POSSESSIVE needs to be set on words that have the DETERMINER-POSSESSIVE set.

Griff sets the ADJECTIVE part of speech flag, and the COMMON NOUN-POSSESSIVE flag during the prepars-ing routine.

If any word has a possessive suffix (properly's/properlys') Griff will read it as a possessive adjective unless properly's or properlys' is put on file as a +NON-STANDARD word.

** He has a properly's job.

The above sentence will not fire any PowerEdit messages. "Properly's" (since it is not on file in the lexicon) will be read as a possible noun by Griff and he will set the +COMMON NOUN-POSSESSIVE flag and the ADJECTIVE part of speech flag.

(The test below is based on Gregg p. 128) Some nouns that end in "s" can be used as a descriptive adjective without having a possessive suffix.

It was a great sales campaign on the part of our staff.

I need another savings account.

The news release was dismal again today.

The market set another all time earnings record today.

The test to see if a common noun needs the possessive is to transform the sentence using the "of construction" instead of the possessive.

The market's profits today were off today.

The profits of the market were off today.

It was a great sales campaign on the part of our staff.

**It was a great campaign of sales on the part of our staff.

COMMON NOUN GRAMMAR SPECIAL FLAGS

COMMON NOUN-TIME

COMMON NOUN-TIME should be set on all time periods that are definite and measurable. COMMON NOUN-TIME words tend to be the temporal designations on calanders (months, days of the weak, year).

Examples of words that are +COMMON NOUN TIME are:

day, week, month, year, Sunday, Christmas, and intermission.

Presently there are approximately 350 words that are +COMMON NOUN TIME in the lexicon.

A COMMON NOUN-TIME word can influence the formation of a reduced adverbial clause when it occurs before the subject.

Every Satuday night (reduced adverbial clause), they promised her a party. (GCE8.1003)

COMMON NOUN-TIME is an extremely strong flag that functions extensively in the IC linguistic core analysis decisions and is used frequently for PowerEdit messages.

COMMON NOUN-TIME is not available for use as a crosscutter.

COMMON NOUN-PLACE

Nouns that are +COMMON NOUN-PLACE refer to a definite location They are the noun equivalent to the ADJUNCT-PLACE flag and could be considered +PLACE and +POSITION. Many words are both locational adverbs and place nouns. The definite location includes geographical locations or any noun with a definite boundary or area set aside for a specific purpose. This includes: cities, countries, counties, shires, lakes, mountains, streets, parks and buildings.

There are approximately 1400 words in the lexicon that are +COMMON NOUN-PLACE.

COMMON NOUN-DISTANCE

Nouns that are +COMMON NOUN-DISTANCE are used to measure distance. The distance is measurable.

Examples of COMMON NOUN-DISTANCE words are: width, mile, interval, breadth, decimeter, radian, length, foot, stere, zone, decastere, marathon, minute, minutes, league, km, distance, dekameter, height, inch, radii, decameter, fathom, hectometer, feet, centare, acre, stretch, apsis, stride, strides, limit, paremeter, median, diameter, yard, hectare, miles, octave, link, decistere, span, furlong.

Nouns may have more than one COMMON NOUN SPECIAL GRAMMAR FLAG set. For example: "Yard" is +COMMON NOUN-PLACE, +COMMON NOUN DISTANCE and +COMMON NOUN-FACTIVE. There is no prescribed limit for COMMON NOUN SPECIAL GRAMMAR FLAGS. If a word needs the flag set, set it.

COMMON NOUN-DISTANCE activates IC linguistic core analysis attractors.

COMMON NOUN-DISTANCE is not available for use as a crosscutter.

COMMON NOUN-SPEECH ACT

COMMON NOUN-SPEECH ACT is a broadly defined flag that encompasses any product or process associated with speech, writing, music, or any of the fine arts. If the noun is published material, a grammatical term or is closely identified with human communication COMMON NOUN-SPEECH ACT may also need to be set.

There are over 2600 words in the system with this flag set.

Examples of COMMON NOUN-SPEECH ACT nouns are:

book, drama, noun, seminar, play, subpoena and sketch.

Words that are +COMMON NOUN-SPEECH ACT are frequently also +COMMON NOUN-EVENTIVE.

COMMON NOUN-SPEECH ACT is set on verbs of speech (such as preach, promise, call, read and utter) to identify them as a class.

COMMON NOUN-SPEECH ACT is not set on words that only metaphorically indicate speaking:

The sargeant barked at the recruits.

"Barked" does not have the COMMON NOUN-SPEECH ACT set.

COMMON NOUN-EVENTIVE

Common nouns can be thought of as alluding to things, events, abstractions and relations. COMMON NOUN-EVENTIVE catagorizes a common noun as having an event as its referent.

Examples of words +COMMON NOUN-EVENTIVE in the lexicon are:

meeting, lunch, race, handiwork, enganglement and work.

COMMON NOUN-EVENTIVE is set on nouns that:

1. Have any of the following nominalization flags set.
   +COMMON NOUN-DEVERBAL
   +COMMON NOUN NOMINALIZED VERB
2. Academic disciplines (such as physics and geology) have the setting of:
   +COMMON NOUN-SPEECH ACT
   +COMMON NOUN-EVENTIVE Nouns that are possible candidates for +COMMON NOUN EVENTIVE can be tested by inserting a temporal adverbial directly after "is."

** The boy is tomorrow. ("Boy" is not eventive.)

The company is tomorrow. ("Company" is not eventive.)

** The shelf is tommorrow. ("Shelf" is not eventive.)

The play is tommorow.

The meeting is tommorow.

The examination is tommorow.

This test does not apply to words that are nominalized.

** The observation is tomorrow.

COMMON NOUN-FACTIVE

COMMON NOUN-FACTIVE identifies factives (or partatives) for the system. A factive allows a COMMON NOUN-COUNT and a COMMON NOUN-MASS noun to be qualatively gradable. ("Kind of" and "sort of" are the most common quality factives.)

This is a new kind of computer program.

This is a deficient sort of information.

A factive also is used to express the quantity or other measurements of +COMMON NOUN-MASS noun.

I need a new suit of armour.

I have six rashers of bacon.

I can drink six pints of beer.

I can drink four glasses of milk.

Examples of COMMON NOUN-FACTIVE words are:

suit, slice, stick, mile, pint, gallon, dram, ton, bar, lump, article, drop.

Words such as "deal" which functions as a COMMON NOUN-FACTIVE when it is singular a good deal of music a great deal of bacon but not when it is plural

*two great deals of music

*two great deals of bacon need to have both singular and plural forms set up in the lexicon. "Deal" with the COMMON NOUN-FACTIVE flag set, and "deals" without the COMMON NOUN-FACTIVE flag set.

COMMON NOUN GENDER FLAGS

COMMON NOUNS should have all possible gender flags set that they can have. For example:

"Character" is +COMMON NOUN-DUAL to indicate the human antecendent.

He was a character (human) who defied analysis.

"Character" is +COMMON NOUN-GENDER-NEUTER to indicate the non-human antecedent.

He had a character (non-human) which defied analysis.

List of gender classes and pronoun series for substitutions. (This list is from GCE p.187

+COMMON NOUN-HUMAN +COMMON NOUN-MALE who/he.

+COMMON NOUN-HIGH ORGANISM +COMMON NOUN-MALE is which/it ? who/he (pet)
(The "?" indicates that the use of "who" is debatable.)
+COMMON NOUN-HUMAN +(COMMON NOUN FEMALE is who/she
+COMMON NOUN-HIGH ORGANISM +COMMON NOUN-FEMALE which/it who/she
+COMMON NOUN-HUMAN +COMMON NOUN-DUAL who/he/she
+COMMON NOUN-HUMAN +COMMON NOUN-COMMON who/he/she/it which/it
+COMMON NOUN-HIGH ORGANISM +COMMON NOUN-COMMON ? who/she/he/it which/it.
+COMMON NOUN-HUMAN +COMMON NOUN-NON-HUMAN +COMMON NOUN COLLECTIVE which/it who/they
+COMMON NOUN-LOW ORGANISM +COMMON NOUN-GENDER-NEUTER which/it.
+COMMON NOUN-NON-HUMAN +COMMON NOUN GENDER-NEUTER which/it.

COMMON NOUN-MALE

COMMON NOUN-MALE is set on nouns that need a masculine gender distinction

COMMON NOUN-MALE activates IC linguistic core analysis attractors.

COMMON NOUN-MALE is not available for use as a crosscutter.

COMMON NOUN-FEMALE

COMMON NOUN-FEMALE is set on nouns that require a feminine gender distinction.

COMMON NOUN-FEMALE activates IC linguistic core analysis attractors.

COMMON NOUN-FEMALE is not available for use as a crosscutter.

COMMON NOUN-COMMON

COMMON NOUN-COMMON refers to nouns that do not require a sex differentiation but can take the pronoun referent of he/she/it/who/which.

An example of a common gender noun that is +COMMON NOUN-HUMAN is "baby."

An example of a common gender noun that is +COMMON NOUN-HIGH-ORGANISM is "cat."

Approximately 500 words in the lexicon have COMMON NOUN-COMMON set.

Selected examples are:

cockatoo, the set of cardinal numbers (figures 1 . . . 100), tabulator, palfrey, falcon.

COMMON NOUN-COMMON may be set on pets and higher organism nouns that do not require a sex distinction when used as a pronoun form. The only human noun that has this flag set on it is "baby." Baby is context sensitive for its pronoun referent. A mother who knows the gender of the baby tends not to use "it". People who do not know the gender of the baby tend to use "it" until they discover the gender of the child and then they tend to use the appropriate gender.

Pets are socially determined in their use of pronoun referents. People who own cats tend to use the who/he/she series for cats. But may use the which/it pronoun series when discussing dogs.

If you have a preference for the who/he/she series for your pet; set the COMMON NOUN-HUMAN flag in conjunction with the COMMON NOUN HIGH ORGANISM flag which will allow who/she/it series on the COMMON NOUN.

COMMON NOUN-COMMON may also be set on words such as "tabulator," (which can describe a machine or a person in a job function) or "transplant" (which can describe a surgical process or a person).

COMMON NOUN-COMMON activates IC linguistic core analysis attractors.

COMMON NOUN-COMMON is not available for use as a crosscutter.

COMMON NOUN GENDER-NEUTER

COMMON NOUN GENDER-NEUTER is set on COMMON NOUNS which do not have a gender distinction or, if they do have a gender distinction, the distinction is not normally made. They are primarily +COMMON NOUN-NON-HUMAN or +COMMON NOUN-LOW ORGANISM nouns. Examples or words that do have a gender distinction but not normally indicated are:

ant, bee, snake, frog, spider.

COMMON NOUN GENDER-NEUTER the pronoun series which/it for its antecedents.

I have a book which is red. It is not read, but red.

I saw the snake which was biting aunt Mary die.

COMMON NOUN GENDER-NEUTER activates IC linguistic core analysis attractors.

COMMON NOUN GENDER-NEUTER is not available for crosscutter use.

COMMON NOUN-DUAL

COMMON NOUN-DUAL is set on nouns that are +COMMON NOUN-HUMAN and can refer either to males or females. COMMON NOUN-DUAL is normally set on nouns which describe occupations that can be performed by either females or males.

COMMON NOUN-DUAL uses the pronoun antecedent series of he/she/who.

COMMON NOUN-DUAL is set on words such as:

doctor, laywer, cook, singer and electrician.

COMMON NOUN-DUAL activates IC linguistic core analysis attractors.

COMMON NOUN-DUAL is not available for use as a crosscutter.

COMMON NOUN GENDER-COLLECTIVE

COMMON NOUN GENDER-COLLECTIVE identifies a noun as being a collective noun.

COMMON NOUN GENDER-COLLECTIVE nouns use the pronoun antecedent series of which/it or who/they.

A collective noun is singular in form but represents a group of persons, animals, or things. Examples of collective nouns are:

army, audience, board, cabinet (political only) committee, army, corporation, council, department, faculty, firm, group, jury, majority, minority, public, school, and society.

(The following comments on collective nouns are taken from Gregg p. 187)

If the collective noun is acting as a unit the subject-verb agreement is singular.

The board meets today.

The firm is the oldest in town.

The committe has met today.

The committee has met its obligations today. (note singular pronoun agreement)

If the members of the collective noun are perceived as acting separately the subject-verb agreeement is plural.

The commitee are not in total agreement.

The audience were leaving as quickly as they could.

NOTE: The use of a collective noun with a plural verb often produces sentences that are awkward and sound strange. Whenever possible use a phrase that functions similar to a factive such as: "the members of".

The committee were meeting yesterday.

The members of the committee were meeting yesterday.

Most COMMON NOUN GENDER-COLLECTIVE nouns in the system are set to go with singular concord only.

COMMON NOUN GENDER-COLLECTIVE nouns are treated as personal when they have plural concord and non-personal when they have singular concord.

The commitee who were responsible for this decision.

The committee which was responsible for this decision.

COMMON NOUN GENDER-COLLECTIVE activates IC linguistic core analysis attractors.

COMMON NOUN GENDER-COLLECTIVE is not available for use as a crosscutter.

COMMON NOUN GENDER-SPECIFIC

COMMON NOUN GENDER-SPECIFIC is available for application use.

COMMON NOUN GENDER-SPECIFIC is ready for an assignment after its earlier core function uses have been deleted.

COMMON NOUN GENDER-SPECIFIC activates IC linguistic core analysis attractors.

COMMON NOUN GENDER-GENERIC

COMMON NOUN GENDER-GENERIC is available for application use.

COMMON NOUN GENDER-GENERIC is ready for an assignment after its earlier core functions have been deleted.

COMMON NOUN GENDER-GENERIC activates IC linguistic core analysis attractors.

COMMON NOUN GENDER-UNIQUE

COMMON NOUN GENDER-UNIQUE is available for application use.

COMMON NOUN GENDER-UNIQUE needs lexicon clean-up work before it can be given an assignment. It also needs to have its core functions deleted.

COMMON NOUN GENDER-UNIQUE activates IC linguistic core analysis attractors.

COMMON NOUN NUMBER FLAGS

The COMMON NOUN NUMBER FLAGS are used by Griff for verb agreement, adjective formation, adjective and noun concord, and determiner usage. When ever a number distinction is needed for nouns (including proper nouns) the COMMON NOUN NUMBER FLAGS provide it.

The vast majority of English words will either be +COMMON NOUN-SINGULAR or +COMMON NOUN-PLURAL.

Some words (such as "sheep" or "species") will need to have both the COMMON NOUN-SINGULAR and the COMMON NOUN-PLURAL flag set.

Other words will require special combinations of the COMMON NOUN NUMBER FLAGS to handle their specific quirks of usage. For example:

A noun such as "Vietnamese" that is:

+COMMON NOUN-SINGULAR

+COMMON NOUN-TAKES SINGULAR VERB

+COMMON NOUN-TAKES PLURAL VERB can still be premodified by plural ordinal numbers.

There are 10 Vietnamese in the village.

However if a noun is set with the above COMMON NOUN NUMBER FLAGS it will not take accept class D determiners (Class D determiners modify plural nouns only). This will cause analysis problems and incorrect PowerEdit messages with sentences contain a class D determiner.

These Vietnamese are the good guys.

hose Vietnamese are the bad guys.

Few Vietnamese like salsa music.

To be able to function correctly, words comparable to "Vietnamese" need to be set with:

+COMMON NOUN-SINGULAR

+COMMON NOUN-PLUARL

There are times when it is desirable for a word to be set:

+COMMON NOUN-SINGULAR

+COMMON NOUN-TAKES SINGULAR VERB

+COMMON NOUN TAKES PLURAL VERB

Some words that have this set of COMMON NOUN NUMBER FLAGS set are:

petropolitics, politics, dozen, gynmastics, mathematics and linguistics.

His politics are conservative.

His linguistics are conservative.

Politics is a dirty business.

Linguistics is not a lucrative profession.

This setting will not allow a class D determiner to modify the noun.

** Few linguistics is best.

** These linguistics are best.

** These dozen are the ones that I want.

Most nouns of this type are also +COMMON NOUN-MASS and +ADJECTIVE to allow for:

She saved the world with linguistics.

She is a linguistics teacher.

COMMON NOUN-SINGULAR

COMMON NOUN-SINGULAR identifies a noun as being singular for determiner, adjective, and verb agreement. The core first checks the determiner and adjective concord. It then checks for verb concord.

"People" is set as:

+COMMON NOUN-SINGULAR

+COMMON NOUN-TAKES PLURAL VERB

This dual setting is the only way to capture its unique usage.

They are a people who are large.

They are a people who is large.

The people were upset at the election.

There were thirty people killed in the crash.

The COMMON NOUN-SINGULAR flag is a powerful flag that can cause analysis problems if it is set on an adjective or on a word that is multiple parts of speech—one of which is an adjective—but is not a noun. This situation creates the possiblility of an ADVERB (or other part of speech) becoming an ADJECTIVE or even though the adjective promotion process to being +COMMON NOUN.

If a word is −COMMON NOUN and +COMMON NOUN-SINGULAR, Girff can promote this word to an ADJECTIVE in some cases unless the NOT ADJECTIVE flag is set.

When COMMON NOUN-SINGULAR and COMMON NOUN-PLURAL are both set, this combination of flags lets a noun take singular and plural determiners, articles and adjectives. It also lets the verb agreement be singular and plural.

When you are setting an ADJECTIVE up in the system, unless the ADJECTIVE is special or non-normal in its function, none of the COMMON NOUN-NUMBER flags should be set. Griff will set them for you. Griff assumes that a word that is only an ADJECTIVE part of speech can modify both singular and plural nouns.

As an alternative both COMMON NOUN-SINGULAR and COMMON NOUN-PLURAL can be set on the ADJEC- TIVE and the ADJECTIVE will be allowed to modify both singular and plural nouns.

If the ADJECTIVE can modify only singular nouns it functions as a determiner and should have the proper DETERMINER GROUP COUNT/MASS FLAG set to give it that restriction. In addition, the ADJECTIVE-SINGULAR flag should be set.

If the adjective can modify only plural nouns it functions hike a determiner and should have the proper DETERMINER GROUP MASS FLAG set to give it that restriction. Also the ADJECTIVE-PLURAL flag should be set.

Adjectives that can only modify plural nouns and are not determiners (assuming that some exist) will need to have the ADJECTIVE-PLURAL flag set.

COMMON NOUN-SINGULAR is not available as a crosscutter. COMMON NOUN-SINGULAR activates IC linguistic core analysis attractors.

COMMON NOUN-PLURAL

COMMON NOUN-PLURAL specifies the noun as being a plural noun for article, determiner, adjective and verb concord. If COMMON NOUN-PLURAL is set Griff will only allow the noun to have concord with plural verbs, plural adjectives, and determiners that are restricted to premodifying plural nouns.

Any COMMON NOUN or PROPER NOUN that can function as an ADJECTIVE cannot have COMMON NOUN-PLURAL set without having COMMON NOUN-SINGULAR set as well. COMMON NOUN-PLURAL forces a heavy attraction to NOT ADJECTIVE. If you need to set COMMON NOUN-PLURAL with out also setting COMMON NOUN-SINGULAR and the word can be used adjectively, than you need to set the ADJECTIVE part of speech flag to allow Griff to read the word as a possible adjective.

Words that are +COMMON NOUN PLURAL and +ADJECTIVE need to be +COMMON NOUN-SINGULAR as well. For example: "sales."

But "sales" also has COMMON NOUN-TAKES PLURAL set to allow it to have verb concord with plural verbs only. "Sales" is somewhat unique in that under special restriced circumstances (when refering to the profession of selling) it can take a singular form of the verb "BE."

Sales is a good field.

Because of this singularity "sales" (and words with the same flag settings in the lexicon) has special coding which allows "be" to follow in the singular.

Common nouns that are +COMMON NOUN-SINGULAR and +COMMON NOUN-PLURAL become +ADJECTIVE in the IC analysis easier than Common nouns with the COMMON NOUN NUMBER FLAGS settings of +COMMON NOUN SINGULAR and +COMMON NOUN TAKES PLURAL VERB.

The default word "NB" (figure numbers such as 1107) has:

+COMMON NOUN-SINGULAR
+COMMON NOUN-TAKES SINGULAR VERB
+COMMON NOUN-TAKES PLURAL VERB
Words that function in the same way as "homeless."
+COMMON NOUN-SINGULAR
+COMMON NOUN-PLURAL
+COMMON NOUN-TAKES PLURAL VERB
+COMMON NOUN-MASS
Test sentences for a word like "homeless."
A homeless person is large.
The two homeless persons are large.
The homeless are large.
**The homeless is large.
**A homeless is large.
**The six homeless are large.

COMMON NOUN-PLURAL is not available as a crosscutter.

COMMON NOUN-PLURAL activates IC linguistic core analysis attractors.

COMMON NOUN-TAKES SINGULAR VERB

COMMON NOUN-TAKES SINGULAR VERB is a special function flag that over-rides the normal subject-verb agreement rules, and lets a plural noun (article, adjective, determiner agreement) take a singular verb. Usually it works with nouns that are +COMMON NOUN-SINGLUAR and +COMMON NOUN PLURAL and are restrcited to singular in their verb agreement.

The settings of +COMMON NOUN-SINGULAR, COMMON NOUN-PLURAL and COMMON NOUN-TAKES SINGULAR VERB is a rare setting. It is set on words such as "o'clock," "rpm," and "mph."

Seven o'clock is not a good time to come.

COMMON NOUN-TAKES SINGULAR VERB is not available as a crosscutter.

COMMON NOUN-TAKES SINGULAR VERB activates IC linguistic core analysis attractors.

COMMON NOUN-TAKES PLURAL VERB

COMMON NOUN-TAKES PLURAL VERB is a special function flag that over-rides the normal subject-verb agreement rules, and lets a singular noun (article, adjective, determiner agreement) take a plural verb. Usually it works with nouns that are +COMMON NOUN SINGULAR and +COMMON NOUN-PLURAL and are restrited to plural in their verb agreement.

The setting:

+COMMON NOUN-SINGULAR
+COMMON NOUN-PLURAL
+COMMON NOUN-TAKES SINGULAR VERB
+COMMON NOUN-TAKES PLURAL VERB
is redundant and should not be used. +COMMON NOUN-SINGULAR and +COMMON NOUN PLURAL will achieve the same results.

The setting of:

+COMMON NOUN-SINGULAR
+COMMON NOUN-TAKES SINGULAR VERB
+COMMON NOUN-TAKES PLURAL VERB
allows for singular noun concord with articles, determiners, adjectives and verbs. In addition, it allows the normally singular noun to agree with a plural verb. Examples of words set this way include:

gymnastics, mathematics, politics, billion, and majority.

The setting of:

+COMMON NOUN-SINGULAR
+COMMON NOUN-TAKES PLURAL VERB
allows for singular concord with articles, determiners and adjectives. The setting only allows plural verb concord. Words with this setting include:

innocent, faithful, happy, poor, police, and sly.

Most of the words that comprise this class are +ADJECTIVE part of speech and +ADJECTIVE-NOUN PROMOTION.

The setting of:

+COMMON NOUN-SINGULAR
+COMMON NOUN-PLURAL
+COMMON NOUN-TAKES SINGULAR VERB allows for singular concord and plural concord with articles, determiners and adjectives. The setting only allows singular verb concord. Words with this setting include:

o'clock, rpm, mph.

The special function verb agreement flags of:

COMMON NOUN-TAKES SINGULAR VERB

COMMON NOUN-TAKES PLURAL VERB

COMMON NOUN-SINGULAR COMPLEMENT OK should only be set as a result of testing and analysis.

COMMON NOUN-TAKES PLURAL VERB is not available for use as a crosscutter.

COMMON NOUN-TAKES PLURAL VERB activates IC linguistic core analysis attractors.

COMMON NOUN-SINGULAR COMPLEMENT OK

COMMON NOUN-SINGULAR COMPLEMENT OK is a special function flag that allows a singular noun complement to co-ocur with a plural subject COMMON NOUN-SINGULAR COMPLEMENT OK only works with the verb "be."

As a rule of thumb, if a noun is +COMMON NOUN-GENDER-COLLECTIVE it will probably need to be +COMMON NOUN-SINGULAR COMPLEMENT.

They were a team.

The men were an army.

Five regions are a district.

COMMON NOUN-SINGULAR COMPLEMENT OK is not available for use as a crosscutter.

COMMON NOUN-SINGULAR COMPLEMENT OK does not independently activate IC linguistic core analysis attractors.

COMMON NOUN SEMANTIC FLAGS

COMMON NOUN-ABSTRACT

COMMON NOUN-ABSRTACT has a dual purpose. It indicates that a noun is denoting an abstraction. COMMON NOUN-ABSTRACT also performs a special syntactic function that will influence Griff to analyze a sentence initial +COMMON NOUN-ABSTRACT and +VERB word an imperative verb before the same form can be a COMMON NOUN.

Words that are +COMMON NOUN-ABSTRACT must also be +COMMON NOUN-CONCRETE. This dual setting allows the Noun-Verb semantic system to function. If you set a word that is +COMMON NOUN-ABSTRACT and -COMMON NOUN-CONCRETE every time the word appears in the text you will fire the PowerEdit SUBJECT-VERB LOGIC MISMATCH message.

COMMON NOUN-ABSTRACT is not available for use as a crosscutter.

COMMON NOUN-ABSTRACT is used by PowerEdit Index.

COMMON NOUN-ABSTRACT activates IC linguistic core analysis attractors.

COMMON NOUN-CONCRETE

COMMON NOUN-CONCRETE does not function in the linguistic or philosophic sense of concrete. A word can be "philosophically" abstract and yet function as a concrete noun.

Her beauty moves me. (A figurative/idomatic use of beauty and moves (a movement verb). But English is replete with such dead metaphors and the system needs to account for them.

COMMON NOUN-CONCRETE is set on all abstract (philosophically) nouns that can be paired up with physical and movement verbs. It is a rare noun that is purely abstract in function in English. (There are no nouns in the system that are +COMMON NOUN ABSTRACT and -COMMON NOUN CONCRETE) A pure abstract noun cannot function as the subject of movement verbs, locational verbs, or physical verbs if it is also flagged as COMMON NOUN-NON-HUMAN.

COMMON NOUN-CONCRETE should be set on all nouns that are entered into the lexicon.

COMMON NOUN-CONCRETE is not available for use as a crosscutter.

COMMON NOUN-CONCRETE is used by PowerEdit Index.

COMMON NOUN-CONCRETE activates IC linguistic core analysis attractors.

COMMON NOUN SEMANTIC-COLLECTIVE

COMMON NOUN SEMANTIC-COLLECTIVE is not really a semantic noun flag, but a special function flag which prevents a noun from co-occuring with the indefinate article.

It works with the determiner system and makes decisions about determiner usage about singular and plural nouns.

Words that are +COMMON NOUN SEMANTIC-COLLECTIVE in the lexicon include:

ours', little, nope, each, themselves, everybody, none, we, some, many a, many an, they all, their's, some more, several, next, many such, any, neither, a great many, each individual, them, us, thy, every one, everyone, theirs, their's, next such, many, -at even our's.

Also the ordinal figure numbers 1st, 2nd, 3rd . . . . . . . 100th.

In the original system this flag was to have the special function of allowing the indefinite article to be used with a plural noun. (A number of students.) It was set on the word "number."

COMMON NOUN SEMANTIC-COLLECTIVE is not available for use as a crosscutter.

COMMON NOUN SEMANTIC-COLLECTIVE activates IC linguistic core analysis attractors.

COMMON NOUN-ANIMATE

COMMON NOUN-ANIMATE does not refer to the usual linguistic definition which is based on the paired opposition of animate/inaimate. COMMON NOUN-SEMANTIC-ANIMATE has nothing to do with being alive, It has more to do with motion. If it can move it is an (whether self-directed or propelled) it can be considered to be +COMMON NOUN-ANIMATE.

The more traditional definition of "animate" is included in the flags of COMMON NOUN-HUMAN, COMMON NOUN HIGH ORGANISM and COMMON NOUN LOW ORGANISM and the personifiation technique +COMMON NOUN-HUMAN and COMMON NOUN-NON-HUMAN.

Every noun should have the COMMON NOUN-ANIMATE flag set. If it is not set, the noun cannot be the subject of any verb semantically except a verb that is +VERB-POSSESSION.

COMMON NOUN-ANIMATE is not available for use as a crosscutter.

COMMON NOUN-ANIMATE activates IC linguistic core analysis attractors.

COMMON NOUN-INANIMATE

COMMON NOUN-INANIMATE is not available for application use.

There are no words in the lexicon with this flag set. The original function of this flag was to identify nouns that cannot be semantically valid subjects with most classes of verbs. The COMMON NOUN-INANIMATE flag is set by GRIFF on all words that do not have either COMMON NOUN-ANIMATE or COMMON NOUN-ANIMATE set. The words do not have to be +COMMON NOUN part of speech.

COMMON NOUN-INANIMATE activates IC linguistic core analysis attractors.

COMMON NOUN-HIGH ORGANISM

COMMON NOUN-HIGH ORGANISM depicts a referent that has a nervous system and thinking capabilities. COMMON NOUN-HIGH ORGANISM is set on animals that are pets, primates, birds, and mammals.

If you are fisherman you probably would want to set it on the word "fish." Differences of opinion are going to occur about a referents semantic designation.

To set up a fully functional COMMON NOUN-HIGHER ORGANISM noun the following semantic flags need to be set:

+COMMON NOUN-HIGH ORGANISM
+COMMON NOUN-CONCRETE
+COMMON NOUN-ANIMATE

Do not set the COMMON NOUN-NON HUMAN flag. The COMMON NOUN-NON-HUMAN flag is reserved for nouns that are not living organisms.

At times there is a conflict since words in real language are homonymous. For example: "bass" can refer to:

1. a musical instrument
2. a sneaky fighting fish thats hard to catch
3. a human singer with a low voice
4. an instrument with a low pitch In the present system "bass" is handled as a +COMMON NOUN LOW ORGANISM. It was assigned this semantic compromise after extensive testing. "Bass" functions well with this setting, but it could be upgraded to COMMON NOUN-HUMAN or downgraded to COMMON NOUN-NON-HUMAN.

COMMON NOUN-HIGH ORGANISM does not independently activate any IC linguistic core analysis attractors.

COMMON NOUN-LOW ORGANISM

COMMON NOUN-LOW ORGANISM nouns are plants, insects, fish, reptiles and unicelluar organisms.

Normally to set up the semantic flags for a COMMON NOUN-LOW ORGANISM the following three flags would be set:

+COMMON NOUN-LOW ORGANISM
+COMMON NOUN-CONCRETE
+COMMON NOUN-ANIMATE

COMMON NOUN-LOW ORGANISM does not independently activate any IC linguistic core analysis attractors.

COMMON NOUN-HUMAN

COMMON NOUN-HUMAN nouns refer to humans.

The following semantic flags should be set on a COMMON NOUN-HUMAN.

+COMMON NOUN-HUMAN
+COMMON NOUN-CONCRETE
+COMMON NOUN-ANIMATE

Common nouns that need to personified need the following flags set:

+COMMON NOUN-HUMAN
+COMMON NOUN-NON-HUMAN
+COMMON NOUN CONCRETE
+COMMON NOUN ANIMATE

Personification occurs frequently in English. There are approximately 10,000 words that are personified in the lexicon.

Human institutions, groups, companies, are personified in the system.

Personification and pronoun usage in the system.

Personality or humanness can be extended to more than just human beings. Some supernatural beings such as elves, angels, fairies, and perhaps orcs can use the human "who" and not the impersonal relative pronoun "which."

The distinction is humanness or personality. A strict view requires that "who" be used for human beings only. A looser view (the view adopted by Griff) is that it is not humanity that counts but personality development. Thus non-human entities such as elves, angels, orcs, and pets, which have well developed personalities, can have the "who" relative pronoun used with them.

Pet animals can be considered to be humans (at least by their owners) and also use a "who." For example:

I have a cat who likes to cuddle.

It is a rare person who will not impart some degree of personality to computers, cars, and ships.

Ships are often referred to by sailors as "she" but usually they use the "which" pronoun and not "who."

Human babies (although not by their parents) sometimes are treated as if they do not have a well developed personality and the "which" is used. For example:

This is the baby which needs the shot.

Persons when dehumanized (especially by the medical profession, military, and other institutions which need some distance between themselves and humans) will also use the "which" instead of "who."

This is the patient which needs the shot.

This is the traitor which needs to be shot.

This is the purchaser which defaulted on the loan.

Collective nouns are treated as personal when they have plural concord and non-personal when they have singular concord.

The commitee who were responsible for this decision.

The committee which was responsible for this decision.

Some nouns can use "which" or "who" depending on what is meant.

John is a strange character who likes life.

John has a strange character which he acquired at work.

COMMON NOUN-HUMAN is set on some ADVERBS to trigger the PowerEdit SUBJECT-ADVERB LOGIC MISMATCH. Source ADVERBS can only be used with a COMMON NOUN-HUMAN noun.

**The clock struck cheerfully.

**The clock would rather eat breakfast.

COMMON NOUN-HUMAN activates IC linguistic core analysis attractors.

COMMON NOUN-HUMAN is used by PowerEdit Index.

COMMON NOUN-NON-HUMAN

COMMON NOUN-NON-HUMAN deonotes nouns that are not living beings.

The following semantic flags need to be set on a non-human noun.

+COMMON NOUN-NON-HUMAN
+COMMON NOUN-CONCRETE
+COMMON NOUN-ANIMATE

COMMON NOUN-NON-HUMAN activates IC linguistic core analysis attractors.

PERSONAL ATTRIBUTES SINGULAR

Refers to nouns that are human body parts. Each person has one. For example: "heart" and "soul."

PERSONAL ATTRIBUTES SINGULAR is a special semantic flag that is an add-on feature to the other semantic flags. Usually the word that this is set on will already be either a non-human noun or a personified noun.

PERSONAL ATTRIBUTES SINGULAR does not independently activate IC linguistic core analysis attractors.

PERSONAL ATTRIBUTES PLURAL

PERSONAL ATTRIBUTES PLURAL identifies nouns that are human body parts that come in pairs, or each person has more than one. For example: "eye" and "leg."

PERSONAL ATTRIBUTES PLURAL is a special semantic flag that is an add-on feature to the other semantic flags. Usually the word that this is set on will already be either a non-human noun or a personified noun.

PERSONAL ATTRIBUTES PLURAL does not independently activate IC linguistic core analysis attractors.

PROPER NOUN NUMBER FLAGS

Number Flags on PROPER NOUNS must be set identical to the COMMON NOUN NUMBER FLAGS. Both sets of number flags need to be set.

PROPER NOUN SINGULAR identifies a noun as being singular for determiner, adjective, and verb agreement. The core first checks the determiner and adjective concord. It then checks for verb concord.

Company names may be treated as either singular or plural. Ususally the company name is treated as singular unless you want to emphasize the individuals who comprise the company.

ZXW have lost their lease. They are looking for a new location.

ZXW has lost its lease. It is looking for a new location.

If the company is referred to as "they" or "who," use a plural verb.

If the company is referred to as "it" or "which," use a singular verb.

Geographic names that are plural in form are treated as singular if they refer to one unit.

The Netherlands is in Europe.

The United States is a wealthy country.

BUT: These United States are bound together with chicken wire.

Titles of Publications are used with singular verb concord even though the title may be plural in form.

Better Homes and Gardens is a popular magazine.

Consumer Reports has some important information.

PROPER NOUN-SINGULAR does not independently activate IC linguistic core analysis attractors.

PROPER NOUN-PLURAL

PROPER NOUN-PLURAL specifies the noun as being a plural PROPER NOUN for article, determiner, adjective and verb concord. If PROPER NOUN-PLURAL is set in conjunction with COMMON NOUN-PLURAL Griff will only allow the noun to have concord with plural verbs, plural adjectives, and determiners that can only modify plural nouns.

When PROPER NOUN-PLURAL is set on a word COMMON NOUN PLURAL must also be set to activate the plural noun concord attractors.

PROPER NOUN-PLURAL is not being used presently by any application.

PROPER NOUN-PLURAL does not activate IC linguistic core analysis attractors.

PROPER NOUN-PLURAL is being set by Griff on the proper noun default words and is set on plural proper nouns in the lexicon. PROPER NOUN-PLURAL is not availble for a general redefinition of its use.

But PROPER NOUN-PLURAL is available for application use.

PROPER NOUN-TAKES SINGULAR

PROPER NOUN-TAKES SINGULAR is a special function slag that over-rides the normal subject-verb agreement rules, and lets a plural noun (article, adjective, determiner agreement) take a singular verb. Usually it works with nouns that are +PROPER NOUN-SINGLUAR and +PROPER NOUN PLURAL and are restrcited to singular in their verb agreement.

When PROPER NOUN-TAKES SINGULAR is set COMMON NOUN-TAKES SINGULAR VERB must be set.

PROPER NOUN-TAKES SINGULAR by itself activates no IC linguistic core analysis attractors.

PROPER NOUN-TAKES SINGULAR is not presently being used by any application.

PROPER NOUN-TAKES SINGULAR is available for applicaiton use.

PROPER NOUN-TAKES PLURAL

PROPER NOUN-TAKES PLURAL is a special function slag that over-rides the normal subject-verb agreement rules, and lets a singular PROPER NOUN (article, adjective, determiner agreement) take a plural verb. Usually it works with PROPER NOUNS that are +PROPER NOUN SINGULAR and +PROPER NOUN-PLURAL and are restrited to plural in their verb agreement.

When PROPER NOUN-TAKES PLURAL is set, COMMON NOUN-TAKES PLURAL VERB must also be set.

PROPER NOUN-TAKES PLURAL is not presently being used by any application.

PROPER NOUN-TAKES PLURAL does not activate IC linguistice core analysis attractors.

PROPER NOUN-TAKES PLURAL is available for application use.

PROPER NOUN GENDER FLAGS

When a PROPER NOUN GENDER FLAG is set, it also must have the corresponding COMMON NOUN GENDER FLAG set.

Each of the PROPER NOUN GENDER FLAGS activates IC linguistic core analysis attractors. When a PROPER NOUN is entered into the lexicon a PROPER NOUN GENDER FLAG must be set on the PROPER NOUN for the word to function with the attractors in the core.

PROPER NOUN-MALE

PROPER NOUN-MALE is set on PROPER NOUNS that are masculine nouns. When PROPER NOUN-MALE is set, COMMON NOUN-MALE must also be set.

PROPER NOUN-MALE activates IC linguistic core analysis attractors.

PROPER NOUN-FEMALE

PROPER NOUN-FEMALE is set on PROPER NOUNS that are feminine. When PROPER NOUN-FEMALE is set, COMMON NOUN-FEMALE must also be set.

PROPER NOUN-FEMALE activates IC linguistic core analysis attractors.

PROPER NOUN-COMMON

PROPER NOUN-COMMON is set on PROPER NOUNS that do not require a sex differentiation but which can take the pronoun referent of he/she/it/who/which.

When PROPER NOUN-COMMON is set, COMMON NOUN-COMMON should also be set.

PROPER NOUN-COMMON activates IC linguistic core analysis attractors.

PROPER NOUN-NEUTER

PROPER NOUN-NEUTER is set on PROPER NOUNS which use the pronoun referent it.

When PROPER NOUN-NEUTER is set, COMMON NOUN-NEUTER must also be set.

PROPER NOUN-NEUTER activates IC linguist core analysis attractors.

PROPER NOUN-DUAL

PROPER NOUN-DUAL is set on PROPER NOUNS which can have a male or female human referent.

When PROPER NOUN DUAL is set, COMMON NOUN-DUAL must also be set.

PROPER NOUN-DUAL activates IC linguistic core analysis attractors.

PROPER NOUN-COLLECTIVE

PROPER NOUN-COLLECTIVE is set on PROPER NOUNS which are collective proper nouns in the traditional sense and have "which/it" or "who/they" as their pronoun substitution.

When PROPER NOUN-COLLECTIVE is set, COMMON NOUN-GENDER-COLLECTIVE must also be set.

PROPER NOUN-COLLECTIVE activates IC linguistic core analysis attractors.

The following PROPER NOUN flags are not presently used by the system:
PROPER NOUN-SPECIFIC
PROPER NOUN-GENERIC
PROPER NOUN-UNIQUE They all set IC linguistic core analysis attractors. They can be made available for application use after the core functions have been removed.

PRONOUN NUMBER FLAGS

PRONOUN-SINGULAR

The PRONOUN-SINGULAR flag identifies a PRONOUN as requiring singular verb concord.

When PRONOUN-SINGULAR is set, COMMON NOUN-SINGULAR must also be set. The number flags se on pronouns and common nouns must agree. When a word is +PRONOUN and +COMMON NOUN (such as "mine") set the number flags to agree with each part of speech.

"Mine" as a COMMON NOUN is +COMMON NOUN-SINGULAR.

"Mine" as a PRONOUN is +PRONOUN-SINGULAR and +PRONOUN-PLURAL.

PRONOUN-SINGULAR activates IC linguistic core analysis attractors.

PRONOUN-SINGULAR is not available for general application use or for use as a crosscutter.

PRONOUN-PLURAL

The PRONOUN-PLURAL flag indicates that the PRONOUN requires a plural verb.

When PRONOUN-PLURAL is set, COMMON NOUN-PLURAL must also be set. The number flags pronouns and common nouns must agree.

PRONOUN-PLURAL activates IC linguistic core analysis attractors.

PRONOUN-PLURAL is not available for general application use or for use as a crosscutter.

PRONOUN PERSON FLAGS

The PRONOUN PERSON FLAGS are only applicable to personal, possessive and reflexive pronouns.

PRONOUN FIRST-PERSON identifies the speaker.

PRONOUN FIRST-PERSON is set on:
I, me, myself, my, mine, we, us, ourselves, our, ours.

PRONOUN FIRST-PERSON activates IC linguistic core analysis attractors.

PRONOUN FIRST-PERSON is used by PowerEdit Index.

PRONOUN FIRST-PERSON is not available for general application use or for use as a crosscutter.

PRONOUN SECOND-PERSON identifies those addressed.

PRONOUN SECOND-PERSON is set on:
you, yourself, your, yours, yourselves

PRONOUN SECOND-PERSON activates IC linguistic core analysis attractors.

PRONOUN SECOND-PERSON is not available for general application use or for use as a crosscutter.

PRONOUN THIRD-PERSON identifies what or who is mentioned.

PRONOUN THIRD-PERSON is set on:
ne, him, himself, his, she her, herself, her, hers, it, itself, its, they, them, themselves, their, theirs.

PRONOUN THIRD-PERSON activates IC linguistic core analysis attractors.

PRONOUN THIRD-PERSON is used by PowerEdit Index.

PRONOUN THIRD-PERSON is not available for use as a crosscutter.

PRONOUN CASE FLAGS

NOMINATIVE-CASE

If the PRONOUN can appear in the subject position as the subject, it needs to have the NOMINATIVE-CASE flag set.

A PRONOUN can have more than one PRONOUN CASE FLAG set.

| | |
|---|---|
| Everyone | +NOMINATIVE-CASE +OBJECTIVE-CASE |
| it | +NOMINATIVE-CASE +OBJECTIVE-CASE |
| her | +OBJECTIVE-CASE +POSSSESIVE-CASE |
| myself | +NOMINATIVE-CASE +OBJECTIVE-CASE |
| whose | +NOMINATIVE-CASE +POSSESSIVE-CASE |
| that | +NOMINATIVE-CASE +OBJECTIVE-CASE +POSSESSIVE-CASE |
| those | +NOMINATIVE-CASE +OBJECTIVE-CASE +POSSESSIVE-CASE |
| each | +NOMINATIVE-CASE +OBJECTIVE-CASE |
| all | +NOMINATIVE-CASE +OBJECTIVE-CASE |
| many | +NOMINATIVE-CASE +OBJECTIVE-CASE |
| more | +NOMINATIVE-CASE +OBJECTIVE-CASE +POSSESSIVE-CASE |
| several | +NOMINATIVE-CASE +OBJECTIVE-CASE |
| either | +NOMINATIVE-CASE +OBJECTIVE-CASE |
| some | +NOMINATIVE-CASE +OBJECTIVE-CASE +POSSESSIVE-CASE |
| no one | +NOMINATIVE-CASE +OBJECTIVE-CASE +POSSESSIVE-CASE |

The NOMINATAIVE-CASE flag needs to be set on AD)VERBS that have the EXPLETIVE THERE flag set to prevent the PowerEdit "PRONOUN ABUSE" message from firing incorrectly.

NOMINATIVE-CASE is used by PowerEdit Index.

NOMINATIVE-CASE activates IC linguistic core analysis attractors.

OBJECTIVE-CASE

OBJECTIVE-CASE should be set on PRONOUNS that can appear as objects or complements.

OBJECTIVE-CASE is a minor cross-cutter. When OBJECTIVE-CASE is set on a word it will allow it only to appear in the object position.

For example: OBJECTIVE-CASE is set on the CONJUNCTION "of whom."

OBJECTIVE-CASE as a cross-cutter exists mainly for the PowerEdit "PRONOUN ABUSE" (misuse of case) messages.

\*\*I saw the man whom hit John.

I saw the man who hit John.

OBJECTIVE-CASE activates IC linguistic core analysis attractors.

OBJECTIVE-CASE is used by PowerEdit Index.

POSSESSIVE-CASE

POSSESSIVE-CASE indicates the presence of a genitive relationship. POSSESSIVE-CASE is usually not set alone on a PRONOUN. PRONOUNS that have a +POSSESSIVE-CASE setting also need the other possessive flags set. For example, "my" has the following flags set:

+POSSESSIVE-CASE
+DETERMINER-POSSESSIVE
+DETERMINER-CLASS A
+COMMON NOUN-POSSESSIVE
+PRONOUN GRAMMAR-POSSESSIVE
+ADJECTIVE-POSSESSIVE

POSSESSIVE-CASE activates IC linguistic core analysis attractors.

PRONOUN GENDER FLAGS

PRONOUN-MASCULINE

Set on pronouns that take male referents. For example: he, him, his, I, me, you, himself, them.

PRONOUN-MASCULINE activates IC linguistic core analysis attractors.

PRONOUN-FEMININE

Set on pronouns that take female referents. For example: her, I, me, ourselves, them, herself, she.

PRONOUN-FEMININE activates IC linguistic core analysis attractors.

PRONOUN-NEUTER

Set on pronouns that take neutral referents. Set on words such as:

it, itself, its, they, them, themselves and which.

PRONOUN-NEUTER activates IC linguistic core analysis attractors.

PRONOUN-PERSON

PRONOUN-PERSON is only set on PRONOUNS that can refer to human referents.

If a PRONOUN can refer to human or non human referents set both the PRONOUN-PERSON and the PRONOUN NON-PERSON gender flags.

Words that are both +PRONOUN-PERSON and +PRONOUN NON-PERSON are:

it, them, and they.

PRONOUN-PERSON activates IC linguistic core analysis attractors.

PRONOUN-PERSON is used by PowerEdit Index.

PRONOUN NON-PERSON

PRONOUN NON-PERSON is set on PRONOUNS that may refer to non-human referents. For example:

it, them, they.

PRONOUN NON-PERSON activates IC linguistic core analysis attractors.

PRONOUN GRAMMAR GENERAL FLAGS

PRONOUN GRAMMAR-POSSESSIVE

PRONOUN GRAMMAR-POSSESSIVE identifies the traditional set of possessive pronouns: my, our, your, his, her, its, their, mine, ours, yours, hers and theirs.

Only those possessive pronouns with a nominal function (mine, ours, yours, hers, theirs) or an objective function (her) will have the PRONOUN part of speech flag set on them. The other PRONOUN GRAMMAR-POSSESSIVE possessive pronouns (my, our, your, its, their) will only have the ADJECTIVE part of speech set on them, since they function as determiners and possessive adjectives.

Words that are +PRONOUN GRAMMAR-POSSESSIVE are not used with articles.

\*\* The car is the ours.

The car is ours.

The car is in the mine. (as in coal mine)

Words that are +PRONOUN GRAMMAR-POSSESSIVE cannot be used with possessive apostrophes.

\*\* it's (=it is)

our's (=substandard)

mine's (=coal mine's.)

PRONOUN GRAMMAR-POSSESSIVE is used by PowerEdit Index.

PRONOUN GRAMMAR-POSSESSIVE activates IC linguistic core analaysis attractors.

PRONOUN GRAMMAR-PERSONAL

PRONOUN GRAMMAR-PERSONAL is set on the pronouns traditionally understood as the personal pronouns.

I, we, you, he, she, it, they (+NOMINATIVE-CASE)

me, us, you, him, her, it, them (+OBJECTIVE-CASE)

PRONOUN GRAMMAR-PERSONAL is used by PowerEdit Index.

PRONOUN GRAMMAR-PERSONAL activates IC linguistic core analysis attractors.

PRONOUN GRAMMAR-INTERROGATIVE

PRONOUN GRAMMAR-INTERROGATIVE identifies the class of interogative pronouns. This set of words is almost identical with the set of PRONOUN-RELATIVE-WHEN pronouns. But it allows a different set of attractors to function.

"Which," "what" and "whose" have a strong determiner/adjectival function.

"Which" and "whose" have the ADJECTIVE part of speech set and are heavily adjectival.

"What" has the ADJECTIVE-LIMITING flag set to activate adjective attractors, as well as DETERMINER-CLASS A flag set.

"Who," "whom," "whose," "which" and "what" have a strong nominal function.

PRONOUN GRAMMAR-INTERROGATIVE is a strong flag that influences the core to understand the sentence as a question under certain syntactic circumstances.

PRONOUN GRAMMAR-INTERROGATIVE will activate the interrogative transformations in an interrogative sentence.

Words that are +PRONOUN GRAMMAR-INTERROGATIVE and +PRONOUN RELATIVE WHEN can introduce nominal clauses.

Subject: How the book will sell depends on its author.
Direct Object: I can't imagine what made him do that.
Subject Complement: The problem is not who will go but who will stay.

Appositive: My question, why he did it, has not been answered. Prepositional Complement: No one was consulted on who should win the money.

PRONOUN GRAMMAR-INTERROGATIVE activates IC linguistic core analysis attractors.

PRONOUN GRAMMAR-INTERROGATIVE is not available for use as a crosscutter.

PRONOUN-DEMONSTRATIVE

The PRONOUN-DEMONSTRATIVE flag identifies the class of demonrstative pronouns:

this, that, these and those.

"That" is probably the most complex word in the system. Do not alter its flags.

"This" is a complex word that should not have its flags altered.

PRONOUN-DEMONSTRATIVE activates IC linguistic core analysis attractors.

PRONOUN-DEMONSTRATIVE is not available for use as a crosscutter.

PRONOUN-INTENSIVE

The PRONOUN-INTENSIVE flag allows a PRONOUN-REFLEXIVE to occur in apposition and widens the syntactic position horizons of a reflexive pronoun.

Presently, PRONOUN-INTENSIVE is only set on the word "itself."

PRONOUN-INTENSIVE activates IC linguistic core analysis attractors.

PRONOUN-REFLEXIVE

The PRONOUN-REFLEXIVE flag identifies the traditional class of reflexive pronouns: myself, ourselves, yourself, yourselves, himsself, herself, itself, and themselves.

The PRONOUN-REFLEXIVE flag also is a special function syntactic flag that indicates that a post-posed PRONOUN can occur after a noun.

This special syntactic function is used on "there," which has the +ADVERB INTENSIFIER set on it. +ADVERB INTENSIFIER prevents "there" from occuring directly in front of a VERB. The PRONOUN-REFLEXIVE flag was added to "there" and allows "there" to function correctly when it occurs after a NOUN and directly before a VERB.

PRONOUN-REFLEXIVE supercedes the ADVERB INTENSIFIER flag for PowerEdit.

When PRONOUN-REFLEXIVE is set (as a crosscutter) on a VERB it indicates that a reflexive pronoun must be the next word if the word is to be analyzed as a VERB.

I expect them pretty soon. ("Pretty" is analyzed as being +ADVERB)

Griff will parse "pretty" as a VERB only if a word that is +REFLEXIVE PRONOUN occurs immediately after "pretty."

The girls will pretty themselves.

PRONOUN-REFLEXIVE as a crosscutter is set on: pretty, absent, perjure, pride, and ingratiate.

PRONOUN-REFLEXIVE as a crosscutter will affect the IC linguistic core functions and also the PowerEdit messages.

PRONOUN-REFLEXIVE as a crosscutter states that for words that are analyzed as being +VERB and -ADJECTIVE only a PRONOUN-REFLEXIVE can occur in the object position.

PRONOUN-REFLEXIVE is used by PowerEdit Index.

PRONOUN-REFLEXIVE activates IC linguistic core analysis attractors.

PRONOUN-RECIPROCAL

The PRONOUN-RECIPROCAL flag is set on the compound pronouns "each other" and "one another." PRONOUN-RECIPROCAL has the syntactic function of not allowing a word that is +PRONOUN-RECIPROCAL to occur in the subject position.

PRONOUN-RECIPROCAL is used by PowerEdit Index.

PRONOUN-RECIPROCAL activates IC linguistic core analysis attractors.

PRONOUN-RELATIVE THAT

PRONOUN-RELATIVE THAT is an extremely powerful flag that is used extensively by the IC linguistic core analysis.

PRONOUN-RELATIVE THAT is reserved for "that" and words that are phrased with "that."

PRONOUN-RELATIVE THAT is not available for use as a crosscutter.

PRONOUN-RELATIVE WHEN

The PRONOUN-RELATIVE WHEN flag is used to identify the traditional class of relative pronouns for the system. Words that are +PRONOUN-RELATIVE WHEN introduce relative clauses.

PRONOUN-RELATIVE WHEN includes the traditional relative pronouns (who, whom, which, whose, of which, and what) and phrases which can function as a PRONOUN-RELATIVE WHEN word.

Words that are +PRONOUN-RELATIVE WHEN can be postmodified by "else."

PRONOUN-RELATIVE WHEN activates IC linguistic core analysis attractors.

PRONOUN GRAMMAR INDEFINITE FLAGS

The following indefinite pronouns are always singular:

each, every, either, neither, one, another, much, anybody, anything, anyone, any one, everybody, everything, everyone, every one, somebody, something, someone, nobody, nothing, no one.

When "each," "every," "many a," and "many an" precede two or more subjects joined by "and," the verb concord is singular.

Every window, door, and bottle was destroyed.

When "each" follows a plural subject the verb concord is plural.

They each have a secure portfolio.

Indefinite pronouns that have any one of the following flags set

+PRONOUN-ASSERTIVE

+PRONOUN-NON-ASSERTIVE

+PRONOUN-NEGATIVE can be postmodified by adjectives but not premodified by adjectives.

PRONOUN-UNIVERSAL

The PRONOUN-UNIVERSAL flag defines the set of PRONOUNS that describe or affect all the members of the set the pronoun is substituting for.

PRONOUN-UNIVERSAL pronouns are a closed set of the following words:

everyone, everybody, every one, each, everything, and every one.

PRONOUN-UNIVERSAL activates IC linguistic core analysis attractors.

PRONOUN-UNIVERSAL is not available for use as a crosscutter.

PRONOUN GRAMMAR-SINGULAR

The PRONOUN GRAMMAR-SINGULAR flag may only be set on the class of indefinite pronouns which includes words that are:

+PRONOUN-UNIVERSAL

+PRONOUN-ASSERTIVE

+PRONOUN-NON-ASSERTIVE

+PRONOUN-NEGATIVE

The PRONOUN GRAMMAR-SINGULAR flag when it is set on a PRONOUN that is also +NOT ADJECTIVE (which gives the pronoun a nominal only use) effects verb aggreement. If a pronoun is +PRONOUN GRAMMAR- SINGULAR it should also be +PRONOUN-SINGULAR and +COMMON NOUN-SINGULAR.

When the PRONOUN GRAMMAR-SINGULAR flag is set on an indefinite pronoun that also has a determiner classification (such as "each" and "every") the PRONOUN GRAMMAR-SINGULAR flag influences determiner and adjective concord as well as verb concord.

At one time dual pronouns were identified in the system as being flagged as -PRONOUN GRAMMAR-SINGULAR and -PRONOUN GRAMMAR-PLURAL. This technique is no longer valid as the system does not have a need to identify them.

PRONOUN GRAMMAR-SINGULAR activates IC linguistic core analysis attractors.

PRONOUN GRAMMAR-PLURAL

The PRONOUN GRAMMAR-PLURAL flag may only be set on the class of indefinite pronouns which includes words that are:

+PRONOUN-UNIVERSAL

+PRONOUN-ASSERTIVE

+PRONOUN-NON-ASSERTIVE

+PRONOUN-NEGATIVE

The PRONOUN GRAMMAR-PLURAL flag, when it is set on a PRONOUN that is also +NOT ADJECTIVE (which gives the pronoun a nominal only use), only affects verb aggreement. Normally, if a pronoun s +PRONOUN GRAMMAR-PLURAL it should normally also be +PRONOUN-PLURAL and +COMMON NOUN-PLURAL. One notable exception to this rule of thumb is "all.""All" has the following flags set:

+PRONOUN GRAMMAR-PLURAL

+PRONOUN-PLURAL

+COMMON NOUN-PLURAL

+COMMON NOUN-TAKES SINGULAR VERB

+COMMON NOUN-TAKES PLURAL VERB

This flag setting is necessary to be able to process sentences as:

All is well.

All that I own is yours.

When the PRONOUN GRAMMAR-PLURAL flag is set on an indefinite pronoun that also has a determiner classification (such as "all" and "some") the PRONOUN GRAMMAR-PLURAL flag influences determiner and adjective concord as well as verb concord.

The pronouns "few," "many," "others," and "several" are always plural. When they are used as subjects or as adjectives modifying subjects, a plural verb is necessary.

The pronouns "all," "none," "any," "some," "more," and "most can be singular or plural depending on their referent.

All the paper has been cut.

All the papers have been cut.

More than one customer has complained.

More than five customers have complained about the weather.

NOTE: In very formal usage "none" is considered a singular pronoun. For general use "none" is singular or plural depending on the referent.

PRONOUN GRAMMAR-PLURAL activates IC linguistic core analysis attractors.

PRONOUN GRAMMAR-PORTION

PRONOUN GRAMMAR-PORTION is not set on any words in the lexicon.

PRONOUN GRAMMAR-PORTION activates IC linguistic core analysis attractors.

PRONOUN GRAMMAR-PORTION is available for application use.

PRONOUN GRAMMAR-ASSERTIVE

Words that are +PRONOUN GRAMMAR-ASSERTIVE form a closed class. They include:

many, more, moss, much, few, several, enough, one, either, some, somebody, someone, and something.

Words that are +PRONOUN GRAMMER-ASSERTIVE affirm the reality of an utterance.

Assertive: I gave her some books.

Non-assertive I did not give her any books.

Negative: I gave her no books.

PRONOUN GRAMMAR-ASSERTIVE activates IC linguistic core analysis attractors.

PRONOUN-NON-ASSERTIVE

Words that are +PRONOUN-NON-ASSERTIVE form a closed class. They include:

anybody, anyone, either, anything, and any.

"Either" is +PRONOUN-ASSERTIVE and +PRONOUN-NON-ASSERTIVE.

Words that are +PRONOUN GRAMMAR-NON-ASSERTIVE do not affirm the reality of an utterance.

---

(Non-assertive positive question) Did John by any cars?
(Non-assertive negative question) Didn't John by any cars?
(Non-assertive negative) John did not buy any cars.
(Negative) John bought no cars.
(Assertive) John bought some cars.

---

PRONOUN-NON-ASSERTIVE activates IC linguistic core analysis attractors.

PRONOUN-NEGATIVE

Words that are +PRONOUN-NEGATIVE form a closed class. They are:

no one, nobody, neither, none, nothing.

Words that are +PRONOUN-NEGATIVE are equivalent in meaning to "not" followed by a +PRONOUN-NON-ASSERTIVE word.

Kelly never writes any functional programs.

Kelly does not write any functional programs.

I hit no one.

I did not hit anyone.

PRONOUN-NEGATIVE activates IC linguistic core analysis attractors.

PRONOUN-NEGATIVE is not available for use as a crosscutter.

PRONOUN-POSITIVE

PRONOUN-POSITIVE is not set on any words in the lexicon.

PRONOUN-POSITIVE activates IC linguistic core analysis attractors.

PRONOUN-POSITIVE is available for application use.

PRONOUN-CARDINAL

PRONOUN-CARDINAL is a special function flag which is set on "ones" to distinguish it from "another."

PRONOUN-CARDINAL is only set on the word "ones."

PRONOUN-CARDINAL activates IC linguistic core analysis attractors.

PRONOUN-ORDINAL

PRONOUN-ORDINAL is a special function flag which is set to help distinguish "ones" from "another."

PRONOUN-ORDINAL is only set on the word "another."

PRONOUN-ORDINAL activates IC linguistic core analysis attractors.

VERB NUMBER FLAGS
VERB-SINGULAR
The VERB-SINGULAR flag tells the system that a verb takes singular subjects.
The VERB-SINGULAR flag should be set if:
You are setting up the -s form of the verb.
You are setting up the present participle form of the verb.
You are setting up the past participle form of the verb.
You are setting up the past habitual form of the verb.
The VERB-SINGULAR flag should not be set if:
You are setting up a regular verb and entering its base form. The system will set this flag for you when ever the -s form of the verb appears in the text.
VERB-SINGULAR activates IC linguistic core analysis attractors.
VERB-SINGULAR is not available for use as a crosscutter.
VERB-SINGULAR is used by PowerEdit Index.
VERB-PLURAL
A word that is +VERB PLURAL has concord with plural subjects. The +VERB-PLURAL setting tells the system that this word takes plural subjects.
VERB-PLURAL needs to be set on all verb forms that are entered into the lexicon except the -s form. (the third person singular form of the verb)
VERB-PLURAL activates IC linguistic core analysis attractors.
VERB-PLURAL is not available for use as a crosscutter.
VERB-PLURAL is used by PowerEdit Index.
VERB PERSON FLAGS
English does not indicate person distinctions except in the present tense of the verb where the -s form is used to indicate third person singular. Even this distinction is lost in the subjunctive mood. First person, second person, and third person plural all use the same verb form.
The only exception to the lack of person distinction is the verb "Be." "Be" maintains person distinctions (albeit inconsistent ones) in its present and past tense forms.

| | |
|---|---|
| 1st person singular present | "am" |
| 3rd person singular present | "is" |
| 2nd person singular present | "are" |
| 1st person plural present | "are" |
| 2nd person plural present | "are" |
| 3rd person plural present | "are" |
| 1st person singular past | "was" |
| 3rd person singular past | "was" |
| 2nd person singular past | "were" |
| 1st person plural past | "were" |
| 2nd person plural past | "were" |
| 3rd person plural past | "were" |

VERB-PERSON-FIRST
Set this flag on all verbs entered into the system unless the verb is the -s third person singular form of the verb.
VERB-PERSON-FIRST activates IC linguistic core analysis attractors.
VERB-PERSON-FIRST is not available for use as a cross-utter.
VERB-PERSON-SECOND
Set this flag on all verbs entered into the system unless the verb is the -s third person singular form of the verb.
VERB-PERSON-SECOND activates IC linguistic core analysis attractors.
VERB-PERSON-SECOND is not available for use as a crosscutter.
VERB-PERSON-THIRD
Set this flag on all verbs entered up in the lexicon. The exception is the verb (Be) which has a seperate first person singular form.

VERB-PERSON-THIRD activates IC linguistic core analysis attractors.
VERB-PERSON-THIRD is not available for use as a crosscutter.
VERB SYNTAX FLAGS
The VERB SYNTAX FLAGS are special function flags that describe special attributes of selected verbs.
VERB-INDIRECT QUOTE
When VERB-INDIRECT QUOTE is set on a VERB that is +VERB-THAT CLAUSE and +COMMON NOUN-SPEECH ACT it indicates the word can accept a following noun clause if "that" is present.
VERB-INDIRECT QUOTE as a crosscutter impacts the PowerEdit application.
VERB-INDIRECT QUOTE as a crosscutter does impact the IC analysis.
VERB-INDIRECT QUOTE is set on verbs such as "advocate" and "question."
We advocate that you should not plead guilty.
*?* We advocate you should not plead guilty.
We advocate a strong defense.
"Question" does not have the VERB THAT CLAUSE flag set on it. This differentiates it from verbs such as "wrote."
VERB-INDIRECT QUOTE is used by PowerRead to determine if word is being used as a quotative verb or not. A word with the
VERB-INDIRECT QUOTE flag set needs a following "that" to be considered a quotative verb.
John wrote that he would go.
John wrote that he would write a letter to Mary.
(John wrote that) he would write a letter to Mary.
"Wrote" has VERB-INDIRECT QUOTE set on it, has a following "that," and "wrote" is considered to be a guotative verb by PowerRead. "John wrote" will be deleted as part of the reduction process.
John wrote he would go.
John wrote a letter to Mary.
"Wrote" does not have a following "that" and is not considered to be a quotative verb in this instance. "John wrote" is not deleted as part of the reduction process.
Quotative verbs are verbs that primarily function to introduce a quotation or close a quotation. Words that have VERB-INDIRECT QUOTE set for quotative verb determination include:
write, writes, writting, wrote, written, represent, answer.
VERB-INDIRECT QUOTE activates it linguistic core analysis attractors.
VERB-THAT CLAUSE
VERB-THAT CLAUSE is now used to allow or handle "that clauses" behind VERBS, ADVERBS (example seldom) and also is used in conjunction with the ADJECTIVE-THAT CLAUSE flag to designate adjectives that can take a following "that clause."
VERB-THAT CLAUSE can be set on a noun that can take a postmodifying "that clause."
It was my recommendation that the experiment be moved.
It was my considered opinion that if the man bit the dog, the dog would die.
The VERB-THAT CLAUSE flag allows a noun clause to follow the verb instead of an object. It will do this even if the "that" is elipted.
The VERB-THAT CLAUSE flag will change an adjective clause into a noun clause when set on a COMMON NOUN.
"But he said there isn't any evidence that the PCBs have infiltrated water supplies or caused any harm.

When "evidence" does not have the VERB-THAT CLAUSE flag set the clause (that the PCBs have infiltrated water supplies) is analyzed as an Adjective Clause by Griff. The adjective clause analysis impacts PowerRead's topic assignment ability.

When "evidence has the VERB-THAT CLAUSE flag set, "that the PCBs have infiltrated water" is analyzed as a Noun Clause by Griff.

Approximately 800 words have VERB-THAT CLAUSE set. Note that the words will be verbs, adjectives, adverbs, and common nouns.

Examples of words that are +VERB-THAT CLAUSE are:

Verbs: declare, see, consider.

Adverbs: likely, unlikely

Adjectives: clear, obvious, evident, certain.

Common nouns: opinion, recommendation.

If an ADJECTIVE is +ADJECTIVE-THAT CLAUSE it needs to be +VERB-THAT CLAUSE as well. When the ADJECTIVE is also a VERB that cannot be +VERB-THAT CLAUSE, the VERB-THAT CLAUSE flag should not be set.

A VERB can be an intransitive only verb (such as "agree") and still have the VERB-THAT CLAUSE flag set.

Test Sentences that determined the above conclusion.

1. We can agree that the contract is a bust.
2. I utterly agree with you.
3. We can agree about that.
4. We can agree on that.
5. We can agree the man.
6. We agree that the man was a doctor.
7. We agree that the man.
8. We have nothing to agree about.
9. I agree you should go back to France.
10. We can agree the man is a doctor.
11. He said I agree you should do that.

Verbs of argumentation and persuasion, are VERB-THAT CLAUSE verbs in the -ed form, even if they are not +VERB-THAT CLAUSE verbs in their base form. "Persuade" is –VERB-THAT CLAUSE. "Persuaded" is +VERB-THAT CLAUSE, but only when it is used in the passive.

We need a flag or a program method to indicate or capture this distinction. Presently we let bad sentences go by.

**I persuade the man is a doctor.

I am persuaded (that) the man is a doctor.

**I satisfied the man is a doctor.

I am satisfied that the man is a doctor.

I am convinced that the man is a doctor.

I am convinced the man is an ass.

"That-clauses" may have three kinds of verb phrases.

1. Indicative: I said that he is tall.
2. Modal: I said that he could come.
3. Subjunctive: I demand that she come here.

The VERB-THAT CLAUSE flag is one that can change the anaysis and assignment of parts of speech in subtle far-reaching ways.

Mr. Deneson pleaded guilty to embezzling $300,000 from a Mississippi bank and to tax evasion, acts committed before he went to work for Mr. War.

When "pleaded" does not have the VERB-THAT CLAUSE flag set, Griff calls "pleaded" an ADJECTIVE part of speech that is a P1 type participle which introduces the adjective clause "pleaded guilty to embezzling $300,000 from a Mississipe bank and to tax evasion." "Guilty" is analyzed as a NOUN by Griff.

When "pleaded" does have the VERB-THAT CLAUSE flag set, (its proper setting) Griff analyzes "pleaded" as a past habitual verb, and "guilty" as an adjective. The adjective clause disappears.

VERB-THAT CLAUSE activates IC linguistic core analysis attractors.

VERB-INFINITIVE SIGN

The main function of VERB-INFINITIVE SIGN is to identify "to" as the marker of the infinitive. Griff needs this flag to form infinitives.

"To" should rarely be phrased either with the underscore phrase (only to) or with the % technique. But when it is phrased, if the phrased word can function as a +VERB-INFINITIVE SIGN word (the phrase can be followed by an infinitive verb (base form) then the VERB-INFINITIVE SIGN has to be set on the phrase. "Only to" is +VERB-INFINITIVE SIGN.

VERB-INFINITIVE SIGN is not available for use as a crosscutter.

VERB-INFINITIVE SIGN activates IC linguistic core analysis attractors.

VERB-INFINITIVE MARKER

VERB-INFINITIVE MARKER influences the attractors to expect an unmarked infinitive to follow. It is set on verbs of perception that attract unmarked infinitives. VERB-INFINITIVE MARKER prevents words that are +VERB and +COMMON NOUN from being misanalysed.

Words that are +VERB-INFINITIVE MARKER include:

hear, see, watch, help, let, make, have, and listen.

I heard the man yell (unmaked infinitive) at his cow.

I saw the man play (unmarked infinitive) the ball.

I made the man run (unmarked infinitive) down the hall.

Verbs that are +VERB-INFINITIVE MARKER are often also +VERB-THAT CLAUSE.

There is only one verb in English in the passive that has a bare infinitive, "let." This occurs because "let" is an irregular verb that has the same base form as its passive particple form.

"The grass was let grow."

"The apartment was let (=rented) by my mother."

VERB-INFINITIVE MARKER is not available for use as a crosscutter.

VERB-INFINITIVE MARKER activates IC linguistic core analysis attractors.

VERB-PASSIVE BLOCK

VERB-PASSIVE BLOCK is a special syntactic flag which adds weight to the adjective attractor when a word is a possible past participle.

VERB-PASSIVE BLOCK will change the analysis of a word from a +VERB past participle to a +ADJECTIVE.

VERB-PASSIVE BLOCK will also stop the PowerEdit "PASSIVE SENTENCE" message from firing.

Words that are +VERB-PASSIVE BLOCK in the lexicon include:

canvas, feign, overdone, learnt, undergone, escape, stricken, gall, behave, wet, actual, undergo, unbound, stunk, cattle, according, outdone, Compassion, learned, rumored, go, overlearnt, bound and determined, went, tired, habituate, drunk, bound, rapt, overlearned, shrunken, outgrown, gone, and sunken.

Originally Griff would copy and set the VERB-PASSIVE BLOCK flag when it was set on the root word of a regular verb. This caused analysis problems.

He is behaving. Where "behaving" is analyzed as +COMMON NOUN and is not part of the verb phrase. There were two possible two solutions.
1. Set up "behaving" on file (and also all the -ing participle forms of verbs that are +VERB-PASSIVE BLOCK and remove the VERB-PASSIVE BLOCK flag from them.
2. Change the core so that it will not set the VERB-PASSIVE BLOCK flag on a present participle when it inflects from the root.

The second option was chosen. Now, Griff will not copy and set the VERB-PASSIVE BLOCK flag on -ing participles.

PASSIVE-BLOCK activates IC linguistic core analysis attractors.

VERB-OBLIGATORY ADVERB

VERB-OBLIGATORY ADVERB influences the core to (if possible) force an adverbial into the predicate. Adverbial means all adverbial constructions. It is set on verbs which frequently require a postmodifying adverbial. The requirement is a combination of syntax and clarity of meaning. A +VERB-OBLIGATORY ADVERB can be downgraded to +VERB-OPTIONAL ADVERB setting (if necessary).

Words that are +VERB-OBLIGATORY ADVERB in the lexicon include:

plunge, instill, leaping, leapt, digrss, lope, secede, galavant, experiments; preside; perch; pine; lords, experiment, put, dwells, lie, pore, leer, speculate, traipse, clinging, pulse, abscond, deprecate, quake, demurred, ramble, defect, flitter, differ, setting, glitter, delineate, glower, peer, housesit, roost, proceed, dwelled, crept, sit down, knocking,amble, placed, campaign, revert, prey, lorded, set, bask, caper, gawk, cosy, cling, revolve, scrummage, feud, sortie, haw, prolapse, gaze, creeping, coping, clerk, prevail, jaunt, abstain, gapes, glister, knock, thirst, lunging, circumrotate, ricochet, hark, glory, knocks, succumb, laze, meander, micturate, bounding, lust, leans, hobnob, flounder, leaning, leant, dwell, cozies, dog-leg, alibi, slalom, chow, hightail, ranch, collide, gape, creep, troupe, stooge, flop, blurt, glide, compete, fuss, creeps, appertain, delve, evanesce, snipe, thrived, barnstorm, sits, lounge, misbelieve, consist, sat, scutter, leap, backslide, intervene, lunge, flounce, transmigrate, seep, bounds, collude, crawl, wail, surprint, places, sojourn, depend, migrate, emerge, plummet, divagate, dodder, luxuriate, cooped, lodge, puts, gab,gallivant, imprecate, alight, loom, eventuate, dowse, breeze, intergrade, adhere, freewheel, weaved, hanging, dawn;hunger, shy, pettifog, intermediate, glissade, major, yank, fawn, backpedal, reminisce, crap, lording, dilly-dally, recoil, grovel, complies, complied, shied, natter, bivouac, gambol, prosper, triumph, hung, hover, lying, redound, grouch, malinger, scrimmage, advert, discourse, copes, scurry, demur, laying, fustigate, disaffirm, kibitz, comply, dwelt, demurs, uprose, trek, embark, gaping, sitting, lays, dote, venture, quail, goose-step, immerge, live, lean, overpraise, shies, outcrop, dwelling, shinny, cope, picnic, objurgate, place, leaned, tower, grouse, cruise, emigrate, clings, slump, hunker, transude, putting, sit, speculated, waddle, jut, trudge, struggle, desist, gravitate, complying, prostrate, reoccur, stray, glimmer, intenerate, leaps, conflict.

John is knocking on the door.

He set the book. (strong attractor for adverbial)

He set the book on the table.

I have a conflict. (weaker attractor for adverbial)

I have a confilct with him.

He introspected about the problem. (Very strong attractor for adverbial)

He introspected.

VERB-OBLIGATORY ADVERB and VERB-OPTIONAL ADVERB are useful flags to set on verbs that commonly occur with prepositional adverbs, but because they are also +COMMON NOUN cannot be phrased. For example:

"Conflict" is +COMMON NOUN and +VERB.

They conflict. (with what?)

They conflict with the color scheme.

But "conflict" cannot be phrased because of the logic break problem in some sentences. I have a conflict with him.

VERB-OBLIGATORY ADVERB should be considered for verbs which are also can be used intensively.

He lives. (=He is alive.) An adverbial is not required.

He lives. (=place of abode) An adverbial may be required.

He lives in France.

He lives. (=time when) An adverbial may be required.

He lives in the seventh century.

Words that are intransitive only verbs and often have a PREPOSITION or an ADVERB directly following are prime canditates for this flag.

He was griping.

He was griping at me.

They seceded.

They seceded from the union.

Verbs of movement could also well be flagged as +VERB-OBLIGTORY ADVERB or +VERB OPTIONAL ADVERB. Which of the two flags to use is a judgement call since verbs of movement have an inherent source, path, or goal of varying degrees of strength.

Verbs of location ("put" and "set") may need to be flagged as +VERB-OBLIGATORY ADVERB or +VERB-OPTIONAL ADVERB.

\*\*He put the book.

He put the book on the table.

\*\*He set the ball.

He set the ball on the tee.

Verbs that are intransitive and reflect human social processes often need a goal present to feel complete.

I speculated.

I speculated that the market would fall. "That clauses" can count as an adverbial on verbs that are +VERB-THAT CLAUSE.)

I speculated in pork bellies.

She minored.

She minored in philosophy.

VERB-OBLIGATORY ADVERB is used by PowerEdit and PowerRead to identify certain types of ditransitive and/or complex-transitive verbs.

There are three classes of di-transitive verbs for the purposes of the PowerEdit "MISSING OBJECT" messages.

Class I. is for verbs like "give." (so far the only member of this class) Class 1 verbs need a direct object and an indirect object to fulfill the requirements of the PowerEdit message. Direct object alone or indirect object alone will not bypass the message.

\*\* I gave the book.

\*\* I gave her.

I gave her the book.
\*\*I gave the book at the office.
A Class I verb is identified by the following flags:
+VERB-PRIME
+VERB-MOVEMENT
+VERB-POSSESSION ("Give" and its inflections are only words in the lexicon with two verb semantic flags set. If more verbs need to be added to this Class I, then these two verb flags should be used to specify the added Class I verbs.

The prepositions "to," "for," and "of" can indicate the presense of an indirect object.

I gave the book to John.
I made a fool of John
I made the car for Joh.
For Class I verbs, only "to" counts as the marker of the indirect object.
\*\*I gave the book of John.
\*\* I gave the book for John.
I gave the book to John.
Class 2 describes verbs such as:
buy, make, show, feed, take, tell, get, and ask.
Class 2 verbs can satisify the requirements of PowerEdit message requirements with:
a direct object and an adverbial.
a direct object and an indirect object.
but not with an adverbial alone.
\*\* I made in the morning.
I told a lie yesterday.
I told John a lie.
\*\*I told yesterday.
I told a lie to you.
I told a lie.
Class 2 verbs are identified by the absence of the following flags:
−VERB-OPTIONAL ADVERB
−VERB-OBLIGATORY ADVERB
Class 3 ditransitive/complex-transitive verbs satisfy the requirements of the PowerEdit "MISSING OBJECT" and "DITRANSITIVE VERB" messages with:
a direct object and an indirect object.
a direct object and an adverbial.
an adverbial only.
I left John a book.
I left John in the afternoon.
I left in the afternoon.
\*\* I left John. (for whom? where?,when?)
\*\* I left a book. (to whom? where? when?)
Class 3 verbs are those such as:
leave, win, play, read, sing, call, and write.
Class 3 verbs can be +VERB-DI-TRANSITIVE and/or +VERB COMPLEX-TRANSITIVE.
Class 3 verbs also are +VERB-OPTIONAL ADVERB or +VERB-OBLIGATORY AVERB.
The test sentences for determining a Class 2 verb from a Class 3 verb are:
\*\*I was feeding yesterday. (Needs a DO, so "feed" is Class
I was feeding her yesterday.
I was leaving yesterday. ("Leave" is a Class 3.)
In a di-transitive verb phrase, if an indirect object is present, a direct object must also be present. The indirect object may be represented by a prepositional phrase.

He gave the ball (DO) to Mary (IO).
He gave the ball(DO) away (Adv.)
\*\*He gave to Mary.
He gave Mary (LO) the ball (DO).
VERB-OBLIGATORY ADVERB activates IC linguistic core analysis attractors.
VERB-OPTIONAL ADVERB
VERB-OPTIONAL ADVERB influences the core to (if possible) force an adverbial into the predicate. Adverbial means all adverbial constructions. It is set on verbs which frequently require a postmodifying adverbial. The requirement is a combination of syntax and clarity of meaning. A +VERB-OPTIONAL ADVERB can be upgraded to +VERB-OBLIGATORY ADVERB setting (if necessary).

Some words that have the +VERB-OPTIONAL ADVERB flag set are "want." "knock," and "intercede."
I want you.
I want you to come with me.
I want you for canon fodder.
I knocked.
I knocked loudly.
I knocked on the door.
I interceded.
I interceded on his behalf.
VERB-OPTIONAL ADVERB is used by PowerEdit to distinguish Class 2 ditransitive and/or complex transitive verbs from Class 3 di-transitive and/or complextrans verbs.

VERB-OPTIONAL ADVERB is used by PowerRead to distinguish verbs that require an infinitive clause to complete the idea inherent in the verb (to do what to whom) when an indirect object is present.

He enabled me to write the book.
\*He enabled me. (to write the book)
She endeared me to her mother.
\*She endeared me. (to her mother)
VERB-OPTIONAL ADVERB should be set on verbs that begin with the prefix "en/em" when the prefix indicates the meaning of "to cause to be" or "to cause to have."
He empowered me (to do what).
He entangled me (in what).
VERB-OPTIONAL ADVERB activates IC linguistic core analysis attractors.
VERB MOOD FLAGS
VERB-INDICATIVE
VERB-INDICATIVE is set on all verbs and on all verb forms.
The base form of all regular and irregular verbs needs:
+VERB-INDICATIVE
+VERB-SUBJUNCTIVE
+VERB-IMPERATIVE
set in order to function properly. Griff knows when a VERB is being used indicatively, subjunctively or as an imperative.

When all other forms of a VERB are being set up in the lexicon the
VERB MOOD FLAG setting should be:
+VERB-INDICATIVE
−VERB-SUBJUNCTIVE
−VERB-IMPERATIVE
VERB-INDICATIVE is not available for use as a cross-cutter.
VERB-INDICATIVE activates IC linguistic core analysis attractors.

VERB-SUBJUNCTIVE

The subjunctive mood is used to indicate; wishes, conditions (hypothetical), contrary-to-fact (concession), verbs that are nested in that clauses and used idomatically.

I demand that she come (subjunctive) home.

The VERB-SUBJUNCTIVE flag should be set on the base form of all verbs that you set up in the lexicon, since the present subjunctive and the base form of the word are the same. Griff will test the verb to decide which mood applies to the verb in its structural description.

The VERB-SUBJUNCTIVE needs to be set on idiomatic expressions such as: God save the King.

The VERB-SUBJUNCTIVE flag should not be set on the -s form; the-ing participle and the -ed form of the verb.

The subjunctive mood is used in "that clauses" after words of that are +COMMON NOUN-SPEECH ACT (words such as: ask, suggest, require, reccomemd, and demand.

I wish that this documentation project were over.

I wish that this documentation project was over.

John recommended that Kelly be given some help.

**I demand that she comes home. I demand that she come home.

VERB-SUBJUNCTIVE is not available for crosscutter use.

VERB-SUBJUNCTIVE activates IC linguistic core analysis attractors.

VERB-IMPERATIVE

VERB-IMPERATIVE flag identifies the base form of the verb. The base form can function as:

1. The present tense of the verb for all but 3p singular which requires the -s form of the verb.
2. The imperative.
3. The present subjunctive.
4. The unmarked infinitive. ("to" not present)
5. The marked infinitive. ("to" present)

VERB-IMPERATIVE must be set on the base form of all verbs that are set up in the lexicon.

Do not set VERB-IMPERATIVE on the -s form, the -ing participle form, or the -ed form of the verb.

The imperative use of the base form is distinguished by:

(The following is heavily based on GCE p.402–406)

1. The base form without the subject occuring sentence initial.

Quiet down there! Be quiet.

2. Imperatives have no tense distinction and do not occur in the perfect aspect. They can rarely occur in the progressive.

*?* Be preparing youself for a good argument. This is probalby best understood as an elipted "You had better be preparing yourself for a good argument."

3. Modal auxiliaries do not occur with imperatives.
4. Imperatives can accept the subject you.

You be quiet now!

5. Imperatives can accept assertive pronouns as subjects.

*?*Somebody open the door.

Everybody shut their eyes. (This sentence is a bad example as "shut" is an irregular verb could be an imperative verb or it could be the past habitial use) Griff will read this particular "shut" as past habitual.

Street directions can also cause Griff problems.

You go left on third street. (A possible ambiguity exists.)

You, go left on third street.

Hey You! Go left on third street.

6. First person imperatives are formed periphrastically with "let" with the subject in the objective case. This is the nortatory subjunctive.

Let us go harass a couple of programmers.

Let's go harass a couple of linguists.

Let them go take a flying leap.

Third person imperatives are formed peraphrastially with "let."

Let each person decide for herself.

Let her speak now.

7. Negative commands are formed peraphrastically with do+negative.

Do not walk on the grass.

Don't play with matches.

Negative commands with "let" insert the negative marker after the objective case pronoun.

Let him not go take a flying leap.

Negative commands are literary and often used in philosphic argumentation.

Let the X not be Y, if the Z is sacrificed in the light of the full moon.

8. Polite imperatives are formed peraphrastically by "Do+have" or "do+let's" (=let us).

Oh, do have some more wine.

Do let us go to the pub. (British)

VERB-IMPERATIVE is used by PowerEdit as a crosscutter. When VERB-IMPERATIVE is set on an ADVERB it blocks the PowerEdit "ATTITUDE-SENTENCE MISMATCH" message.

VERB-IMPERATIVE activates IC linguistic core analysis attractors.

GENERAL VERB CLASS FLAGS

VERB-REGULAR

Regular verbs have predictable forms. Given the base form of the verb, the other inflected forms of the verb can be derived from it.

Regular verbs have four forms:

Base
    present tense form of all but the 3rd person singular
    the imperative
    the subjunctive
    the unmarked infinitive
-ing participle
    the present progressive ("be" + V-ing)
    non-finite -ing clauses
-s form
    the 3rd person singular present tense form
-ed form
    past tense
    past participle
        perfective aspect ("have" + past participle)
        passive voice ("be" + past participle)

To set up a VERB-REGULAR the following flags must be set:

VERB
VERB-PERSON-FIRST
VERB-PERSON-SECOND
VERB-PERSON-THIRD
VERB-PLURAL
VERB-PRESENT HABITUAL
The appropriate transitivity flags.
VERB-COMPLEX TRANSITIVE
VERB-DI-TRANSITIVE

VERB-IN-TRANSITIVE

VERB-MONO-TRANSITIVE

The appropriate VERB SEMANTIC FLAGS

Set VERB-PROCESS if VERB-IN-TRANSITIVE was set

Set VERB-ACTION if VERB-MONO-TRANSITIVE was set

The appropriate exclusive VERB SEMANTIC FLAGS. (Only one of these flags should be set.)

VERB-PERSONAL KNOWLDEGE

VERB-PERCEPTION

VERB-PHYSICAL

VERB-MEASURE

VERB-LOCATION

VERB-MOVEMENT

VERB-POSSESSION

VERB-HUMAN ONLY

VERB-BODY SENSATION

VERB-EMOTION/ATTITUDE

VERB-FACTUAL KNOWLEDGE

The other VERB SEMANTIC FLAGS have special uses and are restriced to a small closed set of verbs and do not need to be set in the normal course of events on a VERB-REGULAR.

VERB-INTENSIVE and VERB-STATIVE also are restricted to a small close set of verbs and do not usually need to be set.

VERB-REGULAR activates IC linguistic core analysis attractors.

VERB-IRREGULAR

Irregular verbs are not predictible in their derivation. Usually the -s forms and the -ing participle form are predictable.

There are approx 1700 irregular principal parts of irregular verbs in the system.

All necessary forms of the VERB-IRREGULAR verb must be set up. All allowable inflecions of the VERB-IRREGULAR verb must be set on the INFLECTION SCREEN on the base form of the +VERB-IRREGULAR verb. For example:

"Spit" has the principle part inflections of "spits" "spat", and "spitting". On the INFLECTION SCREEN they are listed as follows: (the order of the principle parts is not important)

spits spat spitting

Note that "spit" is really two verbs. The VERB-REGULAR spit (to impale) and "spit" (to expectorate).

"Spitted" must be set up seperately as a VERB-REGULAR. "Spitted is not placed in the INFLECTION SCREEN of "spit." If you copy "spitted" from "spat" be sure to remove the NON-STANDARD flag from "spitted" and to change the +VERB-IRREGULAR flag to +VERB-REGULAR.

On all the inflected forms of a +VERB-IRREGULAR verb you must enter the root word in the ROOT SCREEN. Use "r" followed by V-base. For example:

The VERB-IRREGULAR "spitting" has "r spit" in its ROOT SCREEN.

The VERB-IRREGULAR "spits" has "r spit" in its ROOT SCREEN.

The VERB-IRREGULAR "spat" has "r spat" in its ROOT SCREEN.

When setting up underscore phrasal verbs that are based off of the root of an irregular verb, it is not necessary to set up the word as an irregular verb as far as the INFLECTION SCREEN and ROOT SCREEN are concerned.

"Had" does not have the VERB-PAST-PARTICIPLE flag set. "Had" can be used as a past participle.

I was had by the company.

but it causes too many analysis problems for Griff to justify the slangy past participle use. As a general rule, flags are not set to allow for "slang" or "informal" uses of functions words that cause unnecessary complexity and analysis problems for the correct use.

VERB-IRREGULAR activates IC linguistic core analysis attractors.

VERB-DENOMINAL

The VERB-DENOMINAL flag is used to track VERBS that are derived from a noun root by adding a verbal suffix.

Words that end with -ify need to have all of their principal parts in the lexicon. If not on file they cause problems with the preparse suffix stripping routines.

The suffixes used to convert nouns to verbs are:

| | |
|---|---|
| -ate | (orchestra/orchestrate, cholorine/chlorinate) |
| -en | (sad/sadden, glad/gladden) |
| -ify | (simple/simplify, code/codify) |
| -ize | (personal/personalize, computer/computerize) |

Presently, VERB-DENOMINAL is not being used by the IC linguistic core anslysis attractors.

Presently, VERB-DENOMINAL is not being used by any application.

Presently, VERB-DENOMINAL is set on verbs.

PRO VERB

The PRO VERB flag is used to identify "do" and all of its principle part inflections for PowerRead.

PRO VERB is presently set on:

do, do not, does, does not, doing, did, did not, done, don't, and doesn't.

PRO VERB is not being used by the IC linguistic core analysis attractors.

VERB-PRIME

VERB-PRIME verbs:

1. Occur with the highest frequency in the language.
2. Are the most productive for making phrasal verbs.
3. Are the most productive for making idiomatic use of verb noun combinations.

She "goes bananas" when you do that upside-down.

Verbs that are +VERB-PRIME comprise a closed set:

be, bring, come, do, get, give, go, make, put, take

Phrased forms with "not" (are not) are not flagged as +VEVB-PRIME.

Phrased forms of prime verbs (kept sight of) are not flagged as +VERB-PRIME. But their prime base can be recovered since the phrase "kept sight of" is in the PHRASE SCREEN of "kept".

VERB-PRIME is mainly used to identify words for PowerEdit.

VERB-PRIME is used by PowerEdit Index.

VERB-PRIME does not independently activate IC linguistic core analysis attractors.

VERB-INTERROGATIVE

VERB-INTERROGATIVE is available for application use.

There are no words that are +VERB-INTERROGATIVE in the lexicon.

VERB-INTERROGATIVE does not activate any IC linguistic core analysis attractors.

VERB-NEGATIVE

The VERB-NEGATIVE flag is set on verbs that have a negative meaning. (such as "refuse" "not accept")

Verbs that have a negative prefix (such as dis- or de-) have a positive form to be considered +VERB-NEGATIVE.

disobey/obey

** debate/bate

A VERB must have a negative meaning to be considered as +VERB-NEGATIVE.

disobey=not obey

"disconnect" does not equal "not connect"

Verbs that are +VERB-NEGATIVE in the lexicon include:

deject, preclude, prohibit, dissent, am not, shan't, unimpress, misunderstand, avoid, won't, could not, forgottn, used not to, may not, does not accept, has not, will not be, forgetting, ought not, can not, disagree, will not, did not remember, unchanged, ejects, reject, mistreat, misunderstands, fail, can't, failed, hasnt, is not, couldn't, mayn't, misunderstod, exclude, hasn't, are not,forget, forgets, was not, had not, negatep, malfunction, unarmed, would not, hadn't ought, invalidate, forgot, usedn't, do not, unbent, did not accept, contradict, deny, aren't, mightn't, havn't, daren't, prevent, hadn't, misrepresent, wasn't, weren't, misconcieve, shouldn't, isn't, lack, cannot help but, dare not, wouldn't, misapprehend, have not, misunderstanding, usedn't to, were not, must not, dissatisfied, unbends, unbend, cannot, should not, misfile, oughtn't, neglect, do not accept, disserve, doesn't, fails, failing, did not, denies, don't, ought not to, oughtn't to, does not remember, needn't, does not, shall not, refuse, doubt, do not remember, unbending, need not, didn't, unfit, had not been, might not, rejected.

The auxiliary verbs all have the negative form phrased:

is not, are not, have not, should not, did not (and the rest of their principle parts)

There are essentially two classes of negation, which reflect the strength of the focus of the negation, and what kind of words (especially subject adverbs) that the negative verb can occur with.

The heavy negative verb phrase is an auxiliary verb phrased with not.

have not (aspectual perfective)

do not (periphrastic)

is not (primary passive)

should not (modals)

The lighter class of negative verbs are the lexical verbs with

1. A negative meaning. doubt (=do not believe)
2. A negative prefix. disobey. (=do not obey) The single compressed verb form (disobey) is less powerful as a negative than the periphrastic (do not obey form.)

VERB-NEGATIVE does not independently activate IC linguistic core analysis attractors.

VERB PAST TENSE FLAGS

VERB-TENSE-REPORTED

VERB-TENSE-REPORTED is only used as a crosscutter that is set on +ACJUNCT-TIME WHEN words that can co-occur with the past perfect tense.

VERB-TENSE-REPORTED can be set on a verb to turn off the PowerEdit "TIME CLASH" message.

VERB-TENSE-REPORTED does not activate any of the IC linguistic core analysis attractors. It only is used by the PowerEdit application.

VERB-TENSE-ATTITUDINAL

VERB-TENSE-ATTITUDINAL is available for application use.

VERB-TENSE-ATTITUDINAL is not set on any word in the lexicon.

VERB-TENSE-ATTITUDINAL does not activate any of the IC linguistic core analysis attractors.

VERB-TENSE-ATTITUDINAL is ready for a new use.

VERB-TENSE-HYPOTHETICAL

VERB-TENSE-HYPOTHETICAL is available for application use.

VERB-TENSE-HYPOTHETICAL does not activate any of the IC linguistic core analysis attractors.

VERB-TENSE-HYPOTHETICAL is ready for a new use.

VERB-PAST HABITUAL

The VERB-PAST HABITUAL flag refers to simple past tense.

VERB-PAST HABITUAL should not be set on the base form of a regular verb when it is entered into the lexicon. Griff will set this flag for you when the -ed form is used in a text.

VERB-PAST-HABITUAL is set on ADJUNCT-TIME WHEN adverbs to indicate that the ADVERB can be used with the simple past tense.

VERB-PAST-HABITUAL activates IC linguistic core analysis attractors.

VERB-PAST-PARTICIPLE

VERB-PAST-PARTICIPLE allows a VERB to function as a past participle.

VERB-PAST-PARTICPLE is a strong flag that activates many IC core analysis attractors.

VERB-PAST-PARTICIPLE is not available for use as a crosscutter.

VERB-PRESENT TENSE FLAGS

VERB-UNIVERSAL TIME

VERB-UNIVRSAL TIME is available for application use.

VERB-UNIVERSAL TIME does not activate any IC linguistic core analysis attractors.

VERB-UNIVERSAL TIME is not being used by any application.

VERB-UNIVERSAL TIME is not set on any word in the lexicon.

VERB-UNIVERSAL TIME is ready for a new use.

VERB-PRESENT HABITUAL

The VERB-PRESENT HABITUAL flag refers to the simple present tense.

VERB-PRESENT HABITUAL needs to be set on the base form of a regular verb when it is set up in the lexicon.

VERB-PRESENT HABITUAL activates IC linguistic core analysis attractors.

VERB-PRESENT HABITUAL is used as a crosscutter by PowerEdit to identify ADJUNCT-TIME WHEN adverbs that can co-occur with the simple present tense.

VERB-FUTURE TIME

VERB-FUTURE TIME is not set on lexical verbs.

VERB-FUTURE TIME is used as a crosscutter by PowerEdit to identify ADJUNCT-TIME WHEN adverbs that can co-occur with the future tense.

English does not have a tense marker for the future tense. Future time is indicated by a modal auxiliaries, simple present tense, or a progressive form.

VERB-FUTURE TIME does not independently activate IC linguistic core analysis attractors.

VERB-HISTORIC PRESENT

The VERB-HISTORIC PRESENT flag is not set on lexical verbs.

VERB-HISTORIC PRESENT is used as a crosscutter by PowerEdit and is set on ADJUNCT-TIME WHEN adverbs that can co-occur with the present perfect tense.

VERB-HISTORIC PRESENT does not independently activate any IC linguistic core attractors.

VERB-INSTANT

VERB-INSTANT is available for application use.

VERB-INSTANT does not activate any IC linguistic core attractors.

VERB-INSTANT is not being used by PowerEdit or any other ALI application.

VERB-INSTANT is ready for a new use after a DB lexicon clean.

VERB-INSTANTANEOUS

VERB-INSTANTANEOUS is available for application use.

VERB-INSTANTANEOUS does not activate any IC linguistic core attractors.

VERB-INSTANTANEOUS is not being used by PowerEdit or any other ALI application.

VERB-INSTANTANEOUS is ready for a new use.

VERB-INSTANTANEOUS is not set on any word in the lexicon.

VERB-PRESENT PARTICIPLE

The VERB-PRESENT PARTICPLE flag allows a word to function as present participle.

As a general rule, when a word can be an -ing participle and also a COMMON NOUN, (such as "meeting" or "painting") only the VERB part of speech needs to be set. When the VERB-PRESENT PARTICPLE flag is set on VERB, Griff has the ability to recognize and distinguish between the verbal and nominal use of the word.

The word does need to have its plural form ("meetings" and "paintings") entered into the lexicon as a COMMON NOUN.

Most present participles that are used as nouns are +COMMON NOUN MASS only. A word such as "meeting" would have to have the COMMON NOUN-COUNT flag set and the COMMON NOUN-MASS flag removed.

Words that are +VERB-PRESENT PARTICIPLE are often used as adjectives. Giff usually will analyze the word correcly. As a general rule, when a word is +VERB-PRESENT PARTICIPLE it does not need the ADJECTIVE part of speech flag set.

It the word is set as +ADVECTIVE +VERB and +VERB-PRESENT PARTICIPLE, this setting will influence Griff to make the word strongly adjectival. When the absolute use of the present participle is used, Griff will call the clause an adjective clause instead of an adverbial one.

VERB-PRESENT PARTICIPLE is one of the strongest flags in the system. VERB-PRESENT PARTICIPLE activates IC linguistic core anslysis attractors.

VERB-PRESENT PARTICIPLE is not available for use as a crosscutter.

VERB MODAL MEANING "ABLE" FLAGS

MODAL-ABILITY

MODAL-ABILITY conveys the idea of empowerment, competency, and proficiency.

MODAL-ABILITY does not activate any IC linguistic core analysis attractors.

MODAL-ABILITY is only used by PowerEdit Index.

MODAL-PAST ABILITY

MODAL-PAST ABILITY conveys of the idea of empowerment, competency, and proficiency. It is used to distinguis "can" (+MODAL ABILITY) from "could." (+MODAL-PAST ABILITY)

MODAL-PAST ABILITY does not activate any IC linguistic core analysis attractors.

MODAL-PAST ABILITY is used by PowerEdit Index.

VERB MODAL MEANING "MAY" FLAGS

MODAL-PERMISSION

MODAL-PERMISSION is used to identify "may" and "might."

MODAL-PERMISSION does not activate any IC linguistic core analysis attractors.

MODAL-PERMISSION is used by PowerEdit Index.

MODAL-PRESENT FUTURE PERMISSION

MODAL-PRESENT FUTURE PERMISSION is available for application use.

MODAL-PRESENT FUTURE PERMISSION is not set on any word.

MODAL-PRESENT FUTURE PERMISSION does not activate any IC linguistic core analysis attractors.

VERB MODAL MEANING TENSE FLAGS

MODAL PREDICTION

MODAL PREDICITON is used to indicate the use of the future tense use of "will."

MODAL PREDICITON does not activate any IC linguistic core analysis attractors.

MODAL PREDICTION is used by PowerEdit Index.

MODAL-ACTIVE PAST

MODAL-ACTIVE PAST is available for application use.

MODAL-ACTIVE PAST does not activate any IC linguistic core analysis attractors.

MODAL-ACTIVE PAST is not set on any word in the lexicon.

MODAL-ACTIVE PAST is used by PowerEdit Index.

VERB MODAL MEANING "CAN" FLAGS

MODAL-PROBABILITY

MODAL-PROBABILITY indicates that an event is probable.

MODAL-PROBABILITY does not independently activate any IC linguistic core analysis attractors.

MODAL-PROBABILITY is used by PowerEdit Index.

MODAL-THEORETICAL

MODAL-THEORETICAL Indicates that an event is theoretically possible, but not probable.

MODAL-THEORETICAL does not independently activate any IC linguistic core analysis attractors.

MODAL-THEORETICAL is used by PowerEdit Index.

MODAL-PRESENT POSSIBILITY

MODAL-PRESENT POSSIBILITY is available for application use.

MODAL-PRESENT POSSIBILITY does not activate any IC linguistic core analysis attractors.

MODAL-PRESENT POSSIBILITY is used by PowerEdit Index.

MODAL-CONTINGENT POSSIBILITY

MODAL-CONTINGENT POSSIBILITY is available for application use.

MODAL-CONTINGENT POSSIBILITY does not activate any IC linguistic core analysis attractors.

MODAL-CONTINGENT POSSIBILITY is used by PowerEdit Index.

MODAL-FACTUAL POSSIBILITY

MODAL-FACTUAL POSSIBILITY Indicates that an event could possibly be true.

MODAL-FACTUAL POSSIBILITY is used by PowerEdit Index.

MODAL-FACTUAL POSSIBILITY is available for application use.

MODAL-FACTUAL POSSIBILITY does not activate any IC linguistic core analysis attractors.

VERB MODAL MEANING "SHOULD" FLAGS

MODAL-PUTATIVE Used to indicate personal reactions to events or things that were or are assumed to have taken place.

MODAL-PUTATIVE is used by PowerEdit Index.

MODAL-PUTATIVE is available for application use.

MODAL-PUTATIVE does not activate any IC linguistic core analysis attractors.

MODAL-CONTINGENT USE

MODAL-CONTINGENT USE is available for application use.

MODAL-CONTINGENT USE does not activate IC linguistic core analysis attractors.

MODAL-CONTINGENT USE is being used by PowerEdit Index.

MODAL-FORMAL REAL CONDITION

MODAL-FORMAL REAL CONDITION is available for application use.

MODAL-FORMAL REAL CONDITION does not activate IC linguistic core analysis attractors.

MODAL-FORMAL REAL CONDITION is being used by PowerEdit Index.

MODAL-POSTULATORY

Indicates the hypothetical/conditional aspect of a modal.

MODAL-POSTULATORY is being used by PowerEdit Index.

MODAL-POSTULATORY does not activate IC linguistic core analysis attractors.

MODAL-POSTULATORY is available for application use.

MODAL-TENTATIVE

MODAL-TENTATIVE indicates:

A non-commital observation: The camp should be open after 6 o'clock.

(I think the camp will be open but am not 100% certain)

A polite request: Could I have seconds please?

A polite condition: If you should see him let us know.

A non-commitial opinion: The program could blow up.

MODAL-TENTATIVE is used by PowerEdit Index.

MODAL-TENTATIVE does not activate IC linguistic core analysis attractors.

VERB MODAL MEANING "SHALL" FLAGS

MODAL-VOLITION

Used to indicate a conscious choice. This is the base from which grades of volition are meaured. This flag says choice is present, but does not indicate how strong that choice is.

MODAL-VOLITION is used by PowerEdit Index.

MODAL-VOLITION does not activate IC linguistic core analysis attractors.

MODAL-LOGICAL NECESSITY

MODAL-LOGICAL NECESSITY indicates the choice, conclusion or action is/ was/will be made due to logical necessity or other reasons beyond human control. It is a logical deduction due to circumstances. Morality or other socio-ethical conditions do not come to bear. (If they do it should be +MODAL-OBLIGATION.)

I must get control of my portfolio.

You must invest this now.

Surely there must be some mistake.

Spock! You must beam me up now.

MODAL-LOGICAL NECESSITY is used by PowerEdit Index.

MODAL-LOGICAL NECESSITY does not activate IC linguistic core analysis attractors.

MODAL-OBLIGATION

Indicates necessity of action, thought, or conclusions that are based on duty/responsibility/ethics. Spock acts out of logical necessity. Dr. McCoy from obligation.

McCoy! You must beam me up now.

You really should send your mother a card.

You must write your mother more often.

MODAL-OBLIGATION is used by PowerEdit Index.

MODAL-OBLIGATION does not activate IC linguistic core analysis attractors.

MODAL-WILLINGNESS

Indicates weak volition. Reqests are more polite if "would" is used instead of "will."

Would you pass the butter, please?

Will you pass the butter, please?

MODAL-WILLINGNESS is used by PowerEdit Index.

MODAL-WILLINGNESS does not activate IC linguistic core analysis attractors.

MODAL-INTENTION

Indicates intermediate volitional strength.

I will do it if you insist.

I would go there.(literary=I want to go there)

MODAL-INTENTION does not activate any IC linguistic core analysis attractors.

MODAL-INTENTION is used by Power Edit Index.

MODAL-INTENTION is used as a crosscutter by PowerEdit to stop the PowerEdit "PASSIVE SENTENCE" message from occuring on verbs under some syntactic descriptions.

MODAL-INTENTION as a PowerEdit crosscutter was added to the following verbs:

married, divorced, obliged, broken, mistaken, faded, retired, worried, dissatisfied, depressed.

MODAL-INTENTION was added to the -ed form of an if it was present in the lexicon or set on the base form of the verb if it was a +VERB-REGULAR without inflection problems.

We are married. (not a passive)

We were married. (ambiguous)

We were married by the pastor. (passive)

The past tense of (be) + the passive participle gives the word stronger passive attractor value and the passive message should fire.

The children's toys are broken.

The children's toys were broken.

MODAL-INSISTANCE

MODAL-INSISTANCE indicates strong volition.

You shall do as I say.

I will do whatever I want to.

You shall go to the barber and get a haircut tomorrow.

(Get a haircut tomorrow or else.)

MODAL-INSTANCE is used as a message crosscutter for PowerEdit. If MODAL-INSTANCE is set on a verb that is +VERB-STATIVE INTENSIVE it will stop the PowerEdit "PROGRESSIVE VERB WITH STATIVE ADJECTIVE" from firing.

MODAL-INSISTANCE does not activate any IC linguistic core analysis attractors.

MODAL-INSISTANCE is used by PowerEdit Index.

MODAL-LEGAL CONJUNCTION

MODAL-LEGAL CONJUNCTION indicates that the force of law is behind the statement. It is a strong volitional indicator of a legal requirement.

The renter shall keep the rugs clean.

The prisoner shall serve all of his time without parole.

MODAL-LEGAL CONJUNCTION is used as a crosscutter for PowerEdit to stop the PowerEdit "MISUSED STATIVE VERB" message from firing.

MODAL-LEGAL CONJUNCTION does not activate any IC linguistic core analysis attractors.

MODAL-LEGAL CONJUNCTION is used by PowerEdit Index.

VERB SEMANTICS CLASS "A" FLAGS

The semantic flags used in the system are different than the usual linguistic definition of semantics. They are used for the message routines to determine what kind of subjects can pair up with the differing kinds of verb types.

The matches do not follow philosophic truth but are set to allow for common usage. English uses figurative language copiously.

As a rule, the verb is set to its lowest semantic denominator. This means that if a verb has uses that are restricted to human subjects in some senses, but can be applied to rocks as a subject in other senses, then the verb has a semantic flag set to allow "rock" to function as the subject.

The verb semantic flags are used mainly for the PowerEdit "SUBJECT-VERB LOGIC MISMATCH," "VERB-OBJECT LOGIC MISMATCH," and "DANGLING MODIFIER" messages.

VERB-PERSONAL KNOWLEDGE

The VERB-PERSONAL KNOWLEDGE flag defines a set of verbs which require a specific type of subject. The subject is usually one which is capable of a high degree of reasoning and social abilities. This class of verbs will accept a subject that is:

+COMMON NOUN-HUMAN
+COMMON NOUN-HIGH ORGANISM

Words such as "love," and "hate," are +VERB-PERSONAL KNOWLEDGE

Verbs that are +VERB-PERSONAL KNOWLEDGE allow any noun in the object position.

VERB-PERSONAL KNOWLEDGE is used by PowerEdit Index.

VERB-PERSONAL KNOWLEDGE activates IC linguistic core analysis attractors.

VERB-PERCEPTION

The VERB-PERCEPTION flag defines a set of verbs which require a subject that has some degree of reasoning, sensation or is often personfied. Verbs that are +PERCEPTION accept subjects that have the following noun semantic flags set:

+COMMON NOUN-HUMAN
+COMMON NOUN-HIGH ORGANISM
+COMMON NOUN-LOW ORGANISM
+PERSONIFICATION
(+COMMON NOUN-HUMAN and +COMMON NOUN-NON-HUMAN)

Verbs that are +VERB-PERCEPTION allow any noun in the object position.

VERB-PERCEPTION is used by the PowerEdit Index.

VERB-PERCEPTION activates IC linguistic core analysis attractors.

VERB SEMANTICS CLASS "B" FLAGS

VERB-PHYSICAL

The VERB-PHYSICAL flag defines a set of verbs which require a subject that is:

+COMMON NOUN-CONCRETE
+COMMON NOUN-ANIMATE

VERB-PHYSICAL is used by the PowerEdit Index.

VERB-PHYSICAL activates IC linguistic core analysis attractors.

VERB-MEASURE

The VERB-MEASURE flag defines a set of verbs which require a subject that can do actions that normally only humans can perform.

Verbs that are +VERB-MEASURE can accept subjects that are:

+COMMON NOUN-HUMAN
+PROPER NOUN
+COMMON NOUN-HUMAN and
  +COMMON NOUN-NON-HUMAN
  +COMMON NOUN-GENDER-COLLECTIVE The personified +COMMON NOUN-GENDER COLLECTIVE words usually refer to groups of humans.

Verbs that are +VERB-MEASURE allow any noun in the object position.

VERB-MEASURE activates IC linguistic core analysis attractors.

VERB-LOCATION

The VERB-LOCATION flag defines a set of locative verbs that has an inherent idea of posture. Words that are +VERB-LOCATION not only describe the position but the posture of the referent. Some words that are +VERB-LOCATION are:

kneel, lie, sit, and stand.

Words that are +VERB-LOCATION also tend to be +VERB-IN-TRANSITIVE and +VERB-OPTIONAL-ADVERB. When words that are +VERB-LOCATION are used transitively, they tend to have a causal idea.

He stood the broom up in the corner.

(He caused the broom to be standing up {posture} in the corner.)

Words that are +VERB LOCATION resemble words that are +VERB-MOVEMENT. They differ in that words that are +VERB-LOCATION have an overt posture associated with them and do not occur easily with PREPOSITIONS that are +PREP-SOURCE (from) +PREP LOCATION PATH flags or +PREP-GOAL (to).

He kneeled from Memphis across Knoxville to Atlanta.

Words +VERB-LOCATION can accept any noun in the subject position that is:

+COMMON NOUN-CONCRETE
+COMMON NOUN-ANIMATE

Words +VERB-LOCATION can accept any noun in the object position.

VERB-LOCATION is used by PowerEdit Index.

VERB-LOCATION activates IC linguistic core analysis attractors.

VERB SEMANTICS CLASS "C" FLAGS

VERB-MOVEMENT

The VERB-MOVEMENT flag defines a set of movement verbs that has a strong quality of source, path, and goal. Words that are +VERB-MOVEMENT do not have a strong or explicit stance/position quality about them.

Words that are +VERB-MOVEMENT can accept any noun in the subject position that is:

+COMMON NOUN-CONCRETE
+COMMON NOUN-ANIMATE

Words that are +VERB-MOVEMENT can accept any noun in the object position.

The combination of +VERB-MOVEMENT and +VERB-POSSESSION is used to identify "give" and its inflections as a CLASS 1 Ditransitive and/or Complex-Transitive verb for PowerEdit.

VERB-MOVEMENT is used by PowerEdit Index.

VERB-MOVEMENT activates IC linguistic core analysis attractors.

VERB-POSSESSION

Words that are +VERB-POSSESSION are semantically neutral verbs. They allow any noun to be in the subject or object position.

VERB-POSSESSION should not be confused with the notion "possession" as it is usually understood in linguistics.

The combination of +VERB-MOVEMENT and +VERB-POSSESSION is used to identify "give" and its inflections as a CLASS 1 Ditransitive and/or Complex-Transitive verb for PowerEdit.

VERB-POSSESSION is used by PowerEdit Index.

VERB-POSSESSION activates IC linguistic core analysis attractors.

VERB-HUMAN ONLY

The flag VERB-HUMAN ONLY defines the set of actions that only humans or personified non-humans can perform.

Words that are VERB-HUMAN ONLY and are used transitively accept nouns in the subject position that are:
+COMMON NOUN-HUMAN
+COMMON NOUN-HUMAN and +COMMON NOUN-NON-HUMAN.

Words that are +VERB-HUMAN ONLY and are used intranitively accept nouns in the subject position that are:
+COMMON NOUN-CONCRETE
+COMMON NOUN ANIMATE Words that are +VERB-HUMAN ONLY can accept any noun in the object position.

VERB-HUMAN ONLY is used by PowerEdit Index.

VERB-HUMAN ONLY activates IC linguistic core analysis attractors.

VERB SEMANTICS CLASS "D" FLAGS

VERB-STATIVE

The VERB-STATIVE flag is set only on "be" (and its principle parts) to indicate the concept of "stasis."

VERB-STATIVE activates IC linguistic core analysis attractors.

VERB-PROCESS

The VERB-PROCESS flag pairs up with the VERB-INTRANSITIVE flag. Words that are +VERB-INTRANSITIVE are +VERB-PROCESS.

VERB-PROCESS activates IC linguistic core analysis attractors.

VERB-ACTION

The VERB-ACTION flag pairs up with the VERB MONO-TRANSITIVE flag. Words that are +VERB-MONO-TRANSITIVE are also +VERB-ACTION.

VERB-ACTION is used by PowerEdit Index.

VERB-ACTION activates IC linguistic core analysis attractors.

VERB-CAUSE

The VERB-CAUSE flag is set on words that have a strong causal use. VERB-CAUSE s restricted to those words that have a dominant causal meaning.

cause, make, force, compel, coerce.

VERB-CAUSE activates IC linguistic core analysis attractors.

VERB-EMPTY

VERB-EMPTY is used primarily as a crosscutting flag. It is not presently being set on words that are +VERB part of speech.

Originally VERB-EMPTY was used to identify verbs that could only occur with empty subjects. Such as:

It is raining.

It is snowing.

But this was unproductive for the system so it was discontinued. It was troublesome for sentences such as:

The arrows were raining clown on the Spartans.

VERB-EMPTY is used by PowerRead to identify the verbs:

try, begin, ought (and their inflected forms)

VERB-EMPTY is used by PowerEdit to identify "etc" and "and so forth." (These two words are also +DISCOURSE-ADDITION)

VERB-EMPTY is used by PowerEdit to identify "it."

(NOTE: DO NOT REMOVE VERB-EMPTY FROM "IT" WITHOUT CHECKING TO SEE HOW IT WILL AFFECT THE IDENTIFICATION ROUTINES IN DIFFERENT PROGRAMS)

VERB-EMPTY is used by PowerEdit Index.

VERB-EMPTY activates IC linguistic core analysis flags.

VERB-BODY SENSATION

The VERB-BODY SENSATION flag defines a set of verbs which requires a subject that has a nervous system and can experience sensation.

Words that are +VERB-BODY SENSATION can accept nouns in the subject position that are:
+COMMON NOUN HUMAN
+COMMON NOUN HIGH ORGANISM
+COMMON NOUN LOW ORGANISM Verbs with this flag set allow objects that are:
+COMMON NOUN-CONCRETE
+COMMON NOUN-ANIMATE VERB-BODY SENSATION is used by PowerEdit Index.

VERB-BODY SENSATION activates IC linguistic core analysis attractors.

VERB-EMOTION/ATTITUDE

The VERB-EMOTION/ATTITUDE flag defines a set of verbs which requires an object that has a nervous system and can experience sensation and perceive the action.

Words that are +VERB-EMOTION/ATTITUDE can accept nouns in the object position that are:
+COMMON NOUN-HUMAN
+COMMON NOUN-HIGH ORGANISM
+COMMON NOUN-LOW ORGANISM
+COMMON NOUN-PERSONAL ATTRIBUTES SINGULAR
+COMMON NOUN-PERSONAL ATTRIBUTES PLURAL
+PROPER NOUN
+PERSONIFICATION and +COMMON NOUN-GENDER-COLLECTIVE
+PERSONIFICATION and
  +COMMON NOUN-DEVERBAL
  +NOMINALIZED ADJECTIVE
  +NOMINALIZED VERB Words that are +VERB-EMOTION/ATTITUDE can accept any noun in the subject position.

VERB-EMOTION/ATTITUDE is used by PowerEdit Index.

VERB-EMOTION/ATTITUDE activates IC linguistic core analysis attractors.

VERB-FACTUAL KNOWLEDGE

The VERB-FACTUAL KNOWLEDGE flag defines a set of verbs which requires a subject that can think. A word that is +VERB-FACTUAL KNOWLEDGE can accept nouns in the subject position that are:
+COMMON NOUN-HUMAN
+COMMON NOUN-HIGH ORGANIZATION
+PERSONIFICATION A word that is +VERB-FACTUAL KNOWLEDGE will allow any noun to appear in the object positon.

VERB-FACTUAL KNOWLEDGE is used by PowerEdit Index.

VERB-FACTUAL KNOWLEDGE activates IC linguistic core analysis attractors.

VERB GRAMMATICAL LEXICAL FORMS FLAGS

Intensive verb flags are powerful flags which can influence a part of speech decision. If the word is +VERB- STATIVE INTENSIVE or +VERB-DYNAMIC INTENSIVE Griff will select an ADJECTIVE over an ADVERB on the following word when appropriate. For example:

It can come true.

"Come" is +VERB-DYNAMIC INTENSIVE "True" can be an ADJECTIVE or an ADVERB. Griff will analyze it as an ADJECTIVE in the example sentence.

If the verb permits a subject complement then it is an intensive verb.

John grew happier.

John became stronger.

She is careful.

If the verb does not permit a subject complement than it is an extensive verb.

**John knew happier.

John knew the answer.

**It rained larger.

It rained all day.

It is possible for a verb to be both extensive and intensive. ("grow")

He grew happier all the time.

He grew Mary some flowers.

He grew flowers for a living.

Transitivity has an influence on clause formation on present participles. If the verb is intransitive than the np clause assumption is:

The book /lying in the square/ is large.

If the verb is transitive the assumption is:

The book burning /in the square/ is large.

The distinction between dynamic and stative verbs is not always clear. Dynamic verbs can be used with the progressive tense. Stative verbs cannot usually be used with the progressive tense.

He searched the room.

He was searching the room. "Search" is dynamic.

He knew the man.

**He was knowing the man. "Know" is stative.

He owned his own car.

**He is owning his own car. "Own" is stative.

He saw the answer.

**He was seeing the answer.

He was seeing (=visiting) his mother six times a week. "See" can be both stative and dynamic. It can be set in the lexicon as a dynamic verb only, or it can be +VERB STATIVE EXTENSIVE and +VERB-LEGAL CONJUNCTION.

**He is being the man.

He is being himself.

Most verbs that are stative are also dynamic.

Even "Be" has to have the +VERB INTRANSITIVE flag set.

Stative verbs can be used in the progressive when the complement is +ADJECTIVE DYNAMIC.

He is being neurotic.

He is being careful.

**He is being red.

VERB-STATIVE INTENSIVE

Words that are +VERB-STATIVE INTENSIVE are:

Stative not dynamic.

They are states not actions.

They are copular in complementation.

They accept adjectives, nominals, and adverbials for complements.

They do not accept objects.

They do accept subject complements.

They occur in the sentence patterns
  SVC (subject verb complement)
  SVA (subject verb adverbial)

Words that are +VERB-STATIVE INTENSIVE in the lexicon include:

become, becomes, stands, feel, seem, am not, becoming, seemed, has not been, taste, am, is not, smelling, were, stand, keep, was not, is, felt, smells, are, kept, feels, feeling, rest,, was, seems, wasn't, goes, isn't, been, wert, has been, ain't, go, went, smell, be, standing, became, keeps, had been, keeping, being, stood, had not been, gone, remain, lain.

The girl seemed restless. (subject complement adjective)

John is my friend. (subject complement nominal)

The bar is downstairs. (adverbial complement or adjectival)

She is in London. (adverbial of place)

VERB-STATIVE INTENSIVE is used by PowerEdit Index.

VERB-STATIVE INTENSIVE activates IC linguistic core analysis attractors.

VERB-STATIVE EXTENSIVE

Words that are +VERB-STATIVE EXTENSIVE:

Can have a stative meaning.

Take direct objects.

Do not occur in progressive. (but if they are also dynamic verbs they can occur in the progressive in their dynamic visage.)

They tend to be verbs of perception, cognition, or relation.

Words that are +VERB-STATIVE EXTENSIVE in the lexicon include:

owns, equal, like, belong to, tending, knows, knowing, cost, catches sight of, sound, foreknew, owned, fits, foreknew, owned, fits, foreknow, gladden, have, included, concerning, known, foreknown, foreknows, belong, tends, see, own, suffice, haven't, concern, deserving, include, fitting, know, lack, costing, resemble, have not, costing, stay, matter, madden, fit, having, progress, contain, knew, sadden, including, likes, catch sight of, prefer, foreknowing, remains, sees, understanding.

John heard the explosion.

**John is hearing the explosion.

KW owns a car.

**KW is owning a car.

DB understands the problem.

**DB is understanding the problem.

Words that are +VERB-STATIVE EXTENSIVE should be +VERB-MONO-TRANSITIVE.

Stative extensive verbs need to be stative for two reasons:

1. They cannot occur in the -ing form.
   **They are owing the car.
2. They can occur in the -ing progressive form but do not accept process adverbs. Words that fit this criterion need to be +VERB-LEGAL CONJUNCTION. ("Tending" is +VERB-LEGAL CONJUNCTION.)
   They are tending the sheep in the field.
   **They are tending happily.
   **They are tending microscopically.

STATIVE-EXTENSIVE is used by PowerEdit Index.

STATIVE-EXTENSIVE activates IC linguistic core analysis attractors.

VERB-DYNAMIC INTENSIVE

Words that are +VERB-DYNAMIC INTENSIVE:

refer to actions.

accept complementation in the same way that stative intensive verbs can.

can be used in the progressive tense.

Words that are +VERB-DYNAMIC INTENSIVE in the lexicon include:

get, fallen, grown, lie, layed, turns, turning, proving, rides, sprout, died, appear, grow, lay, coming, fare, proven, came, grew, appearing, looks, looking, gets, turn, lies, proved, turned, turns out, grow, growing, laid, comes, got, comes back, getting; come, prove, look, proves, remains, looked, gotten.

He grew tired.=He is tired.

He always comes back happy.

He proved useful.

Honey smells sweet.

He appears ill.

Words that are +VERB-STATIVE INTENSIVE cannot accept a +ADJUNCT-PROCESS adverb in the "next word" position.

Words that are +VERB-DYNAMIC INTENSIVE can accept a +ADJUNCT-PROCESS adverb in the "next word" position.

**He is regularly. ("is" is stative)

He appears regularly. ("appears" is dynamic)

He is happy. ("is" is intensive)

He appears happy. ("appears is intensive)

**He appears the man. ("appears" is not transitive)

It appears that John is a doctor. ("appears" is +VERB-THAT CLAUSE)

VERB-DYNAMIC INTENSIVE is used by PowerEdit Index.

VERB-DYNAMIC INTENSIVE activates IC linguistic core analysis attractors.

VERB-DYNAMIC EXTENSIVE

VERB-DYNAMIC EXTENSIVE redundant with the other Dynamic Extensive flags. It is not neccessary to set this flag.

There are no words in the lexicon that are +VERB-DYNAMIC EXTENSIVE.

VERB-DYNAMIC EXTENSIVE is used by PowerEdit Index.

VERB-DYNAMIC EXTENSIVE activates IC linguistic core analysis attractors.

VERB-DYNAMIC EXTENSIVE is available for application use.

VERB-MONO-TRANSITIVE

Words that are +VERB-MONO-TRANSITIVE take direct objects. They occur in the S-V-O sentence pattern. A verb that is +VERB-MONO-TRANSITIVE is permitted only one object.

There are over 9000 words that are +VERB-MONO-TRANSITIVE in the lexicon.

There is a special case for transitive-only verbs such as 'implant' that are obligatory adverbial words. They must also be set as intransitive to all for 'we will implant in it a . . . ' where the adverbial occurs prior to the object.

VERB-MONO-TRANSITIVE is not available for use as a crosscutter.

VERB-MONO-TRANSITIVE is used by PowerEdit Index.

VERB-MONO-TRANSITIVE activates IC linguistic core analysis attractors.

VERB-DI-TRANSITIVE

Words that are +VERB-DI-TRANSITIVE allow for(but to not require) two objects, since they can be used monotransitively. The objects are usually two noun phrases in which the indirect object (goal) occurs before the direct object.

He gave her (indirect object) a book. (direct object)

Ditransitive verbs occur in the sentence structure S-V-IO-DO.

There are approximately 300 words that are +VERB-DI-TRANSITIVE in the lexicon.

Words that are +VERB-DI-TRANSITIVE should also be +VERB-MONO-TRANSITIVE.

There are three classes of di-transitive verbs for the purposes of the PowerEdit "MISSING OBJECT" messages.

Class I. is for verbs like "give." (so far the only member of this class) Class 1 verbs need a direct object and an indirect object to fulfill the requirements of the PowerEdit message. Direct object alone or indirect object alone will not bypass the message.

**I gave the book.

**I gave her.

I gave her the book.

**I gave the book at the office.

A Class I verb is identified by the following flags:

+VERB-PRIME

+VERB-MOVEMENT

+VERB-POSSESSION ("Give" and its inflections are only words in the lexicon with two verb semantic flags set. If more verbs need to be added to this Class I, then these two verb flags should be used to specify the added Class I verbs.

The prepositions "to," "for," and "of" can indicate the presense of an indirect object.

I gave the book to John.

I made a fool of John

I made the car for Joh.

For Class I verbs, only "to" counts as the marker of the indirect object.

**I gave the book of John.

**I gave the book for John.

I gave the book to John.

Class 2 describes verbs such as:

buy, make, show, feed, take, tell, get, and ask.

Class 2 verbs can satisify the requirements of PowerEdit message requirements with:

a direct object and an adverbial.

a direct object and an indirect object.

but not with an adverbial alone.

**I made in the morning.

I told a lie yesterday.

I told John a lie.

**I told yesterday.

I told a lie to you.

I told a lie.

Class 2 verbs are identified by the absence of the following flags:

−VERB-OPTIONAL ADVERB
−VERB-OBLIGATORY ADVERB

Class 3 ditransitive/complex-transitive verbs satisfy the requirements of the PowerEdit: "MISSING OBJECT" and "DITRANSITIVE VERB" messages with:

a direct object and an indirect object.
a direct object and an adverbial.
an adverbial only.
I left John a book.
I left John in the afternoon.
I left in the afternoon.
**I left John. (for whom? where?,when?)
**I left a book. (to whom? where? when?)
Class 3 verbs are those such as:
leave, win, play, read, sing, call, and write.

Class 3 verbs can be +VERB-DI-TRANSITIVE and/or +VERB COMPLEX-TRANSITIVE.

Class 3 verbs also are +VERB-OPTIONAL ADVERB or +VERB-OBLIGATORY AVERB.

The test sentences for determining a Class 2 verb from a Class 3 verb are:

**I was feeding yesterday. (Needs a DO, so "feed" is Class 2.)
I was feeding her yesterday.
I was leaving yesterday. ("Leave" is a Class 3.)

In a di-transitive verb phrase, if an indirect object is present, a direct object must also be present. The indirect object may be represented by a prepositional phrase.

He gave the ball (DO) to Mary (IO).
He gave the ball (DO) away (Adv.)
**He gave to Mary.
He gave Mary (IO) the ball (DO).

VERB-DI-TRANSITIVE is used by PowerEdit Index.

VERB-DI-TRANSITIVE activates IC linguistic core analysis attractors.

VERB-COMPLEX-TRANSITIVE

Words that are +VERB-COMPLEX-TRANSITIVE allow (but do not require) an object complement. The complement and the object must be equated for the the verb to be complex transitive.

I like my hamburgers raw.
(I like hamburgers. The hamburgers are raw.)
I proclaimed him king.
(I proclaimed (a speech act) He is king.
I painted the barn red.
(I painted the barn. The barn is red.)

There are approximately 200 words that are +VERB-COMPLEX-TRANSITIVE on file in the lexicon.

Verbs can be both +VERB-DI-TRANSITIVE and +VERB-COMPLEX-TRANSITIVE.

There may is not a clear syntactic distinction between VERB-DI-TRANSITIVE and VERB-COMPLEX-TRANSITIVE. The difference is one of meaning.

He made me king. (COMPLEX-TRANSITIVE)
He made me a hamburger. (DI-TRANSITIVE)
He found me a loyal friend. (COMPLEX-TRANSITIVE)
He found me (to be) a loyal friend.
He found me a loyal friend. (DI-TRANSITIVE)
He found me a loyal friend.
He found me an appartment. (DI-TRANSITIVE)

VERB-COMPLEX-TRANSITIVE is not available for use as a crosscutter.

The COMPLEX-TRANSITIVE flag allows a post-posed ADJECTIVE to occur after the direct object.

We consider Bill (to be) faithful.

VERB-COMPLEX-TRANSITIVE is used by PowerEdit Index.

VERB-COMPLEX-TRANSITIVE activates IC linguistic core analysis attractors.

VERB-INTRANSITIVE

Words that are +VERB-INTRANSITIVE do not accept objects or subject complements. They only allow adverbial complementation. Pure intransitive verbs in English do not occur frequently.

There are approximately 900 words in the lexicon that are +VERB-INTRANSITIVE only.

He arrived (in the afternoon).
She emerged (from the conference room).

VERB-INTRANSITIVE is not available for use as a crosscutter.

Most words that are +VERB-INTRANSITIVE and −VERB-MONO-TRANSITIVE require either the +VERB-OPTIONAL ADVERB or +VERB-OBLIGATORY ADVERB end to be set.

VERB-INTRANSITIVE is used by PowerEdit Index.

VERB-INTRANSITIVE activates IC linguistic core analysis attractors.

VERB GRAMMATICAL AUXILIARY FORMS FLAGS

The VERB GRAMMATICAL AUXILIARY FORMS FLAGS are used to identify the set of auxiliary verbs and to enable them to exercise their aspectual, modal, and temporal distinctions.

VERB-PRIMARY PERIPHRASTIC

VERB-PRIMARY PERIPHRASTIC is set on the word "do" and its inflections.

VERB-PRIMARY PERIPHRASTIC is not available for use as a crosscutter.

VERB-PRIMARY PERIPHRASTIC is used by PowerEdit Index.

VERB-PRIMARY PERIPHRASTIC activates IC linguistic core analysis attractors.

VERB-PRIMARY ASPECTUAL

VERB-PRIMARY ASPECTUAL IS set on the aspectual auxiliaries "be" and "have."

"Be" sets attractor values for voice and aspect. "Have" sets attractor values for aspect only.

VERB-PRIMARY ASPECTUAL is not available for use as a crosscutter.

VERB-PRIMARY ASPECTUAL is used by PowerEdit Index.

VERB-PRIMARY ASPECTUAL activates IC linguistic core analysis attractors.

VERB-PRIMARY ASPECTUAL PROGRESSIVE

VERB-PRIMARY ASPECTUAL PROGRESSIVE is set on "be" to allow the core attractors to set values and identify the progressive aspect.

"Be" + the -ing participle equals the progressive aspect.
John is thinking. (present progressive)
John was thinking. (past progressive)
John has been thinking. (present perfect progressive)
John had been thinking. (past perfect progressive)
John will be thinking. (future progressive)
John will have been thinking. (future perfect progressive)
John would have been thinking. (past future perfect progressive)

The progressive aspect does not attract stative verbs.
**We are owning the house.

The verbs "start," "finish," and "begin" act as progressive aspect auxiliaries when they occur in the past habitual tense. To allow them to function as progressive auxiliaries, the VERB-PRIAMARY ASPECTUAL PROGRESSIVE flag has been set on their past habitual form in the lexicon.

He began writing the book.

She started helping him before it was too late.

The finished working during the night.

He started running down the street.

VERB-PRIMARY ASPECTUAL PROGRESSIVE is not available for use as a crosscutter.

VERB-PRIMARY ASPECTUAL PROGRESSIVE is used by PowerEdit Index.

VERB-PRIMARY ASPECTUAL PROGRESSIVE activates IC linguistic core analysis attractors.

VERB-PRIMARY ASPECTUAL PERFECTIVE

VERB-PRIMARY ASPECTUAL PERFECTIVE is set on "have" and the inflections of "have."

VERB-PRIMARY ASPECTUAL PERFECTIVE is not available for use as a crosscutter.

VERB-PRIMARY ASPECTUAL PERFECTIVE is used by PowerEdit Index.

VERB-PRIMARY ASPECUTAL PERFECTIVE activates IC linguistic core analysis attractors.

VERB-PRIMARY ASPECTUAL PASSIVE

VERB-PRIMARY ASPECTUAL PASSIVE allows a verb to pair up with a past participle and create the passive voice.

VERB-PRIMARY ASPECTUAL PASSIVE is not available for use as a crosscutter.

VERB-PRIMARY ASPECTUAL PASSIVE is used by PowerEdit Index.

VERB-PRIMARY ASPECTUAL PASSIVE activates IC linguistic core analysis attractors.

VERB-MODAL

VERB-MODAL is set on the traditional closed class of modal auxiliary verbs:

can, could, may, might, shall, should, will, would, must.

Words that are +VERB-MODAL should not have transitivity flags set unless they are also lexical verbs. ("Can" and "will.")

VERB-MODAL is not available for use as a crosscutter.

Modals do not combine with "will/shall" to indicate future time. Modals both past and present have an inherent future reference. Modals are negative or non-assertive. They are not assertive. Modals are used to indicate events that are:

expected, possible, necessary, improbable, impossible, obligatory, legally binding, or did not occur.

Modals are not inflected like lexical verbs. They do not have principal parts. They do not use the "-s" form for third person singular. They do not have a base form that is the infinitive.

**I to should skate this afternoon.

Modals have no "-ed" past form.

Some modals have a form that serves as a past:

can/could; may/could/might/; shall/should; will/would.

Modals are followed by the unmarked infinitive.

VERB-MODAL is used by PowerEdit Index.

VERB-MODAL activates IC linguistic core analysis attractors.

VERB-MODAL MARGINAL

VERB-MODAL MARGINAL is not available for application use.

VERB-MODAL MARGINAL is not presently being set on words in the lexicon, but it is set on the word "dare."

Originally VERB-MODAL was used to identify the special class of words that function in many structrual descriptions as a modal auxiliary and also appear as lexical verbs:

need, dare, used to, ought, ought to.

VERB-MODAL MARGINAL was discontinued as a viable option and its class of verbs was handled by other flags and combinations of flags.

"Ought" is always is followed by "to," so "ought to" was phrased and given the status of a full modal. ("ought to"="should")

"Ought" is +NON-STANDARD.

"Used to" originally was phrased. But it is used too frequently as a lexical verb. So "used to" was dephrased and "used" now has the status of a full lexical verb only.

The problematic "dare note" and "need not" were phrased. "Dare" and "need" are problematic as they are really two verbs. One personality is regular and lexical, the other personality is irregular and modal marginal.

The modal use of "dare" and "need" is rare in American English.

The only problem exits in the negative use. This was solved by adding "dare not" and "need not" to the lexicon as words that are +VERB-MODAL. The other modal uses of "dare" and "need" are highly literary and infrequent.

No man need fight if he dare not draw his sword.

VERB-MODAL MARGINAL is still set on "dare." but it is not set on any of the inflections of "dare."

VERB-MODAL MARGINAL is used by PowerEdit Index.

VERB-MODAL MARGINAL activates IC linguistic core analysis attractors.

VERB-SEMI-MODAL

VERB-SEMI-MODAL is not available for use as a crosscutter or for a new application use.

Originally there were two classes of semi modals. Class I. was +VERB-SEMI-MODAL and +VERB-SEMI-AUXILIARY. Class I VERB-SEMI-MODAL included words such as: (includes inflected forms)

be about to, be apt to, be bound to, be going to, be liable to, be sure to, be to, have to, have got to, come to, fail to, tend to.

Class II VERB-SEMI-MODAL words were +VERB-SEMI-AUXILIARY and -VERB-SEMI-MODAL. Class II VERB-SEMI-MODAL words indluded words such as: (and inflected forms)

be certain to, be likely to, be unlikely to, appear to, happen to, seem to, turn out to.

Words that were Class II VERB-SEMI-MODAL also were +USED TO (MISC. ELEMENT flag)

The class of semi-modal words was discontinued, since Griff could analyze semi-modals better when they were unphrased.

VERB-SEMI-MODAL is used by PowerEdit Index.

VERB-SEMI-MODAL activates IC linguistic core analysis attractors.

VERB-SEMI-AUXILIARY

VERB-SEMI-AUXILIARY is not available for a general application use.

There are no words in the lexicon with VERB-SEMI-AUXILIARY set.

VERB-SEMI-AUXILIARY is used by PowerEdit Index.

VERB-SEMI-AUXILIARY activates IC linguistic core analysis attractors.

ADJECTIVE SYNTAX COMPARISON FLAGS

ADJECTIVE-POSITIVE

The ADJECTIVE-POSITIVE flag is set on ADJECTIVES that use the suffixes "-er" or "-est" for comparisons.

If the adjective only uses (more/most and less/least) for comparison, ADJECTIVE-POSITIVE should not be set.

If the ADJECTIVE-POSITIVE flag is set on a regular adjective, Griff will set the ADJECTIVE-COMPARATIVE and ADJECTIVE-SUPERLATIVE flags when the "-er" form or the "-est" form of the adjective appears. The comparative and superlative forms of a regular adjective do not need to be placed into the lexicon as a seperate entry. The comparative forms of irregular adjectives do need to be set up in their comparative and superlative forms.

ADJECTIVE-POSITIVE does not independently activate IC linguistic core analysis attractors.

ADJECTIVE-COMPARATIVE

Griff will set this flag on regular adjectives that are +ADJECTIVE-POSITIVE that are being used with the comparative suffix "-er."

Words that are irregular adjectives and have a comparitive form need to be set up in the lexicon as a seperate entry that is

+ADJECTIVE-COMPARATIVE.

NOTE: All words that end with "-er" are read as comparative adjectives by Griff if the word is not set up in the lexicon. For example: "Reader" would be read as a comparative adjective if it were not set up in the lexicon as being +COMMON NOUN.

ADJECTIVE-COMPARATIVE activates IC linguistic core analysis attractors.

ADJECTIVE-SUPERLATIVE

Griff will set this flag on superlative adjectives that are regular and being used with the "-est" inflection.

Words that are irregular adjectives and have an "-est" superlative form, need to be set up in the lexicon as a seperate entry that is +ADJECTIVE-SUPERLATIVE.

NOTE: All words that end with the suffix "-est" are read as superlative adjectives by Griff. If the word is not an "-est" superlative it needs to be set up in the lexicon. For example: "pest" needs to be placed into the lexicon as being +COMMON NOUN.

ADJECTIVE-SUPERLATIVE activates IC linguistic core analysis attractors.

ADJECTIVE SYNTAX TYPE FLAGS

ADJECTIVE-NEGATIVE

The ADJECTIVE-NEGATIVE flag is set on adjectives with a negative meaning. This includes the n-words "not," "non," and "no" and also includes adjectives which have a negative prefix.

Prefixes which impart a negative meaning to adjectives include:

| | |
|---|---|
| dis- | disloyal |
| a- | amoral |
| in- | incompetent (and varients) |
| | il- (before l) illegal |
| | im- (before labials) immoral |
| | ir- (before r) irreverent |
| non- | (often hyphenated) non-smoker |
| un- | unable |

When a sentence has a positive and a negative subject, the verb should agree with the positive subject and consider the negative subject as an intervening element. The negative subject has no influence on subject-verb-agreement.

Profit and not sales is of the utmost importance. The members and not the president rule this club.

Negative adjectives must be entered into the lexicon. Griff will not strip the negative prefixes and set the ADJECTIVE-NEGATIVE flag for you.

ADJECTIVE-NEGATIVE does not independently activate IC linguistic core analysis attractors.

ADJECTIVE-INTERROGATIVE

ADJECTIVE-INTERROGATIVE is available for application use. ADJECTIVE-INTERROGATIVE does not activate any IC linguistic core analysis attractors.

ADJECTIVE-INTERROGATIVE was originally was intended to identify the words:

whose, which, what, whoever, whosever, whichever, whatever.

But the flag was not needed. The identification and function of wh- words that can be adjectives was handled with out ADJECTIVE-INTERROGATIVE.

ADJECTIVE-INTERROGATIVE is not set on any words in the lexicon.

ADJECTIVE-PAST DETERMINER

ADJECTIVE-PAST DETERMINER is available for application use.

ADJECTIVE-PAST DETERMINER is not set on any word in the lexicon.

ADJECTIVE-PAST DETERMINER does not activate any IC linguistic core analysis attractors.

ADJECTIVE-REGULAR

ADJECTIVE-REGULAR is set by Griff as a default flag.

ADJECTIVE-REGULAR is not being set on any words entered into the lexicon. If the ADJECTIVE-IRREGULAR flag is not set, the ADJECTIVE is assumed to be +ADJECTIVE-REGULAR and Griff will set this flag on a word that is +ADJECTIVE.

ADJECTIVE-REGULAR activates IC linguistic core analysis attractors.

ADJECTIVE-REGULAR is not available for use as a crosscutter.

ADJECTIVE-IRREGULAR

The ADJECTIVE-IRREGULAR flag identifies words that have irregular inflection patterns, or incomplete inflections.

Words that are +ADJECTIVE-IRREGULAR that do not have a comparative form (such as "end" and "left") should not have the ADJECTIVE-POSITIVE flag set. Set up the superlative as a separate entry ("endmost" and "leftmost) and enter its root in the ROOT WORD screen so the self correction routine can function properly. For example: "endmost" would have r end in its ROOT WORD screen.

ADJECTIVE-IRREGULAR does have some crosscutter uses.

ADJECTIVE-IRREGULAR is set on possessive pronouns that have the ADJECTIVE flag set but not the PRONOUN part of speech set:

my, our, his, her, their and its.

ADJECTIVE-IRREGULAR is used to identify irregular adverbs. There is no irregular adverb flag.

ADJECTIVE-IRREGULAR activates IC linguistic core analysis attractors.

ADJECTIVE-TIME REFERENT

The ADJECTIVE-TIME REFERENT flag is set on "time when" adjectives.

Words that are +ADJECTIVE-TIME REFERENT include:

earlier, former, preceding, previous, prior, coexisting, coinciding, concurrent, contemporary, comtemporaneous, simultaneous, ensuing, following, later, next, and subsequent.

When ADJECTIVE-TIME REFERENT is set on an adjective, it allows the adjective to be used as a subject complement for a plural verb.

They were first.

There are three sub-classes +ADJECTIVE-TIME REFERENT words. They are:

1. Temporal ordering adjectives indicating time previous to a time-reference. This includes words such as:

earlier, former, preceding, previous, and prior.

This class will be +PREP-BEFORE indicating "time before."

2. Temporal ordering adjectives indicating time subsequent to a time-reference. This includes words such as:

ensuing, following, later, next, and subsequent.

This class will have +PREP-AFTER indicating "time after."

3. Temporal ordering adjectives indicating time simultaneous with a time-referent. This includes words such as:

coexisting, coinciding, concurrent, contemporary, contemporaneous, and simultaneous.

This subclass will be identified with the –PREP-BEFORE and –PREP-AFTER flag setting.

ADJECTIVE-TIME REFERENT activates IC linguistic core analysis attractors.

ADJECTIVE-QUANTIFIER

The ADJECTIVE-QUANTIFIER flag is set on +ADJECTIVE-LIMITING adjectives that contain a notion of quantification. This includes words that are:

+ADJECTIVE-CARDINAL

+ADJECTIVE ORDINAL

+PREDETERMINER

The closed quantifiers (many, more, most, few, fewer, fewest, little, less, least) do not have the ADJECTIVE-QUANTIFIER flag set because of their special uses as adjectives and determiners. Words that are +ADJECTIVE-QUANTIFIER are mutually exclusive.

ADJECTIVE-QUANTIFIER is not available for use as a crosscutter.

ADJECTIVE-QUANTIFIER activates IC linguistic core analysis attractors.

ADJECTIVE-INTENSIFIER

A word that is +ADJECTIVE-INTENSIFIER and is analyzed as an ADJECTIVE cannot be premodified or postmodified by another adjective unless the adjective that premodifies it is functioning as a determiner.

**The present certain (+ADJECTIVE INTENSIFER) man.

A certain man was walking down the street.

ADJECTIVE-INTENSIFIER activates IC linguistic core analysis attractors.

ADJECTIVE GRAMMAR ADJUNCTIVE FLAGS

ADJECTIVE-ADJUNCT

The ADJECTIVE-ADJUNCT identifies a class of adjectives that are functionally similar to adjunct adverbs.

The ADJECTIVE-ADJUNCT flag does not independently activate any IC linguistic core analysis attractors. It is used by PowerEdit to identify a certain class of adjectives.

Often words that are +ADJECTIVE-ADJUNCT are +ADJECTIVE and +ADVERB.

Words that are +ADJECTIVE-ADJUNCT include:

simple, nightly, fortnightly, meer, stronger, clear, into place, pure, yearly yearly, sure, close, entire, mere, plain, next Sunday, hard as nails, real, strong, just, monthly, early, next Friday, tomorrow morning, firm, thin, former, quarterly, pursuant, midnight, next Thursday, absolute, many such, in-and-in, tomorrow afternoon, thick, daily, next week, a great many, nearby, not doubtful, at stake, eastern, nigh, hard, impartiality, at hand, morrow, next Monday, true, occasional, full and complete, outright, perfect, definite, next Wednesday, vanward, tomorrow, easy as pie, manana, very, next Tuesday, closer, next Saturday, out front, past, extreme, utter, certain, sheer, complete, great, total, out-of-door, many, and strong as an ox.

A pit that was two feet deep was prepared for John.

ADJECTIVE-POSTPOSED OK is used to identify certain time nouns such as:

afternoon, noon, and yesterday.

I came Friday afternoon.

The over-use of postposed adjectives is acceptable in a poetic style of writing.

John tender and conscious, walked to the nearest park.

ADJECTIVE-POSTPOSED OK activates IC linguistic core analysis attractors.

ADJECTIVE-POSTPOSED OK

The ADJECTIVE-POSTPOSED OK flag allows an adjective to postmodify a noun that is not an object of a complex-transitive verb.

The ADJECTIVE-POSTPOSED OK flag is not a commonly set flag. It should only be set on ADJECTIVES that can commonly occur after a noun that can be +COMMON NOUN-TIME, or +COMMON NOUN-DISTANCE.

The book is five feet wide.

The road is five feet long.

The ADJECTIVE-POSTPOSED OK flag is not set to handle constructions that are essentially only reduced relative clauses:

He is a man (who is) careful in all that he does.

But some words are used in a postposed fashion commonly, and do need to be +ADJECTIVE-POSTPOSED OK.

The men present were large.

There were six men present.

He was the president elect.

Normally if a word is +ADVERB and +ADJECTIVE the ADJECTIVE-POSTPOSED OK flag should not be set, since the ADJECTIVE-POSTPOSED OK flag often will interfere with the choice between ADVERB and ADJECTIVE. An exception is made for words that can commonly follow quantified measure words.

A pit that was two feet deep was prepared for John.

"Deep" is +POSTPOSED ADJECTIVE OK.

The ADJECTIVE-POSTPOSED OK flag does not need to have the ADJECTIVE part of speech flag set to activate it. ADJECTIVE-POSTPOSED OK will function whenever the flag is set.

The sentence:

There were twelve people present, to be precise.

is analyzed the same way if the ADJECTIVE flag is set, or not set, on "present." The ADJECTIVE-POSTPPOSED OK flag functions in both instances.

The ADJECTIVE-POSTPOSED OK can postmodify a plural noun in a transformation. But the word that it postmodifies must be +COMMON NOUN-DISTANCE.

ADJECTIVE-ATTRIBUTIVE ONLY

The ADJECTIVE-ATTRIBUTIVE ONLY flag places an adjective into a class that can only function as a premodifier of nouns.

ADJECTIVE-ATTRIBUTIVE ONLY does not independently activate IC linguistic core analysis attractors.

ADJECTIVE-ATTRIBUTIVE ONLY specifies that the word belongs this syntactic class for PowerEdit.

ADJECTIVE-ATTRIBUTIVE ONLY may be used as a crosscutter on a word that cannot be an ADJECTIVE.

ADJECTIVE-PREDICATE ONLY

The ADJECTIVE-PREDICATE ONLY flag allows the adjective to be used as a subject or object complement, but not as attributive modifier.

This is a useful flag to use when a word (such as "subject") is +VERB, +NOUN and +ADJECTIVE.

It allows "subject" to occur as a complement after a stative verb, It allows "subject" be a pure count noun.

He is subject to the law when it suits his mood.

I am subject to fits of despair.

If "subject" is not +ADJECTIVE-PREDICATE, Griff will analyze them as being +VERB part of speech, in the above examples.

Some examples of adjectives that are +ADJECTIVE-PREDICATE ONLY indlude:

afraid, akin, alert, alike, alive, alone, ashamed, askew, fraught, plenty, pursuant.

ADJECTIVE-PREDICATE ONLY activates IC linguistic core analysis attractors.

ADJECTIVE-NON-RESTRICTIVE

ADJECTIVE-NON-RESTRICTIVE is available for application use.

ADJECTIVE-NON-RESTRICTIVE does not activate any IC linguistic core analysis attractors.

ADJECTIVE-NON-RESTRICTIVE was originally developed as a cross-cutter to allow an adjective to modify a personal pronoun.

ADJECTIVE-NON-RESTRICTIVE is set on some words in the lexicon.

ADJECTIVE-RESTRICTIVE

The ADJECTIVE-RESTRICTIVE flag limits, restricts, and narrows the focus of its referent. ADJECTIVE-RESTRICTIVE functions much like an ADJECTIVE-LIMITING word.

ADJECTIVE-RESTRICTIVE is used to specify a subset of words that are ADJECTIVE-LIMITING.

Words that are +ADJECTIVE-RESTRICTIVE include:

main, nope, each, chief, either, editorially, sole, many a, many an, every, precise, what this means, commercially, this, not doubtful, each individual, exact, same, particular, very, no, certain, specific, principal, and a bit.

Phrases that contain an adjective that is +ADJECTIVE-RESTRICTIVE include:

a certain person, his chief example, the exact amount, the main reason, the only banker, a particular item, the precise reason, the principal reason, the same banker, the sole survivor, the specific example, the very day.

The combination of +ADJECTIVE, +UNIFIER, +DETERMINER forces singular concord in conjoined noun phrases. Words such as "each" and "every" have these three flags set.

Restrictive adjectives restrict the reference of the noun exclusively, particularly, or chiefly. Most restrictive adjectives are also +ADJECTIVE-ATTRIBUTIVE ONLY. Some restrictives (since they have an inherent intensifying effect) cannot be intensified or compared.

**the very main reason.

ADJECTIVE-RESTRICTIVE is used as message crosscutter for PowerEdit. When a word is +ADJUNCT-VIEWPOINT and +ADJECTIVE-RESTRICTIVE it can activate the "MODIFIED ADVERBS/ADJECTIVES" message.

ADJECTIVE-RESTRICTIVE activates IC linguistic core analysis attractors.

ADJECTIVE SYNTAX POSITION FLAGS

The vast majority of adjectives can function as both predicate and attributive adjectives.

ADJECTIVE-PLURAL

Griff will set ADJECTIVE-PLURAL flag when the ADJECTIVE is modifying a plural COMMON NOUN or a plural PROPER NOUN. If the ADJECTIVE-PLURAL flag is set on a word, it will only be allowed to modify plural nouns.

ADJECTIVE-PLURAL is not available for use as a crosscutter.

ADJECTIVE-PLURAL activates IC linguistic core analysis attractors.

ADJECTIVE-SINGULAR

The ADJECTIVE-SINGULAR flag is not normally set. Griff will set this flag as needed. If you set this flag on an ADJECTIVE, it will only be able to modify singular nouns.

Most descriptive adjectives can modify singular or plural nouns. Some limiting adjectives can only modify singular or plural nouns.

As a general rule, ADJECTIVE-SINGULAR and ADJECTIVE-PLURAL are not set on on a word that is +ADJECTIVE-DESCRIPTIVE.

ADJECTIVE-SINGULAR is not available for use as a crosscutter.

ADJECTIVE-SINGULAR activates IC linguistic core analysis attractors.

Adjectives that are superlatives and are +ADJECTIVE-NOUN PROMOTION take singular or plural concord depending on the meaning.

The best (thing) is yet to come.

The best (people) are yet to come.

ADJECTIVE-NOUN PROMOTION words should have the flags set that allow them to function properly as a COMMON NOUN when they are analyzed as COMMON NOUNS by Griff. They may take singular, plural, or a special concord setting. The appropriate special function flags should also be set.

ADJECTIVE-NOUN PROMOTION is not available for use as a crosscutter.

ADJECTIVE-NOUN PROMOTION activates IC linguistic core analysis attractors.

When setting up an adjective as +ADJECTIVE-NOUN PROMOTION, use the word "poor" as a template. (For plural verb concord only)

"Active" also works well as a template word.

If you set the ADJECTIVE-NOUN PROMOTION flag do not set the COMMON NOUN part of speech flag.

Adjectives that are +ADJECTIVE-NOUN PROMOTION will not be promoted to a COMMON NOUN when they occur in the Indirect Object Position.

They will be read as a Direct Object that does not have a noun head.

I gave the poor the book.

Words like "closer" that are +COMMON NOUN and +ADJECTIVE may need to have the COMMON NOUN flag removed and re-set as +ADJECTIVE-NOUN PROMOTION.

He is a good closer. (=an effective salesperson)

He is closer to me. (=comparative adjective)

When setting the flags the normal template flags for +ADJECTIVE-NOUN PROMOTION. "Closer" needs to be set up as a noun that is +COMMON NOUN-SINGULAR.

"Closer" also needs the COMMON NOUN-COUNT flag set since most promotable adjectives become pure mass nouns.

"Closer needs the COMMON NOUN-MASS flag removed since "closer" as a COMMON NOUN IS not a mass or count/mass noun.

Most +ADJECTIVE-NOUN PROMOTION words become pure mass nouns and cannot occur with the indefinite article nor do they become plural common nouns.

\*\*A poor will always be with you.

The poor will always be with you.

\*\*The poor is large.

The poor are large.

Most +ADJECTIVE-NOUN PROMOTION words cannot occur as possessives.

\*\*The poors' house will always be with you.

Most +ADJECTIVE-NOUN PROMOTION words refer to a group or a class, never one person. They usually do not inflect for number.

\*\*The poors play in the street.

ADJECTIVE-NOUN PROMOTION

ADJECTIVE-NOUN PROMOTION is set on words that are +ADJECTIVE and –COMMON NOUN parts of speech. The ADJECTIVE-NOUN PROMOTION flag will allow the adjective to used as the head of a noun phrase. It will change the part of speech from ADJECTIVE to COMMON NOUN.

ADJECTIVE-NOUN PROMOTION is used when a word is more ADJECTIVAL in its personality than NOUN, but the word still needs to function as a COMMON NOUN in some instances. The ADJECTIVE-NOUN PROMOTION flag is set on the word "average" (which is also +ADJECTIVE and +VERB) to allow it to be more ADJECTIVAL in its nature for sentences such as:

We firmly believe that the content of AHED V 1.0 meets the dictionary needs of the vast majority of average, day-to-day business users.

If "average" is flagged as a VER3, ADJECTIVE, AND COMMON NOUN, Griff will make "average" a COMMON NOUN since "average" has a following comma and is part of a complex noun phrase. When "average" is +ADJECTIVE-NOUN PROMOTION and –COMMON NOUN, Griff is able to analyze the sentence correctly and recognizes "average" as an ADJECTIVE.

ADJECTIVE-NOUN PROMOTION will occur when the word is premodified by the indefinite or indefinite article in the subject, predicate or within a prepositional phrase.

The average is large.

An average is large.

He said the average is large.

He said an average is large.

He sat on an average.

He sat on the average.

He sat on an average of six chickens per day.

An average of six hits per season will get you a bonus.

Most adjectives can be promoted in some context or other. But some words such as "rich," "poor," "young," and "old," are often used as nouns.

The poor will always be with you.

The rich have trouble going through needle eyes.

Youth is wasted on the young

The very wise keep silent.

The sane often are not.

Many words that are +ADJECTIVE-NOUN PROMOTION only use plural verb concord.

ADJECTIVE-DENOMINAL

The ADJECTIVE-DENOMINAL flag is set on pure adjectives and has two main functions:

1. It identifies denominal adjectives.
2. It allows/encourages the IC linguistic core analysis attractors to accept nouns as modifiers in the attributive position.

The United States political system is not corrupt.

We have a country political system in Texas.

Adjective forms that are worth testing to see if they function as denominals are:

-ed, -ful, -ish, -less, -al, esque, ic, -ous.

Words that are +ADJECTIVE-DENOMINAL when occuring with other types of adjectives must come directly before the head noun. No other type of adjective can come between a denominal adjective and its head. This mandatory positioning of a denominal adjective is a test to see if the adjective is denominal or of another type.

ADJECTIVE-DENOMINAL activates IC linguistic core analysis attractors.

ADJECTIVE-RELATIVE

The ADJECTIVE-RELATIVE is used to give select wh-words more of an adjectival punch. It sets IC linguistic core attractors that can nudge the word into a stronger adjectival sense.

ADJECTIVE-RELATIVE is set on:

how few, how many, some of which, whose, which.

The traditional relative adjectives are:

whose, which, what, that, whose, whichever, whatever.

ADJECTIVE-RELATIVE activates IC linguistic core analysis attractors.

ADJECTIVE-INDEFINITE

Used for pure adjectives that cannot be compared. This list includes:

unique, circular, perfect, . . .

ADJECTIVE-DEMONSTRATIVE

ADJECTIVE-DEMONSTRATIVE is available for application use.

ADJECTIVE-DEMONSTRATIVE does not activate any IC linguistic core analysis attractors.

ADJECTIVE-DEMONSTRATIVE is not set on any word in the lexicon.

ADJECTIVE SYNTAX FORM FLAGS

ADJECTIVE-THAT CLAUSE

The ADJECTIVE-THAT CLAUSE flag is set on adjectives of (mainly) perception that allow a following noun clause and do not need a "that" present to precede the noun clause. Adjectives of emotion, perception, attitude, and evaluative adjectives are prime candidates for this flag.

It is certain (that) John will come.

I am happy (that) John is here.

When the ADJECTIVE-THAT CLAUSE flag is set, VERB-THAT CLAUSE must also be set. The ADJECTIVE-THAT CLAUSE flag does not independently activate IC Linguistic core analysis attractors. VERB-THAT CLAUSE activates IC linguistic core attractors.

ADJECTIVE-POSSESSIVE

The ADJECTIVE-POSSESSIVE flag is set on possessive adjectives that are traditionally understood as possessive pronouns. These words (such as: my, your, his, their, its) have flags set in combination to identify them. They are:

+ADJECTIVE-IRREGULAR

+ADJECTIVE-LIMITING

+ADJECTIVE-POSSESSIVE

–PRONOUN

ADJECTIVE-POSSESSIVE is set on "get" and "receive" (and their inflected forms) to identify them specifically for PowerEdit. If ADJECTIVE-POSSESSIVE is to be used as a crosscutter the word that is +ADJECTIVE-POSSESSIVE can never be used as an ADJECTIVE.

ADJECTIVE-POSSESSIVE activates IC linguistic core analysis attractors.

ADJECTIVE-EXISTENTIAL

ADJECTIVE-EXISTENTIAL is available for general application use.

ADJECTIVE-EXISTENTIAL does not activate any IC linguistic core attractors.

ADJECTIVE-EXISTENTIAL is not set on any word in the lexicon.

ADJECTIVE-EXISTENTIAL is ready for a new use.

ADJECTIVE-EMOTIVE

The ADJECTIVE-EMOTIVE flag describes the emotional state of a human or a high organism. For examples: happy, glad, sweet, patient, furious.

ADJECTIVE-EMOTIVE activates IC linguistic core analysis attractors.

ADJECTIVE-UNIFIER

ADJECTIVE-UNIFIER is an adjective flag that has a special syntactic function that influences subject-verb agreement. ADJECTIVE-UNIFIER is set on adjectives and pronouns that only take singular verb agreement. ADJECTIVE-UNIFIER forces Griff to make the subject singular, even when connected by "and". ADJECTIVE-UNIFIER forces singular concord in a conjoined noun phrase.

ADJECTIVE-UNIFIER is set on "each," "every," "many a" and "many an."

Every man, woman, and child is large.

**Every man, woman, and child are large.

ADJECTIVE-UNIFIER activates IC linguistic core analysis attractors.

ADJECTIVE-LIMITER

ADJECTIVE-LIMITER is available for application use.

ADJECTIVE-LIMITER does not activate IC linguistic core analysis attractors.

ADJECTIVE-LIMITER is not set on any word in the lexicon.

ADJECTIVE-LIMITER is ready for use.

ADJECTIVE-LIMITING

ADJECTIVE-LIMITING is set on adjectives that "limit" the scope of the referent.

Adjectives that are +ADJECTIVE-LIMITING can occur before an article.

Words that are +PRE-DETERMINER, +DETERMINER-CARDINAL, DETERMINER-ORDINAL, are also +ADJECTIVE LIMITING.

Words that are +ADJECTIVE-QUANTIFIER are +ADJECTIVE-LIMITING.

Words that are:
+PRONOUN-PERSONAL,
+PRONOUN-REFLEXIVE,
+PRONOUN-DEMONSTRATIVE,
+PRONOUN-UNIVERSAL,
+PRONOUN-ASSERTIVE,
+PRONOUN-NON-ASSERTIVE,
+PRONOUN-INTERROGATIVE,
are also +ADJECTIVE LIMITING.

ADJECTIVE-LIMITING activates IC linguistic core analysis attractors.

ADJECTIVE-DESCRIPTIVE

The ADJECTIVE-DESCRIPTIVE flag is set on words that are used as descriptive adjectives.

Adjectives that are +ADJECTIVE-DESCRIPTIVE cannot occur before an article. In the system, no adjective that is not a determiner can occur before an adjective.

ADJECTIVE-DESCRIPTIVE does not independently activate any IC linguistic core analysis attractors.

ADJECTIVE-DESCRIPTIVE is the default flag set on adjectives by Griff.

ADJECTIVE-AGE

ADJECTIVE-AGE is presently used to identify "not" in two message routines for PowerEdit.

ADJECTIVE-AGE does not activate any IC linguistic core analysis attractors.

ADJECTIVE-DEGREE

ADJECTIVE-DEGREE is available for application use.

ADJECTIVE-DEGREE does not activate any IC linguistic core analysis attractors.

ADJECTIVE-DEGREE is ready for a new use.

ADJECTIVE GRAMMAR NON-ADJUNCTIVE FLAGS

ADJECTIVE-ADVERB-RELATE

ADJECTIVE-ADVERB-RELATE is available for application use.

ADJECTIVE-ADVERB-RELATE does not activate any IC linguistic core analysis attractors.

ADJECTIVE-ADVERB-RELATE is ready for a new use.

ADJECTIVE-VAGUE

ADJECTIVE-VAGUE is used by PowerRead to identify weak adjectives for topic-assignment purposes. Weak nouns that are premodified by an ADJECTIVE-VAGUE ADJECTIVE will not be made into topics.

ADJECTIVE-VAGUE is used by PowerIndex to identify weak adjectives for index-assignment purposes. Adjectives that are ADJECTIVE-VAGUE adjectives (weak adjectives) will not be included in the index.

Words that have the ADJECTIVE-VAGUE flag set include:

different, entire

TOPIC and INDEX assignments of WEAK NOUNS and ADJECTIVES

| ADJECTIVE | NOUN | TOPIC | INDEX |
|---|---|---|---|
| WEAK | WEAK | NO | NO |
| WEAK | STRONG | YES | YES |
| STRONG | STRONG | YES | YES |
| STRONG | WEAK | YES | YES |

The ADJECTIVE-VAGUE flag is also used as a cross-cutter that may be set on VERBS. This indicates that the -ed form and the -ing form of the verb when parsed as an ADJECTIVE is considered to be a WEAK ADJECTIVE by PowerIndex and PowerRead.

It was a corresponding problem that vexed him.

The resulting discovery was a bust.

She left him in an excited state.

If the verb does not have the -ed or -ing form as an entry in the lexicon it may be set on the base form of the word. If the -ed or the -ing form are present in the lexicon ADJECTIVE-VAGUE needs to be set on the -ed and/or -ing form, but should not be set on the base form.

ADJECTIVE-EVALUATIVE

ADJECTIVE-EVALUATIVE does not activate any IC linguistic core analysis attractors.

ADJECTIVE-EVALUATIVE is ready for application use.

ADJECTIVE-SUBJECTIVE MEASURE

ADJECTIVE-SUBJECTIVE MEASURE is available for application use.

ADJECTIVE-SUBJECTIVE MEASURE does not activate any IC linguistic core analysis attractors.

ADJECTIVE-SUBJECTIVE MEASURE is ready for a new use.

ADJECTIVE-OBJECTIVE MEASURE

ADJECTIVE-OBJECTIVE MEASURE is available for application use.

ADJECTIVE-OBJECTIVE MEASURE does not activate any IC linguistic core analysis attractors.

ADJECTIVE SEMANTIC FLAGS

ADJECTIVE-STATIVE

Stative adjectives can be defined as those that do not occur with the present progressive tense of stative intensive verbs.

He is being tall.
He is being short.

ADJECTIVES that are +AJECTIVE-STATIVE do not occur in the imperative.

Be tall!
Be short!

The adjective defaults in the system are set to +ADJECTIVE-STATIVE. If you do not set the ADJECTIVE-DYNAMIC flag, Griff will set the ADJECTIVE-STATIVE flag for you.

Most adjectives are +ADJECTIVE-STATIVE.

ADJECTIVE-STATIVE activates IC linguistic core analysis attractors.

ADJECTIVE-DYNAMIC

Words +ADJECTIVE-DYNAMIC can be used with the progressive tense.

He is being difficult.

Words +DYNAMIC-ADJECTIVE can be used with the imperative mood.

Be careful!

Dynamic adjectives are distinguished by their ability to be subjectively measured.

She is lovely.

Dynamic adjectives retain an inherent verbal component that the referent described can do an action based on the description ascribed.

He is enthusiastic. (He does something with enthusiasm.)

Dynamic adjectives can be easily changed into manner adverbs.

John is enthusiastic.
John acts enthusiastically.

Dynamic adjectives are often +ADJECTIVE-EMOTIVE or +ADJECTIVE-DENOMINAL.

John is being jealous today.
John is being political today.

Words that are +ADJECTIVE-DYNAMIC include:
 abusive, adorable, ambitious, brave, calm, careful, conceited, cruel, faithful, foolish, friendly, generous, greedy, impudent, irritable, jealous, kind, lenient, loyal, playful, political, reasonable, rude, stubborn, stupid, unfaithful, untidy, vulgar, and witty.

ADJECTIVE-DYNAMIC activates IC linguistic core analysis attractors.

ADJECTIVE-GRADABLE

Gradable adjectives can be intensified or modified by adverbs. If an adjective is +ADJECTIVE-POSITIVE, it is always +ADJECTIVE-GRADABLE.

The default setting for AJECTIVE is +ADJECTIVE-GRADABLE. Almost all ADJECTIVES that are +ADJECTIVE-DYNAMIC are +ADJECTIVE-GRADABLE.

The gradable/non-gradable question is not always clear. A word can be gradable or non-gradable depending on its use.

John is very British. (=acts British)
John is very British. (nationality)
**He arrives very daily.
It was a very daily newspaper (marginal)

ADJECTIVE-GRADABLE activates IC linguistic core analysis attractors.

ADJECTIVE-NON-GRADABLE

Words that are +ADJECTIVE-NON-GRADABLE cannot normally be modified by an intensive adverb or compared.

The class of technical denominal adjectives seems to be a frequent attractor of non-gradability.

It was very prussic acid.
She was a medical student.
**She was a very medical student.
?*It was a very medical report.
She was a very studious medical student.
She was a political student.
She was a very political student.

Possessive adjectives are not gradable.

ADJECTIVE-NON-GRADABLE activates IC linguistic core analysis attractors.

ADJECTIVE-INHERENT

ADJECTIVE-INHERENT describes the set of adjectives that directly describe or limit the nominal referent that is present in the noun phrase or clause.

ADJECTIVE-INHERENT is being set on the ADJECTIVE defaults.

He is an old friend. (ambigious,)
My friend is old. (inherent)
He is an old friend of mine. (non-inherent=We have been friends for a long time.)
He is an old friend of mine. (inherent=He is a friend who is advanced in years.)

ADJECTIVE-INHERENT activates IC linguistic core analysis attractors.

ADJECTIVE-NON-INHERENT

ADJECTIVE-NON-INHERENT describes the set of adjectives that does not directly describe or limit the nominal referent that is present in the noun phrase or clause. ADJECTIVE-NON-HNHERENT describes or limits a concecpt that is understood but not actually present in the utterance.

I have a new book. (The book is new. "New" is inherent.)
I have a new friend. (The friend is not new—presumeably, but our friendship is. "New" is non-inherent.)

It is possible for an ADJECTIVE to be be both +ADJECTIVE INHERENT and +ADJECTIVE-NON-INHERENT. It depends on the context and the referent the adjective is modifying.

ADJECTIVE-NON-INHERENT does activate IC linguistic core analysis attractors.

ADVERB SYNTAX MISC. FLAGS

ADVERB-NEGATIVE

The ADVERB-NEGATIVE is set on adverbs that can cause an inversion when occuring in the initial position. Words that are +ADVERB-NEGATIVE also tend to be +ADVERB-NON-ASSERTIVE. Words that are +ADVERB-NEGATIVE may be negative in meaning but not negative in appearance.

Words that are +ADVERB-NEGATIVE include:
 never, slightly, merely, little, barely, scarcely ever, almost, not even, ne'er, rarely ever, no sooner, rarely, hardly, a little, wrongly, scarcely, excluding, and nor, but nor, seldom, nevermore, not only, not until, simply, just about, and nor.

Words like (seldom, rarely, scarcely, hardly, little, few, only, barely) negatives for the following:

1. They tend to be followed by the non-assertive form.
I seldom get any raises.
I hardly speak to anyone.
Only two of us linguists have any ability.
2. They can cause subject-operator inversion.
Rarely does he think about costs.
Scarcely ever has the expensise account been so decimated.
Little care I that the company is in the red.
(These are literary uses but correct.)
3. They are used with positive tag questions, not negative tags.
He seldom comes to work, does he?
**He seldom comes to work, doesn't he?
Note: Positive tags go with negative sentences. Negative tags go with positive sentences.

ADVERB-NEGATIVE is set on the CONJUNCTION "nor" to identify it for PowerEdit.

ADVERB-NEGATIVE activates IC linguistic core analysis attractors.

In the system there are various ways of indicating negation. The VERB-NEGATIVE flag:
  is set on verb phrasals with modals such as:
    cannot, is not, and would not.
  is set on verbs with a negative meaning such as:
    doubt, forget.
The ADVERB part of speech has two flags indicating negative:
  1. ADVERB-NEGATIVE, which signals that inversions are ok.
  Set on adverbs such as:
    little, hardly, scarcely, barely, never, nor
  2. ADVERB-NEGATIVE FORM, which is set on the n-words even if they are not adverbs such as:
    not, never, neither, nor, nowhere
The PRONOUN-NEGATIVE flag, which is set on:
  nothing, none, no one, nobody, neither
The ADJECTIVE-NEGATIVE flag set on words such as:
  no, words with the prefix -un; -im; -dis -il, or other negative morphemes.
The PREP-NEGATIVE flag which only works for the distinction with/without.

These different settings are used to capture double negatives:
  We cannot watch and do nothing.
  (two negatives in the same sentence give a positive meaning, if they are in the same clause)
  Each clause can have one negative phrase without tripping the double negative wire.
  If John will not eat his broccoli, then mom will not offer him any cake.

ADVERB-NEGATIVE FORM

The ADVERB-NEGATIVE FORM flag is set on adverbs that are negative in form. The ADVERB-NEGATIVE: FORM flag does not cause inversions.

Words that are +ADVERB-NEGATIVE FORM include:
  no, neither, nor, never, unexpectedly, nope, unwillingly, in a pig's eye, scarcely ever, not even, ne'er, no more, nay, unjustly, unclearly, nowhere, no sooner, not to mention, neither, not unnaturally, nowise, naught, and nor, not far from where, but nor, unintentionally, nevermore, no longer, not only, not until, con, by no means, noway, no doubt, not, unreasonably, incorrectly, nor.

The class of +ADVERB-NEGATIVE FORM words is essentially an open one as negative prefixes can be attatched to adverbs.

ADVERB-NEGATIVE FORM is an light crosscutter to identify words that are negative in meaning.

ADVERB-NEGATIVE FORM activates IC linguistic core analysis attractors.

ADVERB-ASSERTIVE

The ADVERB-ASSERTIVE identifies a closed set of adverbs which have a close relationship to the assertive pronouns. An ADVERB that is +ADVERB-ASSERTIVE does not occur after "not" or VERB-NEGATIVE words in some environments.
  **We have not eaten somewhere.
  We have eaten somewhere.
Words that are +ADVERB-ASSERTIVE include:
  somehow, somewhere, someplace, sometime, sometimes, already, still, somewhat, too.

ADVERB-ASSERTIVE activates IC linguistic core analysis attractors.

ADVERB-NON-ASSERTIVE

The ADVERB-NON-ASSERTIVE identifies a closed set of adverbs which have a close relationship to the non-assertive pronouns. An ADVERB that is +ADVERB-NON-ASSERTIVE is usually used after a negative verb phrase.
  We have not eaten anywhere today.
  **We have eaten anywhere today.
Words that are +ADVERB-NON-ASSERTIVE include:
  ever, anywhere, either, anyplace, anytime, any more, yet, in the slightest, any, any longer, at all, but yet.

The ADVERB-NON-ASSERTIVE flag is also set on the non-assertive pronouns:
  any, anywhere, anyplace, ever, any more, at all.

ADVERB-NON-ASSERTIVE activates IC linguistic core analysis attractors.

ADVERB-DERIVED LY

ADVERB-DERIVED LY is available for application use.

ADVERB-DERIVED LY does not activate any IC linguistic core analysis attractors.

ADVERB-DERIVED LY is ready for a new use.

ADVERB-DERIVED LY is not set on any word in the lexicon.

ADVERB-GRADABLE

Adverbs that are +ADVERB-GRADABLE can be intensified by "very," compared, and have degree comparison (more or less regularly). The default setting for ADVERB is +ADVERB-GRADABLE.

Assume an adverb is +ADVERB-GRADABLE until proven elsewise.

Gradability varies depending on what is used to modify and compare.
  I. "How" as a premodifier class.
  2. "However" as a premodifier class.
  3. "More than" as a premodifier class.
  4. "Very" as a premodifier class.
  5. "More/less/; most/least" as a premodifier class.
  6. Intensifying Averbs as a premodifier class.

New systems need to be able to distinguish between these five classes of gradability for adverbs. Presently, only "very" is tested for gradability as a premodifier class.

ADVERB-GRADABLE activates IC linguistic core analysis attractors.

ADVERB-NON-GRADABLE

The ADVERB-NON-GRADABLE flag will not allow an ADVERB to be intensified by "very" or words set with the VERY.

Words that are two parts of speech (such as "just") may have different gradable/non-gradable characteristics.

"Just" as a focus adjunct is not gradable.

"Just" as an adjective is gradable.

The +ADVERB-NON-GRADABLE and the +ADJECTIVE-GRADABLE distinction helps Griff decide what part of speech "just" can be.

He is a very just man. ("Just"=ADJECTIVE)

ADVERB-NON-GRADABLE activates IC linguistic core analysis attractors.

ADVERB-EXPLETIVE THERE

The ADVERB-EXPLETIVE THERE flag allows Griff to change an ADVERB into a PRONOUN when a +ADVERB-EXPLETIVE THERE word occurs sentence initial.

Now is the time to attack.

There is a man on the street.

Words and phrases that are +ADVERB-EXPLETIVE THERE include:

right now, then there, there, along there, here, toward there, around here, near home, at home, now and then, right there, towards here, around here, even here, towards there, now, along here, toward here.

Words that are +ADVERB-EXPLETIVE THERE also need to be +NOMINATIVE-CASE.

The ADVERB-EXPLETIVE THERE can cause a word to be analyzed as a PRONOUN part of speech even if the PRONOUN part of speech is not set. The following example with two flags incorrectly set will illustrate the point.

If the ADVERB-EXPLETIVE THERE flag is incorrectly placed on "room," and the ADJECTIVE flag (incorrectly) is not set on "hotel," then "rooms" can be analyzed as a PRONOUN.

"News Corp., based in Sydney Austrilia, said only a fraction of hotel (COMMON NOUN) rooms (PRONOUN or COMMON NOUN) are booked electronically through automated systems provided to travel agents by airlines."

When "hotel" is +ADJECTIVE and "room" is −ADVERB-EXPLETIVE THERE, then "hotel" is analyzed as an adjective and "rooms" is analyzed as a COMMON NOUN.

ADVERB-EXPLETIVE THERE is not available for use as a crosscutter.

ADVERB-EXPLETEIVE THERE activates IC linguistic core analysis attractors.

ADVERB-PARTICLE

The ADVERB-PARTICLE flag is a crosscutting flag that is set on CONJUNCTIONS to force singular Concord in conjoined noun phrases. In this sense it functions much in the same way as the ADJECTIVE-UNIFIER flag.

ADVERB-PARTICLE sets apart a class of conjunctions that are strong exceptions to the basic rule that a subject of two or more words connected by "and" becomes a plural subject and needs plural concord.

Words that are +ADVERB-PARTICLE include:

and then, and so, and also, but also, and perhaps.

Not only a good grammar needs to be written, but also a marketing plan should be developed.

Not only John, but also Mary was a good sport about this.

Bob, and perhaps Bill, is a good quarterback.

Bob, and also Bill, is failing math.

Not only the man but also the woman is large.

** Not only the man but also the woman are large.

ADVERB-PARTICLE is a crosscutter that works with CONJUNCTIONS. The ADVERB part of speech flag is not set on words in the class.

ADVERB-PARTICLE is also set on adverbial phrases (such as kind of, sort of, and type of) to force singular concord.

ADVERB-PARTICLE activates IC linguistic core analysis attractors.

ADVERB-RELATIVE

The ADVERB-RELATIVE flag allows an ADVERB to take a relative clause.

ADVERB-RELATIVE is only set on relative pronouns and conjunctions (mostly wh- conjunctions) that Griff also needs to set as an adverbial.

ADVERB-RELATIVE is a minor crosscutter that is set on:

where, which, and on all phrases based on "which" including:
of which, in which, by which, for which, to which, with which, from which, at which, during which, on which Words that are +ADVERB-RELATIVE include:

under which, anywhere, how few, where, ago when, how many, at a time when, when and where, when, even where, at the time when, apart from when, at which time, not far from where, from whence, either before or after, why, how, which; only when, at which place, to the place at which.

ADVERB-RELATIVE is used by PowerEdit Index.

ADVERB-RELATIVE activates IC linguistic core analysis attractors.

ADVERB-INTERROGATIVE

The ADVERB-INTERROGATIVE flag identifies a class of adverbs that overlaps with words that are +PRONOUN-INTERROGATIVE.

Words that are +ADVERB-INTERROGATIVE include:

where, when, why, how, even where, from whence, apart from when, at which time, not far from where, at which place.

ADVERB-INTERROGATIVE is used by PowerEdit Index.

ADVERG-INTERROGATIVE activates IC linguistic core analysis attractors.

ADVERB-ALTERNATIVE

ADVERB-ALTERNATIVE is available for application use.

ADVERB-ALTERNATIVE does not activate any IC linguistic core analysis attractors.

ADVERB-ALTERNATIVE is ready for a new use.

ADVERB-ALTERNATIVE is not set on any word in the lexicon.

ADVERB-CONNECTION

ADVERB-CONNECTION is available for application use.

ADVERB-CONNECTION does not activate any IC linguistic core analysis attractors.

ADVERB-CONNECTION is not set on any word in the lexicon.

ADVERB-SHIFTED ADJ

The ADVERB-SHIFTED ADJ flag allows an ADVERB to function only as a postmodifying ADVERB.

The ADVERB-SHIFTED ADJ flag weights the part of speech decision to ADJECTIVE when a +ADVERB-SHIFTED ADJ word occurs as a premodifier.

Words that are +ADVERB-SHIFTED ADJ include:

hard, deep, early, fast, long, quick, fresh, slow, fair, right, short, slow, and wide.

To strengthen the force of postmodification the ADJUNCT-INTENSIFIER (which states that the adverb cannot premodify a VERB) flag can be set.

** He hard played.

He played hard. 6-26-91.

The ADVERB-SHIFTED ADJ flag and the ADJUNCT-INTENSIFIER flag used together are a powerful team which impact the analysis of words that are both ADJECTIVE and ADVERB.

\*\*The clock slow ran.

When ADVERB-SHIFTED ADJ and ADJUNCT-INTENSIFIER are not set on "slow," Griff analyzes "slow" as +ADVERB.

When ADVERB-SHIFTED ADJ and ADJUNCT-INTENSIFIER are set on "slow," Griff analyzes "slow" as being +ADJECTIVE.

ADVERB-SHIFTED ADJ activates IC linguistic core analysis attractors.

ADVERB SYNTAX INFLECTED FLAGS

Comparison refers to:

1. The use of the inflected forms positive, comparitive, and superlative.
2. the periphrastic use of "more/most" and "less/least."
3. the periphrastic use of "as (adverb) as."

Intensification refers to adding strength or emphasis to the word.

Intensification can be accomplished by:

1. Using the class of adverbs such as "very."
2. Using the class of intensifying adverbs:
   ADJUNCT-EMPHASIZER
   ADJUNCT-MAXIMIZER
   ADJUNCT-BOOSTER
3. Using the class of downtoning adverbs:
   ADJUNCT-DOWNTONER
   ADJUNCT-COMPROMISER
   ADJUNCT-DIMINISHER
   ADJUNCT-MINIMIZER
   ADJUNCT-APPROXIMATOR

ADVERB-POSITIVE

The ADVERB-POSITIVE flag identifies ADVERBS that can be compared by the comparative or superlative suffix.

Most words that are +ADVERB-POSITIVE are also +ADJECTIVE.

ADVERB-POSITIVE does not independently activate IC linguistic core analysis attractors.

ADVERB-COMPARATIVE

Words that are +ADVERB-COMPARATIVE can accept the "-er" comparative suffix.

Words that are +ADVERB-COMPARATIVE are also +ADVERB-GRADABLE.

ADVERB-COMPARATIVE activates IC linguistic core analysis attractors.

ADVERB-SUPERLATIVE

Words that are +ADVERB-SUPERLATIVE can accept the "-est" superlative suffix.

ADVERB-SUPERLATIVE activates IC linguistic core analysis attractors.

ADVERB-COMPARISON

The ADVERB-COMPARISON flag is used to identify the comparative adverbs such as:

like, as either, as, less, in the same way that.

ADVERB-DEGREE

ADVERB-DEGREE is avilable for application use.

ADVERB-DEGREE does not activate any IC linguistic core analysis attractors.

ADVERB SYNTAX MODIFIER FLAGS

The ADVERB SYNTAX MODIFIER FLAGS are special function flags that expand an adverbs capabilities to premodify words that normally it would not be allowed to premodify.

ADVERB-MODIFIES VERB/ADJECTIVE

The ADVERB-MODIFIES VERB/ADJECTIVE gives a boost to adverbs that require a proclivity to premodify ADJECTIVES and VERBS.

He was a really extraordinary linguist.

There was a rather large problem in the program.

ADVERB-MODIFIES VERB/ADJECTIVE activates IC linguistic core analysis attractors.

ADVERB-MODIFIES ADVERB/ADJECTIVE

The ADVERB-MODIFIES ADVERB/ADJECTIVE identifies adverbs that cannot easily premodify VERBS unless there is an intervening ADJECTIVE or ADVERB.

It gives a boost to ADVERBS that can modify other adverbs and adjectives.

It is set on words including:

little, exactly as, as either, just, that, so far, just as, very, no, such, so, that even.

\*He very played the ball.

He very quietly played the ball.

He just recently arrived.

He was a quietly expressive man.

ADVERB-MODIFIES ADVERB/ADJECTIVE does not independently activate IC linguistic core analysis attractors.

ADVERB-MODIFIES PREPOSITIONAL PHRASE

ADVERB-MODIFIES PREPOSITIONAL PHRASE is available for application use.

It was originally indended to allow some intensifying adverbs to modify prepositional phrases.

His car went right through the window.

He is dead against the marriage.

He made his application well within the deadline.

This would be a useful setting for ambiguity only.

His car went right (direction) through the window.

His car went right(intensifying) through the window.

ADVERB-MODIFIES PREPOSITIONAL PHRASE does not activate any linguistic core analysis attractors.

ADVERB-MODIFIES DETERMINER SYSTEM

The ADVERB-MODIFIES DETERMINER SYSTEM empowers adverbs to premodify the determiner system. This determiner system includes:

determiners, predeterminers; indefinite pronouns; and the cardinal numbers.

Almost everybody came to the linguistic seminar.

Well, nearly everybody came to the linguistic seminar.

They found about half of the information useful.

Well, about roughly half was useful.

Maybe just the first part was useful.

ADVERB-MODIFIES DETERMINER SYSTEM activates IC linguistic core analysis attracctors.

ADVERB-MODIFIES DETERMINER SYSTEM will bypass the PowerEdit "FOCUSING ADVERBS" message.

ADVERB-MODIFIES NOUN PHRASE

ADVERB-MODIFIES NOUN PHRASE identifies the (mainly) intensifying adverbs that can premodify a noun phrase for PowerEdit.

ADVERB-MODIFIES NOUN PHRASE allows ADJUNCT-TIME adverbs to postmodify noun phrases.

Words that are +ADVERB-MODIFIES NOUN PHRASE include:

quite, such, rather.

ADVERB-MODIFIES NOUN PHRASE does not independently activate IC linguistic core analysis attractors.

ADVERB-PREPOSITIONAL COMPLEMENT

ADVERB-PREPOSITIONAL COMPLEMENT is available for application use. It originally was to allow an ADVERB to function as the complement of a preposition. It was to be set on adjuncts of time and place.

He came from downstairs.

He came up from below.

He has been here since yesterday.

ADVERB-PREPOSITIONAL COMPLEMENT was discontinued because most words that would have this flag set were phrased.

ADVERB-PREPOSITIONAL COMPLEMENT does not activate any IC linguistic core analysis attractors.

ADVERB GRAMMAR ADJUNCT MISC FLAGS

ADVERB-ADJUNCT

ADVERB-ADJUNCTS are characterized by the following general criteria: (These characteristics taken from GCE pp.421–426)

They are integrated into the clause structure and cannot be set off from its clause by commas, especially, in a negative declarative clause.

\*\*Quickly (ADJUNCT) they did not leave for the ranch.

Actually, (DISJUNCT) they did leave for the ranch.

Actually. (DISJUNCT) they did not leave for the ranch.

Consequently, (CONJUNCT) they did not leave for the ranch.

ADVERB-ADJUNCTS are descriptive adverbs. ADVERB-ADJUNCTS contribute descriptions of time, space, emphasis, understatement, manner, means, instrumentality, process, and viewpoint.

ADVERB-DISJUNCTS are evaluative adverbs. They evaluate style, form, content and attitude.

ADVERB-CONJUNCTS are connective adverbs. They supply logical and temporal connection between clauses.

ADVERB-ADJUNCTS also have a connective function, but only within clauses.

ADVERB-ADJUNCTS as a class can accept comparison and intensification.

ADVERB-CONJUNCTS as a class cannot accept comparison and intensification.

ADVERB-ADJUNCTS can be contrasted with one another in alternative negation.

Did he split the infinitive inside (ADJUNCT), or did he split it outside (ADJUNCT)?

Are they going upstream (ADJUNCT), or are they going downstream (ADJUNCT)?

ADVERB-DISJUNCTS and ADVERB-CONJUNCTS cannot be contrasted with one another in alternative negation.

Did he argue allegedly (DISJUNCT), or did he agrue supposedly (DISJUNCT)?

Did he come here namely (CONJUNCT), or did he come here therefore (CONJUNCT)?

Words that are +ADVERB-ADJUNCT can also be +ADVERB-DISJUNCT and +ADVERB-CONJUNCT.

Most words that are +ADVERB-DISJUNCT can also be +ADJUNCT-MANNER.

He did not speak amusingly,(ADJUNCT-MANNER) but he did speak strangely (ADJUNCT-MANNER).

Strangely (DISJUNCT), he did not speak.

Amusingly (DISJUNCT), he did not speak.

The ADVERB-ADJUNCT flag activates all of the syntactic characteristics which are common to the entire class of adjuncts.

The exceptions and peculariaities to each subclass and individual adjunct are activated by those specific flags.

The ADVERB default for words ending in -ly is:

+ADVERB

+ADJUNCT

+PROCESS

+MANNER

+GRADABLE

Other less diagnostic features of ADVERB-ADJUNCTS are:

ADVERB-ADJUNCTS can be the focus of a cleft sentence.

It was when the linguist split the infinitive that she lost her job.

ADVERB-ADJUNCTS can be the focus of clause comparison:

She writes more artfully than he does.

ADVERB-ADJUNCTS can be premodified by "however."

However elequently you speak, you still make no sense.

ADVERB-ADJUNCTS can be premodified by "how."

How late can she be?

ADVERB-ADJUNCTS can be be premodified by "so."

So deftly did she split that infinitive that she kept her job.

The ADVERB-ADJUNCT flag activates IC linguistic core analysis attractors.

ADJUNCT-VIEWPOINT

Viewpoint adjuncts can be recognized by this test:

They can be paraphrased by: an (adjective) point of view.

She was very active politically.

From a political point of view, she was very active.

Viewpoint adjuncts are almost disjuncts and have some points of syntactic similarity (they require a comma afterwards when occur sentence initial) but they differ in basic orientation. ADVERB-DISJUNCTS are heavy evaluative adverbs while ADJUNCT-VIEWPOINT words are more descriptive of a perspective rather than an evaluation.

Every area of study or discipline has its own corresponding viewpoint adjunct.

Theology/Theologically.

Politics/Politically.

Science/Scientifically.

Concepts that represent a way of looking at things or provide a perspective also have a corresponding viewpoint adjuct.

Visual/Visually

Intrinsic/Intrinsically.

Most adverbs that are +ADJUNCT-VIEWPOINT are "-ly" ADVERBS derived from a noun or adjective.

Visually, it was a complex screen.

Politically, he is a red.

Linguistically, a split infinitive is no big deal.

Militarily, it was a great victory.

Philosophically, it was a strategic defeat.

Viewpoint adjuncts can also be derived from a "-wise/wize" suffix.

Weatherwize, linguistic-wize, computerwise.

But these "-wize" words are informal and should have the PHRASE-INFORMAL flag set, or some other phrase flag set, since they have a aura of "show biz" about them.

Many words that are +ADJUNCT-VIEWPOINT are also +PHRASE-ORIENTER, since they are often used to set topics or change them.

Pure Viewpoint adverbs are non-gradable. They cannot be intensified, or compared.

Very Militarily, it was a great victory.

If a word is +ADJUNCT-VIEWPOINT and +ADJUNCT-PROCESS it should also be +ADVERB-GRADABLE.

He did that very philosophically.

Philosophically, she was quite astute.

+ADJUNCT-VIEWPOINT adverbs can premodify adjectives.

it was the linguistically correct decision—for once.

ADJUNCT-VIEWPOINT adverbs favor the sentence initial position.

ADJUNCT-VIEWPOINT adverbs can be used for light disjuncts since they are so similar in syntax.

ADJUNCT-VIEWPOINT adverbs that are also +ADJUNCT-PROCESS should be allowed to be modified in the end position but not when the word occurs sentence initial.

ADJUNCT-VIEWPOINT adverbs have a corresponding participle clause:

Visually/Visually speaking.

Visually, it was a great movie.

Visually speaking, it was a great movie.

ADJUNCT-VIEWPOINT adverbs often have a corresponding prepositional phrase:

From an (adjective) point of view.

Visually, it was a great movie.

From a visual point of view, it was a great movie.

The ADJUNCT-VIEWPOINT flag does not independently activate IC linguistic core analysis attractors.

ADJUNCT-VIEWPOINT is used by PowerEdit Index.

ADJUNCT-FORMULAIC

ADJUNCT-FORMULAIC adverbs adjuncts are used as indicators of courtesy.

Words that are +ADJUNCT-FORMULAIC include:

kindly, cordially, graciously, humbly, please.

Will you kindly sit down please.

We graciously agreed to fix your bugs.

We humbly spoke to the cheering multitudes.

Most +ADJUNCT-FORMULAIC adverbs are also +ADJUNCT-PROCESS. When a +ADJUNCT-FORMULAIC +ADJUNCT-PROCESS adverb occurs in the "before verb" position, it is probably being used as a formulaic adverb. When it occurs in any one of the "end positions," it is probably being used as a process adverb.

ADJUNCT-FORMULAIC does not independently activate IC linguistic core analysis attractors.

ADJUNCT-FORMULAIC is used by PowerEdit Index.

ADVERB GRAMMAR ADJUNCT FOCUS FLAGS (The following descriptions from GCE p.431–438)

Focusing adjuncts as a subclass differ syntactically from other adjuncts.

They usually cannot be the focus of other focusing adjuncts.

**John exclusively only phoned the office.

They cannot be the focus of a cleft sentence.

**It was exclusively John who phoned the office.

They cannot be the focus of a comparison.

**John wrote the article more exclusively for the paper.

They cannot be premodified by "however" to form an initial adverbial clause.

**However exclusively you write about it, the paper will not publish it.

They cannot be premodified by "how" when "how" is functioning as an intensifying word introducing a question or exclamation.

**How only does he play that cord?

**How exclusively he writes!

They cannot be coordinated.

**He only and exclusively wrote the story.

("Purely and simply is an exception. It is +PHRASE-DYAD in the lexicon.)

The cannot be modified by an adverb that an INTENSIVE adverb.

**John very exclusively wrote the review.

**John entirely only wrote the review.

**John severely specifically wrote the review.

ADJUNCT-FOCUSING

ADJUNCT-FOCUSING adverbs form a subclass of adjuncts that place a "focus" (spotlight) on what they modify. The focus can be limited or expanded.

Only (+ADJUNCT-LIMITING EXCLUSIVE) John could split an infinitive with such deft precision.

It was primarily (+ADJUNCT-LIMITING-PARTICULAR) John who could split an infinitive with such deft precision.

John also (+ADJUNCT-ADDITIVE) could spilt an infinitive with such deft precision.

The ADJUNCT-FOCUSING flag must be set on all focusing adjuncts whether LIMITING or ADDITIVE. ADJUNCT-FOCUSING indicates that the adverb is in the subclass of focusing adjuncts.

Pure focusing adjuncts such as: "as well," "mainly," and "solely," are +ADVERB-NON-GRADABLE.

Words can +ADVERB-NON-GRADABLE and +ADJUNCT-FOCUSING but +ADJECTIVE-GRADABLE ("just" and "even").

He is a just man.

He is a very just man.

** He very just hit the jackpot.

ADJUNCT-FOCUSING does activate IC linguistic core analysis attractors.

(The following is from GCE pp.433–434.)

Focus adjuncts are extremely mobile and can occur in virtually any position. For this reason, ADJUNCT-FOCUSING adverbs can be excessivly ambiguous. To eliminate as much ambiguity as possible the +ADJUNCT-FOCUSING adverb should occur directly before the word they are highlighting.

The most ambiguous position is between subject and verb.

John only phoned Mary today.

This sentence Is subject to multiple interpretations.

John only phoned Mary today.

Nobody but John phoned Mary.

John only phoned Mary today

John phoned Mary today, but he did nothing else.

ADJUNCT-FROM PRESENT POINT

The ADJUNCT-FROM PRESENT POINT flag denotes a span of time which needs an orientation. ADJUNCT-FROM PRESENT POINT adverbs indicate time from some preceeding point (during a recent period, or from some definite or indefinite point in the past) in time.

Words that are +ADJUNCT-FROM PRESENT POINT include:

lately, recently, since.

Examples of the use the ADJUNCT-FROM PRESENT POINT flag:

I have been recently writing documentation.

I split two infinitives yesterday and KW has not spoken to me since.

I have not seen him lately.

The ADJUNCT-FROM PRESENT POINT does not independently activate IC linguistic core analysis attractors.

ADJUNCT-TIME LENGTH

ADJUNCT-TIME LENGTH adverbs denote a time span whose beginning and end are of no relevance. ADJUNCT-TIME LENGTH adverbs usually refer to a span of time that is indefinite.

ADJUNCT-TIME LENGTH adverbs can serve as a response to a "How long" question.

How long have you been here? Always.

How long have you been here? Briefly.

How long will it take? Awhile.

Words that are +ADJUNCT-TIME LENGTH include:

always, awhile, briefly, indefinitely, momentarily, permanently, temporarily, enduringly, lastingly, provisionally, transitorily, perpetually, perennially.

The programmer is temporarily out of work.

The programmer briefly had the system working.

The programmer momentarily created a viable screen.

The ADJUNCT-TIME LENGTH flag does not independently activate IC linguistic core analysis attractors.

ADJUNCT-DURATION

The ADJUNCT-DURATION flag denotes a length of time which can be a time continuance relationship or a span of time. If "time when" can be represented by a "point," than "time duration" be represented by a "line."

The ADJUNCT-DURATION flag should be set on words that are +ADJUNCT-TIME LENGTH and/or +ADJUNCT-FROM PRESENT POINT.

The ADJUNCT-DURATION flag does not independently activate IC linguistic core analysis attractors.

The ADJUNCT-DURATION flag is used with other ADVERB flags as an identificational crosscutter for PowerEdit.

A "manner/duration" ADVERB is:
+ADJUNCT-PROCESS
+ADJUNCT-MANNER
+ADJUNCT-DURATION Manner duration adverb examples are:
He is writing slowly.
She stopped talking suddenly.
The programmers lost control gradually.

+VERB-TENSE-REPORTED allows an ADJUNCT-TIME BOUNDARY adverb to co-occur with the past perfect tense.

The ADJUNCT-TIME, BOUNDARY flag does activates IC core analysis attractors.

ADJUNCT-TIME BOUNDARY is used as an identificational crosscutter for PowerRead. ADJUNCT-TIME BOUNDARY is set on:

completion, start, finish, end, inception.

ADJUNCT-TIME BOUNDARY

The ADJUNCT-TIME BOUNDARY flag describes "time-when" relationships as if time was not a fixed definite location, but a relative position which acquires its meaning from its orientation.

ADJUNCT-TIME BOUNDARY denotes a "point" of time but the "point" measured or located from another fixed (explicit or implicit) "point/period" of time.

Pure ADJUNCT-TIME BOUNDARY adverbs have a sense of incompleteness if they are not logically attatched to another period of time. The feeling of incompleteness is increased if the ADJUNCT-TIME adverb is also a PREPOSITION or CONJUNCTION.

** He is later.

He is later than he ususally is.

?* I did not recognize him before.

I did not recognize him before his operation.

Words that are +ADJUNCT-TIME BOUNDARY include:

afterwards, before, earlier, eventually, finally, first, formerly, immediately, initially, instantly, just, last, lately, later, momentarily, next, once, originally, previously, presently, recently, shortly, since, soon, subsequently, then.

Examples of the use of ADJUNCT-TIME BOUNDARY words:

I will return shortly.

I recently discovered a bug in the program.

Take a drink and then take another one.

I did not recognize him before.

ADJUNCT-TIME BOUNDARY adverbs are tense sensitive. When they are set up, VERB TENSE FLAGS have to be set to indicate what tenses they can occur with.

+VERB-PRESENT HABITUAL indicates ADJUNCT-TIME BOUNDARY adverb can co-occur with the present tense.

+VERB-FUTURE TIME allows an ADJUNCT-TIME BOUNDARY to co-occur with future time.

+VERB-HISTORIC PRESENT allows an ADJUNCT-TIME BOUNDARY to co-occur with the present perfect.

+VERB-PAST HABITUAL allows an ADJUNCT-TIME BOUNDARY adverb to co-occur with the simple past tense.

The ADJUNCT-POINT OF TIME flag does not independently activate IC linguistic core analysis attractors.

TIME WHEN ADVERBIAL FLAGS

TIME WHEN ADVERBIALS can be +ADJUNCT-POINT OF TIME and +ADJUNCT-TIME BOUNDARY: "presently."

ADJUNCT-POINT OF TIME

ADJUNCT-POINT OF TIME adverbs describe "time-when" relationships that denote a "point" of time. These "points" of time are dealt with much the same way as "place/position" words.

Words that are +ADJUNCT-POINT OF TIME include:

again, early, just, late, now, nowadays, presently, simultaneously, then, today, tonight, yesterday.

I will visit you again.

I will visit you on (position) another occasion.

I arrived early for the meeting.

I arrived at (position) an early time.

I just arrived this morning.

I at (position) this present moment arrived.

I will go home now.

I will go home at (position) this present moment.

I will not be at home today.

I will not be at home at (position) a defined time (today).

ADJUNCT-POINT OF TIME adverbs are tense sensitive. When they are set up, VERB TENSE FLAGS have to be set to indicate what tenses they can occur with.

+VERB-PRESENT HABITUAL indicates ADJUNCT-POINT OF TIME adverb can co-occur with the present tense.

+VERB-FUTURE TIME allows an ADJUNCT-POINT OF TIME to co-occur with future time.

+VERB-HISTORIC PRESENT allows an ADJUNCT-POINT OF TIME to co-occur with the present perfect.

+VERB-PAST HABITUAL allows an ADJUNCT-POINT OF TIME adverb to co-occur with the simple past tense.

+VERB-TENSE-REPORTED allows an ADJUNCT-POINT OF TIME adverb to co-occur with the past perfect tense.

"Again" is +ADJUNCT-POINT OF TIME.
You should see us again. (on another occasion)
"Again is +ADJUNCT-FREQUENCY.
He hit him again. (one more time)

A word can be +ADJUNCT-TIME and not have any other ADJUNCT TEMPORAL FLAG set if the adverb does not fit well into any of the subcategories.

The ADJUNCT-TIME flag activates IC linguistic core analysis attractors.

ADJUNCT-TIME is used by PowerEdit Indexes.

ADVERB GRAMMAR ADJUNCT TEMPORAL FLAGS

ADJUNCT-TIME

ADJUNCT-TIME adverbs describe time relationships.

ADJUNCT-TIME adverbs can be grouped into four subclasses:

PUNCTILLIAR TEMPORAL FLAGS:
   ADJUNCT-POINT OF TIME
   ADJUNCT-TIME BOUNDARY
DURATION TEMPORAL FLAGS:
   ADJUNCT-DURATION
   ADJUNCT-TIME LENGTH
   ADJUNCT-FROM PRESENT POINT
DEFINITE FREQUENCY TEMPORAL FLAGS:
   ADJUNCT-FREQUENCY
   ADJUNCT-PERIOD TIME
   ADJUNCT-NUMBER TIME
INDEFINITE FREQUENCY TEMPORAL FLAGS:
   ADJUNCT-USUAL OCCURANCE
   ADJUNCT-CONTINUAL OCCURANCE
   ADJUNCT-HIGH OCCURANCE
   ADJUNCT-LOW OCCURANCE
   ADJUNCT-ZERO OCCURANCE
TEMPORAL RELATIONSHIP
   ADJUNCT-RELATIONAL
   ADJUNCT-TIME adverbs tend to function as transitional words.

The ADJUNCT-TIME flag is the generic ADJUNCT TEMPORAL FLAG CLASS indicator. A word that has an ADJUNCT TEMPORAL FLAG set needs to be +ADJUNCT-TIME.

ADJUNCT-TIME is the strongest adverb temporal flag and activates the most IC linguistic core analysis attractors.

If a +ADJUNCT-TIME adverb is also +COMMON NOUN the COMMON NOUN-TIME flag also needs to be set.

ADJUNCT-TIME adverbs can belong to more than one subclass.

ADJUNCT-DIRECTION

ADJUNCT-DIRECTION adverbs have an intrinsic "direction-to" or a "direction-from" movement concept.

Words that are +ADJUNCT-DIRECTION and −ADJUNCT-POSITION include:
   after, along, aside, before, by, downwards, downward, inwards, outwards, over, past, round, sideways, skyward.

ADJUNCT-DIRECTION does not independently activate IC core analysis attractors.

ADJUNCT-POSITION

ADJUNCT-POSITION adverbs adjuncts indicate the "location at" concept. They can be be used with stative extensive verbs, dynamic verbs, and stative intensive verbs (primarily "be")

I have the key here.
They grow well locally.
The book is west of here.
Examples of ADJUNCT-POSITION adverb usage:
All our men are aboard.
The problem with the computer is upstairs.
He is always underfoot.
The head is forward of the mess.

Wh-questions attract ADJUNCT-POSITION adverbs as a response to a "where" question.
Where is he going? Outside.
Where is she staying? Locally.

Words that are ADJUNCT-POSITION adverbs do not usually co-occur with the progressive tense.
**They are being west.
** They are being underfoot.
** They are being upstairs.

The ADJUNCT-POSITION flag activates IC linguistic core analysis attractors.
**He ran so locally that he blew his lead.
** However downstairs you may appear, you still reek of nobility.
** How upstream is the good fishing?
How far upstream is the good fishing?

ADJUNCT-PLACE does not independently activate IC linguistic core analysis attractors.

ADVERB GRAMMAR ADJUNCT LOCATION FLAGS

ADJUNCT-PLACE

ADJUNCT-PLACE describes a generic indication of place and identifies the subclass of location adjuncts. Most words that are +ADJUNCT-PLACE are also +ADJUNCT-POSITION and +ADJUNCT-DIRECTION.

Words that are +ADJUNCT-PLACE include:
   aboard, about, above, abroad, across, ahead alongside, anywhere, around , downstream, inside, locally, near, ovrseas, somewhere, there, west, within, where.

We went downstream to take a look.
The boat pulled up alongside.
could not find it anywhere.
We could not buy it locally.

"Far" is identified specially for PowerEdit as being:
−ADJUNCT-PLACE
+ADJUNCT-POSITION "Away" is identified specially for PowerEdit. It is:
−ADJUNCT-PLACE
+ADJUNCT-POSITION
+ADJUNCT-DIRECTION ADJUNCT-PLACE does not activate any IC linguistic core analysis attractors.

ADJUNCT-DIRECTION adverbs do not precede clausal negation except in a literary style with verbs of motion.
**Upstream he did not go.
He did not go upstream.
** Eastward he did not go.
He did not go eastward.

ADJUNCT-POSITION adverbs can precede clausal negation but not with verbs of motion.

\*\*Upstairs he did not go.

He did go upstairs.

Indoors the people are eating.

(better) The people are eating indoors.

Pure Place adjuncts are not modified or compared by "so" "however" "how". But "how far" is acceptable.

\*\*Deliberately, my cat was a nuisance.

3. If the complement is +COMMON NOUN-PLACE.

Reluctantly, she was in Dallas.

ADJUNCT-VOLITIONAL SUBJECT does not independently activate IC linguistic core analysis flags.

ADJUNCT-VOLITIONAL SUBJECT is used by the PowerEdit Indexes.

ADJUNCT-VOLITIONAL SUBJECT

ADJUNCT-VOLITIONAL SUBJECT adverbs relate the subject to the verb. They perform a double duty of characterizing the subject and projecting that characteriztion onto the verb.

The ADJUNCT-VOLITIONAL SUBJECT adds an element of resolve that the ADJUNCT-GENERAL SUBJECT adverbs lack.

Words that are +ADJUNCT-VOLITIONAL SUBJECT include:

deliberately, intentionally, unintentionally, purposely, reluctantly, voluntarily, wilfully, willingly, unwillingly.

ADJUNCT-VOLITIONAL SUBJECT adverbs often have the +COMMON NOUN-HUMAN flag set. When COMMON NOUN-HUMAN is set on an ADJUNCT-VOLITIONAL SUBJECT it indicates that the adverb needs a human subject or a personified subject which is also +COMMON NOUN-GENDER-COLLECTIVE.

The army deliberately bypassed the town.

John reluctantly left the cheesecake on the plate.

\*\*The rock purposely rolled down the ramp.

\*\*The washing machine unintentionally ate a sock.

The ADJUNCT-VOLITIONAL SUBJECT adverb can also be set with COMMON NOUN-HIGH ORGANISM to indicate that the subject needs to be at least +COMMON NOUN-HIGH ORGANISM.

My cat deliberately ripped my new curtains.

The tiger willingly attacked the hunter.

If the COMMON NOUN-HIGH ORGANISM flag is set the COMMON NOUN-HUMAN flag should also be set, unless the ADJUNCT-VOLITIONAL SUBJECT adverb can only occur with beings that are +COMMON NOUN-HIGH ORGANISM.

Words that are +ADJUNCT-VOLITIONAL SUBJECT can occur with intensive verbs in narrowly defined environments.

1. If the adjective complement is +ADJECTIVE-DYNAMIC.

Deliberately, he was being foolish.

Deliberately, he was foolish.

2. If the complement implies activity (+COMMON NOUN-EVENTIVE).

Deliberately, my cat was being a nuisance.

ADJUNCT-GENERAL SUBJECT

ADJUNCT-GENERAL SUBJECT adverbs relate the subject to the verb. They perform a double duty of characterizing the subject and projecting that characterization onto the verb.

Words that are +ADJUNCT-GENERAL SUBJECT include:

bitterly, resentfully, manfully, consistently, sadly.

Bitterly the linguist placed the split infinitive in the book.

Cheerfuly the linguist chashed her meager pay check.

Regretfully the linguist bounced his last payment.

The linguist tenderly placed the derived string into a well-prepared clause structure.

The distinction between ADVERB-DISJUNCTS and ADVERB-GENERAL SUBJECT adverbs is not always clear or logical. "Regretfully" and other emotions of pain and suffering are +ADVERB-GENERAL SUBJECT but are −ADVERB-DISJUNCT. Amusement and pleasure adverbs tend to be +ADVERB-DISJUNCT and −ADVERB-GENERAL SUBJECT. "Amusingly" is a ADVERB-DISJUNCT and not a ADVERB-GENERAL SUBJECT.

ADJUNCT-GENERAL SUBJECT does not independently activate IC linguistic core analysis attractors.

ADJUNCT-GENERAL SUBJECT is used by PowerEdit Index.

ADJUNCT-GENERAL SUBJECT adverbs cannot occur with intensive verbs.

\*\*Proudly, he was in Dallas.

\*\*Proudly, he was being in Dallas.

\*\* Proudly he did not score the goal.

Pure subject adjuncts are repelled by the imperative.

\*\* Sadly relate the story to him.

ADVERB GRAMMAR ADJUNCT SUBJECT FLAGS

Subject Adjuncts relate the subject to the verb. They perform a double duty of characterizing the subject and projecting that characteriztion onto the verb.

They tend to derived -ly adverbs from adjectives of emotion:

resentfully (resentful)

bitterly (bitter)

emotionally (emotional)

sadly (sad)

angrily (angry)

Words that are Subject adjuncts are also often +ADJUNCT-PROCESS and tend to be interpreted as ADJUNCT-MANNER adverbs when they occur in any one of the "end positions."

Subject Adjuncts differ from disjuncts. Subject Adjuncts describe emotions, attitudes, or actions. ADVERB-DISJUNCTS evaluate them.

Cleverly, the linguist patted his boss on the back.

("Cleverly is a +ADVERB-DISJUNCT that evaluates the action of "patting." It was a clever move on the linguist's part more than a description of the linguist.)

Resentfully, the linguist patted his boss on the back.

("Resentfully is +ADJUNCT-GENERAL SUBJECT. "Resentfully" is more of a description of the linguist than an evaluation of action the resentful linguist performed.)

Adverbs can belong to more than one class, and how they are interpreted can be position-sensitive.

Resentfully, the linguist patted his boss on the back.

("Resentfully is +ADJUNCT-GENERAL SUBJECT.)

The linguist resentfully patted his boss on the back.

("Resentfully" can be understood as +ADJUNCT-GENERAL SUBJECT or as +ADJUNCT-MANNER.)

The linguist patted his boss on the back resentfully.

("Resentfully" can be understood as +ADJUNCT-MANNER or as +ADJUNCT-GENERAL SUBJECT.)

Pure Subject Adjuncts do easily accept the focus of negation.

ADJUNCT-INSTRUMENT

ADJUNCT-INSTRUMENT adverbs have a proclivity for describing single units that are physical and used as tools, or supply the physical basis for the technique or system. The key attractor is "physical."

ADJUNCT-MEANS adverbs attract non-physical systems.

ADJUNCT-INSTRUMENT adverbs attract physical tools.

If a word is +ADJUNCT-INSTRUMENT it should also be +ADJUNCT-PROCESS.

ADJUNCT-INSTRUMENTS are often realized by prepositional phrases.

He split the chicken with a knife.
(instrument)
He split the chicken with a flourish.
(manner)

ADJUNCT-INSTRUMENT could be used as a crosscutter to indicate instrumentality on any part of speech.

ADJUNCT-INSTRUMENT does not independently activate IC linguistic core analysis attractors.

ADJUNCT-MEANS

ADJUNCT-MEANS adverbs usually point to proceedures, techniques, and methods. ADJUNCT-MEANS adverbs can be paraphrased with:

by means of

She seperated the prosodies metrically.
She separated the prosodies by means of the meter.

ADJUNCT-MEANS adverbs and ADJUNCT-INSTRUMENT adverbs differ slightly (At times the distinction is not clear or even present).

ADJUNCT-MEANS adverbs have a proclivity for describing mechanisms, methods, systems, abstract orginaztions used as tools, or techniques. The key attractor is "abstract."

ADJUNCT-INSTRUMENT adverbs have a proclivity for describing single units that are physical and used as tools, or supply the physical basis for the technique or system. The key attractor is "physical."

ADJUNCT-MEANS adverbs attract non-physical systems. ADJUNCT-INSTRUMENT adverbs attract physical tools.

The linguist split the infinitive grammatically.
(means/manner)
The linguist could not split the infinitive philosophically.
(means/manner/viewpoint/disjunct)
The police examined the evidence microscopically.
(means/manner/instrument)
The police examined the suspect microscopically.
(manner/metaphorical means)
The police examined the evidence on the slide microscopically
(instrument/manner)

When an adverb is +ADJUNCT-MEANS it should also be +ADJUNCT-PROCESS.

ADJUNCT-MEANS does not directly activate any IC linguistic core analysis attractors.

ADJUNCT-MANNER

ADJUNCT-MANNER adverbs can be paraphrased by:

in a (adjective) manner.
in a political manner.
in a/the (adjective) way.
in a French way.
in the French way.
in a (adjective) style.
in a French style.

Manner adjuncts refer primarily to style.

Means adjuncts refer primarily to proceedure, technique, and method.

Instruments adjunct refer primarily to proceedure, technique, and device/tool use.

Examples of ADJUNCT-MANNER adverb usage:

He came happily.
He wrote the letter awkwardly.
The linguist split the infinitive deftly.
The linguist was paid all too slowly.

ADJUNCT-MANNER adverbs do not need to be entered in the lexicon if they end with the "-ly" suffix. Words that end in "-ly" default to:

+ADVERB-ADJUNCT
+ADJUNCT-PROCESS
+ADJUNCT-MANNER
+ADVERB-GRADABLE.

"Manner," "means," and "instrument" have overlapping shades of meaning. Apart from a context the meaning can be unclear.

He examined the specimen microscopically.
Manner: He examined the specimen in great detail. Instrument: He examined the specimen with a microscope. Means: He examined the specimen with detailed proceedures.

ADJUNCT-MANNER does not independently activate any IC linguistic core analysis attractors.

ADJUNCT-MANNER is used by the PowerEdit Indexes.

ADVERB GRAMMAR ADJUNCT PROCESS FLAGS

ADJUNCT-PROCESS

ADJUNCT-PROCESS adverbs define and describe the process expressed or inherent in the action of the verb.

ADJUNCT-PROCESS describes a subclass of adjuncts which has three members:

ADJUNCT-MANNER
ADJUNCT-MEANS
ADJUNCT-INSTRUMENT

The ADJUNCT-PROCESS flag should be set whenever one of the subclass flags of ADJUNCT-MANNER, ADJUNCT-MEANS, and ADJUNCT-INSTRUMENT is set.

ADJUNCT-PROCESS adverbs that end with the suffix "-wardly" need to be entered into the lexicon. Griff will strip off the "-ly" suffix and read the "-ward" suffix as an ADJUNCT-PLACE adverb.

If an ADJUNCT-PROCESS word can be +ADJUNCT-MANNER, +ADJUNCT-MEANS and +ADUNCT-INSTRUMENT concurrently.

An ADJUNCT-PROCESS adverb that is only +ADJUNCT-MANNER potentially is less ambiguous than one which has multiple ADJUNCT-PROCESS flag settings.

Pure Process adjuncts cannot co-occur with verbs that are +VERB-STATIVE INTENSIVE or +VERB-STATIVE EXTENSIVE unless there are overriding attractors that will allow it. Usually the ADJUNCT-PROCESS adverb needs to premodify another dynamic verb.

**He is (VERB-STATIVE-INTENSIVE) skillfully.
He is skillfully writing the book.
** He owns (VERB-STATIVE-EXTENSIVE) it skillfully.
He drives (VERB-MONO-TRANSITIVE) it skillfully.

ADJUNCT-PROCESS activates IC linguistic core analysis attractors.

ADJUNCT-APPROXIMATOR

ADJUNCT-APPROXIMATORS intimate that the predication did not happen. It came close to happening, but it did not.

Words that are +ADJUNCT-APPROXIMATOR include:
almost, nearly, practically, virtually, as good as, all but.
I almost split the infinitive.
Linguists are virtually extinct.
They all but died.
The bomb nearly nailed him.

ADJUNCT-APPROXIMATORS do not lie within the scope of negation.
** I do not almost like him.
** I did not almost split the infinitive.

ADJUNCT-APPROXIMATOR activates IC linguistic core analysis attractors.

ADJUNCT-APPROXIMATOR is used by PowerEdit Indexes.

ADJUNCT-MINIMIZER

ADJUNCT-MINIMIZERS are negative ADJUNCT MAXIMIZERS.

ADJUNCT-MINIMIZERS include:
a bit, barely, hardly, little, scarcely, in the least, in the slightest, at all.
I can scarcely stomach linguists.
I do not like his demeanor a bit.
Linguists cannot write documentation at all.
Linguists are scarcely human, which places them barely one evolutionary rung above a programmer.
Words that are +ADJUNCT-MINIMIZER include
barely, hardly, little, scarcely, (which are also +ADVERB-NEGATIVE)
in the least, in the slightest, at all, (which are also +ADVERB-NON-ASSERTIVE)
possibly, conceivably, (which are primarily ADVERB-DISJUNCTS except when they follow a VERB-MODAL)

ADJUNCT-MINIMIZERS activate IC linguistic core analysis attractors.

ADJUNCT-MINIMIZERS are used by PowerEdit Indexes.

ADJUNCT-DIMINISHER

ADJUNCT-DIMINISHERS temper the force of the predication. They imply that some aspects of the predication apply and some don't. They may also imply a lack of committment, but for the most part, ADJUNCT-DIMINISHERS are mellow laid-back words.

Words that are +ADJUNCT-DIMINISHER include:
mildly, moderately, partially, partly, slightly, somewhat, in part, in some respects, to some extent, a little; least
She mildly upset her boss when she set the wrong flag.
Her boss became slightly unglued.
To some extent, "somewhat" is a political word.

Many ADJUNCT-DIMINISHERS are also +PHRASE-HEDGER.

ADJUNCT-DIMINISHERS when they are the focus of negation acquire the meaning of an ADJUNCT-MAXIMIZER or ADJUNCT-BOOSTER.
They did not roast the meat slightly. They nuked it.
Her boss did not mildly complain. She threw a wild tizzy.

ADJUNCT-DIMINISHER activates IC linguistic core analysis attractors.

ADJUNCT-DIMINISHER is used by PowerEdit Index.

ADJUNCT-COMPROMISER

ADJUNCT-COMPROMISERS moderate the effect of the verb slightly and imply a granting of a concesion about the force or appropriateness of the verb. They pull back from total commitment and leave the speaker room to negotiate a change of position.

Words that are +ADJUNCT-COMPROMISER include:
kind of, sort of, (informal) quite, rather, enough, sufficiently, more or less
I kind of want to be a linguist.
I like her enough to forget that she is a linguist.
I rather enjoyed her perfume.
She more or less enjoyed his aftershave.

ADJUNCT-COMPROMISER activates IC linguistic core analysis attractors.

ADJUNCT-COMPROMISER is used by PowerEdit Index.

ADJUNCT-DOWNTONER

ADJUNCT-DOWNTONER adverbs scale down the effect and force of the predication. They lessen the impact or weaken the assertiveness of the predication.

ADJUNCT-DOWNTONER describes the "down scale" subclass of the "intensive adverbs." The members of the ADJUNCT-DOWNTONER subclass are:
ADJUNCT-COMPROMISER
ADJUNCT-DIMINISHER
ADJUNCT-MINIMIZER
ADJUNCT-APPROXIMATOR The members of the ADJUNCT-DOWNTONER subclass need to be +ADJUNCT-DOWNTONER.

The linguist kind of (COMPROMIZER) split the infinitive.
The linguist mildly (DIMINISHER) breathed a sigh of relief when the infinitive was finally split.
The linguist barely (MINIMIZER) split the infinitive in time.
The linguist almost (APPROXIMATOR) split the infinitive, but stopped in the nick of time.

Presently the categories the ADJUNCT-DOWNTONER are exclusive and only one subclass flag is set. But there is no compelling reason why an ADJUNCT-DOWNTONER cannot be a have multiple flags set.

The following ADJUNCT-DOWNTONERS cannot be the focus of negation:
kind of, sort of, rather, more or less
** I do not kind of like him.
** I do not sort of like him.
** I do not rather like him.
** I do not more or less like him.

These four ADJUNCT-COMPROMISERS are different from the rest of the ADJUNCT-COMPROMISERS because they are also -ADJUNCT-INTENSIFIER.

ADJUNCT-DOWNTONER activates IC linguistic core analysis attractors.

ADJUNCT-DOWNTONER is used by PowerEdit Index.

ADJUNCT-QUANTIFIER

ADJUNCT-QUANTIFIER is set on adverbs of indefinite quantification.

ADJUNCT-QUANTIFIER is available for application use.

ADJUNCT-QUANTIFIER activates one IC linguistic core attractor.

ADJUNCT-QUANTIFIER is set on "aplenty."

ADJUNCT-BOOSTER

Words that are +ADJUNCT-BOOSTER dramatize the action, but do not have the nuance of the absolute that ADJUNCT-MAXIMIZERS have. The difference between ADJUNCT-BOOSTERS and ADJUNCT-MAXIMIZERS is not always clear and may vary from speaker to speaker. The setting of ADJUNCT-MAXIMIZER or ADJUNCT-BOOSTER is not sacrosanct.

Words that are +ADJUNCT-BOOSTER include:

open, but, badly, bitterly, deeply, enormously, far, greatly, heartily, highly, intensely, much, severly, so, strongly, terribly, violently, well, a lot; by far.

Linguists drink deeply after a long, hard day.

The linguist violently rejected the analysis.

The linguist was intensely sorry for splitting the infinitive.

ADJUNCT-BOOSTER activates IC linguistic core analysis attractors.

ADJUNCT-BOOSTER is used by PowerEdit Index.

ADJUNCT-MAXIMIZER

Maximizers are at the upper limit of the subjective process of accenting a predication.

Words that are +ADJUNCT-MAXIMIZER include:

absolutely, altogether, completely, entirely, extremely, fully, perfectly, quite, throughly, totally, utterly, universally, in all respects, and most.

The linguist absolutely split the infinitive.

The linguist completely ignored the rules of the language.

I perfectly understand the implications of splitting infinitives.

I entirely agree.

If your linguistic ear is bothered by the philosophical implications of intensifying an ADJUNCT-MAXIMIZER, then you should flag it as +ADVERB-NON-GRADABLE. This will disallow such sentences as:

** He did that very perfectly.

He knew very perfectly well that it was wrong.

Maximizers by definition, if they are absolutes, should not allow intensification.

*?* He did that very perfectly.

This is a case where philosophy and language clash. To some ears "very perfectly" is an abomination, to others it fulfills a legitimate function.

A very conservative prescriptive tradition does not allow the use of "very" or comparatives with absolutes such as "completely" or "perfectly."

The present system has "fully" and "throughly" as being +ADVERB-GRAABLE. "Totally," "completely," "perfectly," "entirely," "utterly," "extremely," and "absolutely" are +ADVERB-NON-GRADABLE.

ADJUNCT-MAXIMIZER activates IC linguistic core analysis attractors.

ADJUNCT-MAXIMIZER is used by PowerEdit Index.

ADJUNCT-EMPHASIZER

Emphasizer adjuncts add punch to the predication. They do this by highlighting, accentuating, stressing an aspect, calling attention to, and otherwise attempting to add some power to the predication. Pure emphasizers are rare (if they exist at all) Words that are +ADJUNCT-EMPHASIZER tend to be +ADVERB-DISJUNCT.

I cannot believe that the linguist actually split the infinitive.

Programmers just cannot understand linguists.

He surely will not split that infinitive.

Honestly, split infinitives don't bother me that much.

Words that are +ADJUNCT-EMPHASIZER are often +PHRASE-EMPHATIC.

Words that are +ADJUNCT-EMPHASIZER include:

actually, certainly, clearly, definitely, indeed, obviously, plainly, really, surely, hohestly, frankly, literally, sim;ly, just, and of course.

The +ADJUNCT-EMPHASIZER adverbs "for sure" and "for certain" only postmodify verbs. This distinction is conveyed to Griff by setting +ADJUNCT-INTENSIFER (to prevent "for sure" and "for certain" from legitimately occuring before the verb) and by setting the "end position flags" +POSITION-AFTER INTRANSITIVE VERB, +POSITION-AFTER OBJECT, +POSITION-AFTER COMPLEMENT, and +POSITION-SENTENCE END.

In general, words that are ADJUNCT-EMPHASIZER tend to be idiosyncratic and may need special treatment depending on the situation and context.

ADJUNCT-EMPHASIZER does activates IC linguistic core analysis attractors.

ADJUNCT-EMPHASIZER is used by PowerEdit Index.

ADJUNCT-EMPHASIZER is used as a crosscutter by PowerEdit. When ADJUNCT-EMPHASIZER is set on a "conjunct promote disjunct" (+ADVERB-DISJUNCT, +DISJUNCT-STYLE or +DISJUNCT-ATTITUDE, +CONJUNCT-CONCESSIVE) it will turn of the PowerEdit "MISSING PUNCTUATION/7" message.

ADJUNCT-EMPHASIZER is also used by PowerEdit to identify words that are +CONJUNCTION and are phrased with "even." This includes:

even when, even if, even though.

When "deep is +ADJUNCT-INTENSIFIER "love" is analyzed as +COMMON NOUN.

The ADVERB-SHIFTED ADJ flag and the ADJUNCT-INTENSIFIER flag used together form a powerful team which impacts the analysis of words that are both +ADJECTIVE and +ADVERB.

**The clock slow ran.

When ADVERB-SHIFTED ADJ and ADJUNCT-INTENSIFIER are not set on "slow," Griff analyzes "slow" as +ADVERB.

When ADVERB-SHIFTED ADJ and ADJUNCT-INTENSIFIER are set on "slow," Griff analyzes "slow" as being +ADJECTIVE.

The ADJUNCT-INTENSIFIER flag is a powerful flag that activates numerous IC linguistic core analysis attractors.

ADJUNCT-INTENSIFIER is used as a crosscutter since its function can be set on any part of speech to prevent a word from occuring in the "before verb" position.

ADJUNCT-INTENSIFIER activates IC linguistic core analysis attractors.

ADJUNCT-INTENSIFIER is used by PowerEdit Indexes.

ADJUNCT-INTENSIFIER

The ADJUNCT-INTENSIFIER is not a member of the "intensive adjunct" class of adverbs.

ADJUNCT-INTENSIFIER is a special function flag that influences Griff when he is assigning parts of speech. ADJUNCT-INTENSIFIER tells Griff that this word should not be an ADVERB when it occurs in the "before verb" position.

A word +ADJUNCT-INTENSIFIER that occurs before a word that is +VERB-PAST-PARTICIPLE will influence Griff to make the +VERB-PAST PARTICPLE an ADJECTIVE.

It was a long played set. (tennis)

A word +ADJUNCT-INTENSIFER that occurs before a +VERB-PRESENT-PARTICPLE word will influence Griff to analyze the present participle as an ADJECTIVE or a COMMON-NOUN.

ADJUNCT-INTENSIFIER should be set on adverbs that cannot occur directly before a verb.

Words that are +ADVERB and +PREPOSITION need to be +ADJUNCT-INTENSIFIER. This influences (NOTE: "Influences" means persuasion when directed towards Griff. "Influences" does not mean compel or force when directed towards Griff. It is difficult to force Griff to do anything.)

Griff to analyse a word that is +ADVERB, +PREPOSITION, and +ADJUNCT-INTENSIFIER to be +PREPOSITION directly before a word that is +ADJECTIVE and +VERB.

"On" without the ADJUNCT-INTENSIFIER flag set influences Griff to analyse "major" as a VERB part of speech in the following sentence.

In bringing PowerEdit to market, ALI has chosen to focus their efforts of penetration on major American Corporations.

When "on" is +ADJUNCT-INTENSIFIER, Griff analyzes "major" as an ADJECTIVE.

The ADJUNCT-INTENSIFER has the power to influence Griff to change a +VERB to a +COMMON NOUN part of speech.

His deep love for her is apparent.

When "deep" is −ADJUNCT-INTENSIFIER "love" is analyzed as +VERB.

ADVERB GRAMMAR ADJUNCT INTENSIVE FLAGS

ADJUNCT-QUANTIFIER, and ADJUNCT-INTENSIFIER are not really part of the class of ADJUNCT INTENSIVE FLAGS.

Adverbs that modify other adverbs can only be "intensive" adjuncts.

He was a quietly assertive man.

** He spoke quietly assertively.

He spoke extremely (intensive) assertively.

"Enough" is a postmodifier of adjectives and adverbs.

His efforts were not good enough.

He wrote quickly enough.

Adverbs that premodify adjectives are "intensive" class adverbs.

(ADJUNCT-QUANTIFIER and ADJUNCT-INTENSIFIER do not belong to the "intensive" class of adjuncts.

"Intensive" adjuncts can premodify:

Pronouns.

Nearly everybody came to the party.

Predeterminers.

He recovered roughly half of their equipment.

Cardinal Numbers.

I paid more than ten dollars for it.

I will stay almost ten weeks.

In an informal style some "intensive" adjuncts can modify the noun phrase and precede the determiner when they function this way.

We had quite a party.

He is such a fool.

Since only select "intensive" adjuncts function in this manner they need to be +ADVERB-MODIFIES NOUN PHRASE.

ADJUNCT-LIMITING PARTICULAR

ADJUNCT-LIMITING PARTICULAR adverbs restrict the focus predominately to the action or referent in the spotlight. Not all of the interesting action on stage is occuring under the spotlight, but most of it is.

John specifically requested chocolate cake.

At least linguists can find a job—sometimes.

We evaluated the linguists primarily on the way they split infinitives.

He likes everybody, especially the linguists.

Words that are +ADJUNCT-LIMITING PARTICULAR include:

chiefly, especially, mainly, mostly, particularly, primarily, principally, and specifically.

ADJUNCT-LIMITING PARTICULAR activates IC linguistic core analysis attractors.

ADJUNCT-LIMITING PARTICULAR is used by PowerEdit Index.

ADJUNCT-LIMITING EXCLUSIVE

ADJUNCT-LIMITING EXCLUSIVE adverbs restrict the application of the focus strictly, exclusively to the referent under focus. They limit the range of the spotlight to one performer.

No one could do it, just John.

He wrote the documentation exclusively for the company.

We evaluate linguists solely on the way they split infinitives.

The linguists, alone, are underpaid.

Words that are +ADJUNCT-LIMITING EXCLUSIVE include:

alone, exactly, exclusively, just, merely, only, precisely, purely, simply, and solely.

Words that are +ADJUNCT-LIMITING EXCLUSIVE should also be +ADJUNCT-FOCUSING.

"Just", "merely", "purely" and "simply," cannot occur in the "sentence end" position. They are identified for PowerEdit with the crosscutting flag +PREP-COMPLEX.

Words that are +CONJUNCTION and +ADJUNCT-LIMITING EXCLUSIVE will select the ADVERB part of speech in place of CONJUNCTION under certain circumstances. "So" is +CONJUNCTION and +ADJUNCT-LIMITING EXCLUSIVE.

ADJUNCT-LIMITING EXCLUSIVE will activates IC linguistic core analysis attractors.

ADJUNCT-LIMITING EXCLUSIVE is used by PowerEdit Index.

ADJUNCT-ADDITIVE

ADJUNCT-ADDITIVE adverbs indicate the predication is additionaly true about the referent under focus (in the spotlight).

John could play the banjo as well.

Mary also could play the banjo.

The banjo simliarly has the dynamic range of a chainsaw.

The mandolin likewise has a restricted dynamic range.

Words that are +ADJUNCT-ADDITIVE include:

again, also, either, equally, even, further, neither, nor, similarly, and too.

Words that are +ADJUNCT-ADDITIVE should also be +ADJUNCT-FOCUSING

ADJUNCT-ADDITIVE activates IC linguistic core analysis attractors.

ADJUNCT-ADDITIVE is used by PowerEdit Index.

John only phoned Mary today.

John phoned Mary today, but he phoned no one else.

John only phoned Mary today.

John phoned Mary today, but he called her at no other time.

ADJUNCT-FOCUSING activates IC linguistic core analysis attractors.

ADJUNCT-FOCUSING is used by PowerEdit Index.

ADJUNCT-FREQUENCY

The ADJUNCT-FREQUENCY flag denotes "repetition time" relationships. ADJUNCT-FREQUENCY words easily answer the question "how often."

The ADJUNCT-FREQUENCY flag should be set any of the following flags are set:

ADJUNCT-PERIOD TIME
ADJUNCT-NUMBER TIME
ADJUNCT-USUAL OCCURANCE
ADJUNCT-CONTINUAL OCCURANCE
ADJUNCT-HIGH OCCURANCE
ADJUNCT-LOW OCCURANCE
ADJUNCT-ZERO OCCURANCE

The ADJUNCT-FREQUENCY flag does activates IC linguistic core analysis attractors.

ADJUNCT-FREQUENCY is used by PowerEdit Indexes.

ADJUNCT-PERIOD TIME

ADJUNCT-PERIOD TIME adverbs denote to a definite time period that is has a clear, definite beginning and an end. ADJUNCT-PERIOD TIME differs ADJUNCT-DURATION. ADJUNCT-DURATION time an be visualized as a line. ADJUNCT-PERIOD TIME can be visualized as a series of points. Points of time that are repeated over a definite span of time.

ADJUNCT-PERIOD TIME words are often used for "calendar time" designations.

Words that are +ADJUNCT-PERIOD TIME include:

hourly, daily, nightly, weekly, fortnightly, monthly, quarterly, annually, yearly, biannualy, semi-annually.

The ADJUNCT-PERIOD TIME flag does not independently activate IC linguistic core analysis attractors.

When ADJUNCT-PERIOD TIME adverbs and ADJUNCT-NUMBER TIME adverbs are juxtaposed, the normal order is:

1. ADJUNCT-NUMBER TIME
2. ADJUNCT-PERIOD TIME

You should update your work twice daily.
** You should update your work daily twice.

ADJUNCT-NUMBER TIME

ADJUNCT-NUMBER TIME denotes points of time that are repeated a set number of times. The repetitions are quantified with an ordinal number or with an implied ordinal number.

Words that are +ADJUNCT-NUMBER TIME include:

once, twice, thrice, again (a second time).

Most "number time" adjuncts are prepositional phrases with cardinal numbers in an adjective position.

He failed the test on five different occasions.
She wrote the program differently on three concecutive days.

The ADJUNCT-NUMBER TIME flag does not independently activate IC linguistic core analysis attractors.

ADJUNCT-USUAL OCCURANCE

ADJUNCT-USUAL OCCURANCE adverbs signal the expectancy chain of custom and habit. ADJUNCT-USUAL OCCURANCE defines an event which will happen again and again and again given the same set of (primarily social) circumstances. Comme d'habitude as we say in Canada.

ADJUNCT-USUAL OCCURANCE adverbs can appear before clausal negation.

Generally, she does not update her program hourly.
Ordinarily, she does not update her program hourly.
Usually, she does not save her program hourly.
**Repeatedly he does not save his program hourly.
**Regularly he does not save his program hourly.

Pure ADJUNCT-USUAL OCCURANCE adverbs cannot be used to affirm and negate at the same time.

**Generally he updates his program, but generally he does not update his program.
Generally, (a pure ADJUNCT-USUAL OCCURANCE) he updates his program, but often (+ADJUNCT-USUAL OCCURANCE and +ADJUNCT-HIGH OCCURANCE) he does not update his program.

Words that are +ADJUNCT-USUAL OCCURANCE include:

commonly, customarily, generally, habitually, invariably normally, ordinarily, usually, often, frequently.

The difference between ADJUNCT-USUAL OCCURANCE and ADJUCT-HIGH OCCURANCE does not have a clear line of demarkation.

ADJUNCT-HIGH OCCURANCE has an element of unpredicability that implies that given the same set of circumstances a different result may occur, or that the circumstance could change quite readily. Many words can be both +ADJUNCT-USUAL OCCURANCE and +ADJUNCT-HIGH OCCURANCE. ("often" and "frequently")

If a word is +ADJUNCT-HIGH OCCURANCE and can occur before a negative clause, it probably needs to be +ADJUNCT-USUAL OCCURANCE.

The ADJUNCT-USUAL OCCURANCE flag does not independently activate IC linguistic core analysis attractors.

The ADJUNCT-USUAL OCCURANCE flag is used by the PowerEdit Indexes.

ADJUNCT-CONTINUAL OCCURANCE

ADJUNCT-CONTINUAL OCCURANCE overlaps quite a bit with ADJUNCT-USUAL OCCURANCE. ADJUNCT-CONTINUAL OCCURANCE has an element of uninterruptability that ADJUNCT-USUAL OCCURANCE lacks. There is an implied element of unceasingness present, which suggests that the action goes on without a break, interuption, stoppage.

ADJUNCT-CONTINUAL OCCURANCE words cannot occur before negation, but ADJUNCT-USUAL OCCURANCE words can.

Generally, she does not save her programs hourly.
She generally does not save her programs hourly.
She does not generally save her programs hourly.
**Always, she does not save her programs hourly.
**She always does not save her programs hourly.
She does not always ("always" following the negative verb becomes a ADJUNCT-LOW FREQUENCY or ADJUNCT-ZERO FREQUENCY adverb) save her programs hourly.

ADJUNCT-CONTINUAL OCCURANCE adverbs are often +PHRASE-EMPHATIC.

Words that are +ADJUNCT-CONTINUAL OCCURANCE include:

always, constantly, continually, continuously, ever, incessantly, permanently, perpetually.

The ADJUNCT-CONTINUAL OCCURANCE flag does not independently activate IC linguistic core analysis attractors.

ADJUNCT-CONTINUAL OCCURANCE is used by the PowerEdit Indexes.

ADJUNCT-HIGH OCCURANCE

ADJUNCT-HIGH OCCURANCE adverbs denote "repitition time" that can be expected to happen "often".

Words that are +ADJUNCT HIGH OCCURANCE include:

frequently, often, regularly, repeatedly.

The ADJUNCT-HIGH OCCURANCE flag does not independently activate IC linguistic core analysis flags.

The ADJUNCT-HIGH OCCURANCE flag is used by the PowerEdit Indexes.

ADJUNCT-LOW OCCURANCE

ADJUNCT-LOW OCCURANCE adverbs limits "repetition time" repetitions that are few and far between. ADJUNCT-LOW OCCURANCE denotes the notion of "from time to time".

Words that are +ADJUNCT-LOW OCCURANE include:

infrequently, irregularly, occasionaly, periodically, rarely, seldom, sometimes, hardly ever, scarcely ever.

The ADJUNCT-LOW OCCURANCE flag does not independently activate IC linguistic core analysis attractors.

ADJUNCT-ZERO OCCURANCE

The ADJUNCT-ZERO OCCURANCE denotes that the frequency of repetition is "zero."

Words that are +ADJUNCT-ZERO OCCURANCE include:

never, ne'er, never ever.

The ADJUNCT-ZERO OCCURANCE flag does not indepdendently activate IC core analysis attractors.

ADJUNCT-RELATIONAL

ADJUNCT-RELATIONAL adverbs require special handling because they are transitional words and/or describe time relationships that fall outside of the other temporal class descriptions.

Words that are +ADJUNCT-RELATIONAL include:

afterwards, before, eventually, finally, first, later next, originally, previously, subsequently, then, already, yet, still, again, when.

The words:

already, yet, still, again, when require special handling and are uniquely identified by the PowerEdit programs. Do not delete flags from these words without consulting the computational linguist.

The time flags working together serve to make a rough class distinction between the types of +ADJUNCT-RELATIONAL adverbs.

+ADJUNCT-TIME

+ADJUNCT-RELATIONAL is set on: when, already, still, yet.

+ADJUNCT-TIME

+ADJUNCT-POINT OF TIME

+ADJUNCT-FREQUENCY

+ADJUNCT-NUMBER TIME

+ADJUNCT-RELATIONAL identifies "again."

+ADJUNCT-TIME

+ADJUNCT-TIME BOUNDARY

+ADJUNCT-POINT OF TIME

+ADJUNCT-RELATIONAL is set on: afterwards, before, eventually, finally, first, later, next, originally, previously, then.

+ADJUNCT-TIME

+ADJUNCT-TIME BOUNDARY

+ADJUNCT-POINT OF TIME

The ADJUNCT-RELATIONAL flag does not indepdendently activate IC linguistic core analysis attractors.

The ADJUNCT-RELATIONAL flag is used by PowerEdit Indexes.

ADVERB GRAMMAR ADJUNCT OTHER FLAGS

ADJUNCT-CAUSE

The ADJUNCT-CAUSE flag is used an identificational crosscutter only for PowerEdit.

The ADJUNCT-CAUSE flag may be set on any TRANSITIONAL WORD or SUBORDINATING CONJUNCTION that needs to have a "cause" denotation specified to identify it.

Words that are +ADJUNCT-CAUSE flag include:

because, because of, for the simple reason that, why, for, on account of, on the grounds that, and all because, but because.

The ADJUNCT-CAUSE flag does not independently activate any IC linguistic core analysis flags.

The ADJUNCT-CAUSE flag is used as a PowerEdit identificational crosscutter to denote "cause" on TRANSITIONAL WORDS.

ADJUNCT-PURPOSE

The ADJUNCT-PURPOSE flag is used as a crosscutter by PowerEdit to identify TRANSITIONAL WORDS that need a "purpose" denotation.

The ADJUNCT-PURPOSE flag activates IC linguistic core analysis attractors.

ADVERB DISJUNCT STYLE FLAGS

ADVERB-DISUUNCT

ADVERT-DISJUNCTS have two main classes:

DISJUNCT-STYLE

DISJUNCT-ATTITUDE.

ADVERB-DISJUNCTS are denote evaluations based on a perspective and as such are often indicate editorial comments or author intrusion.

There are over 200 words that are +ADVERB-DISJUNCT in the lexicon.

The ADVERB-DISJUNCT flag when the DISJUNCT-ATTITUDINAL flag or the DISJUNCT-STULE flag is set. The only exception to this setting occurs when the word is a "light disjunct" which has the setting of −ADJVERB-DISJUNCT and +DISJUNCT-ATTITUDINAL.

"Light disjuncts" are used by PowerEdit punctuation routines. The "light disjunct" setting bypasses the PowerEdit "MISSPUNCTUATION OF INTRODUCTION-102/4" message.

ADVERB-DISJUNCTS attract punctuation. They are often used as extraneous comment clauses, parentheticals, and author intrusion comments.

ADVERB-DISJUNCTS are often derived evaluative adjectives.

Strange/Strangely.

Wise/Wisely.

ADVERB-DISJUNCT test:

When used as an independent comment an ADJVERB-DISJUNCT requires commas to set it off.

Obviously, John played well.

John, obviously, played well.

When an ADVERB-DISJUNCT is used as an emphatic no commas are required.

John obviously played well.

Commas function as intonation markers in written language. If your voice and its tonality goes up it is emphatic. If your voice and tonality go down it is an independent comment and nonessential.

Pure disjuncts do not have the ADVERB-ADJUNCT flag set.

Pure disjuncts can appear sentence initial before a negative clause.

Frankly, I don't give a damn.

Supposedly, he did not commit the crime.

For dual class adverbs (+ADVERB-DISJUNCT and +ADVERB-ADJUNCT) word position sentence often determines which class the adverb belongs to.

The initial positions tend to make the word disjunctive.

The end positions tend to make the word adjunctive (usually manner).

The middle positions tend to be ambiguous.

Honestly, he performed the audit.

He honestly performed the audit.

He performed the audit honestly.

The ADVERB-DISJUNCT flag activates IC linguistic core analysis attractors.

The ADVERB-DISJUNCT flag is used by the PowerEdit Indexes.

DISJUNCT-STYLE

DISJUNCT-STYLE adverbs supply a speakers evaluation on the style and form of the utterance.

DISJUNCT-STYLE adverbs provide insight into the mindset of speaker, the interpretative frame of reference that the speaker wishes to convey to the listener, and the significance of the utterance from the speakers point of view.

DISJUNCT-STYLE adverbs are used to indicate:

The degree of truthfulness of the speaker.
  (truly, honestly)
The degree of intimacy the speaker is using.
  (confidentially, frankly)
The importance of the statement from speakers perspective.
  (seriously)
The speakers comment on the form and depth of the statement.
  (literally, briefly, roughly)

Words that are +DISJUNCT-STYLE tend to occur in clauses that have a verb that is +COMMON NOUN-SPEECH ACT or in a context that is direct or indirect speech.

Style disjuncts also tend to occur in contexts that have the first person in proximity.

Words that are +DISJUNCT-STYLE include:
  bluntly, frankly, honestly, in common parlance, commonly, generally, seriously, approximately, personally, increasingly, metaphorically, strictly, truthfully, truly, in general, transitorily, if I may say so, confidentially, broadly, candidly, crudely, briefly, literally, rougly.

Honestly, he can't program his way out of a paper bag.
Personally, I do not think this will work.

DISJUNCT STYLE supplies the speaker's comments on the form of the utterance.

DISJUNCT-ATTITUDE supplies the speakers comments on the content of the utterance.

The DISJUNCT-STYLE flag does not independently activate IC linguistic core analysis attractors.

The DISJUNCT-STYLE flag is used by PowerEdit Indexes.

ADVERB DISJUNCT COMMENT FLAGS

DISJUNCT-ATTITUDINAL

DISJUNCT-ATTITUDINAL adverbs evaluate or comment on the content of the predication.

DISJUNCT-ATTITUDINAL identifies a subclass of ADVERB-DISJUNCTS that has the following flags that comprise its membership:

DISJUNCT-EVIDENCE
DISJUNCT-PROBABILITY
DISJUNCT-DOUBT
DISJUNCT-CONVICTION
DISJUNCT-REALITY
DISJUNCT-SUBJECTIVE VIEW
DISJUNCT-OBJECTIVE EVIDENCE

When one of the above flags it set (unless the flag has a special crosscutter usage) ADVERB-DISJUNCT and DISJUNCT-ATTITUDINAL also should be set.

The most striking syntactic difference between +DISJUNCT-STYLE and +DISJUNCT-ATTITUDINAL adverbs is:

DISJUNCT-ATTITUDINAL adverbs cannot appear in interrogative clauses.

**Does he fortunately know about it?
**Fortunately, does he know about it?

DISJUNCT-STYLE adverbs can appear in interrogative clauses.

Does he honestly know about it?
Honestly, does he know about it?

The DISJUNCT-ATTITUDINAL flag does not activate IC linguistic core analysis attractors.

The DISJUNCT-ATTITUDINAL flag is used by PowerEdit Indexes.

DISJUNCT-EVIDENCE

The DISJUNCT-EVIDENCE flag evaluates the action but does not necessarily evaluate the initatiator of the action.

Amazingly, John split the infinitive.

There is nothing amazing about John but his action was amazing.

Words that are +DISJUNCT-EVIDENCE evaluate, perceive or judge actions as being:

1. Strange, unusual, unexpected, or ironic.
   amazingly, astonishingly, curiously, funnily enough, incredibily, ironically, oddly, remarkably, stangely, suspiciously, unexpectedly.
2. Appropriate, proper, or expected.
   appropriately, properly, inevitably, naturally, not unnaturally, predictably, typically, understandably.
3. Fulfilling (emotionally or, psychologically) or disturbing.
   annoyingly, delightfully, disappointingly, disturbingly, refreshingly, regrettably.
4. Fortunate or unfortunate.
   fortunately, unfortunately, happily, unhappily, luckily, unluckily, sadly, tragically.
5. Other emotional, psychological, or logical judgements.
   amusingly, conveniently, hopefully, mercifully, preferably, significantly, thankfully.

The DISJUNCT-EVIDENCE flag does not independently activate IC linguistic core analysis attractors.

DISJUNCT-PROBABILITY

DISJUNCT-PROBABILITY adverbs evaluate a predication as being "probably true", or "true in principle."

Words that are +DISJUNCT-PROBABILITY include:
  basically, essentially, fundamentally, primarily, substantially, outwardly, theoretically, ostensibly, hypothetically, essentially, officially, ordinarily, basically, formally, usually, superficially, fundamentally, as it were, primarily, only appaently, nominally, substantially, technically, as usual, ideally, apparently.

Words that are +DISJUNCT-PROBABILITY are often +PHRASE-HEDGING.

The DISJUNCT-PROBABILITY flag does not independently activate IC linguistic core analysis attractors.

DISJUNCT-DOUBT

DISJUNCT-DOUBT adverbs express the evaluation of doubt or lack of commitment.

Words that are +DISJUNCT-DOUBT include:

arguably, allegedly, conceivably, doubtless, quite likely, maybe, perhaps, possibly, presumably, purportedly, reportedly, reputedly, supposedly, apparently, seemingly, probably, for all intents and purposes, purportedly.

Words that are +DISJUNCT-DOUBT are often +PHRASE-HEDGING.

The DISJUNCT-DOUBT flag does not independently activate IC linguistic core analysis attractors.

DISJUNCT-CONVICTION.

DISJUNCT-CONVICTION adverbs are strong affirmation words that indicate an intense belief in the content of the predication.

Words that are +DISJUNCT-CONVICTION include:

admittedly, assuredly, avowedly, certainly, decidedly, definitely, incontestably, incontrovertibly, indeed, indisputably, indubitably, surely, unarguably, undeniably, undoubtedly, unquestionably.

Words that are +DISJUNCT-CONVICTION are often +PHRASE-EMPHATIC.

The DISJUNCT-CONVICTION flag does not independently activate IC linguistic core analysis attractors.

DISJUNCT-REALITY

DISJUNCT-REALITY adverbs are used to assert what the speaker believes to be true.

Words that are +DISJUNCT-REALITY include:

actually, really, factually, in reality, damn well, all things being equal, in fact; no doubt, everything being equal, suffice it to say.

The DISJUNCT-REALITY flag does not independently activate IC linguistic core analysis attractors.

DISJUNCT-SUBJECTIVE VIEW

A DISJUNCT-SUBJECTIVE VIEW adverb indicates a value judgement that evaluates the action as clever, prudent, and wise, or its negative derivation of imprudent, foolish, and incompetent.

DISJUNCT-SUBJECTIVE VIEW adverbs evaluate both the subject of the action and the action itself.

Correctly, John split the infinitive.

(John was correct and his action was correct.)

Words that are +DISJUNCT-SUBJECTIVE VIEW include:

artfully, cleverly, cunningly, foolishly, prudently, reasonably, unreasonably, sensibly, shrewdly, wisely, unwisely, imprudently, rashly, impulsively, impetuously, incautiously, carelessly, recklessly, boldly, indiscreetly, thoughtlessly, unthinkingly, heedlessly.

The DISJUNCT-SUBJECTIVE VIEW flag does not independently activate IC linguistic core analysis attractors.

The DISJUNCT-SUBJECTIVE VIEW flag is used as a crosscutter for PowerRead. When used as a crosscutter it will not have a +DISJUNCT-ATTITUDINAL flag set.

When DISJUNCT-SUBJECTIVE VIEW is used as a PowerRead crosscutter, it is used on words that are +COMMON NOUN and are considered to be a weak noun. Weak nouns derive their content from their premodification (usually adjectival) and their postmodification (usually an "of" prepositional phrase, or relative clause).

DISJUNCT-SUBJECTIVE VIEW PowerRead weak noun crosscutters include:

view, point, stance, outlook, angle, stand, aspect, perspective, standpoint, station, viewpoint, feature.

When a word is +DISJUNCT-SUBJECTIVE VIEW and has one of the following SLANG/LOG FLAGS of:

PHRASE-OFFENSIVE

PHRASE-VULGAR

PHRASE-OBSCENE

PHRASE-DEROGATORY set, the word will be prevented from becoming a Level 4 theme for PowerRead.

DISJUNCT-OBJECTIVE EVIDENCE

DISJUNCT-OBJECTIVE EVIDENCE adverbs evaluate the subject of the action and the action itself. The evaluation is a judgement of the rightness or wrongness of an act. The DISJUNCT-OBJECTIVE EVIDENCE adverb is moral, immoral, ethical or unethical.

Words that are +DISJUNCT-OBJECTIVE EVIDENCE include:

correctly, incorrectly, justly, unjustly, rightly, wrongly, ethically, morally, unethically, immorally.

DISJUNCT-OBJECTIVE EVIDENCE is being used by PowerRead to identify words that are classified as weak nouns or as adjectives but do not have the DISJUNCT-SUBJECTIVE VIEW flag set on them. When the DISJUNCT-OBJECTIVE EVIDENCE flag is set on a PowerRead-weak-noun or any adjective, PowerRead will allow the word to become a Level-4-Topic word or adjective that does not require premodification or postmodification. The +DISJUNCT-OBJECTIVE EVIDENCE word will appear as a Level-4-Topic without modification.

The PowerRead crosscutter only is activated on words that are +COMMON NOUN or +ADJ and do not have the ADVERB part of speech flag set.

The DISJUNCT-OBJECTIVE EVIDENCE flag does not independently activate IC linguistic core analysis attractors.

ADVERB CONJUNCT MISC. FLAGS

ADVERB-CONJUNCT

ADVERB-CONJUNCTS are transitional expressions that are peripheral to the clause structure and serve primarily a logical connective function.

ADVERB-CONJUNCTS (with the exception of +CONJUNCT-ENUMERATIVE) form a closed class.

Words that are +ADVERB-CONJUNCT have the appropriate TRANSITIONAL WORD flags set.

An ADVERB-CONJUNCT can be more than one kind of conjunct.

ADVERB-CONJUNCT adverbs, and phrases, are transitional expressions that logically link sentences. They differ from conjunctions in that they cannot join independent clauses.

ADVERB-CONJUNCTS require that the previous independent clause or sentence end with either a period or a semi colon.

** The programmers destroyed the analysis, however, the linguist saved the day. (comma splice)

** The programmers destroyed the analysis however, the linguist saved the day. (fused sentence)

The programmers destroyed the analysis; however, the linguist saved the day.

The programmers destroyed the analysis.

However, the linguist saved the day.

ADVERB-CONJUNCT can appear in different positions in an independent clause. But it needs to be set off by commas.

However, the linguist corrected the programmers' mistakes.

The linguist, however, corrected the programmers' mistakes.

But if the word is +ADVERB-CONJUNCT and +ADVERB-ADJUNCT it may not require the commas.

However the linguist corrected the mistakes, it was esential that he do so.

Most ADVERB-CONJUNCTS are also ADVERB-ADJUNCTS.

The "essential/nonessential" distinction applies to ADVERB-CONJUNCTS that are transitional expressions. "Nevertheless" is +CONJUNCT-CONCESSIVE.

Essential. The linguist is nevertheless bound and determined to correct the programmers' mistakes.

Non Essential. The linguist is bound and determined, nevertheless, to correct the progarmmer's mistakes.

The ADVERB-CONJUNCT activates IC linguistic core analysis attractors.

CONJUNCT-TRANSITIONAL

CONJUNCT-TRANSITIONAL adverbs are used frequently to change topics. Words that are +CONJUNCT-TRANSITIONAL include:

incidentally, now, by the way, by the by(e), in the meantime, alas, in the meanwhile, right now, at the present time, at this time, alas and alack, in turn, if I may say so, as it were, at this particular point in time.

I split three infinitives today. Now, how was your day?

Words that are +CONJUNCT-TRANSITIONAL are also +ADVERB-CONJUNCT.

Words that are +CONJUNCT-TRANSITIONAL are often +PHRASE-ORIENTER.

The CONJUNCT-TRANSITIONAL flag does not independently activate IC linguistic core analysis attractors.

(Save this flag for a discourse level topic changer that is a light conjunct. -ADVERB-CONJUNCT, +CONJUNCT-TRANSITIONAL)

CONJUNCT-SUMMATIVE

CONJUNCT-SUMMATIVES introduce generalization which recapitulates earlier statements.

Words that are +CONJUNCT-SUMMATIVE include:

altogether, overall, then, therefore, thus, all in all, in conclusion, in sum, therefore, thereby, in my opinion.

The linguist split three infinitives, dangled three participles, and lost an appositive; overall, it was a bad day.

CONJUNCT-SUMMATIVES need to have the appropriate TRANSITIONAL WORD FLAGS and DISCOURSE FLAGS set.

Words that are +CONJUNCT-SUMMATIVE need to be +ADVERB-CONJUNCT.

CONJUNCT-SUMMATIVE and CONJUNCT-APPOSITION words precede "text" which is going to be related to earlier "text."

CONJUNCT-SUMMATIVES introduce a general statement that summarizes the preceeding ones.

CONJUNCT-APPOSITION words introduce a reformulation of the earlier text.

The linguist split three infinitives, dangled three participles, and lost an appositive; in other words, it was a bad day.

The CONJUNCT-SUMMATIVE flag activates IC linguistic core analysis attractors.

CONJUNCT-APPOSITION

CONJUNCT-APPOSITION words express the appositive relationships of:

reformulation (in other words)

exemplification (for example)

specification (especially)

Words that are +CONJUNCT-APPOSITION include:

namely, viz, thus, in other words, for example, e.g., eg, for instance, that is (handled specially in the program), i.e., ie, that is to say.

The CONJUNCT-APPOSITION flag does not independently activate IC linguistic core analysis attractors.

Words that are +CONJUNCT-APPOSITION need to be +ADVERB-CONJUNCT, unless they are being used as crosscutters.

Words that are +CONJUNCT-APPOSITION need to have the appropriate TRANSITIONAL WORD FLAGS set.

CONJUNCT-APPOSITION words that are -ADVERB-CONJUNCT and +CONJUNCT-APPOSITION identify words that are strong apposition signals for PowerEdit. Set on: include, included, and including.

CONJUNCT-RESULT

CONJUNCT-RESULT adverbs introduce the second half of "reason/result" predications.

The linguist refused to pay higher taxes. Therefore, she went to jail.

The linguist corrected the programmers mistakes. Consequently, the programmers recommended her for a raise.

Words that are +CONJUNCT-RESULT include:

accordingly, consequently, hence, now, so, therefore, thus, as a consequence, in consequence, as a result, of course, somehow.

Words that are +CONJUNCT-RESULT need to be +ADVERB-CONJUNCT.

Words that are +CONJUNCT-RESULT need to have the appropriate TRANSITIONAL WORD FLAGS set.

The CONJUNCT-RESULT flag activates IC linguistic core analysis attractors.

CONJUNCT-INFERENTIAL

CONJUNCT-INFERENTIAL adverbs intruduce inferences and conclusions based (presumably) on logic and reasoning. Logically they can be used to introduce the "conclusion" in a "grounds/conclusion" progression.

Words that are +CONJUNCT-INFERENTIAL include:

else, otherwise, then, in other words, alias, or else, otherwise, in other words, else then.

I need to split those infinitives. Otherwise, the sentence will be vague.

Words that are +CONJUNCT-INFERENTIAL need to be +ADVERB-CONJUNCT.

Words that are +CONJUNCT-INFERENTIAL need to have their appropriate TRANSITIONAL WORDS set.

The CONJUNCT-INFERENTIAL flag does not independently activate IC linguistic core analysis attractors.

CONJUNCT-TEMPORAL

The CONJUNCT-TEMPORAL flag is a special function flag designed to handle the complexity of "then."

The CONJUNCT-TEMPORAL flag is set on:

in the meantime, in the meanwhile, then, after that.

The CONJUNCT-TEMPORAL flag is a powerful flag that activates IC core analysis attractors.

WARNING: DO NOT REMOVE THIS FLAG FROM "THEN."

The CONJUNCT-TEMPORAL flag is not available for use as a crosscutter.

CONJUNCT-CONCESSIVE-ADVERB

The CONJUNCT-CONCESSIVE-ADVERB flag is a special function flag that was designed for "even."

The CONJUNCT-CONCESSIVE-ADVERB is set on:

not even, that is, even so, even.

WARNING: DO NOT REMOVE THIS FLAG FROM "EVEN."

The CONJUNCT-CONCESSIVE-ADVERB is a powerful flat that activates many IC linguistic core analysis attractors.

The CONJUNCT-CONCESSIVE-ADVERB is not available for use as a crosscutter.

ADVERB CONJUNCT LISTING FLAGS
CONJUNCT-ENUMERATIVE
CONJUNCT-ENUMERATIVE words often introduce lists. The CONJUNCT-ENUMERATIVE rates the priority or importance of the items in the list or predication.

First, second, third, . . .

Words that are CONJUNCT-ENUMERATIVE include:

ordinals, (open class), next, then, finally, last, lastly (pseudo-academic), firstly (psudo-academic).

When a word is +CONJUNCT-ENUMERATIVE it should also be +ADVERB-CONJUNCT.

Words that are +CONJUNCT-ENUMERATIVE also need their appropriate TRANSITIONAL WORD FLAGS set.

The phrases such as:

in the first place, in the second place, for one thing, for a start, to begin with, to start with, to conclude also act as conjuncts. They are not phrased in the lexicon because they cause analysis problems due to logic break problems.

The CONJUNCT-ENUMERATIVE flag does not independently activate IC linguistic core analysis attractors.

CONJUNCT-REINFORCING

CONJUNCT-REINFORCING adverbs are additive in their nature and often are used to emphasize what follows. They may be used to add emphasis to the final predication of a series of predicates.

Words that are +CONJUNCT-REINFORCING include:

again, also, further, furthermore, moreover, then (informal), too (rare), in addition, above all, on top of it all, to top it all, some more.

Examples of CONJUNCT-REINFORCING usage:

I split the infinitive. Furthermore I would split it again!

The linguist had the opportunity, the motivation and, above all, the guts to split the infinitive in front of the English teacher.

CONJUNCT-REINFORCING adverbs can be used for indicators of an emphatic style. Some are pack more punch than others. Some are idiomatic, some are cliches. Some have no punch at all. (again, then, too, also)

The CONJUNCT-REINFORCING flag activates IC linguistic core analysis attractors.

When a word is +CONJUNCT-REINFORCING it also need to be +ADVERB-CONJUNCT.

Words that are +CONJUNCT-REINFORCING need to have their appropriate TRANSITIONAL WORD FLAGS set as well.

CONJUNCT-EQUATIVE

CONJUNCT-EQUATIVE adverbs relate two ideas and give them equal weight.

Words and phrases that are +CONJUNCT-EQUATIVE include:

correspondingly, equally, likewise, similarly, in the same way, by the same token.

Words that are +CONJUNCT-EQUATIVE are also +ADVERB-CONJUNCT. Words that are +CONJUNCT-EQUATIVE need to have their appropriate TRANSITIONAL WORD FLAGS set.

The CONJUNCT-EQUATIVE flag does not independently activate IC linguistic core analysis attractors.

ADVERB CONJUNCT CONTRASTIVE FLAGS
CONJUNCT-REFORMULATORY
CONJUNCT-REFORMULATORY adverbs introduce a "contrastive/appositive/additive" relationship.

The CONJUNCT-REFORMULATORY overlaps with the CONJUNCT-SUMMATIVE and CONJUNCT-APPOSITION meaning.

CONJUNCT-REFORMULATORY adverbs contrast prior and subsequent predications. (an "or-but" conjunct)

CONJUNCT-SUMMATIVE adverbs and CONJUNCT-APPOSITION adverbs relate prior and subsequent predications. (an "and" conjunct)

Words that are +CONJUNCT-REFORMULATORY include:

better, rather, in other words, better still, so.

CONJUNCT-REFORMULATORY adverbs often preceded by "or."

The linguist split three infinitives, or rather, he tried to.

CONJUNCT-REFORUMLATORY adverbs relate two predications.

The linguist split three or, rather, four infinitives.

CONJUNCT-SUMMATIVE adverbs relate two or more predications to the last predication of the series:

He is slow, dumb, and ugly; in other words, he is a typical programmer.

Words that are +CONJUNCT-REFORMULATORY need to be +ADVEDRB-CONJUNCT.

Words that are +CONJUNCT-REFORMULATORY need to have their appropriate TRANSITIONAL WORD FLAGS set.

The CONJUNCT-REFORMULATORY flag does not independently activate IC linguistic core analysis attractors.

CONJUNCT-REPLICATIVE

CONJUNCT-REPLICATIVE adverbs contrast and replace one predication with one that is more important, dramatic, or correct.

CONJUNCT-REPLICATIVE adverbs are often preceded by "or."

Words that are +CONJUNCT-REPLICATIVE include:

worse, again, rather than, on the other hand, better, or again, alternatively, afresh, ruther, anew, bis, better still, agin, rather.

You can walk home, or, better (yet), you can ride.

Words that are +CONJUNCT-REPLICATIVE need to be +ADVERB-CONJUNCT.

Words that are +CONJUNCT-REPLICATIVE and can function as transitionals need to have their appropriate TRANSITIONAL WORD FLAGS set.

"Better" and "worse," for example, do not have TRANSITIONAL WORD FLAGS set. They rarely (if at all unless in a highly contrived sence) can function as transitionals.

NOTE:

The decision was made not to remove the ADVERB-CONJUNCT flag and the CONJUNCT-REPLICATIVE flag from "better" and "worse" even though they are not actually conjuncts, and only function so when they are the rememants of a reduced clause. (what is better, what is worse, it would be better if)

Removing flags on function words can be dangerous. Check with the lexicon linguist and the computational linguist before you remove a flag form a function flag. Even when you know it is a erroneous setting, check first. Remove later.)

The CONJUNCT-REPLICATIVE flag does not independently activate IC linguistic core analysis flags.

CONJUNCT-ANTITHETIC

CONJUNCT-ANTITHETIC adverbs have a strong contrastive personality.

They contrast two predications.

Words that are +CONJUNCT-ANTHITHETIC include: instead, oppositely, on the other hand, constrastingly, vice versa, then, by way of comparison, by contrast, contrariwise, conversely, on the contrary, in comparson.

You told me that you act academically; instead, you split infinitives like Abe split wood.

Words that are +CONJUNCT-ANTITHETIC need to be +ADVERB-CONJUNCT.

Words that are +CONJUNCT-ANTITHETIC and can be used as transitionals need to have their appropriate TRANSITIONAL WORD FLAGS set.

The CONJUNCT-ANTITHETIC flag does not independently activate IC linguistic core analysis attractors.

CONJUNCT-CONCESSION

CONJUNCT-CONCESSION adverbs introduce the unexpected and acknowledge or concede a point.

Words that are +CONJUNCT-CONCESSION include: anyhow, anyway, besides, else, however, nevertheless, nonetheless, none the less, notwithstanding, only, still, though, yet.

Words that are +CONJUNCT-CONCESSION need to be +ADVERB-CONJUNCT.

Words that are +CONJUNCT-CONCESSION and can function as transitionals need to have their appropriate TRANSITIONAL WORD FLAGS set.

The CONJUNCT-CONCESSION flag is used as a crosscutter by PowerEdit to activate the "MISSING PUNCTUATION 223/7" message on select disjuncts.

Words that are +ADVERB, +ADVERB-ADJUNCT, +ADVERB-DISJUNCT, but are –ADVERB-CONJUNCT can have CONJUNCT-CONCESSIVE set to make the word a "conjunct promote" word and activate "MISSING PUNCTUATION 223/7."

The promote conditions are:

Sentence initial before a +VERB-PRIMARY ASPECTUAL PASSIVE verb.

He, surely, is a doctor ass.

Sentence final. If the word is +ADJUNCT-PROCESS it will not be a "conjunct promote" in this position.

Words that are "conjunct promote" include:

words, happily, ideally, literally, theoretically, personally, actually certainly, clearly, naturally, obviously, apparently, perhaps, presumably, surely, by the way.

The CONJUNCT-CONCESSION flag activates IC linguistic core analysis attractors.

The CONJUNCT-CONCESSION flag is used by the PowerEdit Indexes.

CONJUNCT-CONDITION

CONJUNCT-CONDITION is the marker of abrupt temporal transitions.

CONJUNCT-CONDITION adverbs are used to signal shifts in time that need to be expressed because either they are unexpected shifts or they are important for the understanding of the relationship between two predications.

The robber headed for home. Meanwhile, the police were arresting his wife. (unexpected shift=irony)

Words that are +CONJUNCT-CONDITION include: meanwhile, in the meanwhile, how, now matter how, meantime.

When the CONJUNCT-CONDITION flag is set, the ADVERB-CONJUNCT flag should also be set.

CONJUNCT-CONDITION adverbs that can function as transitionals should have their appropriate TRANSITIONAL WORD FLAGS set.

The CONJUNCT-CONDITION flag activates IC linguistic core analysis attractors.

The CONJUNCT-CONDITION flag is used by the PowerEdit Indexes.

ADVERB POSITION INITIAL FLAGS

The POSITION FLAGS listed below are not restricted to adverbs. They are meant to be crosscutters that can occur on any part of speech.

When the part of speech is ADVERB its function is to allow the adverb to occur in that position even though its class generally does not occur there.

The POSITION FLAGS are primarily identificational. They specify that the word can occur in a certain position.

The POSITION FLAGS are used to bypass PowerEdit position errors.

They can be used for other identificational purposes as a crosscutter.

But, the flags listed below activate IC linguistic core analysis attractors and cannot be used indiscriminately as a crosscutter.

POSITION-SENTENCE INITIAL

POSITION-BEFORE OPERATOR

POSITION-BETWEEN TWO AUXILIARIES

POSITION-BEFORE COMPLEMENT

POSITION-SENTENCE END.

Follow the regular procedure and make sure that you are not stepping on a core function when you use one of these flags as a crosscutter.

POSITION-BEFORE SUBJECT

The POSITION-BEFORE SUBJECT flag allows the word to occur directly before the subject.

The POSITION-BEFORE SUBJECT does not activate IC linguistic core analysis attractors.

POSITION-SENTENCE INITIAL

The POSITION-SENTENCE INITIAL flag allows a word to occur as the first word in a sentence.

The POSITION-SENTENCE INITIAL flag activates IC linguistic core analysis attractors.

ADVERB POSITION MEDIAL FLAGS

POSITION-BEFORE OPERATOR

The POSITION-BEFORE OPERATOR flag allows the word to occur directly before an operator auxiliary.

An operator is the first auxiliary verb that occurs in a series of auxiliary verbs.

He could (operator) have been being (aux verbs) deleted by the great operator in the sky.

POSITION-BEFORE OPERATOR activates IC linguistic core analyis attractors.

POSITION-BETWEEN TWO AUXILIARIES

The POSITION-BETWEEN TWO AUXILIARIES flag allows the word to occur between two auxiliary verbs.

The POSITION-BETWEEN TWO AUXILIARIES flag activates IC linguistic core analysis attractors.

POSITION-BEFORE VERB

The POSITION-BEFORE VERB flag allows a word to occur directly before a lexial verb.

The POSITION-BEFORE VERB flag activates IC linguistic core analysis attractors.

POSITION-BEFORE COMPLEMENT

The POSITION-BEFORE COMPLEMENT flag allows a word to occur before a complement in intensive clauses.

The POSITION-BEFORE COMPLEMENT flag activates IC linguistic core analysis attractors.

ADVERB POSITION END FLAGS

POSITION-AFTER INTRANSITIVE VERB

The POSITION-AFTER INTRANSITIVE VERB flag allows a word to occur directly after an intransitive verb.

The POSITION-AFTER INTRANSITIVE VERB flag does not independently activate any IC linguistic core analysis attractors.

POSITION-AFTER OBJECT

The POSITION-AFTER OBJECT flag allows a word to occur directly after an indirect or direct object.

The POSITION-AFTER OBJECT does not independently activate IC linguistic core analysis flags.

POSITION-AFTER COMPLEMENT

The POSITION-AFTER COMPLEMENT flag allows a word to occur directly after an object complement.

The POSITION-AFTER COMPLEMENT flag does not independently activate IC linguistic core analysis attractors.

POSITION-SENTENCE END

The POSITION-SENTENCE END flag allows a word to be the last word in a sentence.

The POSITION-SENTENCE END flag activates IC linguistic core analysis attractors.

PREPOSITION SYNTAX FLAGS

Prepositions can function as:

A postmodifier in a noun phrase.
  The people in the street were walking.
Adverbial Adjuncts.
  The people were walking in the street.
Disjuncts.
  With all fairness, he did save his program.
Conjuncts.
  On the other hand, his computer was not plugged in.
Complement of a Verb.
  We were looking at his French photograph collection.
Adjective.
  I am sad for his condition.

The PREPOSITIONS in the system are flagged so that each preposition will leave its own footprint. This allows the programmers and linguists to identify one PREPOSITION and program for its special uses. One set of flags per PREPOSITION.

The PREPOSITIONS are also flagged so that they capture class and subclass distinctions of types of PREPOSITIONS that share common functions.

The semantic, syntactic, and pragmatic discussion about each prepositional flag is not meant to be a definitive classification and dicsussion of prepositional meanings.

The crucial settings are those which allow the preposition to function as an adverbial adjunct of various types, postmodifiers, complementation uses, disjunctive uses, and special uses of verb complements.

PREP-SIMPLE

The PREP-SIMPLE flag is set on all one word PREPOSITIONS.

Words that are +PREP-SIMPLE include:
  about, above, across, after, against, along, amid, among, before, behind, below, beside, by, despite, down, for, from, in, inside, of, off, on, upon, over, per, plus, since, than, through, to, toward, under, until, up, with, within, and without.

The PREP-SIMPLE flag activates IC linguistic core analysis attractors.

PREPOSITIONS cannot be followed by "that" clauses.

**He demanded on that he was not guilty.

After that clause verbs or adjectives the preposition should be ommitted if a "that" clause follows.

**He insisted on that he was guilty.

He insisted on his innocence.

He insisted that he was innocent.

PREP-COMPLEX

The PREP-COMPLEX flag is set on all PREPOSITIONS that are phrased.

This flag is primarily an identification flag. If a phrased preposition has the same flags set as its single word PREPOSITION counterpart, The PREP-COMPLEX flag is set to show that it is a phrased preposition.

This allows for greater specificity in preposition identification.

This flag is set on all complex prepositions to distinguish them from single word prepositions.

Prepositions should only be phrased when it forms a sequence that forms a unit that is indivisible in meaning and syntax.

Words that are phrased and +PREP-COMPLEX include:
  in spite of, in regard to, in exchange for, in back of, by means of, out of, from below, down in, because of, except for, from without, in all of, down under.

Only phrase prepositions based on real analysis problems. Then test them thoroughly.

The PREP-COMPLEX flag is used extensively as a crosscutter for PowerEdit on words that are -PREPOSITION.

PREP-COMPLEX is used to identify phrased elements that are +ADVERB and/or +CONJUNCTION but not a preposition.

only when, only if, only then.

The PREP-COMPLEX and ADVERB-FOCUS flags are used by PowerEdit to identify: merely, purely, simply, and just. As ADVERB-FOCUS words they are a unique set that cannot occur in the SENTENCE END position.

The PREP-COMPLEX flag is used by PowerEdit to distinguish "our" from "my."

The PREP-COMPLEX is used by PowerEdit to identify PREPOSITIONS that are phrased with "which."

The PREP-COMPLEX flag activates IC linguistic core analysis attractors.

NOTE:

Words that are also "-ing" or "-ed" participles can sometimes function as prepositions. Since Griff gives such a great weight to VERBS, to flag present participles and past participles as +PREPOSITION only causes confusion in the system, obliterates logic breaks and otherwise causes havoc with the analysis.

Words that are +VERB-PRESENT PARTICIPLE or +VERB-PAST PARTICIPLE and are not +PREPOSITION include:

barring, excepting, excluding, concerning, considering, regarding, respecting, touching, failing, wanting, following, pending, given, granted, including.

Griff will handle these words fine by analyzing them particples. When people use these words prepositionally, they often end up producing a dangling participle construction.

Granting his foul manners, the job was carried through to completion.

PREP-MEANS

The PREP-MEANS flag denotes "means."

Words that are +PREP-MEANS include:
  by, with, in, by means of, by the hand of.

The PREP-MEANS flag activates IC linguistic core analysis attractors.

PREP-INSTRUMENT

The PREP-INSTRUMENT flag is set on PREPOSITIONS that denote instrumentality.

Words that are +PREP-INSTRUMENT include:

by, with.

He trashed the program with a single key stroke.

They beat the snake with a club.

The cars were dented by the hail.

The cars were dented with hail.

The PREP-INSTRUMENT flag activates IC linguistic core analysis attractors.

PREP-MANNER

The PREP-MANNER is set on PREPOSITIONS that denote manner.

Words that are +PREP-MANNER include:

like, with, by.

The PREP-MANNER flag allows singular count nouns to surround it with the zero article.

step by step, day by day, inch by inch.

The PREP-MANNER flag activates IC linguistic core analysis attractors.

PREP-PURPOSE

The PREP-PURPOSE flag is set on PREPOSITIONS that are used to express purpose (the idea of "in order to" ) and the idea of ultimate destination.

Words that are +PREP-PURPOSE include:

as for, for about, in order for, for, for up to.

The PREP-PURPPOSE flag activates IC linguistic core analysis attractors.

PREP-LINE

PREP-LINE is set on place prepositions that are associated with line/space.

Words that are +PREP-LINE include:

onto, aboard, off, up on, on, upon, astride.

Examples of PREP-LINE usage:

John drove his car onto the road. (destination/line/positive)

John drove his car on the road. (position/positive/line)

John drove his car off the road. (destination/negative/line)

John drove his car off the road. (position/negative/line)

The PREP-LINE flag activates IC linguistic core analysis attractors.

PREP-POINT

PREP-POINT is set on place prepositions where the location is dimentionless or treated as point in space.

Words that are +PREP-POINT include:

from, unto, at, away from, against, to, towards.

The man is at his home. (point/position)

John is going to work. (point/positive/destination)

John is coming home from work. (point/negative/destination)

The PREP-POINT flag activates IC linguistic core analysis attractors.

PREP-POSITION

The PREP-POSITION flag is set on place prepositions that do not have movement asscoiated with them. The referent is stationary at a particular space and is not moving.

Words that are +PREP-POSITION include:

at, out, within, near, outside, by, in, on, against.

Words can be +PREP-POSITION and +DESTINATION.

John was at home. (point/position)

John was on the street corner. (line/position)

John was in jail. (area/position)

The PREP-POSITION flag activates IC linguistic core analysis attraactors.

PREP-DESTINATION

The PREP-DESTINATION flag is set on locational prepositions that have an inherent idea of movement associated with them.

Words that are +PREP-DESTINATION include:

onto, out, under, from, in back of, round, over, upon, into, off, accross, for.

Destination prepositions are not allowed to follow causal verbs.

** He made to the door.

He made it to the door.

He made for (goal) the door. Idiomatic.

Examples of +PRE-DESTINATION usage:

John was going to Dallas. (point/positive/destination)

John was coming from Dallas. (point/negative/destination)

John was driving his car onto the road. (line/positive/destination)

John was driving his car off the road. (line/negative/destination)

John was going into Dallas. (area/positive/destination)

John was driving his car out of Dallas. (area/negative/destination)

The PREP-DESTINATION flag activataes IC linguistic core analysis attractors.

PREPOSITION LOCATION PLACE FLAGS

Place prepositions are defined by how they are used spatially.

PREP-DESTINATION implies movement.

PREP-POSITION implies a fixed position with no movement.

PREP-POSITIVE and PREP-DESTINATION indicate movement towards.

PREP-NEGATIVE and PREP-DESTINATION indicate movement away or from. PREP-POINT denotes a specific point or referent.

PREP-LINE denotes a surface.

PREP-AREA denotes an area, or enclosed space (including volume).

PREP-NOUN FREE

The PREP-NOUN FREE flag is special function flag that allows a pure count noun to occur as a prepositional complement with out a determiner.

We produced the document in house.

Words that are +PREP-NOUN FREE include:

in, down in, up in, out in, according as, per, as, but.

PREP-NOUN FREE is used by PowerEdit as a crosscutter. When PREP-NOUN FREE is set on a word that is:

+COMMON NOUN

+COMMON NOUN-MASS

−COMMON NOUN-COUNT

−PREPOSITION it will bypass the PowerEdit "MASS NOUN USAGE 49/3" message.

The setting will allow:

You have been a great help.

The crosscutter is set on: help, helping, and fondness.

It is also a crosscutter for conjunctions that have an implied subject for the clause they introduce. of_who in 'I was aware of who was in charge' tells message 14 that the of_who is functioning as the subject.

The PREP-NOUN FREE flag activates IC linguistic core analysis attractors.

PREP-AREA

The PREP-AREA flag denotes PREPOSTITIONS used to designate area and/or volume space.

Words that are +PREP-AREA include:

down in, out, in, into, without, within, out of.

Examples of PREP-LINE usage:

John drove his car into the house. (destination/positive/area)

John drove his car in the city. (position/positive/area)

John drove his car out of the city. (destination/negative/area)

John drove his car out of the city. (position/negative/area)

The PREP-LINE flag activates IC linguistic core analysis attractors.

PREP-SOURCE

The PREP-SOURCE functions similar to a "negative/destination" preposition. But PREP-SOURCE indicates "place of origin." The PREP-SOURCE flag is presently reserved for "from" and phrased words with "from" or equivalent in meaning to "from."

Words that are +PREP-SOURCE include:

from below, from outdoors, from, from within, down from, from without, from indoors, different from, right out of.

The PREP-SOURCE flag activates IC linguistic core analysis attractors.

PREP-GOAL

The PREP-GOAL flag functions similar to the combination "positive/destination," but PREP-GOAL is restricted to the meaning of intended "recipient/destination."

Words that are +PREP-GOAL include:

to, at, on, for.

Examples of PREP-GOAL usage:

I have a book for you.

I am heading for the hills.

The lawyer created confusion for all parties.

John cooked a delightful dinner for his friends.

He gave the money to his banker.

The judge took aim at the hearsay law--and missed.

The PREP-GOAL does not use "positive/negative" distinctions because it has a non-assertive quality about it.

A PREPOSITION that is +PREP-GOAL is a non-assertive PREPOSITION.

"I have a book for you" is not as strong as "I will give you a book." It may imply that there are conditions when I will give you the book, and conditions when I won't give you the book.

"I am heading for the hills" does not assert that I will reach my destination (probably will), but it is not a given.

The PREP-GOAL flag activates IC linguistic core analysis attractors.

PREP-BEFORE

The PREP-BEFORE flag denotes that a PREPOSITION has a relative position that is primarily in space, but PREP-BEFORE can be used for "before" temporal relationships that indicate a time relationship previous to a given time-referent.

Words that are +PREP-BEFORE include:

even before, previous to, beyond, prior to, before.

The PREP-BEFORE flag does not indepdndently activate IC linguistic core analysis attractors.

The PREP-BEFORE flag may be used as a crosscutter. The PREP-BEFORE flag may be set on words that are +ADJECTIVE-TIME REFERENT, +VERB-PRESENT PARTICIPLE, +ADJUNCT-TIME that indicate a temporal ordering that is previous to an explicit time reference.

He had to write the book. His preceeding book was a loser.

Do not use PREP BEFORE as a crosscutter if the word is +ADJECTIVE and +PREPOSITION ("next")

PREP-AFTER

The PREP-AFTER flag identifies a PREPOSITION that has a relative position that is primarily spatial but the PREP-AFTER flag can also be used for temporal relationships as well. The PREP-AFTER flag is used to indicate "subsequent time" relationships.

Words that are +PREP-AFTER include:

after, later, ensuing, subsequent, behind, subsequently.

The PREP-AFTER flag does not independently activate IC linguistic core analysis attractors.

The PREP-AFTER flag is used as a crosscutter on words that are +ADJCTIIVE-TIME-REFERENT, +VERB-PRESENT-PARTICIPLE, or +ADJUNCT-TIME to indicate the word is being used to temporally order events that are subsequent to a given specific time referent.

He looked well on Friday. The following day, he died.

Do not use PREP-AFTER on a word that is +ADJICTIVE and +PREPOSITION ("next").

PREP-POSITIVE

The PREP-POSITIVE flag when paired with the PERP-DESTINATINO flag denotes "movement towards."

Words that are +PREP-POSITIVE include:

even at, up in, at, in, down on, to,

The PREP-POSITIVE flag does not directly activate IC linguistic core analysis attractors.

PREP-NEGATIVE

The PREP-NEGATIVE flag with words that are +PREP-DESTINATION denotes movement "away form" or "out of." The PREP-NEGATIVE word often has an opposite that is +PREP-POSITIVE.

"John is off his mark today" is equivalent to "John is not on his mark today."

Words that are +PREP-NEGATIVE include:

out, outwith, from, down from, out of, from out of, exclusive of, without.

The PREP-NEGATIVE flat provides the esstntial difference between:

with +PREP-POSITIVE without +PREP-NEGATIVE but +PREP-POSITIVE but for +PREP-NEGATIVE The PREP-NEGATIVE flag activates IC linguistic core analysis attractors.

PREPOSITION LOCATION PATH FLAGS

PREP-PASSAGE

PREP-PASSAGE denotes movement "accross" space, "through" space, or "beyond" a space.

PREPOSITIONS that are +PREP-PASSAGE frequently occur with verbs of motion.

Words that are +PREP-PASSAGE include:

along, over, via, across, by way of, beyond, past, well over, through.

PREPOSITIONS that denote a "relative position" are:

+PREP-POSITION and +PREP-ORIENTATION

PREPOSITIONS that denote "relative destination" are:

+PREP-DESTINATION and +PREP-ORIENTATION

The PREP-PASSAGE flag does not independently activate IC linguistic core analysis attractors.

PREP-ACROSS

PREP-ACROSS denotes movement "on" the surface of "point-space," "line-space." The movement must denote a break in a horizontal axis. This breaking of a horizontal axix captures the difference between "along" and "across."

I walked across the road.

(My movement broke the horizontal axis of the road)

I walked along the road.

(My movement did not break the horizontal axis of the road.

PREP-ACROSS is only set on "across."

The PREP-ACROSS flag does not independently activate IC linguistic core analysis attractors.

PREP-THROUGH

The PREP-THROUGH flag is set on PREPOSITIONS which denote movement through "area-space" or "volume-space."

Words that are +PREP-THROUGH include:

per, via, by way of, through.

Words that are +PREP-THROUGH are not +PREP-DESTINATION.

I swam accross the river. (to the other side)

**I swam through the river (to the other side)

The PREP-THROUGH flag activates IC linguistic core analysis attractors.

PREP-UP

The PREP-UP flag is set on PREPOSITIONS that denote movement "up" a vertical axis.

Words that are +PREP-UP include:

At up, over, on top of, atop, above, well over.

The PREP-UP flag activates IC linguistic core analysis attractors.

PPEP-DOWN

The PREP-DOWN flag is set on PREPOSITIONS that denote movement "down" a vertical axis.

Words that are +PREP-DOWN include:

under, down, down under, below, underneath, from under.

The PREP-DOWN flag activates IC linguistic core analysis attractors.

PREP-ALONG

The PREP-ALONG flag is set on PREPOSITIONS that refer to horizontal movement that does not break a vertical axix.

The PREP-ALONG flag is on "along."

The PREP-ALONG flag activates IC linguistic core analysis attractors.

PREP-VERTICAL

The PREP-VERTICAL flag is set on PREPOSITIONS that denote movement or position "along," "on," or "across" a vertical axis.

Words that are +PREP-VERTICAL include:

under, up, down, over, down under, underneath, on top of, atop, above, from under.

The PREP-VERTICAL flag activates IC linguistic core analysis attractors.

PREP-HORIZONTAL

The PREP-HORIZONTAL flag is set on PREPOSITIONS that denote movement or position "along," "on," or "across" a horizontal axis.

Words that are +PREP-HORIZONTAL include:

after, long, in back of, below, beneath, behind.

The PREP-HORIAONTAL flag may activate IC core analysis attractors.

PREP-ORIENTATION

The PREP-ORIENTATION flag is set on PREPOSITIONS that denote relative position. Relative position is determined by a referents coordinates in reference to other fixed points. Location implies actual contact with the referent.

He is opposite the barn. (orientation)

He is in the barn. (location: The barn contains/encloses him.)

The PREP-ORIENTATION flag is used in combination with other locational flags to indicate the differences of:

Relative destination. +PREP-DESTINATION +PREP-ORIENTATION.

Relative destination words include:

alongside, opposite, over, under, behind.

These prepositions can be used freely with progressive movement verbs.

He is going over the fence.

He is going behind the fence.

He is pulling alongside the boat.

Relative position. +PREP-POSITION, +PREP-ORIENTATION.

He is over the barn.

He is close to the barn.

He is alongside the boat.

There is considerable overlap among orientation prepositions. Their use and denotation is heavily influenced by verb type and aspect of tense.

Relative position/motion (the general vacinity of). +PREP-POSITION, +PREP-ORIENTATION, +PREP-DESTINATION.

This class contains those prepositions which are used frequently in continuous motion clauses that may or may not have a goal or destination in sight.

He is running around.

He is running around the barn.

He is running about the barn. (rare)

We were sitting around the office.

There are not too many good linguists around here.

There are not too many good linguists about here.

We were running around the office. (ambiguous)

Relative time. Temporal prepositions which are also conjunctions have the PREP-ORIENTATION flag set to indicate relative, indefinite time. It measures the relative time from a fixed point.

He arrived at 6 o'clock. (definite)

He arrived after 6 o'clock.(indefinite)

The PREP-ORIENTATION flag activates IC linguistic core analysis attractors.

PREPOSITION GRAMMAR ADVERBIAL ADJUNCTIVE FLAGS

The adjunctive use of prepositons captures the conceptual uses, meanings and relationships of:

The cause/purpose/destination/goal notion.

The manner/means/instrument/agent/stimulus notion.

The accompaniment/support/opposition notion.

The temporal relationship notion.

Examples of "cause/purpose:" (Quoted from CGEL p.695)

Cause: She lost her job because of her age.

Reason: He was fined for drunken driving.

Motive: She did it out of kindness.

Purpose: Everyone ran for shelter.

Destination: I am leaving for Seattle.

Goal: The novel is aimed at a young audience.

Examples of "means/agent:" (Quoted from CGEL p. 695)
Manner: She performed the operation with skill.
Instrument: She opend the door with a knife.
Agent: They were noticed by John.
Stimulus: I am astonished by your reaction.
Examples of accompaniment: (Based on CGEL pp. 702–3.)
Accompaniment: I am glad you came with us.
Support: I am glad you stood with us.
Oppostition: I am not glad you fought with us.
Examples of time. (Based on CGEL p.694.)
Time when: He came at 6.
Time duration: He stayed for 6 hours.

PREP-STIMULA

The PREP-STIMULA flag denotes PREPOSITIONS that are used to describe the relationship between a stimulus and an emotion. There is considerable overlap between the manner, means, instrument, stimulus, and agentive notions.

The PREP-STIMULA flag is used to distinguish "by" which is +PREP-STIMULA from "with" which does not have PREP-STIMULA set.

Words that are +PREP-STIMULA include:
by, at, at all, even at.

The PREP-STIMULA flag activates IC lingustic core analysis attractors.

PREP-ACCOMPANIMENT

The PPEP-ACCOMPANIMENT flag denotes PREPOSITIONS that express an additive meaning.

Words that are +PREP-ACCOMPANIMENT include:
outwith, together with, up with, cum, without.
I am glad that you went with us.
I like whiskey with my water.

The PREP-ACCOMPANIMENT flag activates IC linguistic core analysis attractors.

PREP-SUPPORT

The PREP-SUPPORT is set on PREPOSITIONS which denote the notion of solidarity and cooperation.

Words that are +PREP-SUPPORT include:
for, with.

The PREP-SUPPORT flag does not independently activate IC linguistic core analysis attractors.

PREP-OPPOSITION

The PREP-OPPOSITION flag conveys the notion of opposition. Words that are +PREP-OPPOSITION include:
with, against, versus, vis-a-vis, other than.
The union stood with their members. (support)
The union faught with the company. (opposition)
The linguist went against the flow of opinion.

The PREP-OPPOSITION flag does not independently activate IC linguistic core anslysis attractors.

PREP-TIME WHEN

The PREP-TIME WHEN flag is set on PREPOSITIONS that denote "time when."

Words that are +PREP-TIME WHEN include:
after, even at, within, from, by, at, in, between.
We will arrive in the morning.
We will be ther by 6 o'clock.
We left at 8 o'clock.
The linguist will leave before evening.

The PREP-TIME WHEN flag activates IC linguistic core analysis attractors.

PREP-DURATION

The PREP-DURATION is set on PREPOSITIONS used to express a span of time. The PREPOSITIONS that are +PREP-DURATION function similar to +ADJUNCT-DURATION adverbs.

PREP-DURATION can express the ADJUNCT-TIME LENGTH notion.
He was here for six weeks.

PREP-DURATION can express the ADJUNCT-FROM PRESENT POINT notion:
He has been up since dawn.

Words that are +PREP-DURATION include:
over, since, for about, beyond, past, for, till, until, during.

The PREP-DURATION may activates IC linguistic core analysis attractors.

PREPOSITION GRAMMAR ADVERBIAL DIS/CONJUNCT FLAGS PREP-RESULTIVE

The PREP-RESULTIVE flag is set on some negative position prepositions and some passage prepositions to isolate them into a subclass which can be used with the verb "be" to indicate the state of having arrived at a destination.

Words that are +PREP-RESULTIVE include:
from, over, out of, from out of, past, through.
At last, we are accross the river.
Finally, that crisis is past us.
The cars are over the hill.
We are through that crisis.
We are out of the woods.

The PREP-RESULTIVE flag does not independently activate IC linguistic core analysis attractors.

PREP-COMPARISON

The PREP-COMPARISON flag is set on PREPOSITIONS with signal comparisons.

Words that are +PREP-COMPARISON include:
less than, rather than, over, as, than, such as, as well as.

The PREP-COMPARISON flag activates IC linguistic core analysis attractors.

This flag was originally called preference. (wd preference prep) Preference did activate IC linguistic core analysis attractors.

PREP-COMPARISON is set on the words "full" and "empty" to identify them as a class which can occur after "as" in comparisions.

PREP-PERVASIVE

The PREP-PERVASIVE flag is set on PREPOSITIONS that have the meaning "everwhere."

Words tht are +PREP-PERVASIVE include:
all around, along, over, as a whole, through, throughout.
Linguists throughout the world are underpaid.
Some prepositions, when fronted by "all," have a pervasive meaning.
They marched all around the field.
Linguists all over the world are underpaid.
The linguistis stood in the unemployment line all through the day.

The PREP-PERVASIVE flag activates IC linguistic core analysis attractors.

PREP-CAUSE

The PREP-CAUSE flag is set on PREPOSITIONS that denote causality. Causality includes: motive, ultimate cause, penultimate cause, psychological cause, indirect cause, basis, reason, and impetus.

Words that are +PREP-CLAUSE include:
because of, for the sake of, owing to, for, from.

Examples of PREP-CLAUSE usage:
He did it for no good reason.
The linguist was fired because of his bad breath and dangling participles.

The linguist saved the product out of the kindness of her heart.

The linguist perished from the abundance of psudo-cleft-splitinfinitive-double-entendre sentences.

The PREP-CLAUSE flag activates IC linguistic core analysis

PREP-CONCESSION

The PREP-CONCESSION flag is set on PREPOSITIONS which are used to signal something unexpected or surprising will take place, or has taken place.

Words that are +PREP-CONCESSION include:

rather than, notwithstanding, despite, other than, instead of.

I will bring a raincoat in spite of the weather forecast.

Despite his resume, he still does not impress me.

The PREP-CONCESSION flag does not independently activate IC linguistic core analysis attractors.

PREP-REFERENCE

The PREP-REFERENCE flag is set on PREPOSITIONS that signal the topic or theme.

Words that are +PREP-REFERENCE include:

with regard to, according as, about, on the matter of, in, on, in view of, as, according to, re.

With respect to your qualifications, we remain unimpressed.

Re your idea in the memo, it works.

As for his ideas, I suppose they have merit.

With regard to your comments, I think it best if we ignore them.

The PREP-REFERENCE flag activates IC linguistic core analysis attractors.

PREP-EXCEPTION

The PREP-EXCEPTION flag is set on PREPOSITIONS that signal exceptions, reservations, anomalies, and other deviations from a general rule or statement.

Words that are +PREP-EXCEPTION include:

except for, but even so, but for, with the exception of, beyond, except, but.

I could program this, except for the fact that I can't read.

The program runs well apart from the gliches.

Apart from John, everyone here knows their stuff.

The PREP-EXCEPTION flag does not independently activate IC linguistic core analysis attractors.

PREP-ADDITION

The PREP-ADDITION flag is set on PREPOSITIONS which signal afterthoughts, or additive ideas. +PREP-ADDITION words function similar to ADJUNCT-ADDITIVE adverbs.

Words which are +PREP-ADDITION include:

moreover, in addition to, let alone, minus, besides, but besides.

Five programers in addition to the entire linguistic staff were leaving.

He was learning how to program as well as learning how to read.

Linguists have many friends besides other linguists.

The PREP-ADDITION flag does not independently activate IC linguistic core anlalysis attractors.

PREPOSITION NOUN FLAGS

PREP-POSSESSION

The PREP-POSSESSION flag is a special flag to allow a PREPOSITION to be a postmodifier of a noun phrase.

Words that are +PREP-POSSESSION include:

of, of about, in need of, with, in connection with.

The PREP-POSSESSION flag activates IC linguistic core analysis attractors.

PREP-HAVING

The PREP-HAVING flag indicates the "having the attributes" notion of possession.

Words that are +PREP-HAVING include:

of, of about, in need of, with, up with, in connection with.

The PREP-HAVING flag does not independently activate IC linguistic core analysis attractors.

PREP-SEMANTIC NOUN

The PREP-SEMANTIC NOUN flag is available for application use.

The PREP-SEMANTIC NOUN flag does not activate any IC linguistic core analysis attractors.

The PREP-SEMANTIC NOUN flag is ready for a new use.

PREPOSITION VERB COMPLEMENT FLAGS

PREP-SUBJECT MATTER

The PREP-SUBJECT MATTER flag is set on prepositions that indicate the subject matter after a VERB or ADJECTIVE.

Words that are +PREP-SUBJECT MATTER include:

about, over, of, upon, on.

This is a program about language.

He is speaking about language tomorrow.

This is a program on language.

He is speaking on the subject of language tomorrow.

The PREP-SUBJECT MATTER flag is used as a PowerEdit crosscutter to bypass the "PASSIVE" message when PREP-SUBJECT MATTER is set on a VERB that is +COMMON NOUN-SPEECH ACT.

PREP-INGREDIENT

The PREP-INGREDIENT flag is set on PREPOSITIONS that indicate materials used in construction or making something.

Words which are +PREP-INGREDIENT include:

from, of, with, out of, together with, right out of.

The first little pig built a house with bricks.

The second little pig prefabricated a house out of straw.

The third little pig made a house of sticks.

The fourth little pig made a house from environmentally unsafe material.

The PREP-INGREDIENT flag activates IC linguistic core analysis attractors.

PREP-REACTION

The PREP-REACTION flag is set on PREPOSITIONS which occur after verbs that express emotion.

Words that are +PREP-REACTION include:

to, by, at.

I was angry at John.

To my surprise, it worked.

The PREP-REACTION flag activates IC linguistic core analysis attractors.

PREP-STANDARD

The PREP-STANDARD flag set on PREPOSITIONS used to make evaluation comparisons. The PREP-STANDARD flag is the disjunct flag of PREPOSITIONS.

PREPOSITIONS that are +PREP-STANDARD include:

even at, as for, even on, for about, at, on, for.

That program is large, for a program.

Linguists are terrible at programming.

For a linguist, he is ok.

He is not very good at linguistics.

The PREP-STANDARD flag does not independently activate IC linguistic core analysis attractors.

The PPEP-STANDARD flag is set on adjectives of color for PowerEdit.

PREP-STANDARD is set on words of "color" to identify them for PowerEdit. The identification is needed since most words of color (while they can function as adjectives, and count/mass nouns) are entered into the lexicon as +ADJECTIVE-NOUN PROMOTION. This creates a problem when the word is used as a mass noun after a dynamic extensive verb. PowerEdit fires off an incorrect error message since only intensive verbs can accept an adjective in the "next-word" position.

The man glared red.

The man saw red.

The man went red in the face.

Usually these colors are used idiomatically as "adverbs" expressing a metaphorical use of color for emotion, attitude, or viewpoint.

The major colors are flagged as +PREP-STANDARD:

white, black, gray, brown, red, orange, yellow, green, blue, purple, pink, violet.

Colors that are count/mass nouns do not need this flag:

ivory, lampblack, coconut, hazel, topaz.

Colors that are not used metaphorically or idiomatically do not need this flag:

tenne, oriole, russet, sienna, alizarin, annatto, for example.

CONJUNCTION COORDINATING FLAGS

The coordinating conjunctions are a closed class. How the flags work together with the attractors is too complex to detail. The flags on each CONJUNCTION were assigned after testing and experience.

Since the CONUUNCTIONS function differently, it is important that the flags capture a way of identifying each conjunction as different from each of the other coordinating conjunctions in the system.

Phrases can be made using coordinating conjunctions but they must be extensively tested to ensure that no logic breaks are obliterated.

CONJUNCTION-COORDINATING

The CONJUNCTION-COORDINATING flag allows a word to connect two independent clauses, or two main clauses. It marks the attractors for co-ordinating clauses.

Words which are +CONJUNCTION-COORDINATIONG include:

and then, or else, or so, and/or, and so, or, or rather, so far, let alone, et, but nor, and also, but also, so now, and, as well as, for, not until, and therefore, so, not, and perhaps, nor.

The CONJUNCTION-COORDINATING flag is not available for use as a crosscutter.

The CONJUNCTION-COORDINATING flag activates IC linguistic core analysis attractors.

CONJUNCTION-PURE COORDINATING

The CONJUNCTION-PURE CORRDINATING flag is one of the most powerful flags in the system. It is used frequently to activate clause formation attractors.

The CONJUNCTION-PURE COORDINATING flag is the real coordinating power behind the coordinating conjunctions. This is a very powerful flag which lets clauses, phrases, and individual parts of speech (adjectives, adverbs,) be coordinated.

The distinguishing mark of a CONJUNCTION-PURE COORDINATING word is that it is exclusive and cannot co-occur with another CONJUNCTION-PURE COORDINATING word.

** He was a large and but adventerous person.

** He was a large or and adventerous person.

This definition rules out "for" and "nor" as pure coodinators since they can be preceeded by a pure coordinator.

Words that are +CONJUNCTION-PURE COORDINATING include:

and then, but then, or else, but even so, or so, but whether, but if, but unless, yet, and/or, only, and so, or, or rather, let alone, et, anyway, as much as, but nor, but only, and also, and still, but still, and, as well as, whereas, but, and therefore, and perhaps, and yet, quite, but yet The CONJUNCTION-PURE COORDINATING flag is not available for use as a crosscutter.

The CONJUNCTION-PURE COORDINATING flag activates IC linguistic core analysis attractors.

DISTINGUISHING MARKS OF COORDINATORS

There are three central coordinators. "and, or, but."

"For" is often classified as a coordinator.

"Nor" is not a PURE COORDINATOR because it can be preceded by another coordinator, and because it has a negative element which adds some syntactic differences.

"Both," "either," and "neither" are used in an anticipatory sense in a correlative pairing with "and", "or", "nor".

"Both," "either, and "neither" are not coordinators since they can be preceded by another coordinator.

The Pure coordinators are:

1. Restricted to initial position in their clauses.
2. Stop cataphoric pronoun reference.
3. "And" and "or" do not allow another conjunction to precede them.

CONJUNCTION-BLENDED COORDINATING

The CONJUNCTION-BLENDED COORDINATING FLAG IS set words that are not pure correlative coordinating conjunctions.

Words that are +CONJUNCTION-BLENDED COORDINATING include:

as for, no one, for about, so far, and nor, but nor, worthy of, except, so now, for, so, nor.

The CONJUNCTION-BLENDED COORDINATING flag activates IC linguistic core analysis attractors.

The CONJUNCTION-BLENDED COORDINATING flag is not available for use as a crosscutter.

CONJUNCTION-COORELATIVE COORDINATING

Words that are +CONJUNCTION-COORELATIVE COORDINATING include:

but then, or else, both much, but even so, either, or so, but whether, both, but if, but unless, yet, or, or rather, neither, and nor, but nor, but only, but also, but still, not only, but, not until, so, not, nor, but yet.

The CONJUNCTION-CORRELATIVE COORDINATING flag activates IC linguistic core analysis attractors.

The CONJUNCTION-CORRELATIVE COORDINATING flag is not available for use as a crosscutter.

CONJUNCTION SUBORDINATING FLAGS

SUBORDINATOR

The +SUBORDINATOR and +CONJUNCTION-WH-ELEMENT or +CONJUNCTION-THAT flag provides an weaker subordinating alternative than making a CONJUNCTION +SUBORDINATOR and +SIMPLE SUBORDINATOR.

The SUBORDINATOR class is composed of essentially the core words:

whosoever, whoever, that, what, whether, whichever, so.

Words tht are +SUBORDINATOR and -SIMPLE-SUBORDINATOR include:

toward which, without which, along which, among which, in which, under which, about which, out which, throughout which, until which, with which, upon which, on which, towards which, within which, against which, down which, between which, into which, to which, unto which, inside which, beside which, through which, around which, despite which, up which, besides which, off which, beyond which, underneath which, beneath which, over which, of which, notwithstanding which, for which, by which, below which, during which, from which, at which, he who, the fact that, that only, ago that, from the fact that, of the fact that, that even, as to whether, the question as to whether, as for, whoever, whosoever, no sooner, that, what, whether, whichever, how little, what little, so.

If a word is +SIMPLE-SUBORDINATOR it should also have +SUBORDINATOR set.

+SUBORDINATOR and -SIMPLE-SUBORDINATOR gives a stronger attractor value noun and adjective clause formation. It is possible to derive an adverbial clause, but first consideration is given to non-adverbial use.

Subordination can also be caused by inversion.

+ADVERB-NEGATIVE FORM can cause inversion but not subordination.

"Had," "were," and "should" can cause inversion and subordination when they are operators in conditional clauses.

Inversion and subordination on these words is handled programatically. This means that the words are identified uniquely and the attractors test for these words specifically.

There is no special lexicon flag set which says these words cause inversion in conditional clauses. Their thumbprint of flags activates attractors which balance and test for the inversion subordination posibility.

The SUBORDINATOR flag is a strong activator of IC linguistic core analysis attractors.

The SUBORDINATOR flag is not available for use as a crosscutter.

Words that are SUBORDINATORS can accept a nominative case PRONOUN following it.

That is a statement of which he is not ashamed.

For he is a jolly good fellow.

SIMPLE-SUBORDINATOR

The SIMPLE-SUBORDINATOR flag activates all the attractors that work with subordinating conjunctions. This is an extremely powerful flag.

Words that are +SIMPLE-SUBORDINATOR include:

after, although, though, as, because, before, if, how, however, once, since, that, till, unless, until, when, whenever, where, wherever whereas, whereby, whereupon, while, whilst. and phrases.

Words that are +SIMPLE-SUBORDINATOR also need to be +SUBORDINATOR.

The SIMPLE-SUBORDINATOR is the strongest flag of the CONJUNCT SUBORDINATING class. This flag will trigger IC linguistic core analysis attractors even if the CONJUNCTION part of speech flag is not set.

SIMPLE-SUBORDINATOR activates IC linguistic core analysis attractors.

The SIMPLE-SUBORDINATOR flag is not available for use as a crosscutter.

COMPOUND-SUBORDINATOR

The COMPOUND-SUBORDINATOR flag is a class identification flag. When a two words are phrased and the form a SUBORDINATING CONJUNCTION they should be +COMPOUND SUBORDINATOR.

Words that are +COMPOUND-SUBORDINATOR as include:

even as, so as, less than, as though, rather than, now that, in case, inasmuch as, but unless, as far as, just like, the fact that, no sooner, insofar as, as soon as, so that, in order that, save, as long as, so long as, such that, except that, for all that, until after, insomuch as, from the fact that, so far as, of the fact that.

The COMPOUND-SUBORDINATOR flag does not independently activate IC linguistic core analysis attractors.

END-THAT-SUBORDINATOR

The END-THAT-SUBORDINATOR flag identifies COMPOUND-SUBORDINATORS that are phrased with "that."

Words that are +END-THAT-SUBORDINATOR are:

now that, the fact that, so that, in order that, such that except that, for all that, from the fact that, of the fact that.

Words that are +END-THAT-SUBORDINATOR need to be +COMPOUND-SUBORDINATOR.

The END-THAT-SUBORDINATOR flag activates IC linguistic core analysis attractors.

The END-THAT-SUBORDINATOR flag is not available for use as a crosscutter.

OPTIONAL-END-THAT-SUBORDINATOR

The OPTIONAL-END-THAT-SUBORDINATOR flag is available for application use.

The OPTIONAL-END-THAT-SUBORDINATOR flag does not activate any IC linguistic core analysis attractors.

Originally this flag was intended to capture such words as:

providing that, provided that, supporing that, considering that, given that, granting that, granted that, admitting that, assuming that, presuming that, seeing that, immediately that, directly that.

But Either the system handles words such as those with the subordinating power of the participle, or else the phrase has a logic break problem.

He granted that man a wish.

The OPTIONAL-END-THAT-SUBORDINATOR flag is not presently set on any word in the lexicon.

END-AS-SUBORDINATOR

The END-AS-SUBORDINATOR flag is set on COMPOUND-SUBORDINATORS that end with "as."

Words that are +END-AS-SUBORDINATOR include:

even as, so as, exactly as, as either, whenas, inasmuch as, as far as, as, insofar as, as soon as, as far back as, now so, let alone, as long as so long as, but even as, just as, as much as, in the same way that, (=exactly as) so well as, insomuch as, so far as.

"As" had this flag set on it early. Do not remove END-AS-SUBORDINATOR from "as." "As" does not have the COMPOUND-SUBORDINATOR flag set.

The END-AS-SUBORDINATOR activates IC linguistic core analysis attractors.

The END-AS-SUBORDINATOR is not available for use as a crosscutter.

END-THAN-SUBORDINATOR

The END-THAN-SUBORDINATOR flag is set on COMPOUND-SUBORDINATORS that end with "than."

"Than" is +END-THAN-SUBORDINATOR but does not have the COMPOUND-SUBORDINATOR flag set. Do not remove the END-THAN-SUBORDINATOR flag from "than."

Words that are +END-THAN-SUBORDINATOR in the lexion as of 5-31-91:

rather than, less than, than, than if

"Than if" has END-THAN-SUBORDINATOR set because it is a combination of "than" and "if."

The END-THAN-SUBORDINATOR flag activates IC linguistic core analysis attractors.

The END-THAN-SUBORDINATOR flag is not available for use as a crosscutter.

CORRELATIVE-SUBORDINATOR

The CORRELATIVE-SUBORDINATOR flag is set on SUBORDINATING CONJUNCTIONS that pair up with an adverbial to augment or complement its meaning in the clause. The adverbial is optional.

Words that are +CORRELATIVE-SUBORDINATOR include:

> albeit, exactly as, as either, if, if it should happen that, and only if although, whether or not if, notwithstanding the fact that, if it should transpire that, if and when, although, no sooner, despite the fact that, If and only if, in spite of the fact that, under circumstances in which, as if, just as, if it should happen that, in the same way that, though, regardless of the fact that, so, whether.

The paired COORELATIVE SUBORDINATOR+ adverbial clarifies the relationship in the sentence, or the relationship between the adverbial subordinate clause and the main clause which is. introduced by the optional adverbial.

The CORRELATIVE-SUBORDINATOR flag is a powerful flag that activates many IC linguistic core analysis attractors.

The CORRELATIVE-SUBORDINATOR flag is not available for crosscutter use.

"If" and "though" can link ADJECTIVES.

He is a pleasant if talkative child.
It is a shabby though comfortable chair.
A simple yet devout prayer.

"If" and "though" can link ADVERBS.

He looked at me kindly if somewhat sceptically.
He spoke firmly though pleasantly.
He drove quickly yet safely.

Albeit" can link COMMON NOUNS.

He is an intelligent albeit rash leader.
He spoke firmly albeit pleasantly.

CONJUNCTION MISC. FLAGS

CONJUNCTION-SHIFTED POSITION

The CONJUNCTION-SHIFTED POSITION flag signals that there is a logic break that is mandatory on coordinating conjunctions that are phrased with another word.

A CONJUNCTION that is +CONJUNCTION-SHIFTED POSITION can co-ordinate clauses but not units smaller than a clause. The logic break occurs after the CONJUNCTION-SHIFTED POSITION word.

He ate an orange, and then (logic break) he died.

Words that are +CONJUNCTION-SHIFTED POSITION include:

> and then, in order, and so, only to, in order to, and also, to, and perhaps.

The CONJUNCTION-SHIFTED POSITION flag activates IC linguistic core analysis attractors.

The CONJUNCTION-SHIFTED POSITION flag is not available for use as a crosscutter.

CONJUNCTION-THAT

CONJUNCTION THAT is set on the word "that." It is one of the strongest flags in the entire system.

Words that are +CONJUNCTION-THAT in the lexicon:

> with which, within which, the fact that, that only, that, ago that, over which, of which, from the fact that, of the fact that, that even.

Words phrased with "that" or are functional equivilents to "that" should be +CONJUNCTION-THAT.

CONJUNCTION-THAT is a powful flag that activates many IC linguistic core analysis attractros.

CONJUNCTION-THAT is not available for use as a crosscutter.

CONJUNCTION-WH-ELEMENT

The CONJUNCTION-WH-ELEMENT is set on words that are +SUBORDINATOR and -SIMPLE-SUBORDINATOR. The CONJUNCTION-WH-ELEMENT flag is a powerful flag and activates a large number of IC linguistic core analysis attractors.

The CONJUNCTION-WH-ELEMENT is not set on all of the traditionally understood wh-words.

THE CONJUNCTION-WH-ELEMENT is a powerful attractor that will activate IC linguistic core attractors without having the CONJUNCTION flag set.

Words that are +CONJUNCTION-WH-ELEMENT include:

> toward which, without which, what ever, howsoever, about which, how few, before which, until which, upon which, on which, where, he who, towards which, whosoever, however, round which, to the place on which, whatever, that is, how many, whomever, even so, into which, what, whom, through which, despite which, how much, up which, wherever, whether, off which, to the place above which, underneath which, this fact notwithstanding, whatsoever, of course, till which, why, but however, whichever, as to whether, how, whose, how little, no matter how, what little, notwithstanding which, which, for which, below which, the question as to whether, who, as to whether, whatever else.

The CONJUNCTION-WH-ELEMENT flag is not available for use as a crosscutter.

CONJUNCTION-WH-ELEMENT activates IC linguistic core analysis attractors.

CONJUNCTION-YES-NO

The CONJUNCTION-YES-NO is set on conditionals.

Words that are +CONJUNCTION-YES-NO include:

> as though, in case, if, if it should happen that, but whether, and only if, only if, and if, but if, but unless, whether or not if, if it should transpire that, if and when, than if, under circumstances in which, as if, even if, unless, unless and until, in the event that, if it should happen that, no matter how, whether or not.

The CONJUNCTION-YES-NO flag activates IC linguistic core analysis attractors.

The CONJUNCTION-YES-NO flag is not available for use as a crosscutter.

CONJUNCTION-OTHER

THE CONJUNCTION-OTHER flag indicates the difference between "and" and "or."

"Or" is +CONJUNCTION-OTHER.

"And" is -CONJUNCTION-OTHER.

Words that are +CONJUNCTION-OTHER in the lexicon:

> or else, as though, in case, if, if it should happen that, or so, but whether, and only if, only if, and if, but if, yet,,whether or not if, if it should transpire that, if and when, only,,than if, or, or rather, in the event, if and only if,,under circumstances in which, as if, even if, in the event that,,if it should happen that, as usual, whether or not, so, but yet.

The CONJUNCTION-OTHER flag activates IC linguistic core analysis attractors.

The CONJUNCTION-OTHER flag is not available for use as a crosscutter.

DETERMINER GROUP ARTICLE FLAGS

Determiners are closed system items.

Determiners are mutually exclusive with each other. There usually cannot be more than one determiner per noun head.

He is a large man.
**He is a this large man.
DEFINITE-ARTICLE
The DEFINITE-ARTICLE flag is set on the definite article "the."
Words that are +DEFINITIE-ARTICLE in the lexicon include:
the, hoi, much the, "the or a."
The DEFINITE-ARTICLE flag activates IC linguistic core analysis attractors.
The DEFINITE-ARTICLE flag is not available for use as a crosscutter.
The three major generalizations about good article use:
1. Do not use "the" (with plural and mass nouns) to make generalizations.
Life is hard.
** The life is hard.
2. Do not use singular pure count nouns without articles.
The book is large.
He put the book on the table.
He put the table on the book.
He gave the book to me.
He gave me the book.
**Book is large.
**He put book on the table.
**He put the table on book.
**He gave book to me.
**He gave me book.
3. Use the indefinite article "a/an" when referring to professions or jobs.
She is a brain surgeon.
** She is brain surgeon.
She is the (a specific one) brain surgeon.
Words that are +DEFINITE-ARTICLE need to be +DETERMINER-GROUP A.
INDEFINITE-ARTICLE
The INDEFINITE-ARTICLE is set on the indefinite articles "a" and "an."
Words that are +INDEFINITE-ARTICLE include:
not a, some, a very few, an, any, a.
Words that are +INDEFINITE-ARTICLE need to be +DETERMINER-GROUP A.
The INDEFINITE-ARTICLE flag activates IC linguistic core analysis attractors.
The INDEFINITE-ARTICLE flag is not available as a crosscutter.
DETERMINER GROUP MISC. FLAGS
PREDETERMINER
A PREDETERMINER is a determiner that can occur before another determiner.
Usually two determiners cannot occur in a row. PREDETERMINER a special class of determiner that can occur before the definite or indefinite article, or before any of the DETERMINER GROUP MASS determiners.
PREDETERMINERS are mutually exclusive. Two PREDETERMINERS cannot occur in a row. If two words that are +PREDETERMINER can occur in a row it is because one (or both) can be used as a different part of speech.
P **The all both men are large.
** The half double shot was not enough.
He took it all, both the property and the cats.
Mr. Sulu, ahead all one-third.
Words such as:
only, especially, rather, and other restrictive words sometimes thought of as determiners are flagged as any type of determiner in the lexicon.
They are ADVERBS that can modify the determiner system.
Words that are +PREDETERMINER in the lexicon: (10-11-91)
The closed class items are: all, both, half.
The open class items are:
multipliers; double, twice, three times . . .
fractions: one-third; three-fifths . . . . . .
Special words: just, both much, few times, not all.
PREDETERMINERS only occur before articles or demonstratives.
They cannot occur before:
every, either, neither, each, some, any, no, enough.
"All/both/half" have "of" constructions.
All (of) the meat.
both (of) the students.
half (of) the time.
"All/both/half" can be used as nominals.
All passed the examination.
All of the students passed the exam.
Both passed the exam.
Both of the students passed the exam.
Half passed the exam.
Half of the students passed the exam.
"All/both" can occur after the head.
The men all passed the examination.
The men both passed the examination.
Half cannot be used after the head.
**The men half passed the examination.
"Both/all/half" cannot be used without the "of" construction before personal pronouns.
** Both us went to town. Both of us went to town.
** All us went to town. All of us went to town.
** Half us went to town. Half of us went to town.
"Half" cannot be used with the "of" construction when refering to quantities or measurements.
**My home is half of a mile from town.
My home is half a mile from town.
**Good linguists drink half of a bottle of cheap booze every night.
Good linguists drink half a bottle of cheap booze every night.
"All" requires the "of" construction before nouns, if the noun it occurs before does not have a determiner.
** All of men are large.
All men are large.
** All of whiskey is good.
All whiskey is good.
The open class multipliers cannot occur after the noun head as a postmodifier. They are premodifiers only. They do not function well as postposed adjectives.
** The amount double is my salary.
The open class multipiers do not have the "of" construction.
**He wants triple of the amount.
The fractions function like "all" and "both."
Fractions can co-occur with other determiners, if they occur first.

She can do it in one-third (of) the time that it takes him to do it.

Fractions also have the "of" construction.

The PRE-DETERMINER flag activates IC linguistic core analysis attractors.

The PRE-DETERMINER flag is not available for use as a crosscutter.

DETERMINER-POSSESSIVE

Words that are +DETERMINER-POSSESSIVE in the lexicon:

her, our, his or her, his/her, her own, our ouwn, your own, their, that ony, that, this, ago that, my, thy, those, his, its, your, his', from the fact that, his own, its own, of the fact tha, their own, these, that even, my own.

When a word is +DETERMINER-POSSESSIVE the other possessive flags should be set.

My, our, your, his, its, and their are:

+DETERMINER-POSSESSIVE

+COMMON NOUN-POSSESSIVE

+PRONOUN-POSSESSIVE

+ADJECTIVE-POSSIVE

+POSSESSIVE CASE

"Whose" is not a DETERMINER-POSSESSIVE so it only has the POSSESSIVE-CASE flag set.

The DETERMINER-POSSESSIVE flag activates IC linguistic core analysis attractors.

The DETERMINER-POSSESSIVE flag is not available for use as a crosscutter.

Possessive determiners are mutually exclusive with other determiners.

PREDETERMINERS can occur before DETERMINER-POSSESSIVES, but DETERMINER-POSSESSIVES cannot occur before PPEDETERMINERS.

** His all car is red.

His car is red all over.

His car is all red.

** His half car is red.

His car is half red.

Half of his car is red.

DETERMINER-DEMONSTRATIVE

The DETERMINER-DEMONSTRATIVE flag is available for application use.

The DETERMINER-DEMONSTRATIVE flag activates IC linguistic core analysis attractors.

The DETERMINER-DEMONSTRTIVE flag is not available for use as a crosscutter.

There are no words in the lexicon that are +DETERMINER-DEMONSTRATIVE. The traditional demonstrative determiners are +DETERMINER-POSSISIVE (this, that, these, those).

DETERMINER-CARDINAL

The DETERMINER-CARDINAL flag is set on on the cardinal numbers, one, two, three . . . , and the figure form of the cardinals, 1, 2, 3 . . .

When a word is +DETERMINER-CARDINAL is also needs to be:

+COMMON NOUN

+COMMON NOUN-CARDINAL

+ADJECTIVE

+ADJECTIVE-QUANTIFIER

The numbers "one" to a "hundred" and "1" to "100" have been entered into the lexicon as have "thousand," "million," "billion." The other cardinal numbers are handled programatically.

The DETERMINER-CARDINAL flag activates IC linguistic core analysis attractors.

The DETERMINER-CARDINAL flag is not available for use as a crosscutter.

Cardinal numbers and quantifiers are mutually exclusive.

** Five many men.

**Three plenty of men.

Cadinal numbers tend to occur after determiners and before adjectives.

The five good men are large.

DETERMINER-ORDINAL

The DETERMINER-ORDINAL flag is set on the ordinal numbers "first," "second" "third". . . , and on their figure form 1st, 2nd, 3rd, The DETERMINER-ORDINALS "first" through "thirty-first" have been entered into the lexicon.

The DETERMINER-ORDINALS "1st" through "100th" have been entered into the lexicon.

Other DETERMINER-ORDINALS in the lexicon include:

ninetieth, first such, last such, firstly, secondly, thirdly, fourthly, fifthly, twentieth, next, sixtieth, first and foremost, billionth, millionth, another, next such, last.

When a word is +DETERMINAL-ORDINAL it should also be:

+COMMON NOUN

+COMMON NOUN-ORDINAL

+ADJECTIVE

+ADJECTIVE-QUANTIFIER

Ordinal numbers should also be:

+ADVERB-CONJUNCT

+CONJUNCT-ENUMERATIVE

The DETERMINAL-ORDINAL flag activates IC linguistic core analysis attractors.

The DETERMINAL-ORDINAL flag is not available for use as a crosscutter.

Cardinal determiners follow determiners in noun phrases.

Cardinal determiners occur before:

many, more, most, few, fewer, fewest, less, least, several.

Cardinal determiners occur before adjectives.

The open class ordinals only modify singular count nouns.

Ordinal numbers cannot premodify pure mass nouns unless a factive is present.

**I want the fourth bacon from the left.

I want the fourth piece of bacon form the left.

**I want the fifth information in my computer.

I want the fifth piece of information in my computer.

DETERMINER GROUP MASS FLAGS

DETERMINER-GROUP A

The DETERMINER-GROUP A flag allows this determiner class to premodify:

singular count nouns plural count nouns mass nouns. P Words that are +DETERMINER-GROUP A in the lexicon include:

the, how, what ever, her, our, how few, his or her, his/her, her own, our own, your own, some, their, whatever, how many, no sooner, most important, much the, a little, any, nm, what, how much, my, thy, whatsoever, a given, whichever, his, its, whose, how little, the or a, your, his', which, no, his own, its own, for which, their own, whatever else, my own.

The DETERMINER-GROUP breakdown in traditional terms.

The possessive pronouns: my, our, your, his, her, its, their.

The definite article: the.

Selected -wh words: whose, whosoever, which, whichever, what, whatever.

Negative adjective: no

The Assertive pronoun: some (has a stress difference which is lost in written English. The unstressed "some" is considered a class B determiner. But since the stress is omitted from written English it is marked as a class A determiner in Griff.)

The unassertive pronoun: any (has a stress difference which is lost in written English. The unstressed "any" is considered a class B determiner. But since the stress is omitted from written English it is marked as a class A determiner in Griff.)

NOTE:

The determiners which can function as an indefinite article (a,an,some,any,) need the COMMON NOUN-USE "A" or COMMON NOUN-USE "AN" flags set. This is to allow metalanguage use of the articles.

I have a "some" that none can use.

The DETERMINER-GROUP A flag activates IC linguistic core analysis attractors.

The DETERMINER-GROUP A flag is not available for use as a crosscutter.

DETERMINER-GROUP B

The DETERMINER-GROUP B flag is a determiner class that occurs with:

plural count nouns plural count/mass nouns mass nouns.

Words that are +DETERMINER-GROUP B in the lexicon include:

less than, more, no more, most, all, some more, accordingly enough, not all, so odd, enough, plenty of, such, lots of.

The zero article is a class B determiner.

The DETERMINER-GROUP B flag activates IC linguistic core analysis attractors.

The DETERMINER-GROUP B flag is not available for use as a crosscutter.

DETERMINER-GROUP C

The DETERMINER-GROUP C class occurs with:

singular count nouns singular count/mass nouns mass nouns.

Words that are +DETERMINER-GROUP C in the lexicon include:

per, what this means, the fact that, that only, that, this, aso that, from the fact that, of the fact that, that even.

DETERMINER-GROUP C is set on "per" which is only a PREPOSITION to indicate that "per" can only occur with singular mass nouns and singular count nouns.

"Per days" is incorrect.

The DETERMINER-GROUP C flag activates IC linguistic core analysis attractors.

DETERMINER-GROUP D

The DETERMINER-GOURP D determiner class occurs with plural count nouns.

Words that are +DETERMINER-GROUP D in the lexicon include:

a select few, a good many, several, a dozen, only a few, many such, not many, a great many, any and all, a few, those, fewer, these, many, few, other.

The DETERMINER-GROUP D flag activates IC linguistic core analysis attractors.

The DETERMINER-GROUP D flag is not available for use as a crosscutter.

DETERMINER-GROUP E

The DETERMINER-GROUP E determiner class occurs with singular count nouns.

Words that are +DETERMINER-GROUP E in the lexicon include:

one, each, not a, no one, either, nary a, many a, many an, every, each and every, one percent, not one, an, nm, neither, such an, such a, a, each individual, a close, anaother, 1, nary.

The DETERMINER-GROUP E flag activates IC linguistic core analysis attractors.

The DETERMINER-GROUP E flag is not available for use as a crosscutter.

DETERMINER-GROUP F

The DETRMINER-GROUP F class occurs with mass nouns only.

Words that are +DETERMINER-GROUP F in the lexicon include:

less, much.

The DETERMINER-GROUP F flag activates IC linguistic core analysis attractors.

The DETERMINER-GROUP F flag is not available for use as a crosscutter.

DETERMINER-GROUP OTHER

The DETERMINER-GROUP OTHER is a special class of determiner that requires special active attractors. The DETERMINER-GROUP OTHER flag is set in conjunction with DETERMINER-GROUP D to restrict it to occuring with plural count nouns only, but a DETERMINER-GROUP OTHER word have the full force of the DETERMINER GROUP D limitations. Words that are +DETERMINER GROUP OTHER have a PREDETERMINER quality about them at times.

The DETERMINER-GROUP OTHER flag imparts a strong adjectival value to the word that allows it to occur with a determiner.

Words that are +DETERMINER-GROUP OTHER in the lexicon include:

any and all, so odd, such, other.

"Such" as a DETERMINER-GROUP OTHER word is vacuous since "such a" and "such an" are set up as phrases in the data base. The flag was not deleted from "such" because it is part of its identifiction.

WORD BASE FLAGS

BASE-SIMPLE

The BASE-SIMPLE is flag is not presently being set by the lexicon linguist.

BASE-SIMPLE is set by Griff as a default setting.

All new words entered into the lexicon will have BASE-SIMPLE as a default setting.

The BASE-SIMPLE flag activates IC linguistic core analysis attractors.

The BASE-SIMPLE flag is not available for use as a crosscutter.

BASE-DERIVED

The BASE-DERIVED flag is available for application use.

The BASE-DERIVED flag activates IC linguistic core analysis attractors.

The BASE-DERIVED flag is not available for use as a crosscutter.

BASE-NON-STANDARD

The BASE-NON-STANDARD flag is available for application use.

The BASE-NON-STANDARD flag activates IC linguistic core analysis attractors.

The BASE-NON-STANDARED flag is set on words in the lexicon.

The BASE-NON-STANDARD flag is not available for use as a crosscutter.

MISC ELEMENT FLAGS

These flags have special functions in the system. They are used on words that need special handling in the core or identify a class of words easily for the programmers or for the core.

MISC-USED TO

The MISC-USED TO flag is not available for application use.

The MISC-USED TO flag does activate IC linguistica core analysis attractors.

The MISC-USED TO flag is presently not set on any words.

The MISC-USED TO flag is not available for use as a crosscutter since its original use (following word is probable verb) will be activated by any word that has MISC-USED TO set.

MISC-ERROR POSSIBILITY

The MISC-ERROR POSSIBILITY flag is available for application use.

The MISC-ERROR POSSIBILITY does not activate any IC linguistic core analysis flags.

MISC-ERROR POSSIBILITY is not set on any word in the lexicon.

The MISC-ERROR POSSIBILITY flag is ready for a new use.

MISC-VERY

The MISC-VERY flag is set on "very" and "now." The setting on "now" could be removed, but "now" may have this flag as part of its identification package. Do not remove MISC-VERY from "now" without KWDB approval and testing.

The MISC-VERY flag does not independently activate IC linguistic core analysis flags.

The MISC-VERY flag is used by PowrEdit to identify "very" as being the word that cannot occur with ADVERB-NON-GRADABLE adverbs.

MISC-DEFAULTS

The MISC-DEFAULTS flag is set on select default words to identify them for PowerEdit. It is set on:

PP is proper noun plural.
PN is proper noun singular.
CM is comparative adjective.
CS is common noun singular.
AJ is adjective.
CP is common noun plural.
AV is adverb.

The MISC-DEFAULTS flag does not independently activate IC linguistic core analysis attractors.

MISC-INDUSTRY

The MISC-INDUSTRY flag identifies special industry-specific technical words.

The MISC-INDUSTRY flag is presently not being set, nor is it used by PowerEdit.

The MISC-INDUSTRY flag is presently set on the following words:

mile, ampere, ton, terahertz, radian, milligram, dram, stere, ounce, gram, lumen, decigram, pint, coulomb, decastere, joule, hectogram, volt, quart, centare, acre, hertz, tesla, newton, decagram, ohm, farad, candela, gigahertz, centigram, quintal, hectare, miles, lux, decistere, watt, kilogram.

The MISC-INDUSTRY flag does not activate IC linguistic core analysis attractors.

MISC-NUMBER

The MISC-NUMBER flag allows Powe.rEclit to apply the NUMBER CONCORD RULE to a word.

The phrase "the number" has a singular meaning and requires a singular verb.
The number of branch offices has increased.
The number of skilled workers in America has decreased dramatically.

The phrase "a number" has a plural meaning and requires a plural verb.
A number of branch offices have increased.
A number of skilled workers in America are unemployed.

Words that are +MISC-NUMBER in the lexicon include:
cluster, number, quantity, percent, group, percentage, fraction, couple, bunch, dozen.

When set on a collective noun such as "group" the following analysis occurs.

A group of men were sitting on the porch. (no concord error)
A group of men was sitting on the porch. (no concord error)
The group was a large one. (no concord errors)
The group were a large one. (no concord error)

When "group" does not have usage 6 set the following analysis occurs;

A group of men were sitting on the porch. (concord error)
A group of men were sitting on the porch. (no concord error)
The group was a large one. (no concord error)
The group were a large one. (concord error)

Nouns that are:
+COMMON NOUN-GENDER COLLECTIVE
+COMMON NOUN-SINGULAR
+COMMOUN NOUN-SINGULAR COMPLEMENT OK can accept plural concord when followed th "of" +plural noun.

A group of men were sitting on the porch.

MISC NUMBER words and collective nouns differ subtly with verb concord.

A number of men are sitting on the porch.
**A number of men is sitting on the porch.
The number of skilled workers is small.
**The number of skilled workers are small.
A group of men are sitting on the porch.
A group of men is sitting on the porch.
The group of men are sitting on the porch.
The group of men is sitting on the porch.
The number is too large to be imagined.
**The number are too large to be imagined.
A number as big as that are too large to be imagined.
**A number as big as that are too large to be imagined.
The group is advancing on the city.
**The group are advancing on the city.
A group is advancing on the city.
**A group are advancing on the city.

Presently the MISC-NUMBER flag does more than apply the "number" rule to PowerEdit. It bypasses all concord agreement messages.

MISC-USAGE 7

The MISC-USAGE 7 flag is used to identify the general numbers words NM and NB.

NB is the number-appear word or figure number such as 5.

NM is "money-number." It is a number with the dollar sign before it. ($13)

Words that are +MISC-USAGE 7 in the lexicon include:

The numerals 1 to 100 and the default words NM and NB.

The MISC-USAGE 7 flag will totally bypass the subject-verb concord messages in PowerEdit. It will allow the verb agreement to be singular or plural even if "a" premodifies the noun.

A majority of our employees are large.

**A majority of our employee are large (no concord message)

The singular-plural concord agreement of fractional expressions (such as one-half of, two-thirds of, a part of, a majority of, a portion of, the rest of) is determined by the number of the prepositional complement in the following "of" prepositional phrase:

a. use a singular verb if a singular noun follows "of."
    Three-fourths of the mailing list has disappeared.
    Part of our company is failing.
    A majority of one is enough.
    A large percentage of the material has vanished.
  b. use a plural verb when a plural noun follows "of.
    Two-thirds of our customers are satisfied.
    Part of the walls are papered.
    A majority of the men are large.
    A large percentage of employees are large.

The MISC-USAGE 7 flag does not independently activate IC linguistic core analysis attractors.

MISC-USAGE 8

The MISC-USAGE 8 flag is a special syntacic core flag that works on CONJUNCTIONS. When a Pure coordinating conjunction is followed by a subordinate conjunction, the MISC-USAGE flag attempts to force Griff to read the subordinating conjunction as introducing a main clause.

Words that are +MISC-USAGE 8 in the lexicon include:

but whether, and only if, and if, but if, but for, and since, and because, but even as, and all because, but however, but because.

He asked to be transfered because he was unhappy and because he saw no prospect of promotion.

The MISC-USAGE 8 flag activates IC linguistic core analysis attractors.

MISC-USAGE 9

MISC-USAGE 9 is used to allow a following adjective to function as a proper noun. It is set on words such as 'version,chapter,section' and allows 'version 3.0' to work.

MISC-USAGE 10

The MISC-USAGE 10 flag is available for application use.

The MISC-USAGE 10 flag does not activate any IC linguistic core analysis attractors.

The MISC-USAGE 10 flag is not set on any word in the lexicon.

The MISC-USAGE 10 flag is ready for a new use.

MISC-USAGE 11

The MISC-USAGE 11 flag is available for application use.

The MISC-USAGE 11 flag does not activate any IC linguistic core analysis attractors.

The MISC-USAGE 11 flag is not set on any word in the lexicon.

The MISC-USAGE 11 flag is ready for a new use.

MISC-USAGE NOTES

The MISC-USAGE NOTES refers to a screen.

If there is any comment or usage note written on the screen the flag will be set.

Presently the screen is not being used. But it will be used for later versions to indicate special problems, rules, examples, and notes.

MISC-UNIQUE USE

The MISC-UNIQUE USE flag is a system internal flag.

The MISC-UNIQUE USE flag is not available for application use.

MISC-PRINTED FLAG

The MISC-PRINTED FLAG flag is a system internal flag set by the word maintence program. Its function is computer internals not linguistic.

MISC-ALWAYS CHECKED

The MISC-ALWAYS CHECKED flag is an internal system flag that is set by the word maintence program.

Griff will set this flag on every word in the lexicon.

TRANSITIONAL WORD FLAGS

Transitional notions and how they are expressed by the flags in the system.

Summarizing transitionals are:
    +TRANSITION-CONCLUDING
    +TRANSITION-EXEMPLIFYING Generalizing transitionals are:
    +TRANSITION-ADDING
    +TRANSITION=EXEMPLIFYING Illustrative transitionals are:
    +TRANSITION-EXEMPLIFYING Contrast/comparision transitionals are:
    +TRANSITION-ADDING
    +TRANSITION-INTENSIFYING Concession transitionals are:
    +TRANSITION-OPPOSING Sequence transitionals are:
    +TRANSITION-SEQUENCE Restatement transitionals are:
    +TRANSITION-EXEMPLIFYING Diversion transitionals are:
    +TRANSITION-INFORMAL
    +TRANSITION-ADDING Consequence/result transitionals are:
    +TRANSITION-CONCLUDING Transitional words have enough flags set on them to be individually identified by linguists and programmers.

Transitional words relate to coherence. They indicate logical relationships between ideas.

A transitional word can be a possible:

ADVERB-DISJUNCT

ADVERB-CONJUNCT

ADVERB-ADJUNCT

SIMPLE-SUBORDINATOR

TRANSITION-ADDING

The TRANSITION-ADDING flag denotes the logical relation of addition.

Words that are +TRANSITION-ADDING in the lexicon include:

still, again, too, second, moreover, likewise, also, incidentally, anyway, besides, furthermore, as usual, for the most part.

The TRANSITION-ADDING flag does not independently activate IC linguistic core analysis attractors.

TRANSITION-OPPOSING

The TRANSITION-OPPOSING flag denotes the logical relation of contrast.

Words that are +TRANSITION-OPPOSING in the lexicon include:

still, at any rate, but then, meanwhile, instead, nevertheless, however, on the other hand, although, notwithstanding, nonetheless, then, but, though, conversely, on the contrary, in any case.

The TRANSITION-OPPOSING flag does not independently activate IC linguistic core analysiis attractors.

TRANSITION-INITIAL

The TRANSITION-INITIAL flag is set on transitions that can initiate the beginning of a sequence.

Words that are +TRANSITION-INITIAL include:

before you do anything else, first such, first of all, to begin with, in the first place, first and foremost, at first, on the one hand, to start with, whereas, first.

The TRANSITION-INITIAL flag does not independently activate IC linguistic core analysis attractors.

TRANSITION-CONCLUDING

The TRANSITION-CONCLUDING flag is set on transitionals that are used to end a sezuence.

Words that are +TRANSITION-CONCLUDING in the lexicon include:

in short, therefore, hence, thus, last, in conclusion, in the final analysis, in any case.

The TRANSITION-CONCLUDING flag does not independently activate IC linguistic core analysis attractors.

TRANSITION-DIRECT

The TRANSITION-DIRECT flag is available for application use.

The TRANSITION-DIRECT flag is not set on any word in the lexicon.

The TRANSITION-DIRECT flag does not independently activate IC linguistic core analysis attractors.

The TRANSITION-DIRECT flag is ready for a new assignment.

TRANSITION-STEP

The TRANSITION-STEP flag is set on transitionals that indiate a the steps of a progression, or process.

Words that are TRANSITION-STEP in the lexicon include:

then, next, first, second, third, fourth, fifth, sixth.

The TRANSITION-STEP flag does not independently activate IC linguistic core analysis attractors.

TRANSITION-INFORMAL

The TRANSITION-INFORMAL flag is set on transitional words the have a PHRASE FLAG set or are idiomatic without a PHRASE FLAG being set.

Words that are TRANSITION-INFORMAL in the lexicon include:

by the by, by and large, in any event, in general, in the final analysis, in the long run.

The TRANSITION-INFORMAL flag does not independently activate IC linguistic core analysis attractors.

TRANSITION-EXEMPLIFYING

The TRANSITION-EXEMPLIFYING is set on transitionals that introduce examples or illustrations.

Words that are +TRANSITION-EXEMPLIFYING in the lexicon include:

right now, in short, in other words, by and large, in any event, on balance, for example, for instance.

The TRANSITION-EXEMPLIFYING flag does not independently activate IC linguistic core analysis attractors.

TRANSITION-INTENSIFYING

The TRANSITION-INTENSIFYING flag is set on transitionals that are used to narrow the focus, limit, or emphazise what follows.

Words that are +TRANSITION-INTENSIFYING in the lexicon include:

accordingly, as a matter of fact, likewise, by the same token, rather, after all, conversely, on the contrary.

The TRANSITION-INTENSIFYING flag does not independently activate IC linguistic core analysis attractors.

TRANSITION-SEQUENCING

The TRANSITION-SEQUENCING flag denotes the general category of temopral sequence.

Words that are +TRANSITION-SEQUENCING in the lexicon include:

meanwhile, originally, again, next, also, ultimately, finally, proior to, before, afterwards, last week.

The TRANSITION-SEQUENCING flag does not independently activate IC linguistic core analysis attractors.

DISCOURSE FUNCTION FLAGS

DISCOURSE-ADDITION

The DISCOURSE-ADDITION flag is set on "etc." and "and so forth" as an identificaional crosscutter for PowerEdit.

DISCOURSE-ADDITION is used by PowerRead as a crosscutter to identify words that can function as a quotation apparatus verb but have neither the COMMON NOUN-SPEECH ACT nor the VERB-THAT CLAUSE flag set.

A quotation apparatus verb is one which allows for the quotation to function as a fronted object.

"I believe I'll have another drink," he said.

"That is what you think," she replied.

"I believe I'll have two drinks," he continued.

"Continued" is +DISCOURSE-ADDITON because:

It does not have the COMMON NOUN-SPEECH ACT flag set.

It does not have the VERB-THAT CLAUSE flag set.

It can be used as a quotation apparatus verb.

Restrictions on quotation apparatus verbs that have can have the DISCOURSE-ADDITION flag set on them are:

To be a DISCOURSE-ADDITION quotation apparatus verb, the verb needs to be used intransitively (intransitive in this instance means that it does not have a direct object following the verb.)

**"You just keep on thinking that," he continued writing the book.

"You just keep on thinking that."

He continued writing the book.

To be a DISCOURSE-ADDITION quotation apparatus verb, the verb can only occur in either the simple-present tense, or the simple-past tense. If the verb phrase contains an auxilary verb or contains a form of 37 be" and the present participle, it cannot be considered to be functioning as a DISCOURSE-ADDITION quotation apparatus verb.

**"You might have to make a thousand," he is continuing.

"You might have to make a thousand," he continued.

DISCOURSE-ADDITION is set on "continue," "continues," and "continued." It is not set on the present participle "continuing."

The DISCOURSE-ADDITION flag does not independently activate IC linguistic core analysis attractors.

DISCOUSRE-ALTERNATIVES

The DISCOURSE-ALTERNATIVES flag is used by PowerEdit as a crosscutter to identify "otherwise."

The DISCOURSE-ALTERNATIVES flag does not independently activate IC linguistic core analysis attractors.

DISCOURSE-CAUSE/EFFECT

The DISCOURSE-CAUSE/EFFECT flag is used as a PowerEdit crosscutter to identify words that indicat a cause-effect relationship.

Words that are +DISCOURSE-CAUSE/EFFECT include:

therefore, consequently, since, accordingly, hence, thus, as a result, for the simple reason that, because, on the grounds that, in view of the fact that, and all because, due to the fact that, thusly, considering the fact that, the reason is because, the reason why is that, so, in light of the fact that, owing to the fact that.

Do not remove DISCOURSE-CAUSE/EFFECT from any of the function words without checking with the computational linguist.

The DISCOURSE-CAUSE/EFFECT flag does not independently activate IC linguistic core analysis attractors.

DISCOURSE-CONDITIONS

The DISCOURSE-CONDITIONS flag is available for application use.

The DISCOURSE-CONDITIONS flag does not activate IC linguistic analysis core attractors.

DISCOURSE-SEQUENCES

The DISCOURSE-SEQUENCES is being used as a crosscutter by PowerEdit to identify "begin" and "start."

The DISCOURSE-SEQUENCES flag does not independently activate IC linguistic core analysis flags.

DISCOURSE-TIME

The DISCOURSE-TIME flag is being used as a crosscutter by PowerEdit to identify "while" and diferentiate "while" from other temporal conjunctions.

The DISCOURSE-TIME flag does not independently activate IC linguistic core analysis attractors.

DISCOURSE-NOUN SUBSTITUTION

The DISCOURSE-NOUN SUBSTITUTION flag is used to indicate that the word so flagged is a strong THAT CLAUSE VERB. A strong THAT CLAUSE VERB is a verb whose transitivity requirements can only be fulfilled by a following noun clause or a direct quotation (if the word is also a SPEECH ACT VERB.

He said that the man was a linguist.

He said the man was a linguist.

He said, "the man."

*He said, the man.

He said the man.

Words that have the DISCOURSE-NOUN SUBSTITUTION flag set on them include:

say, saying, says, said.

Regular THAT CLAUSE VERBS (verbs that have the VERB-THAT CLAUSE flag set on them) may have their transitivity requirement fulfilled by either a noun clause or a noun phrase.

He knew that the man was a linguist.

He knew the man was a linguist.

He knew the man.

Weak THAT CLAUSE VERBS have the VERB-INDIRECT QUOTE flag set on them. They can best have their transitivity requirements fulfilled by a noun clause only when they have a following "that."

We advocate that you plead guilty.

We advocate you plead guilty.

We advocate a strong defense.

All classes of THAT CLAUSE VERBS have the VERB-THAT CLAUSE flag set on them.

DISCOURSE-VERB SUBSTITUTION

The DISCOURSE-VERB SUBSTITUTION flag is available for application use.

The DISCOURSE VERB SUBSTITUTION flag does not activate any IC linguistic core analysis attractors.

DISCOURSE-TOPIC DISJUNCT

The DISCOURSE-TOPIC DISJUNCT flag is available for application use.

The DISCOURSE-TOPIC DISJUNCT flag does not activate any IC linguistic core analysis attractors.

ROOT WORD SCREEN

The ROOT WORD SCREEN will contain the root words of:

Irregular nouns. For example:
"man" will have "n men" in its ROOT WORD SCREEM to inticate that its plural form is "men" The "n" stands for "Noun."
"men" will have "n man" to indicate that its singular form is "man."

Irregular verbs. For example:
"bought" will have "r buy" in its ROOT WORD SCREEN to indicate that it is an inflected form of "buy."

The noun which functions as the "concept-noun" of a verb or other part of speech. The non-noun part of speech obtains its concept from the concept-noun A word that is verb only, will have "m concept-noun" in its ROOT WORD SCREEN. For example: "indicate" has "m indication" in its ROOT WORD screen.

THE ROOT WORD SCREEN AS A SPECIAL TOOL FOR POWERINDEX.

The ROOT WORD SCREEN is referenced by PowerIndex to determine the special index form of a word.

"i (space) ASIS (in upper case letters)" in a word's ROOT WORD SCREEN indicates the form of the word to be used by the INDEX FORMATION ROUTINE.

The "i ASIS" technique is used for problematic words need a special entry for PowerIndex. For example "basis."

"Basis" is an irregular noun which has as it plural "bases." But "bases" is also the plural form of the NOUN/VERB word "base." "i basis" is entered on the ROOT WORD SCREEN of "basis" to provide PowerIndex with an unambiguous entry for "basis."

The ROOT WORD SCREEN may be used to prevent a word from appearing as a head entry in PowerIndex.

Using the technique of "i (space) OMIT" (all in upper case letters), indicates that the word will not appear as the head word in an index generated by PowerIndex.

This technique is used for words that have SUBJECTIVE VIEW set on them (which makes them weak nouns for PowerRead and PowerIndex) but do not have the TOPICALIZER flag set. (The combination of both flags indicates that the word cannot appear as a head word in PowerIndex and also it will be deleted by PowerRead.) For example, "means" requires the "i OMIT" technique. "Means" is a weak noun but it is not a topicalizer.

means of vocalization ("means"=a weak noun)

If "means" is flagged as a weak noun (SUBJECTIVE VIEW) then PowerRead will not delete the postmodifying prepositional phrase introduced by "of."

vocalization ("means"=a topicalizer)

If "means" has the TOPICALIZER flag set, it will disappear for PowerRead on level three and four.

Using the "i OMIT" technique in the ROOT WORD SCREEN allows "means" to be used as a weak noun by PowerRead, and yet not be indexed by PowerIndex as a head entry without premodification.

"means of vocalization" will be indexable under vocalization. (vocalization, means of) but "means of vocalization will not be indexable under "means." There will be no entry for "means," of vocalization.

If "means" is premodified by a strong adjective it will be indexable with its premodification. (dramatic means) but will not be indexable without premodification. There will be no entry for (means, dramatic).

The ROOT WORD SCREEN may be used to capture other special features of words for PowerIndex as a seperate entity without impinging on other APIs. (i PREMOD for example to indicate the word may only appear as an indexable word when it has premodification.)

PHRASAL FORMS SCREEN

The PRASAL FORMS SCREEN contains phrases that are built on the lexical entry.

Technique and decisions for when to create a phrase or let it go.

If there is trouble with a phrase and use of the article the sequence is a possible candidate for a phrase.

"For office," "Office" is a count only noun that requires determiner premodification. In the phrase "for office," "office" does not require a determiner as in:

he ran for office.

But in the vast majority of instances "office" will require determiner premodificaiton. The major options are:

1. Leave it alone. Do not phrase "for office." This that for PowerEdit a false determiner message will fire on "for office."
2. If it fires too much add set the +COMMON NOUN-TAKES NO ARTICLE flag on "office. This will prevent the determiner message from false-firing. Griff will still analyze "office" as a count noun. But he will not fire the PowerEdit determiner message on incorrect sentences such as:
   **I came from office today.
3. Another solution is to add the COMMON-NOUN-MASS flag on "office." This will will solve the PowerEdit false message problem. And since "office" is not a possible verb there are no major complications. Griff will now analyze "office" as a count/mass noun and this causes large effects in the IC linguiscit core analysis attractors and will change the analysis of each sentence "office" occurs in. It may or may not have a devistating effect. But A sentence such as: He bought office for me. Will go by unchallenged. It may be too heavy handed and miss to many messages on incorrect sentences.
4. Phrase for office. This is the last resort. But in this particular instance it seems to be the best option. Be careful when you make a phrase as logic breaks can sneak in and kill you in other contexts. As a rule, if a word is +VERB and +NOUN there will be a logic break problem. If the word also is +PREPOSTION, +CONJUNCITON of has a special function flag set it also may be a poor risk for phrasing.

PHRASING COMPOUND NOUNS.

If Griff can handle the word sequence without phrasing, do not phrase the word sequence. Phrasing limitis the flexibility of Griff.

If the word sequence changes the semantics of the words or if Griff cannot handle the phrase without a misanalysis (such as "composite trading"). Phrase it.

"In New York Stock Exchange composite trading yesterday, GenCorp shares closed at $18.625, down 75 cents."

When "composite trading" is not phrased, Griff has difficulty in analyzing "composite trading." When "composite trading" is phrased, Griff has no difficulty analyzing the sentence.

The "% Phrasal" Verb Technique.

When the % (followed by a word ie. up) is set Griff ignores the second word. It becomes invisable to Griff.

Speed+up (speed % up) the boat is read and analyzed as

Speed the boat.

The % when set on the base form will carry over into the words inflections.

We used to have to set up each inflected form seperately. But now % on the root will work fine.

Phrasal Verbs that are also nouns (ie. hand) should not have % phrasals set on the Base or "-s" forms. It creates logic break problems.

I hand+in the book. (I hand the book.) I have my hand+in the cookie jar. (I have my hand the cookie jar.)

The long version of a phrase has to be entered first in the PHRASAL FORMS SCREEN. On the PHRASAL FORMS SCREEN of "forget" it should be:

forget me nots forget me not

If the long version of a phrase is not first on the PHRASAL FORMS SCREEN, Griff will not read forget me nots. He will not notice forget me not, and stop.

Phrases can serve as the base for other phrases if you need to phrase beyond five words.

"am" can serve as the phrase base for "am not."

"am not" can serve as the phrase base for "am not forgotten."

"am not forgotten" can serve as the base for "am not forgotten for existential reasons."

Verbs that are intransitive-only verbs, cannot be a "% phrasal" verb. The % makes Griff read the verb as if it were transitive.

He came +in the door. (He came the door.)

Transitive Verbs only, can be a "% phrasal" verb. But runs the risk of being understood intransitively if a preposition or adverb follows.

As a general rule verbs need to be both transitive and intransitive to be a "% phrasal" verb.

No "% Phrasal" can be formed with "% to" if an infinitive can follow the verb. This causes analysis problems with determining if a word is an infinitive.

No "% Phrasal" Verb can be made for a verb that takes a that clause. If a verb takes a that clause the "%" on the end wrecks Griff's ability to detect the noun phrase. Verbs that need to be phrased and are +VERB-THAT CLAUSE verbs need the underscore technique. Not "showing % off" but "showing off."

If a word is on file as +ADJECTIVE only, such as "weary," then foot weary must be a phrase since nouns cannot modify an adjective and "weary" is not a true ADJECTIVE-POSTPOSED OK adjective.

NOUN PHRASALS. When these are set up the plural form must be entered first in the PHRASAL FORMS SCREEN.

daycare centers daycare center

When reading up phrasals Griff first looks for "% forms" then underscores.

Thus, if you phrase "accounts % for" and "expense accounts," you will end up with:

Their expense accounts+for+over 50% of our business.
Their expense accounts are in the mail.
But:
I need the accounts+for the Smith project.
will kill you. Griff will not see the preposition "for," and will read the sentence as:
I need the accounts the Smith project.
INFLECTIONS
Inflections that need to be on file.
Verbs that end in -ly.
Nouns that end in -ly.
Adjectives that end in -ly.
Words that end in y. ie factory and its plural factories.
Words that end in -ness.
Nouns that are singular and end in -s.
Adjectives that end in -ed. words like, gifted, indebted, unarticulated. If not on file then griff. chokes on them. cannot decide if they are verb, adj, or past participle.
Nouns that end in -ings.
All words that end in -er and are not comparitive adjectives.
All words that end in -est and are not superlative adjectives.
All words that end in -ly and are not adverbs.
All words that end in -ate and are not adjectives.
All words that end in -wize and are not adverbs.
All words that end in -wise and are not adverbs.
All words that have a root which is in common with an irregular noun or verb.
If these "related" words not on file PowerEdit will give you the "NON-STANDARD" message.
"Bees" (insect) must be on file since "be" is an irregular verb.
"Stoves" needs to be on file since "stove" is the past participle of an irregular verb "stave."
All the principal parts of verbs that end in -fy need to be on file such as: calcify, calcifies, calcified, calcifying. (You may not have to add the -ing present participle if, when the -ing suffix is stripped, it leaves the base form of the word.)
Words that need to be on file because of "strange happenings."
"Cared" needs to be on file. Griff strips the "-ed" and reads it as "car." Watch all words ending in a vowel, check to see if they can inflect back wrongly.
Griff strips off "-ing", thus "noting" is read as "not"+"ing." The present participle form of "note" needs to be on file. All words ending in "e" run the risk of being interpreted wrong when in the plural such as "case" and "cases." Griff reads "cases" as "cas" +"es." This does not cause any problems.
"Themes." Griff reads "themes" as "them"+"es." A problem. "Themes" needs to be on file.
All words that inflect "y" to "ied" must be on file. Thus "glorified" needs to be a lexical entry (as does "entries").
Words like "wings" that are +COMMON NOUN and +VERB and end in "-ings" must be on file.
Words that are +COMMON NOUN and −VERB and end in "-ed" must be on file.
Words that end in "-ist" must be on file if they are not +ADJECTIVE.
For Version I. a sentence cannot end in all capitalized letters such as: "JJJ" or "I." Griff will not be able to process this senetnce.

Who is a better person, vou or I?
Words in the system with double quotes around it, "word," will be read as a noun. So if you put a verb "goes" in your text Griff will read "goes" as a noun.
INFLECTION SCREEN.
This screen contains the principle parts of irregular verbs. The principle parts of an irregular verb are listed on the INFLECTION SCREEN of the base form of the irregular verb. "Take" has:
takes
taken
taking
took
listed on its INFLECTION SCREEN. The order in which the inflected parts are listed is irrelevant.
DEFINITIONS SCREEN
The DEFINITIONS screen is a work screen to enter notes and observations about a lexical entry. The buffer of the DEFINITIONS SCREEN is only 100 characters long. If you put in a string longer than 100 characters and leave the word, two things will happen.
1. The system will erase everything longer than 100 characters.
2. When you leave word maintenence you will get a memory allocation message and have to re-boot.
The DEFINITIONS SCREEN is not being used at this time.
NOTES SCREEN
The NOTES SCREEN is a work screen to store notes and observations about a lexical entry. The buffer of the NOTES SCREEN is only 100 characters long.
The NOTES SCREEN is presently not being used.
EXAMPLES SCREEN.
The EXAMPLES SCREEN is a designated examples and illustration area. The buffer is the EXAMPLES SCREEN is only 100 characters long. If you put in a string longer than 100 characters and leave the lexicon, two things will happen.
1. The system will erase everything longer than 100 characters.
2. When you leave "word maintenence" you will be awarded a memory allocation message and have to re-boot.
TEST CASE SCREEN
The TEST CASE SCREEN serves as a designated examples and test sentence area. The buffer is the TEST CASE SCREEN is only 100 characters long. If you put in a string longer than 100 characters and leave the lexicon, two things will happen.
1. The system will erase everything longer than 100 characters.
2. When you leave "word maintenence" you will be awarded a memory allocation message and have to re-boot.
Hiding words in the system.
Behind the scenes words can be placed in the system by placing an "underscore" before the word. Hidden words in the system include:

_in    (in without phrasals)
_inp   (in with phrasals)
_byp   (by with phrasals)
_fromp (from with phrasals)
_asp   (as with phrasals)
_by    (by without phrasals)
_asp2  (as version 2 with phrasals.)

CONNOTATION SCREEN.
The CONNOTATION SCREEN a designated area for CONCEPTS. No other entry should be made on this screen.

REPLACEMENT SCREEN

When a word has a phrase flag set on it, the word appearing in this screen is the one that will replace it when correction button is hit in the PowerEdit system.

Only one word can be entered as a replacement. If replacement is two words it must be phrased by using an underscore. (such as "existential_crisis")

If no REPLACEMENT is entered into the screne the PowerEdit default of <edit> will appear.

Phrase flags which do not need a REPLACEMENT are:

PHRASE-TOPICALIZER
PHRASE-ONOMATOPEIA
PHRASE-HEDGER
PHRASE-ACRONYM
PHRASE-EMPHATIC
PHRASE-ORIENTER
PHRASE-CATCH PHRASE
PHRASE-FILLER
PHRASE-WEAK SUBJECT
PHRASE-OVERUSED
PHRASE FLAGS
PHRASES LITERARY FLAGS
PHRASE-ONOMATOPOEIA

PHRASE-ONOMATOPEIA is set on words whose sound suggests their meaning. Onomatopoeia includes:

Words that mimic animal sounds. (bow-wow, moo)
Words that sound like the actions they name. (sizzle, drip)
Words that are +PHRASE-ONOMATOPEIA include:
bang, meow, pitter-patter, clang, ding, whizz.
Overuse of onomatopoeia may be distracting.
ONOMATOPOEIA does not activate IC linguistic core analysis attractors.

PHRASE-METAPHOR

The PHRASE-METAPHOR flag is available for application use.

PHRASE-METAPHOR does not activate IC linguistic core analysis attractors.

PHRASE-METAPHOR is not set on any words in the lexicon.

PHRASE-POETIC DICTION

POETIC DICTION describes words that belong in literary works of art. POETIC DICTION words may sound pretentious or out of place in business writing.

Words that are +POETIC DICTION include:
gargoyle, neath, ne'er, idyllic, swoon, verdant.
POETIC DICTION does not activate IC linguistic core analysis attractors.

PHRASE-IDIOM

The PHRASE-IDIOM flag is set on phrases whose meaning cannot be known from the meaning of the individual words that comprise the phrase. For PHRASE-IDIOM words the whole differs from the sum of its parts.

Words that are +PHRASE-IDIOM include:
left-handed compliment, on the whole, bark up the wrong tree, give-and-take, blue in the face, blind alley.
PHRASE-IDIOM does not activate IC linguistic core analysis attractors.

PHRASE-DYAD

The PHRASE-DYAD flag is set on words that seam "bound and determined" to occur in pairs, though the "sum and substance" of their meaning may be expressed by a single word. Dyads often have the effect of a cliche.

Words that are +PHRASE-DYAD in the lexicon include:
tooth and nail, willing and able, by hook or by crook, sum and substance, part and parcel, various and sundry.

PHRASE-DYAD does not activate IC linguistic core analysis attractors.

PHRASE-OXYMORON

The PHRASE-OXYMORON flag is set on pairs of words that contain a possible logical contradiction.

Words that are +PHRASE-OXYMORON include:
eloquent silence, peaceful war, tearful optimist, friendly fire, quiet riot.
PHRASE-OXYMORON does not activate IC linguistic core analysis attractors.

PHRASES INFORMAL SLANG/HIGH FLAGS

PHRASE-FOREIGN WORD

For hundreds of years, English has been a borrower language, taking words from other languages. Some words have become naturalized citizens (cafe and price). Others like "junta" or "triage" are still undergoing the process of naturalization. Others are part of the language but only understood by specialists (allegro, Weltanschauung, and Gestalt). Foreign words that have not become full citizens receive the PHRASE-FOREIGN WORD flag.

Words that are +PHRASE-FOREIGN WORD include:
caballero, hoi, verboteri, mitzvah, festschrift.
PHRASE-FOREIGN WORD does not independently activate IC linguistic core analysis attractors.

PHRASE-ARCHAIC

The PHRASE-ARCHAIC flag is set on words that have been obsolete for quite some time. Archaic words are commonly preserved in religious language and the plays of Shakespeare.

Words that are +PHRASE-ARCHAIC include:
thyself, wouldst, smote, varlet, peradventure.
PHRASE-ARCHAIC does not independently activate IC linguistic core analysis attractors.

PHRASE-OBSOLETE

The PHRASE-OBSOLETE flag is set on words and phrases that are on their way out. They are no longer in active circulation. They are words that make you appear behind the times or out of the loop. Many obsolete words and phrases tend to be out of date slang expressions.

Words that are +PHRASE-OBSOLETE include:
authoress, beatnik, troth, stewardess, groovy.
PHRASE-OBSOLETE does not independently activate IC linguistic core analysis attractors.

PHRASE-CIRCUMLOCUTION

The PHRASE-CIRCUMLOCUTION is set on phrases form a roundabout, wordy, often evasive way of referring to something. Circumlocutions are often used in a literary writing style where it is more important to be poetic than clear.

Phrases that are +PHRASE-CIRCUMLOCUTION include:
friend of all the world, lucid images of the night, fruit of the vine, eater of lotus blossoms.
PHRASE-CIRCUMLOCUTION does not independently activate IC linguistic core analysis attractors.
PHRASE-CIRCUMLOCUTION is used by the PowerEdit Indexes.

PHRASE-REDUNDANT

The PHRASE-REDUNDANT flag is set on pairs of words that are potentially redundant. In a concise style each successive word adds new information. In a redundant style, a single idea is repeated in two or more words.

Phrases that are +PHRASE-REDUNDANT include:
initial preparations, personal belief, urgent crisis, free gifts, true fact, personal opinion.
PHRASE-REDUNDANT is used by the PowerEdit Indexes.

PHRASE-REDUNDANT does not independently activate IC linguistic core analysis attractors.

PHRASE-PHRASE/WORD

The PHRASE-PHRASE/WORD flag is set on set phrases that can be expressed by one word. PHRASE-PHRASE/WORD is a type of redundancy. English uses may set phrases to indicate temporal and logical relationships within a sentnece or across sentence boundaries. Often these transitional phrases can be reduced to one word.

"By the way" can be reduced to "incidentally."
"Due to the fact that" can be reduced to "because."
"With regard to" can be reduced to "about."
"And as a result" can be reduced to "therefore."
Phrases that are +PHRASE-PHRASE/WORD include:
if and only if, before you do anything else, with respect to, on the whole, in this day and age.

PHRASE-PHRASE/WORD is used by the PowerEdit Indexes.

PHRASE-PHRASE/WORD does not independently activate IC linguistic core analysis attractors.

PHRASE-EUPHAMISM

The PHRASE-EUPHAMISM flag may be set on words that replace nasty unspeakable words associated with subjects like death, sex, and bodily functions. An overuse of PHRASE-EMPHAMISM words may indicate a writer's discomfort with the subject.

Words that are +PHRASE-EUPHAMISM include:
amenity_center, f-word, social disease, in a family way.

PHRASE-EUPHAMISM is used by the PowerEdit Indexes.

PHRASE-EUPHAMISM does not independently activate IC linguistic core analysis attractors.

PHRASE-RELIGIOUS

Religious language is a powerful source of metaphor and description. But when used in this fashion some audiences may not understand or appreciate the metaphor or allusion. Some Religious language is highly emotive and may be offensive to those who are not of the faith.

Words that are +PHRASE-RELIGIOUS include:
cross to bear, crown of glory, Torah, anathema.

PHRASE-RELIGIOUS is used by the PowerEdit Indexes.

PHRASE-RELIGIOUS does not independently activate IC linguistic core analysis attractors.

PHRASES INFORMAL SLANG/LOW FLAGS

The SLANG/LOG FLAGS of:
PHRASE-OFFENSIVE
PHRASE-VULGAR
PHRASE-OBSCENE
PHRASE-DEROGATORY
are used as crosscutters for PowerRead. When when of these four flags is set on a word that also has the DISJUNCT-SUBJECTIVE VIEW flag set on it, the word will be prevented from becoming a Level 4 theme for PowerRead.

PHRASE-OFFENSIVE

PHRASE-OFFENSIVE words can cause wounds to self-esteem. Even if the words are used "jokingly," PHRASE-OFFENSIVE words can cause problems for everyone concerned. Offensive words are not appropriate.

Words that are +PHRASE-OFFENSIVE include:
coyote ugly, baldy, whitey.

PHRASE-OFFENSIVE is used by the PowerEdit Indexes.

PHRASE-OFFENSIVE is used by PowerRead as a crosscutter to prevent words that are +PHRASE-OFFENSIVE and +DISJUNCT-SUBJECTIVE VIEW from becoming Level 4 themes.

PHRASE-OFFENSIVE does not independently activate IC linguistic core analysis attractors.

PHRASE-VULGAR

PHRASE-VULGAR words are crude variants of more emotionally neutral words that refer to sensitive areas like bodily functions, sex and death. PHRASE-VULGAR words are often meant to have a slight shock value, but usually they alienate your audience more than shock them.

Words that are +PHRASE-VULGAR include:
screws up, bitchy, pisser, bare-assed, pain in the ass.

PHRASE-VULGAR is used by the PowerEdit Indexes.

PHRASE-VULGAR is used by PowerRead as a crosscutter to prevent words that are +PHRASE-VULGAR and +DISJUNCT-SUBJECTIVE VIEW from becoming Level 4 themes.

PHRASE-VULGAR does not independently activate IC linguistic core analysis attractors.

PHRASE-OBSCENE

PHRASE-OBSCENE words break major social taboos. Common wisdom has it that these words are not to be spoken or written. Most obscene words have been used so freely in speech and in writing that their original shock value has been lost. Using them makes you look unimaginative and crude.

Words that are +PHRASE-OBSCENE include:
We all know what they are.

PHRASE-OBSCENE is used by the PowerEdit Indexes.

PHRASE-OBSCENE is used by PowerRead as a crosscutter to prevent words that are +PHRASE-OBSCENE and +DISJUNCT-SUBJECTIVE VIEW from becoming Level 4 themes.

PHRASE-OBSCENCE does not independently activate IC linguistic core analysis attractors.

PHRASE-DEROGATORY

The PHRASE-DEROGATORY flag is set on words and phrases whose negative conotations are offensive to some identifiable racial, ethnic, religious, or some such similar group. The intent of derogatory language is to injure or inflame members of such a group or to incite others. Derogatory terms are never innocent and should always be avoided.

Words that are +PHRASE-DEROGATORY include:
wop, honky, dago, queer, nigger, bugger, honkie, gook.

PHRASE-DEROGATORY is used by the PowerEdit Indexes.

PHRASE-DEROGATORY is used by PowerRead as a crosscutter to prevent words that are +PHRASE-DEROGATORY and +DISJUNCT-SUBJECTIVE VIEW from becoming Level 4 themes.

PHRASE-DEROGATORY does not independently activate IC linguistic core analysis attractors.

PHRASE-SEXIST

Offensive words wound, intentionally or otherwise. Most sexist words wound women specifically. The term "woman doctor" suggests that there is something exceptional about a woman who is a physician. Other words or phrases that refer to men and women directly and disparagingly are also sexist.

Words that are +PHRASE-SEXIST include:
bimbo, crone, policewoman, policeman, businesswoman.

PHRASE-SEXIST is used by the PowerEdit Indexes.

PHRASE-SEXIST does not independently activate IC linguistic core analysis attractors.

PHRASE-SLANG

The PHRASE-SLANG flag is set on words indended to exclude outsiders from understanding the speech of an in-group. Slang is inappropriate for most audiences.

Words that are +PHRASE-SLANG include:
gandy dancer, zilch, high roller, chugalug, firewater, chow, hanky-panky, mooch, goner, lifer, deep-six.

PHRASE-SLANG is used by the PowerEdit Indexes.

PHRASE-SLANG does not independently activate IC linguistic core analysis attractors.

PHRASES INFORMAL/BREEZY FLAGS

PHRASE-REGIONAL

The PHRASE-REGIONAL flag may be set on words or phrases that belong to particular regions of the country.

Words that are +PHRASE-REGIONAL include:
critter, arroyo, hoosegow, tater, bateau, youse.

PHRASE-REGIONAL is used by the PowerEdit Indexes.

PHRASE-REGIONAL does not independently activate IC linguistic core analysis attractors.

PHRASE-FOLKSY

Folksy words are informal words that try to project the image of "just plain folks." Some PHRASE-FOLKSY words drop the "g" off of words ending in -ing," (agin, goin), or use creative spellings to indicate a dialect.

Words that are +PHRASE-FOLKSY include:
dang, possum, hoodwink, goin, doohickey, kinfolk.

PHRASE-FOLKSY is used by the PowerEdit Indexes.

PHRASE-FOLKSY does not independently activate IC linguistic core analysis attractors.

PHRASE-COLLOQUIALISM

The PHRASE-COLLOQUIALISM flag is set on words or expressions that are likely to turn up in informal conversations but are inappropriate for formal writing. Many colloquialisms are informal idioms and some are also cliches.

Words that are +PHRASE-COLLOQUIALISM include:
clodhopper, fanny, in a pigs eye, nitty-gritty, tacky-tacky, bookie, fish or cut bait.

PHRASE-COLLOQUIALISM is used by the PowerEdit Indexes.

PHRASE-COLLOQUIALISM does not independently activate IC linguistic core analysis attractors.

PHRASE-INFORMAL

Informal language implies relations of carefree equality with a touch of assumed intimacy between writer and reader. Informal language may be appropriate in a note to a close friend, but it is not appropriate in normal business writing. Many PHRASE-INFORMAL words are contractions.

Words that are +PHRASE-INFORMAL include:
hodgepodge, skedaddle, gizmo, huobby, jiffy, snooze.

PHRASE-INFORMAL is used by the PowerEdit Indexes.

PHRASE-INFORMAL does not independently activate IC linguistic core analysis attractors.

Entering a Contraction in the Lexicon.

To enter a contraction:

1. Put the word on file in its contracted form. Enter "what's" as "what*s" in the lexicon. Use "*" on the lexical entry. Do not use """ as sign of the contraction in the lexicon.
2. Do not set any flags, the default of COMMON will suffice. Write "what*s" then hit enter on the lexicon word entry screen.
3. Go To the PHRASALS SCREEN.
4. Enter the word on the PHRASALS SCREEN as @ (word). @ what is.
5. Griff will then read "what*s" as "what is."

This technique is creates an automatic correction from "What*s" to what is. For this particular word we have no choice.

6. Also set PHRASE-INFORMAL on the word enter its replacement where applicable. "Can*t" is replaced by cannot.

PHRASES INFORMAL VISUAL FLAGS

PHRASE-BARBARISM

Barbarisms are words that are substandard words derived from a word that has the same function but is more acceptable. (adaption/adaptation)

Words that are +PHRASE-BARBARISM include:
orientated, preventative, educationalist, reoccur.

PHRASE-BARBARISM is used by the PowerEdit Indexes.

PHRASE-BARBARISM does not independently activate IC linguistic core analysis attractors.

PHRASE-FOREIGN LANGUAGE

The PHRASE-FORIGN LANGUAGE is available for application use.

It refers to foreign language spellings such as "labour" for "labor."

PHRASE-FOREIGN LANGUAGE does not activate IC linguistic core analysis attractors.

PHRASE-MISSPELLED

The PHRASE-MISSPELLED flag is set on the correct form of a commonly misspelled word to activte the PowerEdit Message "MISPELINGS HAPEN/267." It is possible to activate the automatic spell correction feature without leaving the MISPELINGS HAPEN by not flagging PHRASE-MISSPELLD on the correct spelling of the word.

There are approximately 10,000 words in the lexicon that will automatically defer to the correct spelling.

PHRASE-MISSPELLED does not activate IC linguistic core analysis attractors.

Using the Automatic Spelling Correction

To set up a word to correct the spelling automatically:

1. Enter the word into the lexicon and check the PHRASE-MISPELLED flag on the correct form of the word.
2. Enter the incorrect form of the word into the lexicon. Thes inccoorect form only needs the noun part of speech flag set. The other flags are not relevent.
3. In the PHRASALS SCREEN of the incorrect form enter @ space and the correct form of the word. For example. porplex would have @ perplex.
4. When Griff sees the @ (word) he will automatically correct the mispelled word on the screen.
5. CAVEAT. For this to work the mispelled form of the word can be the only form of the word in the PHRASALS SCREEN. Be sure that the word is not a correct spelling of another word with a different meaning. Example: Do not correct the mispelled word eaves (meaning eves). "Eaves" are fine on houses.

PHRASE-ABBREVIATION

An abbreviation reduces a word or a phrase to a series of one or more letters. The spelling of most abbreviations is standardized and may be found in any good dictionary. Some abbreviations are inappropriate in formal writing. Others such as "A.M." or "P.M." (with a specific time), and "A.D." or "B.C." (with a specific year) are always acceptable.

Words that are +PHRASE-ABBREVIATION include:
cf, ca, eg, viz, v, ie, etc, UFO.

PHRASE-ABBREVIATION is used by the PowerEdit Indexes.

PHRASE-ABBREVIATION does not independently activate IC Linguistic core analysis attractors.

Words that end in periods should be entered in both ways.

Mr./Mr

Mrs./Mrs

Ms./Ms

B.C./B C.

PHRASE-ACRONYM

An acroynm is a word created from the first letters of words in a phrase, often derived from the name or title or an institution. Unlike an abbreviation, an acroynm is pronounced as if it were an ordinary word. Using an acronym runs the risk of being misunderstood if the acronym is unfamiliar to the target audience.

Words that are +PHRASE-ACRONYM include:

NATO, OPEC, ASAP, VISTA, AWOL, SAC.

PHRASE-ACRONYM is used by the PowerEdit Indexes.

PHRASE-ACRONYM does not independently activate IC linguistic core analysis attractors.

PHRASES INFORMAL/HIGH FLAGS

PHRASE-DIFFICULT

PHRASE-DIFFICULT words are difficult to understand and often are misused.

Words that are +PHRASE-DIFFICULT include:

bibliophile, obloquy, bathos, occlusion, definiens.

PHRASE-DIFFICULT is used by the PowerEdit Indexes.

PHRASE-DIFFICULT does not independently activate IC linguistic core analysis attractors.

PHRASE-JARGON

Every trade of professon developes its own special vocabulary, partly as a way to save time and energy, partly as a way to keep outsiders in the dark about what they do. These specialized words are PHRASE-JARGON words.

Words that are +PHRASE-JARGON include:

duopsony, psychographics, heteronym, defragmenter, IBM compatible, angst.

PHRASE-JARGON is used by the PowerEdit Indexes.

PHRASE-JARGON does not independently activate IC linguistic core analysis attractors.

PHRASE-SCIENTIFIC

The PHRASE-SCIENTIFIC flag is set on words that comprise the specialized vocabulary of the scientific community and may not be readily understood by the average person.

Words that are +PHRASE-SCIENTIFIC include:

alpha decay, asymptote, barycenter, quanta, permittivity.

PHRASE-SCIENTIFIC is used by the PowerEdit Indexes.

PHRASE-SCIENTIFIC does not independently activate IC linguistic core analysis attractors.

PHASE-LEGALESE

The PHRASE-LEGALESE flag is set on words that comprise the specialized vocabulary of the legal profession and may not be readily understood by the average person.

Words that are +PHRASE-LEGALESE include:

in camera, non compos mentis, coparcenary, ex parte.

PHRASE-LEGALESE is used by the PowerEdit Indexes.

PHRASE-LEGALESE does not independently activate IC linguistic core analysis attractors.

PHRASE-CODE WORD

The PHRASE-CODE WORD is available for application use.

PHRASE-CODE WORD is not set on any word in the lexicon.

PHRASE-CODE WORD does not activate IC linguistic core analysis attractors.

PHRASES INFORMAL/LOW FLAGS

PHRASE-FILLER

A PHRASE-FILLER word adds nothing to the meaning of the sentences in which they appear. They can be deleted without loss.

Words that are +PHRASE-FILLER include:

by all accounts, for all intents and purposes, in my opinion, if I may say so.

PHRASE-FILLER is used by the PowerEdit Indexes.

PHRASE-FILLER does not independently activate IC linguistic core analysis attractors.

PHRASE-CLICHE

A cliche "to coin a phrase" is an example of faded cleverness. Whoever first compared the invention of a new phrase to the minting of a new coin was the wordsmith of a clever metaphor. Over time, though, the phrase has lost its vividness and originality.

Words that are +PHRASE-CLICHE include:

as dry as dust, a drop in the pucket, neat as a pin, behind the 8-ball, ace in the hole.

PHRASE-CLICHE is used by the PowerEdit Indexes.

PHRASE-CLICHE does not independently activate IC linguistic core analysis attractors.

PHRASE-NEOLOGISM

The PHRASE-NEOLOGISM is available for application use.

PHRASE-NEOLOGISM is not set on any word in the lexicon.

PHRASE-NEOLOGISM does not activate IC linguistic core analysis attractors.

PHRASE-OVERUSED

The PHRASE-OVERUSED flag is set on words or phrases that are often overused. The expression may be precisely the one you wich to use; however, it is worth reconsidering the selection of another word or phrase to avoid sounding common, bland, or uninteresting.

Words that are +PHRASE-OVERUSED include:

therefore, meaningful, fantastic, colossal, interesting, very, so, new and improved.

PHRASE-OVERUSED is used by the PowerEdit Indexes.

PHRASE-OVERUSED does not independently activate IC linguistic core analysis attractors.

PHRASE-TRITE

Trite expressions resemble cliches: they don't have any bite to them. The difference between the two is that while cliches started life as a clever phrase that faded with overuse, trite expressions were dull from the start. Trite expressions put thoughts that anyone might have into words that anyone might use.

Words that are +PHRASE-TRITE include:

everything being equal, at this particular point in time, as luck would have it, it goes without saying that.

PHRASE-TRITE is used by the PowerEdit Indexes.

PHRASE-TRITE does not independently activate IC linguistic core analysis attractors.

PHRASE-FADWORD

Fad words mirror society's changing tastes and enthusiasm. They change rapidly and may be thought of as slang for the upwardly mobile.

Words that are +PHRASE-FADWORD include:

optimize, upscale, relevance, laid-back, nouvelle.

PHRASE-FADWORD is used by the PowerEdit Indexes.

PHRASE-FADWORD does not independently activate IC linguistic core analysis attractors.

PHRASE-CATCH PHRASE

Certain phrases are used not to convey information, but to establish a bond between writer and audience. Catch phrases are usually drawn from current events of pop culture. They quickly become cliches and are forgotton altogether. Some examples of catch phrases are:

Read my lips.

Beam me up Scotty.

Words that are +PHRASE-CATCH PHRASE include:

and so forth, beam me up Scotty, read my lips, read my hips, wild and crazy guy, cowabunga.

PHRASE-CATCH PHRASE is used by the PowerEdit Indexes.

PHRASE-CATCH PHRASE does not independently activate IC linguistic core analysis attractors.

PHRASE-COLLOCATION

PHRASE-COLLOCATION is available for application use.

PHRASE-COLLOCATION is not set on any word in the lexicon.

PHRASE-COLLOCATION does not activate IC linguistic core analysis attractors.

PHRASE-SENSATIONALISM

Some expressions are more emotionaly charged than others. PHRASE-SENSATIONALISM words indicate strong emotions are invoked about the subject in question. PHRASE-SENSATIONALISM words are powerful words. Used correctly they add depth and force to your writing.

Words that are +PHRASE-SENSATIONALISM include:

prurient, sordid, heinous, mendacity, recidivist, bigot.

PHRASE-SENSATIONALISM is used by the PowerEdit Indexes.

PHRASE-SENSATIONALISM does not independently activate IC linguistic core analysis attractors.

PHRASES INFORMAL/USAGE FLAGS

PHRASE-NON-STANDARD

Non-standard words or phrases carry a heavy stigma. Usually they are produced by an incorrect use of an irregular form. The PowerEdit Message "NON-STANDARD PHRASE/127" is triggered by the PHRASE-NON-STANDARD flag which Griff will set on the non-standard forms of irregular verbs, nouns, and the plural forms of pronouns.

Words that are +PHRASE-NON-STANDARD include:

ours', better had, nothings, speechify, beautifullest, ought not to, sheeps, i-regardless.

PHRASE-NON-STANDARD is used by the PowerEdit Indexes.

PHRASE-NON-STANDARD activates IC linguistic core analysis attractors.

PHRASE-NON-STANDARD ENGLISH

The PHRASE-NON-STANDARD ENGLISH flag is available for application use.

PHRASE-NON-STANDARD ENGLISH is not set on any word in the lexicon.

PHRASE-NON-STANDARD ENGLISH does not activate IC linguistic core analysis attractors.

PHRASE-INCORRECT

The PHRASE-INCORRECT flag is available for application use.

PHRASE-INCORRECT does not activate IC linguistic core analysis attractors.

PHRASE-OFTEN MISUSED

PHRASE-OFTEN MISUSED is set on words that in pairs or triplets that sound and look alike but have different meanings. (allusion, elusion, and illusion).

Words that are +PHRASE-OFTEN MISUSED include:

affluent, effluent, affective, effective, affluence, effluence, ensure, insure.

PHRASE-OFTEN MISUSED is used by the PowerEdit Indexes.

PHRASE-OFTEN MISUSED does not independently activate IC linguistic core analysis attractors.

PHRASE-CANT

The PHRASE-CANT flag is available for application use.

PHRASE-CANT is not set on any word in the lexicon.

L PHRASE-CANT does not activate IC linguistic core analysis attractors.

PHRASES INFORMAL/CLARITY FLAGS

PHRASE-UNCLEAR

The PHRASE-UNCLER flag is set on words that may cause trouble with participant identification and tracking.

Words that are +PHRASE-UNCLEAR include:

some, anyone, anybody, another, somebody.

PHASE-UNCLEAR is used by the PowerEdit Indexes.

PHRASE-UNCLEAR does not independently activate IC linguistic core analysis attractors.

PHRASE-USELESS

The PHRASE-USELESS flag is available for application use.

PHRASE-USELESS does not activate IC linguistic core analysis attractors.

PHRASE-WEAK SUBJECT

The PHRASE-WEEK SUBJECT flag can be set on nouns that to not convey much information by themselves without premodification or postmodification.

The PHRASE-WEAK SUBJECT flag will also cause the topic to shift from the simple subject of a sentence (normally the topic) to the prepositional complement when the PHRASE-WEAK SUBJECT word is followed by an "of" prepositional phrase.

Words that are +PHRASE-WEAK SUBJECT include:

one, more, little each, everybody, stuff, this.

PHRASE-WEAK SUBJECT is used by the PowerEdit Indexes.

PHRASE-WEAK SUBJECT activates IC linguistic core analysis attractors.

PHRASE-WEAK ADJECTIVE

Adjectives can add poignancy to a phrase or they can detract from the vividness of a phrase.

Words that are +PHRASE-WEAK ADJECTIVE include:

little, good, nice, bad, large, big, small.

PHRASE-WEAK ADJECTIVE is used by the PowerEdit Indexes.

PHRASE-WEAK ADJECTIVE does not independently activate IC linguistic core analysis attractors.

PHRASE-WEAK

The PHRASE-WEAK flag can be set on words or phrases that add little to the meaning or flavor of a phrase. They are dull words that, if used too often or incorrectly, will put your reader to sleep.

Words that are +PHRASE-WEAK include:

circumstance, area, item, situation, figure.

PHRASE-WEAK is used by the PowerEdit Indexes.

PHRASE-WEAK does not independently activate IC linguistic core analysis attractors.

PHRASE-MEANINGLESS VERB

The PHRASE-MEANINGLESS VERB flag is available for application use.

PHRASE-MEANINGLESS VERB is not set on any words in the lexicon.

PHRASE-MEANINGLESS VERB does not activate IC linguistic core analysis attractors.

PHRASE-MEANINGLESS WORD

The PHRASE-MEANINGLESS WORD flag is available for application use.

PHRASE-MEANINGLESS WORD is not set on any words in the lexicon.

PHRASE-MEANINGLESS WORD does not activate IC linguistic core analysis attractors.

PHRASE-COINAGE

Coinages are made-up words that have just entered the languate. they are often puzzling to readers outside the industry or field in which they originated.

Words that are +PHRASE-COINAGE include:

cash-short, couch potato, vaporware, brewski, p-jammer.

PHRASE-COINAGE is used by the PowerEdit Indexes.

PHRASE-COINAGE does not independently activate IC linguistic core analysis attractors.

PHRASE-CLIPPING

A clipped word is a shortened form of a larger word. A clipped word tends to be either informal or unclear.

Words that are +PHRASE-CLIPPING include:

promo, auto, stats, obit, natch, stat, wiz, fridge.

PHRASE-CLIPPING is used by the PowerEdit Indexes.

PHRASE-CLIPPING does not independently activate IC linguistic core analysis attractors.

PHRASE-WORDY

In a concise style, one word expresses one idea. In a wordy style, several generic words combine to express one idea.

Words that are +PHRASE-WORDY include:

in the meanwhile, be that as it may, were in need of, the question as to whether, as a matter of fact.

PHRASE-WORDY is used by the PowerEdit Indexes.

PHRASE-WORDY does not independently activate IC linguistic core analysis attractors.

PHRASE-EMPHATIC

Emphatics commit the writer 110% to the statement in which they appear.

Words that are +PHRASE-EMPHATIC include:

never, always, surely, altogether, all of the time, of course, for sure.

PHRASE-EMPHATIC is used by the PowerEdit Indexes.

PHRASE-EMPHATIC does not independently activate IC linguistic core analysis attractors.

PHRASE-EMPHATIC

Emphatics commit the writer 110% to the statement in which they appear.

Words that are +PHRASE-EMPHATIC include:

never, always, surely, altogether, all of the time, of course, for sure.

PHRASE-EMPHATIC is used by the PowerEdit Indexes.

PHASE-EMPHATIC does not independently activate IC linguistic core analysis attractors.

PHRASE-TOPICALIZER

The PHRASE-TOPICALIZER flag is set on words that are generic topic nouns used to declare the topic of the sentence.

The PHRASE-TOPICALIZER flag will also cause the topic to shift from the simple subject of a sentence (normally the topic) to the prepositional complement when the PHRASE-TOPICALIZER word is followed by an "of" prepositional phrase.

Words that are +PHRASE-TOPICALIZER include:

Ms, period, creature, source, messrs, mrs, everything, field.

PHRASE-TOPICALIZER is used by the PowerEdit Indexes.

PHRASE-TOPICALIZER activates IC linguistic core analysis attractors.

PHRASE-TOPICALIZER is used by PowerRead and PowerIndex to identify nouns that are VERY WEAK and should not be made topics or should not be indexed when they also have the DISJUNCT SUBJECTIVE-VIEW flag set, which marks them as being weak nouns.

Examples of words that have DISJUNCT-SUBJECTIVE VIEW flag and the PHRASE-TOPICALIZER flag set include:

example, topic, way

| TOPIC AND INDEX ASSIGNMENTS | | | |
| --- | --- | --- | --- |
| ADJECTIVE | NOUN | TOPIC | INDEX |
| WEAK | WEAK | NO | NO |
| WEAK | STRONG | YES | YES |
| STRONG | STRONG | YES | YES |
| STRONG | WEAK | YES | YES |
| STRONG | VERY WEAK | NO | NO |

PHRASE-TOPICALIZER

The PHRASE-TOPICALIZER flag is set on words that are generic topic nouns used to declare the topic of the sentence.

The PHRASE-TOPICALIZER flag will also cause the topic to shift from the simple subject of a sentence (normally the topic) to the prepositional complement when the PHRASE-TOPICALIZER word is followed by an "of" prepositional phrase.

Words that are +PHRASE-TOPICALIZER include:

Ms, period, creature, source, messrs, mrs, everything, field.

PHRASE-TOPICALIZER is used by the PowerEdit Indexes.

PHRASE-TOPICALIZER activates IC linguistic core analysis attractors.

PHRASE-TOPICALIZER is used by PowerRead and PowerIndex to identify nouns that are VERY WEAK and should not be made topics or should not be indexed when they also have the DISJUNCT SUBJECTIVE-VIEW flag set, which marks them as being weak nouns.

Examples of words that have DISJUNCT-SUBJECTIVE VIEW flag and the PHRASE-TOPICALIZER flag set include:

example, topic, way

| TOPIC AND INDEX ASSIGNMENTS | | | |
| --- | --- | --- | --- |
| ADJECTIVE | NOUN | TOPIC | INDEX |
| WEAK | WEAK | NO | NO |
| WEAK | STRONG | YES | YES |
| STRONG | STRONG | YES | YES |
| STRONG | WEAK | YES | YES |
| STRONG | VERY WEAK | NO | NO |

PHRASE-ORIENTER

The PHRASE-ORIENTER flag is set on words used to indicate a context for part or all of the discussion. Words that are +PHRASE-ORIENTER also tend to be +ADJUNCT-VIEWPOINT.

Words that are +PHRASE-ORIENTER include:

politically, editorially, ethnically, economically, medically, socially.

PHRASE-ORIENTER is used by the PowerEdit Indexes.

PHRASE-ORIENTER does not independently activate IC linguistic core analysis attractors.

PHRASE-NEGATIVE TO AFFIRMATIVE

It is possible to indicate a positive concept by stacking two negative words in a row. Sentences stacked with negatives are often difficult to interpret and distracting.

Words that are +PHRASE-NEGATIVE TO AFFIRMATIVE include:
  does not accept, did not remember, not unnaturally, not uneven, not different, not certain, not many.

PHRASE-NEGATIVE TO AFFIRMATIVE is used by the PowerEdit Indexes.

PHRASE-NEGATIVE TO AFFIRMATIVE does not independently activate IC linguistic core analysis attractors.

The content processing system 200 further includes a knowledge catalog processor 240 and a theme vector processor 250. As shown in FIG. 2, the knowledge catalog processor 240 and the theme vector processor 250 are coupled to the lexicon 212 and knowledge catalog 100. In general, the knowledge catalog processor 240 receives, as inputs, the structured output 230 including the extracted content, the knowledge catalog 100, and the lexicon 212, and processes the extracted content for use with the knowledge catalog 100. The theme vector processor 250 receives, as inputs, the structured output 230, the processed output from the knowledge catalog processor 240, the knowledge catalog 100, and the lexicon 212. The theme vector processor 250, in accordance with the present invention, identifies the most important themes in the input discourse, and maps these themes into the knowledge catalog 100.

As described above, the knowledge catalog 100 describes all senses for a particular word or term. In a preferred embodiment, the content and topic of sentences is extracted in the linguistic engine 220, and is input to the knowledge catalog processor 240 in the form of content carrying words. The content processing system 200 only operates on the content carrying words for which the sense has been determined with a large degree of certainty (e.g. the non ambiguous content carrying words). After determining the sense of content carrying words, the content processing system 200 determines the expressions of content for the input discourse.

The content processing system 200 may be implemented in either hardware or software. For the software implementation, the content processing system 200 is software that includes a plurality of computer executable instructions for implementation on a general purpose computer system. Prior to loading into a general purpose computer system, the content processing system software may reside as encoded information on a computer readable medium, such as a magnetic floppy disk, magnetic tape, or compact disc read only memory (CD-ROM). In one hardware implementation, the linguistic engine 220, the knowledge catalog processor 240 and the theme vector processor 250 may each comprise dedicated processors including processor instructions for performing the functions described herein. Circuits may also be developed to perform the functions described herein. The lexicon 212 and the knowledge catalog 100 may be implemented as databases stored in memory for use by the content processing system 200.

Figure 3:
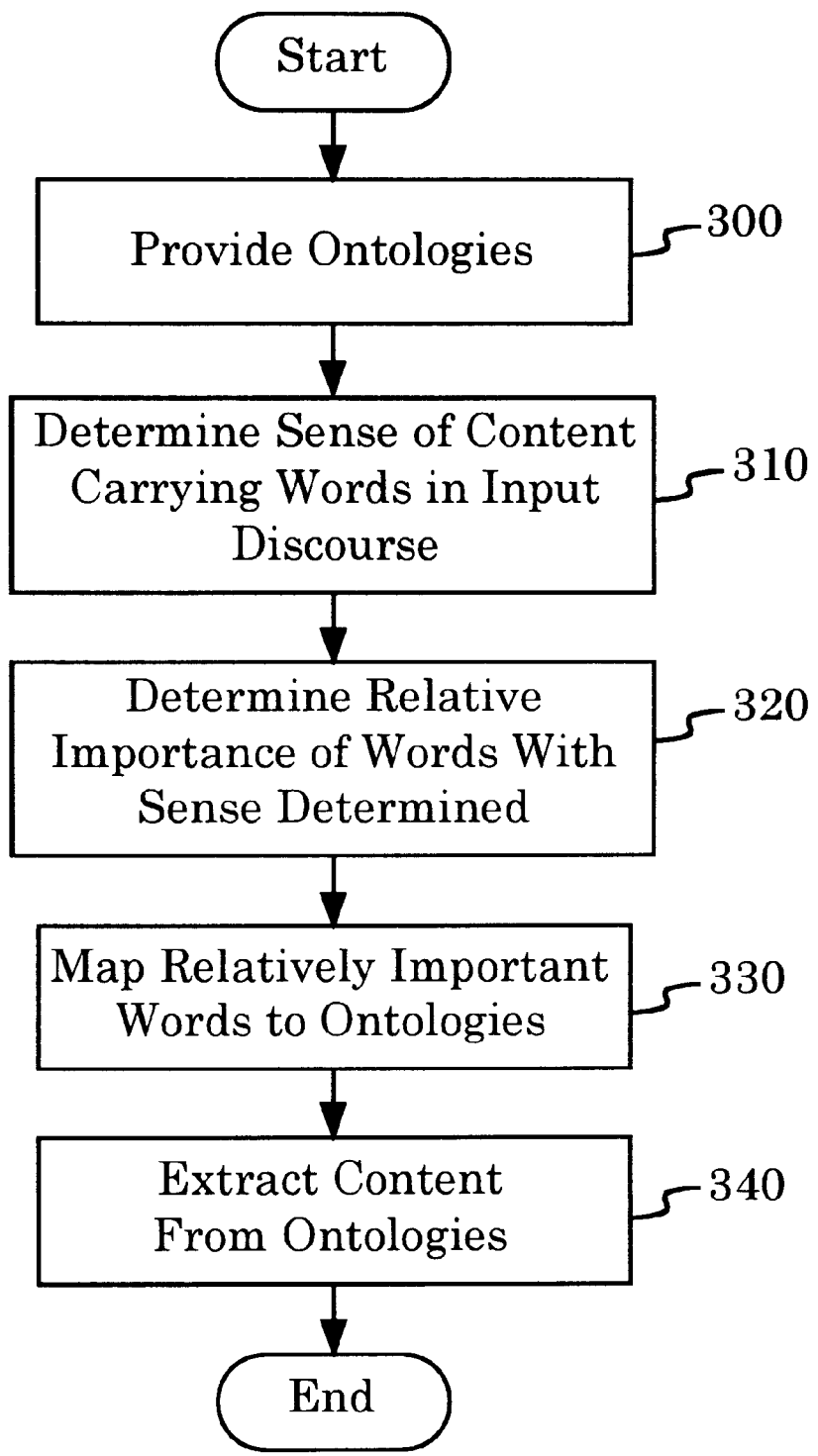
FIG. 3 is a flow diagram illustrating the high level methodology for content processing.

FIG. 3 is a flow diagram illustrating the high level methodology for content processing. The ontologies, such as the static ontologies 105, are provided as shown in block 300. As shown in block 310, the sense of content carrying words in the input discourse are determined. For all words in which the sense has been determined, the relative importance of these words, with respect to each other, are determined as shown in block 320. Based on the relative importance, the words are mapped to the static ontologies to reflect the general concepts disclosed in the input discourse as shown in block 330. By utilizing the static ontologies, content classification is determined as shown in block 350.

In general, the concepts mapped to the static ontologies capture the overall world view content classification of the input discourse. However, through discourse of a document, a combination of the abstract expressions of the knowledge base elements represent the actual content of the particular document. Therefore, the concepts from the static ontologies are an abstract representation of input discourse themes in time. The combination of these themes in time represent the actual content of the input discourse.

The knowledge catalog processor 240 processes content carrying words for use by the theme vector processor 250. Specifically, the knowledge catalog processor 240 generates the noun or nominal forms of the content carrying words in the input discourse. The knowledge catalog processor 240 parses the knowledge catalog 100 to compare the content carrying words with the knowledge concepts stored in the static ontologies. If the content carrying word is not contained in at least one domain in the static ontologies, then the word is noted as being not yet understood. If the word is stored more than once in the static ontologies, then the word is classified as ambiguous. If the word is stored only once in the static ontologies, then the word is classified as non ambiguous. If a word is classified as non ambiguous, then the theme vector processor 250 determines the concept of the word from the static ontologies. In a preferred embodiment, a minimum of 50% of the content carrying words must be recognized as non ambiguous.

As discussed above, the knowledge catalog processor 240 generates noun and nominal forms of content carrying words for look-up in the knowledge catalog 100. In order to accomplish this, the knowledge catalog processor 240 reads structured output 230 to determine which words are the content carrying words. The contextual tags determine whether a word carries content. For example, the word "will" could be an auxiliary verb or it could be a noun (e.g. a legal term). As an auxiliary verb, the word "will" carries no content. Using the content carrying words, the knowledge catalog processor 240 separates nouns and non nouns. The non noun content carrying words, such as adjectives, adverbs, and verbs, etc., are converted into nouns or nominal forms. For example, the verb "to fish" is converted to "fishing." The content carrying nouns are further analyzed to determine whether the word has a mass sense and/or a count sense. For example, the word "baseball", which is the mass sense of the word, has a completely different meaning than the count sense "baseballs."

In the preferred embodiment, because the noun sense of a word may be different from the nominal sense, and the mass sense may be different from the count sense, a separate classification or tree attachment exists for nominal and noun forms as well as for mass and count senses. Therefore, the knowledge catalog 100 stores all possible senses of a content carrying word. For example, the noun "a fish" has a different meaning than the verb "fishing" which was nominalized to "to fish." Based upon the above criteria, every content carrying word contains up to four potential pointers into one or more categories in the static ontologies 105. Specifically, each content carrying word may contain a pointer to the static ontologies 105 for the noun form, the nominal form, the mass sense, and the count sense.

In addition to nouns and regular content carrying words discussed above, words in the input discourse may also be characterized as special words. These special words include orienters and global classifiers. Orienter words guide the reader to a field of study regardless of the use of the word. A global classifier word carries the essence of a particular category, wherein the category may include sub categories beneath the category defined by the global classifier. In generating the pointers to the static ontologies, if there is not a concept for the nominal, then the concept of the noun is attached to the concept of the nominal. The special words may be mapped directly into the static ontologies.

After the sense of a majority of the content carrying words has been determined, the content processing system 200 maps key content carrying words into the static ontologies 105. In order to accomplish this, the theme vector processor 250 determines the relative importance of content carrying words in relationship to other content carrying words. The most important content carrying words are mapped to the knowledge catalog elements in the static ontologies 105.

Figure 4:
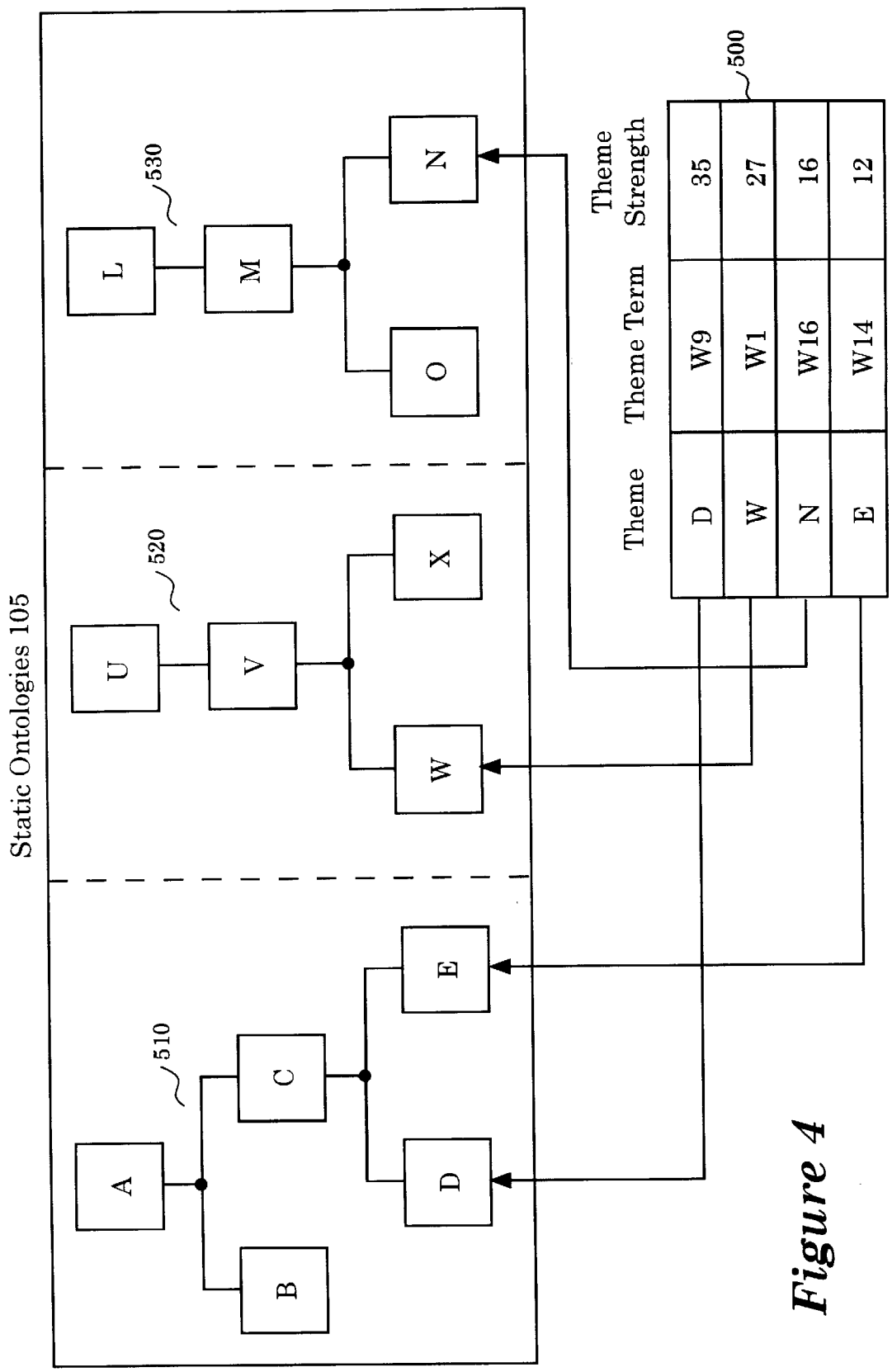
FIG. 4 conceptually illustrates an example of theme vector processing.

FIG. 4 conceptually illustrates an example of theme vector processing of the present invention. For purposes of explanation, the static ontologies 105 of the knowledge catalog 100 are shown as having three classification hierarchies 510, 520 and 530. Specifically, the database element "A" represents the highest level for the classification hierarchy 510, and the database element "B" and "C" are sub classifications of "A." Also, the classification hierarchy 510 includes sub classifications "D" and "E" linked to the database element "C." Furthermore, as shown in FIG. 4, the classification hierarchies 520 and 530 contain the database elements "U" and "L", respectively as the high level classifications.

The theme vector processor 250 receives, as an input, the structured output 230 that contains contextual and thematic tags. In addition, the theme vector processor 250 receives the definitional characteristics from the lexicon 212. With this information, the theme vector processor 250 executes a plurality of heuristic routines to generate the relative importance of content carrying words in the input discourse. The theme vector processor 250 only operates on non ambiguous content carrying words or on ambiguous words that have been disambiguated. In a preferred embodiment, the theme vector processor 250 generates a theme strength based on the output of the heuristic routines. The theme strength of a particular content carrying word is then used in conjunction with the theme strength of another word to generate a ratio of relative thematic importance between all words.

A theme vector output, labeled 500 in FIG. 4, illustrates several relative theme strengths for a number of words in an example input discourse. As shown in FIG. 4, the ninth word "W9" received a relative strength of 35, and the first word "W1" received a relative strength of 27. Therefore, "W9" has a relative thematic importance of 35/27 in relationship to "W1."

The theme vector processor 250 links the most important content carrying words into the static ontologies 105. As discussed above, the theme vector processor 250 only operates on non ambiguous content carrying words. Therefore, the content carrying words are directly mapped into the knowledge concepts of the static ontologies 105. For the example shown in FIG. 4, the most important word, "W9", has the "D" concept, and therefore is mapped to the "D" knowledge concept in the static ontologies 105. Note that for this example, the three most important words tie into the static ontologies in three separate classification hierarchies. Accordingly, the theme vector processor 250 determines that the three most important concepts in the input discourse are "D", "W", and "N."

In a preferred embodiment, the theme vector processor 250 uses the sixteen most important words of each sentence to map the concepts into the static ontologies 105. If the input discourse consists of a single paragraph, the sixteen concepts are more than enough to capture the overall content of the document. For a larger document consisting of many paragraphs, the sixteen most important concepts captures the overall content, and extending beyond the sixteen concepts typically only reinforces the high level concepts that were deemed most important.

THEME PARSING OVERVIEW:

As discussed above, the theme vector processor 250 utilizes the contextual tags stored in the structures output 230. In one embodiment, the linguistic engine 220 generates the contextual tags via a chaos loop process. The document entitled "Chaos Processor for Text", contains an explanation for generating contextual or grammatical tags, which is expressly incorporated by reference. All words in a text have varying degrees of importance in the text, some carrying grammatical information, and others carrying the meaning and content of the text. In general, the chaos loop process identifies, for words and phrases in the input discourse, grammatical aspects of the input discourse including identifying the various parts of the speech. In order to accomplish this, the chaos loop process ascertains how the words, clauses and phrases in a sentence relate to each other. By identifying the various parts of speech for words, clauses, and phrases for each sentence in the input discourse, the context of the input discourse is defined. The chaos loop process stores information in the form of the contextual tags. For a detailed explanation of the contextual or grammatic tags, see the document entitled "Analysis Documentation", which is expressly incorporated by reference.

The theme vector processor 250 also utilizes the thematic tags stored in the structures output 230. Each word carries thematic information that conveys the importance of the meaning and content of the input discourse. In general, the thematic tags identify thematic context of the input discourse. In general, the thematic tags identify thematic context of the input discourse, such as text. Each word is discriminated in the text, identifying the type of importance or meaning, the impact on different parts of the text, and the overall contribution to the content of the text. The thematic context of the text is determined in accordance with predetermined theme assessment criteria that is a function of the strategic importance of the discriminated words. The predetermined thematic assessment criteria define which of the discriminated words are to be selected for each thematic analysis unit. The text is then output in a predetermined thematic format.

THEME PARSER

After the grammatical context, the base thematic context, and the style have been ascertained, the full thematic parse can be implemented. The grammatical context is needed in order to establish the grammatical relationships that exist in a sentence. The style assessments are needed in order to establish the general tone and writing methods used by the author, and the base thematic context is the initial thematic analysis that makes simple decisions about the basic components of the theme when using only the grammatical context for clues. In addition to these contextually calculated aspects of a sentence, additional lexical information that is attached to each word will also be used.

The full thematic context of the document in now produced by checking each word against all possible thematic constructions, and recording either the existence or non-existence of each thematic aspect, or a scale of how much of a thematic aspect each word carries, or what specific sub-classification of a general thematic aspect the word contains. Each word in a sentence is then subjected to a series of tests to determine and record its thematic aspects.

As the detail for the thematic parser is discussed, certain examples will be used to indicate why a particular assessment is useful. Many of these examples will be based on the ability to generate a new, summarized version of a sentence. This assumes that any sentence contains a certain amount of information that can be removed without removing the main 'gist' of the sentence. An example of this would be:

Each word in a sentence is then subjected to a series of tests.

Each word subjected to series of tests.

Each word subjected to tests.

Word subjected to tests.

The subsequent sentences can progressively paraphrase the first, full version. While not fully grammatical, they can be read correctly and easily, without misinterpretation. A common example that will be used in any discussion of weak/strong words will be the ability to readily remove parts of a linguistic constituent group without rendering the sentence unintelligible.

Default Setup

Eight default setup operations are performed before the full thematic parsing can commence:

1. Weak/Strong Noun Initialization
2. Sentence Structure Checking
3. Grammatical Ambiguity Analysis
4. Industry-Specific Terminology Identification
5. Possessive Contextual Form Analysis
6. Dual Gender Noun Initialization
7. Verb Modification Attachment
8. Noun Support Attachment The first processing step sets the default conditions of each thematic aspect of each word to a zero condition (does not contain this thematic aspect).

Weak/Strong Noun Initialization

A default condition is placed on each noun in the sentence. Each noun carries a thematic aspect recording the strength of the noun. 'Weak' and 'strong' refer to the strength of the word's content-carrying sense. Some nouns are very descriptive when used in isolation, while others are very vague. 'Windmill' is very specific, but 'place' is very vague, and needs some additional information to help define the type of 'place' to which the author is referring. A noun can be encoded in the lexicon as 'strong' or 'weak', or can be computed in the thematic analysis as 'strong' or 'weak'. But each noun initially starts in its thematic processing by assuming it is 'strong'.

The strong/weak labels are referring only to the noun in isolation. A noun that is 'weak' in isolation can still be 'strong' as a unit, as long as it has some strong supporting words, such as adjectives or prepositional phrases. And there can be a number of levels of supporting prepositional phrases. But as long as one of the nouns in one of the prepositional phrases that modifies a particular noun can be classified as 'strong', the whole chain from that point up to the originating noun head can be classified as strong because of this strong support.

There are four conditions that must be thought of together when ascertaining a noun's content value.

1. A noun can be weak, with no support.
2. A noun can be weak with strong support.
3. A noun can be strong with weak support.
4. A noun can be strong with strong support.

Each noun is coded with a thematic aspect tag indicating whether it has supporting content, in the form of strong modifying adjectives or strong postposed prepositional phrases. A noun's initial default condition assumes it does not have strong supporting content.

Basic thematic analysis is highly concerned with the content-strength of words, especially nouns and adjectives. Nouns are the most focal part of a sentence, and can be thought of as carrying a certain amount of content in them. Some nouns are very rich in content and need no additional supporting information to be complete. A word such as 'sonar' is very strong in its content-senses. But words such as 'list' are very weak, and do not convey much information in isolation. Instead they look for other supporting information to help deliver the content of the noun phrase.

'Employee list' or 'list of employees' uses a stronger content word, such as 'employee,' to complete the full content-representation of the word 'list'. Eventually, one aspect of thematic analysis will determine if a noun phrase group (a noun plus its adjectives and supporting prepositional phrases) must be kept intact in order to convey its content properly, or if parts of the phrase can be removed without altering the basic meaning. An example would be 'electric guitar'. 'Electric' conveys additional information about 'guitar', but 'guitar' on its own still provides the basic thematic content. So 'electric' could be removed, which would remove some descriptive detail from the sentence, but would not diminish the basic understanding of the sentence. However, removing 'employee' from 'employee list' would remove the basic content-carrying word, leaving only an empty shell. This would seriously detriment the understanding of the sentence.

Each assessment of theme must understand the gradient levels of content in a sentence, where they exist, and where and when they could be removed without excessive problems. This will be discussed in detail later. But there are some default operations that are performed initially on a word that override certain types of strong/weak analyses.

Sentence Structure Checking

The sentence as a whole is checked for the existence of at least one predicate. If the sentence does not contain a single predicate, it is assumed to be a heading or part of a sentence that cannot be analyzed for thematic content. The entire sentence is therefore marked for removal from the thematic processing routines.

Grammatical Ambiguity Analysis

Each word in the sentence is checked for any grammatical ambiguity. One such condition occurs when the grammar parser cannot assign any parts of speech to a word. In this case, if the word is in a noun phrase, it is defaulted to an adjective. If the word is not in a noun phrase, it is defaulted to a noun. This causes naturally ambiguous grammatical conditions to be focused on more heavily by the thematic routines (since nouns and noun phrases are the most content-rich parts of thematic analysis).

Industry-Specific Terminology Identification

Additional default conditions are based on the existence of certain pieces of lexical information for a word. One such default is based on the use of special industry-specific terminology. Any word that is marked in the lexicon as 'industry oriented' should keep its supporting information, even if the word is deemed to be strong. For example, the word 'yield' may be marked as an important industry-specific term in banking. This would cause phrases such as 'yield on certificates of deposit' to remain together as a complete content unit, when otherwise it may have been logical to think that 'yield' could stand alone. In this case, a default test sets the industry-specific word to 'weak' whenever it has strong supporting information. This helps any application interested in reducing the content of the sentence to keep the supporting terms attached to the head term.

Possessive Contextual Form Analysis

Another default condition arises with the use of strong head nouns with strong, postposed, supporting terms in a possessive-style prepositional phrase. For example, in 'the theft of automobiles', 'theft' could be thought of as being 'strong', but 'of automobiles' is a strong indicator of content and usually needs to be kept associated with the head word. Head words in this context are by default marked as 'weak', but with strong supporting information. They are also marked with a special strong-content code that specifically identifies the head word as conveying strong content, but wants the supporting words to be kept associated with the head word. This helps applications that summarize text to keep the phrase together, but also indicates to content-abstraction applications that the head term conveys strong content in isolation.

Dual Gender Noun Initialization

Another default condition sets the strength of certain dual-gender nouns to 'weak'. If a word is marked as dual-gender, if it has no additional strong supporting context, if it is not in the simple subject position of a clause, and if it is not in a prepositional phrase, then the word is marked as 'weak.' An example is 'They allow manufacturers to offer large discounts'. 'Manufacturers' is marked as 'weak' in this particular context.

Verb Modification Attachment

This thematic aspect concerns itself with the attachment of additional modifying information to verbs. Some verbs require additional adverbial information in order to be fully understood. This additional information could be available in the form of an adverb, an adverbial prepositional phrase, or an adverbial clause. Other verbs accept this additional information when available, and specifically look for it, but can still function properly without it. And still other verbs do not care if it is included or not. These verbs are specifically marked in the lexicon as 'obligatory-adverb required' and 'optional-adverb acceptable'.

The verb 'put' is an example of an obligatory-adverb verb. A sentence such as 'He put the book.' leaves us naturally wanting to know where the book was placed, such as 'on the desk'. But other verbs with the same grammatical context do not convey the same experience. 'He read the book.' does not cause the reader to be looking for additional information modifying 'read', such as 'in a chair' or 'at the office'.

As with the 'weak' and 'strong' nouns, applications that look to summarizing these sentences must be aware of the information that can be easily removed, and the information that causes problems for the reader when it is removed.

In our initial default analysis, before the full thematic assessments begin, several conditions naturally cause verbs to be defaulted to an 'obligatory' or 'optional' condition. Any monotransitive verb that does not have a direct object but that does have an adverbial phrase is coded by default as an obligatory-adverb verb. This causes the adverbial phrase to be retained longer, as would an object to the verb.

Intransitive verbs should have the obligatory-adverb setting, causing any adverbial phrases to be linked more directly to the verb. And verbs that signal 'unmarked' infinitive clauses are marked as optional-adverbial, causing the infinitive clause to be carried with the verb. An example of this type of sentence is 'Bob had three people guard the door.'. 'Had' signals the allowance of the unmarked infinitive 'guard'. This sentence would feel very incomplete if this clause were removed when a summary of the sentence is generated.

Finally, ditransitive verbs with only one object set the optional-adverb flag to indicate that any adverbial information be strongly attached to the verb, filling in for the missing object.

Noun Support Attachment

As a last stage in the pre-processing theme section, each word is analyzed to determine if strong support exists for it. The strong support assessment will be used along with the strong/weak noun thematic assessments to determine if the word is a focal point for a strong point as a whole.

MAIN THEMATIC ASSESSMENTS

After the initial setup routines are complete, each word is processed through the main thematic assessment routines. These routines attach flags to each word/phrase that indicates its thematic character. Each theme routine will have a short explanation, examples where needed, and sample abstract syntactic representations that indicate the abstract nature of the sentence context that is necessary for the routine.

The thematic assessments are a series of tests made against each word/phrase in the exact context of the sentence. Each test records the existence or degree of applicability of each of the theme routines to the word/phrase. The collection of the grammar, style, base theme, and these thematic assessments together will provide the necessary information that applications need to re-write sentences and extract group of content.

There are three main types of thematic assessments:

1. Major Thematic Assessments
2. Theme-Relational Tagging
3. Theme-Location Identification Major Thematic Assessments Major thematic assessments contain all of the routines necessary to make major assessments about the overall theme of the sentence. There are 210 such routines, each of which produces an output to be stored for each word/phrase in the thematic context output.

AddAdv: Identifies 'additive adverbs' functioning in an adverbial role. Additive adverbs indicate that the predication is additionally true about the referent under focus. Based on the exact context of the sentence, this flag is set when an additive adverb is not essential to the meaning. The adverb may occur in any contextual position in the sentence.

ex: Mary also could play the banjo.

The banjo similarly has the dynamic range of a chainsaw.

AdjAdvSubordination: Identifies adjectival and adverbial clauses that are not essential to the meaning or to the grammatical integrity of the sentence. Most non-contrastive type sentence level adverbial clauses are tagged, and most adjectival clauses that modify strong nouns are tagged. If the adjectival clause carries strong content information and the noun it modifies is weak, then the clause is not tagged. Adjectival clauses that have no strong elements are tagged even if the noun being modified is weak and needs support.

ex: After they had voted, the race was run on Sunday.

The main idea that he had was never implemented.

AdjDeterminer_b: Identifies determiners that modify plural count nouns or mass nouns, and that are not essential to the meaning or to the grammatical integrity of the sentence. They must be used as a determiner in the context of the sentence.

ex: I don't have enough strength to lift the box.

AdjectiveNotDet: Identifies adjectives that are not determiners, and that are not essential to the meaning. The adjective must occur in a noun phrase, and be marked as a weak adjective in the lexicon.

ex: A large cat jumped off the roof

AdjectivalClause: Identifies adjectival clauses that are not essential to the meaning. If the adjectival clause carries strong content information and the noun it modifies is weak, then the clause is not tagged. If the clause contains no strong information, then it is tagged, even when the noun being modified is weak.

ex: The main idea that he had was never implemented.

AdjectivalPrepPhrase: Identifies adjectival prepositional phrases that are not necessary to the meaning. If the noun being modified by the prepositional phrase is weak and the prepositional phrase carries strong content, the phrase is not tagged. If the prepositional phrase contains no strong information, it is tagged, even if the noun it modifies is weak.

ex: My physics book with the torn pages was lost.

AdjSubjComp: Identifies adjectives functioning as subject complements that are not essential to the grammatical integrity of the sentence. These adjectives will be marked as weak in the lexicon.

ex: The box was large.

Adverbs: Identifies adjunctive adverbs that are not essential to the meaning or to the grammatical integrity of the sentence. The adverb may appear in any position in the sentence, and may modify any valid constituent.

ex: The bear quickly ran into the forest.

AdverbAfterVerb: Identifies adverbs (usually adjuncts) directly following verbs where the adverb is not essential to the meaning. It is essential only when the verb it modifies is marked in the lexicon as an obligatory or optional adverb-type verb.

ex: The bear ran quickly into the forest.

AdverbEndMc: Identifies adverbs (usually adjuncts) ending a main clause where the adverb is not essential to the meaning (when the verb in its clause is not an obligatory or optional adverb type verb).

ex: The bear ran into the forest quickly.

AdverbialNpInit: Identifies introductory noun phrases of time. The noun phrase may occur at the start of any main clause, must have a time noun as its head, and must be only a noun phrase, not a prepositional phrase or any other constituent.

ex: Early that morning, we set off for camp.

AdverbInit: Identifies adverbs (usually disjuncts) that start a main clause where the adverb is not essential to the meaning. It is essential to the meaning only when marked in the lexicon as an orienter, such as the words 'economically' or 'linguistically' which name industries or specific fields of study.

ex: Actually, they left for the store.

AdvClauseInit: Identifies adverbial clauses at the beginning of a main clause that are not necessary to the meaning. Only those clauses that contrast to the information in the main clause will not be tagged.

ex: After they had voted, the race was run on Sunday.

AdvInNp: Identifies adverbs in noun phrases that are not essential to the grammatical integrity of the sentence. This includes any adjverb but those marked as orienters.

ex: It was an unusually comical movie.

AdverbSplitInfin: Identifies adverbs in split infinitives.

ex: . . . to boldly go where . . .

AdverbialBetweenCommas: Identifies adverbial phrases set off by commas, which are not essential to the meaning or to the grammatical integrity of the sentence. This includes all adverbials that are not orienters.

ex: The bear was, at least partially, standing on its hind legs.

AdverbialClause: Identifies adverbial clauses that are not necessary to the meaning. These include most non-contrastive adverbials.

ex: When the right times comes, I am going to learn to fly a plane.

AgoAdverbial: Identifies time representations that end in 'ago' or similar words, which are not necessary to the grammatical integrity of the sentence.

ex: I took the test some years ago.

Appositive: Identifies all appositives in any context.

ex: Bob Smith, a market analyst, said . . .

ApproxPrep: Identifies 'approximator prepositions' such as 'around, about, close to' where the prepositional phrase is not essential to the meaning. The phrase will be necessary only when it modifies a verb marked as obligatory or optional adverbial, or when the prepositional phrase contains strong content and the noun it modifies is weak.

ex: Bob left the party around ten o'clock.

Article: Identifies articles (determiner type).

ex: The bear ran down the road.

AttitudeAdv: Identifies 'attitudinal adverbs' functioning in an adverbial role where the adverb is not essential to the meaning.

BeVerb: Identifies all forms of the 'be' verb in certain contextual positions where the sense of the clause can be understood without the 'be' verb.

ex: The student is taking too many courses.

BeVp: Identifies the entire non-lexical section of a verb phrase that involves a 'be' verb, where the verb phrase section is not essential to the meaning or to the grammtical integrity of the sentence.

ex: Doug must be willing to invest in the future.

BogusSubject: Identifies subjects that carry no content.

ex: The level increased because the knob kept moving forward.

CommentInit: Identifies initial sentence comments that are not marked as orienters.

ex: Pound for pound, Bill Bates is the hardest hitter in the league.

ComparativeInSubjComp: Identifies comparatives in subject complements that are not essential to the meaning or to the grammatical integrity of the sentence.

ex: These cars are faster than mine.

ComparativeInSubject: Identifies comparative expressions in the subject that are not essential because they do not contain significant content.

ex: The faster planes will leave last.

Compromiser: Identifies 'compromiser adverbs' that are not essential to the meaning, where the conjunction is not essential to the meaning or to the grammatical integrity of the sentence.

ex: Men both young and old were invited.

ConcessiveAdv: Identifies 'concessive adverbs' that are not orienters.

ConjInNp: Identifies conjunctive and adjunctive adverbs that start main clauses and which are not orienters.

ex: Additionally, we may have to spend more money.

CorrelConj: Identifies 'correlative conjunctions' with following prepositional phrases.

CryptoAdjClause: Identifies clauses that syntactically appear adjectival but grammatically function adverbially.

ex: It came from the French, which also . . .

CryptoAdv: Identifies syntactic adverbs that are not necessary to the meaning.

CryptoClause: Identifies clauses of any type that appear syntactically isolated. Identifies a syntactic subject that is grammatically an adverbial.

ex: Actually, a few days prior to the interview, they had . . .

CryptoPrepPhrase: Identifies prepositional phrases of time that are not part of verbs that are marked as obligatory or optional adverbials.
ex: We met on that day.
DemonsAdj: Identifies 'demonstrative adjectives' that donot carry strong content (marked weak in the lexicon).
DemonsSubjBe: Identifies 'demonstrative pronouns' that are the grammatical subject of 'be' verbs.
DemonstrativeModifier: Identifies demonstrative adjectives that do not carry strong content (marked weak in the lexicon).
DemonstrativeSubject: Identifies demonstrative pronoun subjects that are not necessary to the grammatical integrity of the sentence.
Determiner_d: Identifies determiners that modify only plural count nouns, and that are not essential to the meaning.
DoVerb: Identifies the 'do' verbs that are not negated and that are not essential to the meaning.
ex: The students did understand the lesson.
EllipedPassive: Identifies ellipted passives clauses that are not essential to the meaning.
ex: The language supports several color spaces based on this standard.
EmptyVerb: Identifies verbs with an empty meaning, such as 'try, begin, ought', that are not essential to the meaning.
ex: He tries to maintain a good balance.
ExtractTopicWord: Returns the actual word from the initial sentence that represents the topic of the sentence.
Factive: Identifies 'noun particles' that are measurements, such as 'gallon, piece, few' that are not essential to the meaning.
ex: He added several gallons of water.
FinalPrep: Identifies prepositions that occur at the end of the sentence.
ex:
FindTopic: Identifies the main thematic topic in the sentence.
ex: A list of employees was printed.
The judge ruled that they were innocent.
FocusAdv: Identifies 'focusing adverbs' that are not orienting words.
HaveAux: Identifies the 'have' verb where it is not essential to the meaning or to the grammatical integrity of the sentence.
ex: The students have learned their lesson.
HaveTo: Identifies the phrasal forms of 'have+to' when functioning as a full lexical verb. This sequence would be replacable by single words, such as 'must'.
ex: We have to leave soon.
HedgingWd: Identifies 'hedging' words, such as 'partially' that do not carry strong content.
ex: He was partially finished with the job.
HedgingVerb: Identifies hedging verbs whose subject is plural with a following infinitive.
InfinClauseAfterObj: Identifies infinitive clauses that follow direct objects. The clause if tagged if it contains no strong elements.
ex: We completed all the forms to get a passport.
InfinInfin: Identifies a series of two infinitive phrases where the first is not necessary to the meaning or to the grammatical integrity of the sentence.
ex: We needed to finish to get our diploma.
IsAdjOrAdvClause: Identifies the given word as part of any adverbial or adjectival subordinate clause.
IsAnotherFocus: Returns TRUE when another main focus occurs in the current predicate after the given word location.
IsAnnouncement: Identifies the current verb as a verb of 'announcement'.
ex: We announced that the acquisition was called off.
IsAdjAdvClauseAnywhere: Identifies that the given word is contained in an adverbial or adjectival subordinate clause at ANY level of subordination.
IsAntecedantPrnSubj: Identifies the given pronoun subject as having an antecedent in the current sentence.
ex: Bob said that he would be there later.
IsAsBlankAs: Identifies the given word as part of an 'as WORD as' sequence.
ex: He is as clever as a fox.
IsAuxVerb: Identifies the given word as an auxiliary verb.
ex: He can see the painting.
IsBackRefCompoundNp: Identifies the given conjunction as part of a noun phrase compound where the second element is referring back to previous information.
IsBeComplement: Identifies the given word as a topic in a subject complement.
IsBeEquate: Identifies the given word as a 'be' verb for a coordinated topic.
IsBogusMc: Identifies the given word as an appositive that is syntactically marked as a main clause.
ex: He pleaded guilty to embezzeling from a bank, and to tax evasion, acts committed before he was married.
IsBogusSubject: Identifies the given word as a gerund syntactically marked as a subject.
ex: An excercise machine employing this cam enables the user to produce remarkable growth in strength and muscle size.
IsCompAppositive: Identifies the given word as an appositive that is properly ended.
ex: Bob Smith, a market analyst, said . . .
IsComplexPrep: Identifies the given word as the preposition starting a complex prepositional phrase.
IsCompoundNp: Identifies the given word as part of a compound noun phrase.
ex: Bob caught a tuna and a bass.
IsCryptoNoun: Identifies the given word as an adverb that is syntactically functioning like a noun.
IsDefArtThisNp: Identifies the given word as part of a noun phrase that contains a definite article.
ex: The three bears lived in the woods.
IsDeleteableNounClause: Identifies the given word as part of a noun clause that does not contain strong information.
ex: A general link will find the general area of the document on which the mouse was clicked.
IsDitransNeedPp: Identifies the given word as a prepositional phrase that belongs to a ditransitive verb.
ex: The state declared the land as one of its natural resources.
IsEllipedPassiveClause: Identifies the given word as part of an ellipted passive construction.
ex: These are device independent programs based on the new standard.
IsEndOfClause: Identifies the given word as occuring at the end of any clause structure.
ex: After the game was over, we left for the party.
IsEndOfMc: Identifies the given word as occuring at the end of a main clause.
ex: The bear walked through the woods; Bob never heard it coming.
IsEveryWordToLeftDeleted: Identifies that every word to the left of the given word in the sentence has been marked as non-essential.

IsGoodNounThisPp: Returns TRUE when the given word is in a prepositional phrase that contains a strong or supported noun.

ex: A list of new employees was printed.

IsEmbeddedClause: Identifies the given word as part of a subordinate clause that is embedded in another subordinate clause.

ex: Bob said that the list that was printed was incomplete.

IsImperative: Identifies the given word as an imperative verb.

ex: Write your name on the first line.

IsInNp: Identifies the given word as part of a valid noun phrase.

ex: The bear walked through the woods.

IsInfinitive: Identifies the given word as an infinitive verb.

ex: Bob is going to give me the lamp.

IsInfinitiveClause: Identifies the given word as part of an infinitive clause.

ex: Bob is going to give me the lamp.

IsMainVerb: Identifies the given word as the main lexical verb of a verb phrase.

ex: The ship can usually be identified by its name.

IsModifierSpeechAct: Identifies the given word as a noun that is being modified by a speech act word.

ex: Chapter one is an overview . . .

IsNeededAdjClause: Identifies that the given word is part of an adjectival clause that IS essential to the sentence. The clause is essential when the noun it modifies is weak and needs support, and then the adjectival clause has strong elements.

ex: The person who rang the bell was never found.

IsNegAdvCl: Identifies the given word as part of a subordinate clause that is being negated (a negative word appears in the clause).

ex: When I couldn't jump the ditch they left me behind.

IsNegVerbThisPred: Identifies the given word as part of a predicate that contains a negative verb.

ex: Bob did not hear the bear.

IsNotPartOfSpeech: Identifies the given word as syntactically ambiguous.

IsNounThisDo: Identifies the given word as part of a direct object with a noun head.

ex: Bob heard the bear in the woods.

IsOkAdj: Identifies the given word as an adjective that carries strong thematic content for supporting a noun.

ex: The economic summit was a success.

IsOkCompHead: Identifies the given word as the head word of a subject complement.

IsOneWordClause: Identifies the given word as a subordinate clause with only one word.

ex: The man accused was very nervous.

IsOnlyPossibleTheme: Identifies the given word as the only strong theme in the sentence.

ex: The bear didn't hear me approaching.

IsSubjectVerbMatch: Identifies that the two given word locations agree in number. This is valid only for simple number tests.

ex: The man with the pictures runs my business.

IsNeededPp: Identifies prepositional phrases that are attached to verbs and that are necessary for the proper thematic completion of the verb.

ex: He put the book on the table.

IsOfPpNeeded: Identifies possessive prepositional phrases that modify weak noun heads, where the prepositional phrase is necessary to the thematic completion of the main noun.

IsOkTheme: Identifies a particular word as being a valid thematic topic. A noun phrase that is strong or that has strong support in its modifying elements.

IsPassiveVbThisPred: Identifies the main verb phrases of the currently pointed to predicate, and returns TRUE when the verb phrase is a passive verb phrase.

ex: We were expected at the office.

IsPassiveVp: Identifies the current word position as being in a passive verb phrase.

ex: We were usually expected at the office.

IsPluralSubjectOfVerb: Identifies the subject of the verb currently being pointed to, and returns TRUE if this subject is plural.

ex: The boys who were at the store jumped into the car.

IsPosAppositive: Identifies the current word being pointed to as being an appositive for the previous noun phrase.

IsPosMainTopic: Identifies the current word being pointed to as being able to function as the main topic of the sentence. It must be strong or have strong support.

IsPrepPhrase: Identifies the current word being pointed to as part of a prepositional phrase.

ex: The rest of the group were hidden in the back of the house.

IsPreviousAs: Identifies when the current word being pointed to is part of an 'as' subordinate clause.

ex: We need to implement the new plan now, as the old plan cannot be completed on time.

IsPreviousComparative: Identifies when the current word being pointed to is part of a comparative phrase in the predicate of the sentence.

IsPrevAuxNeg: Identifies if the current word being pointed to is a verb in a verb phrase that carries a negative modal verb.

ex: He could not usually talk that long.

IsReducedSubClause: Identifies that the current word being pointed to is part of a reduced subordinate clause.

ex: The bear walking in the woods is very noisy.

IsSameBaseClause: Identifies that the two words being pointed to are part of the same base clause.

IsSameClause: Identifies that the two words being pointed to are part of the same clause.

IsSameNounConstituent: Identifies that the two words being pointed to are part of the same noun constituent.

IsSamePp: Identifies that the two words being pointed to are part of the same prepositional phrase.

IsSectionHeading: Identifies the current sentence as being a heading only, not a complete grammatical sentence.

ex: Formatting New Sections

IsStartMc: Identifies the current word being pointed to as the first word of a main clause.

ex: The bear walked through the woods; Bob could not hear it.

IsSubjDeleted: Identifies that the subject for the clause that is being pointed to has been marked as not being essential to the meaning or to the grammatical integrity of the sentence.

ex: The list was not printed using the laser printer.

IsThereMainAction: Identifies that there is a main clause action in the sentence that has not been marked as weak or unnecessary.

ex: The bear walked through the woods.

IsThereMainFocus: Identifies that there is a main focus in the sentence.

ex: The employee master list was printed with a laser printer.

IsThereMainTopic: Identifies that there is a main topic in the sentence.

ex: The list was printed with a laser printer.

IsThereNcTopic: Identifies that the main topic of the sentence is being expressed by a noun clause.

ex: What the speaker said didn't make much sense.

IsTherePrevDo: Identifies that there is a direct object in the current predicate that occurs prior to the current position being pointed to.

ex: We heard the bear walking though the woods.

IsTherePrevPrepFrom: Identifies a prepositional phrase in the same basic thematic unit that is a 'from' type prepositional phrase.

IsThereSupport: Identifies that the current noun being pointed to has strong modifying information.

ex: An economic decision is best.

IsThereWeakTopic: Identifies that the current word being pointed to is a weak, but usable, topic.

ex: The decision was made.

IsTrueAdj: Identifies that the current word being pointed to is a true adjective, not a participle.

ex: The linguistic program at the college was cancelled.

IsTrueNp: Identifies that the current word being pointed to is part of a valid noun phrase.

ex: The linguistic program at the college was cancelled.

IsThemePh: Identifies that the prepositional phrase being pointed to is part of the main theme of the sentence.

ex: The list of employees was printed on a laser printer.

IsType1Quote: Identifies quoted material with the format—subject+comma+speech act verb+noun phrase+comma+predicate:

ex: But the action, said London financial analyst Bob Smith, was . . .

IsType2Quote: Identifies quoted material with the format—subject+comma+noun+prepositional phrase+comma+speed act+noun clause:

ex: Bob Smith, president of the company, said that the system

IsType3Quote: Identifies quoted material with the format—main clause with no object+comma+noun phrase+speech act:

ex: The yield dropped substantially, market watchers said.

IsType4Quote: Identifies quoted material with the format—main clause with object+comma+noun phrase+speech act:

ex: Commercial banks will reduce the prime rate, analysts said.

IsType5Quote: Identifies quoted material with the format—subject+verb+to+speec act+noun clause:

ex: He declined to say whether the paper was accepted or not.

IsType6Quote: Identifies quoted material with the format—subject+speech act+comma+quoted clause:

ex: She said, "We will probably buy it."

IsType7Quote: Identifies quoted material with the format—subject+comma+noun+prepositional phrase+comma+speec act+comma+quoted noun clause:

ex: Bob Smith, son of Joe, said, "I don't care."

IsType9Quote: Identifies quoted material with the format—subject+speech act+object+noun clause:

ex: The lady told the customers that they were out of peanuts.

IsType10Quote: Identifies quoted material with the following format:

ex: "I don't care who shot the cat," Josh said.

IsType11Quote: Identifies quoted material with the format—quoted main clause with comma+subject+speech act+comma:

ex: "We can do it," he said, and added that it would be difficult.

IsVerbThisClause: Returns TRUE when there is a lexical verb in the clause pointed to.

IsWeakCompoundNp: Identifies weak compound noun phrases.

ex: The line and the list were not long enough.

IsWeakPp: Identifies that the current word being pointed to is in a weak prepositional phrase.

ex: The name on the list was mine.

IsWhatTense: Returns the verb tense for the word being pointed to. Only 'past' and 'present' are valid.

IsProgressiveVp: Identifies the current word being pointed to as a progressive verb phrase.

IsRepeatTopic: Identifies a particular topic as one that has been established in the discourse recently.

ex: The bear was running through the woods. It stopped at a small pond and started to drink. Then the bear raised its head and started sniffing.

IsTooWeakThemeWord: Identifies a given word as one that is too weak to be a topic of the sentence.

ex: The list was printed on the laser printer.

LowAdverbialClauses: Identifies low priority adverbial clauses that are not necessary to the meaning.

MannerAdverb: Identifies 'manner adverbs' that are not essential to the meaning or to the grammatical integrity of the sentence.

ex: He wrote the letter awkwardly.

McIntroConj: Identifies conjunctions starting main clauses where the conjunction is not essential to the meaning or to the grammatical integrity of the sentence. The conjunction would be replaced with a semicolon.

ex: The soldiers gave a great cheer, for he had won the victory.

Modal: Identifies 'modal auxiliary verbs' that are not essential to the meaning or to the grammatical integrity of the sentence.

ex: We shall arrive on time.

ModDetAdv: Identifies adverbs that modify determiners that are not negative.

MoreAdverbial: Identifies the adverb 'more' in contexts that are not essential to the meaning or to the grammatical integrity of the sentence. This usually indicates additional detail to follow that other theme routines would identify.

ex: Freud contributed more than anyone.

MoreThan: Identifies more . . . than constituents with than functioning as a preposition, with the prepositional phrase not essential to the meaning.

ex: It is more a fish than an animal.

NegativeAdj: Identifies negative adjectives that are not essential to the grammatical integrity of the sentence.

ex: Neither student failed.

NegativePrnSubj: Identifies negative pronoun subjects modified by possessive prepositional phrases.

ex: Neither of the accusations was true.

NeuterProSubj: Identifies 'neuter pronoun subjects' such as 'it, there', that are not essential to the meaning or to the grammatical integrity of the sentence.

ex: It ran into the woods.

NonRestrictiveRel: Identifies syntactic prepositional phrases that are grammatically relative clauses.
  ex: Certain buildings such as the RCA building will be destroyed.

NounTimeAdverbial: Identifies noun time adverbials that are not essential to the grammatical integrity of the sentence.
  ex: Ed signaled Thursday that he's tired.

ObjectAfterPp: Identifies syntactic direct objects that follow prepositional phrases, which are grammatically appositives or reduced clauses and not essential to the grammatical integrity of the sentence.
  ex: The stock closed at 5½, a gain of ⅛.

OfInNp: Identifies the 'of' preposition as head of a prepositional phrase that, along with a weak noun it may modify, is not essential to the meaning or to the grammatical integrity of the sentence.
  ex: One of the dogs OneAdj: Identifies where 'one', when used as an adjective, is not essential to the meaning.
  ex: We saw one bear running through the woods.

OnBeforeTime: Identifies where 'on', when used before 'time' words, is not essential to the meaning.
  ex: The party was held at the office on Tuesday.

OrphanAdjectivalClause: Identifies adjectival clauses whose noun head modifiers have been identified as not essential to the meaning or to the grammatical structure of the sentence.

OrphanAdv: Identifies adjuncts that are not part of verb phrases or noun phrases.
  ex: The simple truth is often not simple at all. OrphanPp: Identifies prepositions that do not have following noun phrases.

PersonalRef: Identifies personal references.
  ex: I would expect other banks to follow suit.

PossProObj: Identifies possessive pronouns in prepositional phrases or objects, where the pronoun is not essential to the meaning or to the grammatical integrity of the sentence.

PossProSubj: Identifies possessive pronouns in subjects, where the pronoun is not essential to the meaning.

PreDetNp: Identifies 'predeterminers' such as 'just' that are not essential to the meaning.
  ex: Bob thought that just three files were missing.

PrepPhrases: Identifies prepositional phrases that are not essential to the meaning or to the grammatical integrity of the sentence.

PrepPrep: Identifies a preposition followed by another preposition where the second preposition is not essential to the meaning or to the grammatical integrity of the sentence.
  ex: The cat is by the heater in the kitchen.

PronounSubjPassive: Identifies 3rd person pronoun subjects with passive verb phrases.
  ex: She was sent to the store by Bob.

PseudoMcBreak: Identifies 'in that' clauses where 'in that' could be replaced by punctionation.
  ex: We agreed with Bob, in that he was the expert.

PureCoordConj: Identifies 'pure coordinating conjunctions' that could be replaced by commas or other punctuation.
  Bob saw the bear, and the bear ran away.

QuoteSource: Identifies the quoted source of statements. Refer to the the individual IsQuote . . . theme routines for detail.

ReflexivePrn: Identifies 'reflexive pronouns' that are not essential to the meaning or to the grammatical integrity of the sentence.

RelThat: Identifies 'relative pronouns' that introduce relative clauses, where the pronoun is not essential to the grammatical integrity of the sentence.

SaveTopic: Identifies every word in the sentence that is not part of the main topic.
  ex: The bear ran through the woods.

Semicolons: Identifies main clause boundaries where conjunctions could be replaced with punctuation.
  ex: The bear ran through the woods, and Bob ran home.

StrandedInfinClause: Identifies syntactic infinitive clauses that are not essential to the meaning or to the grammatical integrity of the sentence.

StrandedNounClause: Identifies noun clauses that are not essential to the meaning or to the grammatical integrity of the sentence.

StrandedNounPhrase: Identifies temporal noun phrases that are not essential to the meaning or to the grammatical integrity of the sentence.
  ex: The tiger at the circus performs twice a day.

StrayAdj: Identifies adjectives not in noun phrases or subject complements.

StrayAdverbial: Identifies adverbials that are not in traditional grammatical locations.

SubjAdvVerb: Identifies adverbs positioned between the subject and verb of a clause, where the adverb is not an orienter.
  ex: Bob quickly ran away from the bear.

SubjectSplice: Identifies subordinate clause subjects that are acting as the subject of the main clause.
  ex: As the term is used again in the same section of text, it loses importance.

SweepNpTrash: Identifies noun phrases that appear stranded after the surrounding context has been identified as non essential.

ThanPrepPhrase: Identifies prepositional phrases beginning with 'than' that are not essential to the meaning.
  ex: It is more a fish than an animal.

ThatClauseAdj: Identifies adjectives in 'that' clauses with weak verbs, where the entire clause is not essential to the meaning or to the grammatical integrity of the sentence.
  ex: Be aware that similar products often come with different labels.

TimeAdj: Identifies 'adjectives or adverbs of time' that are not essential to the meaning.
  ex: Bob walked to the store daily.

TimeAdvInVp: Identifies time adverbs in verb phrases.
  ex: Bob walked daily to the store.

TimeInObject: Identifies time noun phrases in objects.
  ex: Bob went to Rome each Christmas.

TimeInSubjNp: Identifies time noun phrases in the subject of the sentence.
  ex: Every Thursday is a hard day for Bob.

TimeSubject: Identifies simple time subjects, with following subject modifiers, where the time subject can be replaced with the following modifiers.
  ex:
    TimeTime: Identifies time words that follow other time words, where the second time word is not essential to the meaning.
    ToInfinitive: Identifies infinitives marked by 'to' where the 'to' is not essential to the grammatical integrity of the sentence.
    ToneAdv: Identifies 'tone adverbs' indicated as 'maximizers, emphasizers or diminishers' that are not essential to the meaning.

TopicalizerPhrase: Identifies topicalizers modifying before possessive prepositional phrases where the topicalizer and the following preposition are not necessary to the meaning or to the grammatical integrity of the sentence.

TopicalClause: Identifies introductions to topical clauses.

ex: It is dynamic in that it can provide feedback.

Transition: Identifies 'transition words' that do not indicate 'time' or 'coordination', and that are not essential to the meaning or to the grammatical integrity of the sentence.

TrashBogusMc: Identifies clauses begun with semicolons where there is not a full main clause and where the clause is not essential to the meaning or to the grammatical integrity of the sentence.

TrashMc: Identifies main clauses that have all of their major elements marked as non-essential to the meaning and to the grammatical integrity of the sentence, where the entire main clause is actually unnecessary.

TrashStraySubj: Identifies subjects that have become unattached because of insufficient strong information in the rest of the clause.

TrashWholeSent: Identifies entire sentences that don't have any strong thematic content.

UniversalPrn: Identifies 'universal pronouns', 'predeterminers' or 'cardinal determiners' that are not essential to the meaning or to the grammatical integrity of the sentence.

UselessAdj: Identifies weak adjectives in noun phrases.

ex: The late president planted that tree.

UselessPrepPhrase: Identifies meaningless prepositional phrases.

ex: There is a viable alternative to it.

UselessPrnObj: Identifies indirect object pronouns.

ex: Congress gave them the shaft.

UselessPrnSubj: Identifies pronoun subjects that have alternate subject contexts that carry the meaning.

ex: No one except his supporters agree with the senator.

VerbAtEnd: Identifies verbs at the end of subordinate clauses, where the verb is not essential to the meaning or to the grammatical integrity of the sentence.

VerbInit: Identifies initial comment verbs.

ex: Note, however, that the apples were all green.

WeakAdj: Identifies weak adjectives.

ex: The simple solution is to not go.

WeakEquation: Identifies non-negative be-verb clauses that are equating only weak thematic information.

ex: The list was quite large.

WeakPrepPhrase: Identifies weak prepositional phrases.

ex: I would like to know your opinion as to your boss's behaviour.

WeakPrepSeq: Identifies a sequence of prepositional phrases that are collectively weak in thematic content.

ex: It was built on the basis of my invention.

WeakSubjComp: Identifies weak subject complements that have extended contexts.

ex: The motivation for the research was the issue of how to teach pronunciation.

WhAdjClause: Identifies wh-element adjectival clauses that modify strong nouns or that do not carry supporting information.

ex: Boredom is especially trying for young people who have so few opportunities.

WhElement: Identifies wh-element clauses.

WhNounClause: Identifies noun clauses that are not essential to the grammatical integrity of the sentence.

ex: A model for the scientific investigation of language arose which took its problems almost exclusively from British sources.

Wordy: Identifies wordy expressions and single word replacements.

WhileSubordinators: Identifies 'time-indicating' subordinating conjuctions, such as 'while', that are not essential to the meaning or that could be replaced with punctuation.

ex: Please get me some flour while you are at the store.

Theme-Relational Tagging

Theme-relational tagging looks for certain grammatical or thematic relationships and follows a particular line of processing which tags all of the words from a specifically identified start point to a specifically identified end point. There are approximately 15 of these routines.

DelAllAux: Flags each auxiliary verb in each verb phrase.

ex: Bob can leave as soon as he is cleared of the charges.

DelAllButNp: Flags each word in the sentence that is not in the current noun phrase being pointed to.

DelClause: Flags each word in the clause (and imbedded clauses) being identified by the given word.

DelCurrPp: Flags each word in the prepositional phrase being pointed to.

DelDo: Flags each word in the direct object being pointed to.

DelLogicBreak: Flags each word in the same logical constituent group indicated by the given word.

DelMc: Flags each word in the main clause being pointed to.

DelObj: Identifes any word in an object being identified by the given word.

DelPp: Flags each prepositional phrase that is not essential to the meaning or to the grammatical integrity of the sentence.

DelRemainderSubj: Flags each word to the right of the current word that is part of the complete subject of the current clause.

DelStraySubj: Flags each word of the complete subject being pointed to when the subject is not essential to the meaning of the sentence.

DelToTheLeft: Flags each word to the left of the given word.

DelToTheRight: Flags each word to the right of the given word.

DelVerb: Flags the current word being pointed to if it is a verb.

DelVp: Flags all words if the verb phrase being pointed to.

Theme-Location Identification

Theme location identification searches for particular grammatical or thematic relationships and returns a location of where this word, phrase or clause starts in a sentence. There are approximately 35 of these routines.

FindIoThisPred: Returns the location of an indirect object in an identified predicate.

FindAllPp: Returns the location of a prepositional phrase where the last word of a string of phrases is needed to support any part of the prepositional phrase string from the beginning.

FindClauseType: Returns the type of subordinate clause at the given location.

FindClauseLevel: Returns the number of subordinate clause levels at the given location.

FindEndNp: Returns the location of the end of the given noun phrase.

FindEndLogiceBreak: Returns the location of the end of the logical constituent group being pointed to.

FindEndObj: Returns the location of the end of the object being pointed to.

FindEndPp: Returns the location of the noun head of the prepositional phrase being pointed to.

FindEndSubj: Returns the location of the end of the complete subject being pointed to.

FindEndSc: Returns the location of the end of the subject complement being pointed to.

FindEndSubClause: Returns the location of the end of the subordinate clause being pointed to.

FindEndVp: Returns the location of the end of the verb phrase being pointed to.

FindLastNounInNp: Returns the location of the last noun head of the series of noun phrases identified by the given word.

FindLastVerbInVp: Returns the location of the last verb in the series of verb phrases identified by the given word.

FindNextMc: Returns the location of the start of the next main clause after the given word.

FindNextNoun: Returns the location of the next strong noun after the given word.

FindNextFirstNoun: Returns the location of the next noun after the given word.

FindNextKeptWd: Returns the location of the next word after the given word, where the word has not been marked as non-essential.

FindNounForThisAdj: Returns the location of the noun that the current adjective being pointed to modifies.

FindNounForThisPp: Returns the location of the noun head for the prepositional phrase being pointed to.

FindObject: Returns the location of the next object after the given word.

FindPrevNoun: Returns the location of the last noun before the current given word.

FindPrevNounVerb: Returns the location of the last noun or verb before the current given word.

FindPrepPrep: Returns the location of the last preposition before the current given word.

FindStartNp: Returns the location of the start of the noun phrase being pointed to.

FindPseudoVerbThisPred: Returns the location of the next participle in the predicate being pointed to.

FindStartMc: Returns the location of the start of the main clause being pointed to.

FindStartPp: Returns the location of the start of the prepositional phrase being pointed to.

FindStartSubClause: Returns the location of the start of the subordinate clause being pointd to.

FindStartVp: Returns the location of the start of the verb phrase being pointed to.

FindSubjThisPred: Returns the location of the simple subject after the current given word.

FindUndeletedWrd: Returns the location of the next word before the current given location that is not marked as non-essential to the meaning.

FindVerbThisPred: Returns the location of the first verb of the verb phrase for the current predicate being pointed to.

FindVerbThisSubj: Returns the location of the first verb of the verb phrase for the subject being pointed to.

Each of these assessments has its results stored for each word in the thematic context output area. Any application is now able to take advantage of this information, as well as the grammatical and stylistic information stored previously, to make intelligent observations about the grammar, theme and style of the text, and to perform some helpful operation against it, such as summarizing or outlining the text.

Sample Code

The following sample code shows how several typical theme tagging routines work. The theme parser works by setting a generalization of what each routine is looking for, followed by specific contexts that can either exclude certain sentences from the tagging or specifically include them.

```
PersonalRef(word_ctr)
ub1 word_ctr
{
int vbos;
int endvp;
int endnp;
int ctr;
if (LEX(wd_personal_prn,word_ctr) &&
    LEX(wd_first_person_prn,word_ctr) &&
    verb_phrase[word_ctr+1] &&
    simple_subject[word_ctr] &&
    !subordinate_clause[word_ctr])
***The above section tests that the current word being pointed to by word_ctr is
a first-person, personal pronoun, functioning as the subject of the clause, followed
by a verb phrase. The clause must be a main clause, not a subordinate clause. If
these tests pass, the routine continues, otherwise it returns. This test is the first
general test to determine if a word is a personal reference type. It is followed by
secondary tests the constrain this generalization in certain contextual conditions.
Note in this sample routine that the constraints are fairly specific and if met return
without doing any tagging. If the reference noun in question does not have these
contstraints, then it is flagged by default.***
    {
    vbpos = FinfLastVerbInVp(word_ctr+1); *** this locates the last verb in the
verb phrase following the word after the current pronoun***
        if (IsNegVerbThisPred(vbpos) ||
            prep[vbpos+1]) *** this checks the verb phrase for a negative element
anywhere in it, or for a preposition immedietely following the last verb in the verb
phrase***
        {
        return 0; *** return when negative verb phrases encountered: We CANNOT
forsee any insurmountable problms. ***
        }
    ctr = vbpos+1;*** position to next word following the end of the verb phrase
```

-continued

```
***
    if (prn[ctr])
    {
        return 0; *** return if a pronoun follows the verb phrase: I saw HIM the
following weekend. ***
    }
    while (ctr < number_words-3 &&
        predicate[ctr] &&
        IsSameClause(vbpos,ctr))
    {
    if(conj[ctr]) &&
        IsWordCoordConj(ctr) &&
        ctr < number_words-2 &&
        verb[ctr+1])
    {
        vbpos = FindLastVerbInVp(ctr+1);
        if(IsNegVerbThisPred(vpos))
        {
            return 0; *** Return when the predicate extends with the context of a
coordinating conjunction followed by a verb phrase, and where the verb phrase
contains a negative element. ***
        }
        break;
    }
    ctr++;
    }
    if (LEX(wd_that_clause_verb,vbpos) ||
        LEX(wd_emotion_attitude,vbpos))
    {
    if (LEX(wd_factual_know_verb,vbpos))
    {
        if(!(LEX(wd_speech_act,vbpos) &&
            LEX(wd_that_clause_verb,vbpos)))
        {
            return 0: *** Checks the last verb in the verb phrase for being either a that-
clause verb (say, expect, see . . . ) or a verb of emotion or attitude (disappoint,
amazed), and where the verb is a factual knowledge verb, but not a speech act verb
AND a that-clause verb. Verbs will be those such as 'hate, call . . . ' ***
        }
    }
    if (IsWordQuoteVerb(vbpos) &&
        vbpos < number_words-1 &&
        !IsWordThat(vbpos+1))
    {
    return 0; *** Returns when the verb position is a quotative verb, not the last
word of the sentence, and where the following word is NOT abstractly identified
by the lexical flags set on 'that'. I will WRITE as soon as I can. ***
    }
    endvp = FindEndVp(vbpos);
    if (endvp < number_words-1 &&
        IsInfinitiveClause(endvp+ 1))
    {
    return 0; *** Returns when the end of the verb phrase (includes adverbs) is
followed by an infinitive clause. ***
    }
    if (prn[endvp+ 1]&&
        !LEX(wd_nominative_case_prn,endvp+1))
    {
        endvp++; *** Positions pointer to a subjective case pronoun ***
    }
    if (!noun_phrase[endvp+1]&&
        !conj[endvp+1])
    {
    return 0: *** Returns if the following word is not in a noun phrase and not a
conjunction. ***
    }
    if (noun_phrase[endvp+1])
    {
    endnp = FindEndNp(endvp+1);
    if (!(conj[endnp+1]&&
        IsWordTo(endnp+1)))
    {
        return 0; *** Returns when the following word in in a noun phrase, and
when the next word after the end of the noun phrase is not the an infinitive clause
(identified by the abstract features of the word 'to' tagged in a conjunctio position,
which signals the subordination in the parser). ***
    }
    }
    for (; word_ctr <= endvp; word_ctr++)
```

-continued

```
    {
    ThemeTag[word_ctr][PersonalRefCode] = TRUE;
    *** Tags all of the words from word_ctr through the end of the verb phrase
as a personal reference: I believe that through revenue growth we will make that
goal. ***
    }
        if (IsWordThat(word_ctr))
        {
        ThemeTag[word_ctr][PersonalRefCode] = TRUE;
        *** Tags the word that if in the following position after the previous tags. ***
        return 0;
        }
        else
        {
        word_ctr--; *** Sets position at last tagged word. ***
        }
        }
    }
}
AdverbNpInit(word_ctr)
int word_ctr;
{
int nounpos;
if (noun_phrase[word_ctr]&&
    !subordinate_clause[word_ctr]&&
    IsStartMc(word_ctr))
{
*** The above code is the opening generalization that looks for a noun phrase that
is not in a subordinate clause, and that starts a new main clause. This is the initial
condition necessary for determining initial noun phrase adverbials. The following
code will add constraints for particular contextual conditions. Notice that the
constraints are fairly general, and that with a few basic tests being passed, and a few
NOT conditions being met, the noun phrase will be tagged of this type. ***
    nounpos = FindLastNounInNP(word_ctr); *** Find the last noun in the noun
phrase currently being pointed to from above. ***
    if (IsTimeNoun(nounpos) &&
        !simple_subject[nounpos]&&
        complete_subject[nounpos])
        {
*** if the noun head is a time word, not the simple subject of the clause, but is
classified in the complete subject portion of the clause, then it is tagged as being an
introductory adverbial of time. ex: Early next morning, before dawn, they fed the
foxes. ***
        TagNp(nounpos);
        }
    }
}
UselessPrepPhrase(word_ctr)
int word_ctr;
{
int nounpos;
int envpp;
int vbpos;
int temp;
if (prep[word_ctr]&& pp_adj[word_ctr])
{*** Opening generalization is to allow all prepositional phrases that are coded
as adjectival types to be available for the useless prepositional phrase tagging. The
following code will apply constraints to this generalization. Unlike the previous
examples, this example does not return based on the constraints as much as it only
allows for the preositional tagging inside specific constraints. ***
    nounpos = FindNounForThisPp(word_ctr); *** find the noun head for the
prepositional phrase. ***
    if (nounpos == NOT_FOUND)
    {
    return 0; *** return if a valid noun head is not found for the preposition. ***
    }
    if (IsGoodNounThisPp(word_ctr))
    {
    return 0: *** return of the noun head is listed as an important supporting word
for other phrases. It cannot be flagged as useless if this is so. ***
    }
    endpp = FindEndPp(word_ctr); *** Find the end of the prepositional phrase (last
word). ***
    if(endpp < number_words-1 && IsWordThan(endpp+1))
    {
    return 0: *** If the following word has the abstract characteristics of 'than' then
return. ***
    }
    if (predicate[word_ctr])
```

-continued

```
    {
    vbpos = FindVerbThisPred(word_ctr);
    if (vbpos < number_words && IsDitransNeedPp(vbpos))
    {
        return 0; *** If the word is in the predicate, and the main lexical verb for the
predicate is ditransitive, and is the type of word that needs supporting prepositional
information, then return. ex: The state declared the land as one of its natural
resources. ***
    }
    }
    if (LEX(wd_personal_prn,nounpos) ||
        IsWordDemonstrative(nounpos) ||
        IsWordNeuterPrn(nounpos))
    { *** A second generalization is made above. This states that the noun head
identified earlier should be a personal pronoun, a demonstrative pronoun, or a
neuter gender pronoun to be considered in this section. ***
        if (word_ctr>0 &&
            tag_table[word_ctr-1]!=TAG_WD &&
            (verb_phrase[word_ctr-1]||
            IsWordParticiple(word_ctr-1)))
        {
        return 0; *** This constraint exits when the previous word has been tagged
by another routine as not high-priority and was either in a verb phrase or a
participle. ex: She stood for a while looking at everything there was to see. ***
        }
        TagPp(word_ctr); *** Now this prepositional phrase is tagged as being weak
(non-priority). ex: There is a viable alternative to it. ***
    }
}
if (word_ctr &&
    prep[word_ctr]&&
    pp_adv[word_ctr]&&
    adj[word_ctr-1]&&
    !apunc[word_ctr-1]&&
    LEX(wd_comparative_adj,word_ctr-1))
{ *** This routine allows another generalization to attempt the weak prep phrase
tagging. If the word is a preposition and functioning adverbially, and of the prior
word is an adjective and is not followed by any punctuation mark, and if the prior
word is also a comparative adjective, then the routine continues. ex: It is better for
you than for me. ***
    nounpos = FindNounForThisPp(word_ctr);
    if (nounpos != NOT_FOUND &&
        IsWordThan(nounpos+1) &&
        !apunc[nounpos])
    { *** This constraint will allow for the weak prep phrase tagging. If the noun
head of the preposition is followed by the abstract nature of the word 'than' and
does not have any punctuation mark, then the prep phrase is tagged as weak. ***
        TagPp(word_ctr);
    }
    }
}
```

USING THE THEME OUTPUT

There are three primary uses of the thematic information stored in the output section:

1. Kernel Sentence Generation
2. Topic Extraction
3. Content Extraction

Kernel Sentence Generation

A sentence can be said to have a main point, or kernel, that embodies the major pieces of information that the writer is communicating to the reader. The kernel is generally a subset of the sentence, with additional supporting detail mostly enforcing the main point. Much of the supporting information can be removed without detracting from either the logical truth of the sentence or the general understanding of the point being communicated. The grammar, style and theme of the sentence are used to make the determination of which words can be removed without violating either of the above guidelines. In addition, there is often not a single but a number of reductions that can be made, each moving towards the main kernel in small steps, the last step being the most tersely worded kernel sentence.

To generate these kernel sentences, certain thematic output settings will be checked, and certain low-content, grammatically neutral words removed. The correct thematic assessments are checked to give the desired kernel reduction level. Each of the following tags will be checked against each word in the sentence. Any word that has been thematically tagged with any of the assessments listed here will be removed from the sentence. The words that are left will form the new, reduced sentence.

Levels of Reduction

When a new sentence is generated, thematically-tagged functionality is removed, as opposed to reducing thematic aspects until a certain percent of the sentence remains. Four reduction levels are sufficient to represent summarized forms of sentences. Any more and the noticeable differences between levels becomes insignificant. The individual thematic contextual elements that are tested at each level should also be tested in the order given. If they are not, the reductions may vary. For example, some theme assessments look for 'stranded' clauses, where the prior word removals have caused a clause to be stranded from the main clause. In this case, it should be tested after most other tests, or it may be stranded after the test is made. Some of these routines are using the run-time theme assessments, since they cannot be tested in isolation. The four reduction levels are:

1. Contextual Reduction
2. Base Thematic Reduction
3. Secondary Thematic Reduction
4. Headline Thematic Reduction Contextual Reduction Contextual reduction is a different type of reduction from the three thematic reductions. Thematic reductions function hierarchically, with each reduction level having potentially more information removed than did the previous reduction level. The contextual reduction may be smaller or larger than any of the thematic reductions, depending on the writing style of the sentence. From the original sentence, the following thematic contextual elements are tested and, if present, the corresponding words are removed from the sentence in this reduction type.

QuoteSource
ThatClauseAdj
TopicalClause
TrashStraySubj
OrphanAdjectivalClause
CryptoAdjClause
PrepPhrases
CryptoPrepPhrase
ThanPrepPhrase
PrepPrep
UselessPrepPhrase
AdverbInit
OrphanPp
AdverbialBetweenCommas
WeakSubjComp
ElliptedPassive
Adverbs
TopicalizerPhrase
TimeObject
PossProSubj
AdjDeterminer_b
DemonstrativeSubject
WhElement
ComparativeInSubjComp
MoreThan
WeakAdj
AdvInNp
DemonstrativeModifier
AgoAdverbial
PersonalRef
BogusSubject
StrayAdj
TimeSubject
NonRestrictiveRel
PureCoordConj
Article
PossProObj
BeVerb
SubjAdvVerb
Modal
DoVerb
RelThat
AdverbAfterVerb
NeuterProSubj
DemonsSubjBe
HaveAux
DemonsAdj
OneAdj
PreDetNp
OfInNp
ToInfinitive
ToneAdv
FocusAdv
AddAdv
Factive
HaveTo
HedgingWd
AttitudeAdv
ConcessiveAdv
OnBeforeTime
TimeAdj
ApproxPrep
ReflexivePrn
UniversalPrn
EmptyVerb
WhileSubordinator
TimeTime
Determiner_d
AdverbSplitInfin
NounTimeAdverbial
AdjSubjComp
Compromiser
CorrelConj
McIntroConj
PronounSubjPassive
FinalPrep
MannerAdverb
ModDetAdv
ComparativeInSubject
AdverbEndMc
CryptoAdv
WeakPrepSeq
HedgingVerb
VerbInit
TimeInSubjNp
Wordy Base Thematic Reduction This is the first of three hierarchical reductions for a sentence. It is intended that the resulting new sentence is both grammatical and logically correct. It should also be relatively easy to read. The following thematic contextual elements in the original sentence are tested and, if present, the cooresponding words removed from the sentence at this reduction level.

QuoteSource
ThatClauseAdj
TopicalClause
TrashStraySubj
AdvClauseInit

TrashBogusMc
Appositive
AdjectivalClause
AdverbialClause
CryptoAdverbialInit
AdverbialNpInit
CryptoAdjClause
StrayAdverbial
PseudoMcBreak
ObjectAfterPp
StrandedInfinClause
StrandedNounClause
StrandedNounPhrase
WeakEquation
SubjectSplice
PersonalRef
ThanPrepPhrase
BogusSubject
StrayAdj
AdverbInit
PrepPrep
TimeSubject
AdverbialBetweenCommas
NonRestrictiveRel
PureCoordConj
Article
PossProObj
BeVerb
SubjAdvVerb
Modal
DoVerb
RelThat
AdverbAfterVerb
NeuterProSubj
DemonsSubjBe
HaveAux
DemonsAdj
OneAdj
PreDetNp
OfInNp
ToInfinitive
ToneAdv
FocusAdv
AddAdv
Transition
Factive
HaveTo
HedgingWd
AttitudeAdv
ConcessiveAdv
OnBeforeTime
TimeAdj
ApproxPrep
ReflexivePrn
UniversalPrn
EmptyVerb WhileSubordinator
TimeTime
Determiner_d
AdverbSplitInfin
NounTimeAdverbial
AdjSubjComp
Compromiser
OrphanPp
UselessPrepPhrase
CorrelConj
McIntroConj
PronounSubjPassive
FinalPrep
MannerAdverb
ModDetAdv
ComparativeInSubject
AdverbEndMc
CryptoAdv
WeakPrepSeq
HedgingVerb
VerbInit
TimeInSubjNp
Wordy
SweepNpTrash
VerbAtEnd
InfinInfin
TrashMc
Semicolons
TrashWholeSent
StrayAdj
StrayAdverbial
CorrelConj
Secondary Thematic Reduction This is the second of three hierarchical reductions for a sentence. It is intended that the resulting new sentence is both grammatical and logically correct. It removes additional information that begins to send the new sentence into a headline mode, but not quite as terse. The following thematic contextual elements in the original sentence are tested and, if present, the cooresponding words removed from the sentence at this reduction level.

QuoteSource
ThatClauseAdj
TopicalClause
TrashStraySubj
AdvClauseInit
TrashBogusMc
Appositive
AdjectivalClause
AdverbialClause
CryptoAdverbialInit
AdverbialNpInit
CryptoAdjClause
StrayAdverbial
PseudoMcBreak
CommentInit
ObjectAfterPp
StrandedInfinClause StrandedNounClause
StrandedNounPhrase
WeakEquation
SubjectSplice
AdjAdvSubordination
PrepPhrases
WeakSubjComp
ElliptedPassive
Adverbs
InfinClauseAfterObj
TopicalizerPhrase
TimeInObject
PossProSubj
AdjDeterminer_b
DemonstrativeSubject
CryptoClause
WhElement
ComparativeInSubjComp
MoreThan
AdjectivalPrepPhrase
WeakAdj
AdvInNp
DemonstrativeModifier
AgoAdverbial
CryptoPrepPhrase
AdjectiveNotDet
PersonalRef
ThanPrepPhrase
BogusSubject
StrayAdj
AdverbInit
PrepPrep
TimeSubject
AdverbialBetweenCommas
NonRestrictiveRel
PureCoordConj
Article
PossProObj
BeVerb
SubjAdvVerb
Modal
DoVerb
RelThat
AdverbAfterVerb
NeuterProSubj
DemonsSubjBe
HaveAux
DemonsAdj
OneAdj
PreDetNp
OfInNp
ToInfinitive
ToneAdv
FocusAdv
AddAdv
Transition
Factive
HaveTo
HedgingWd
AttitudeAdv
ConcessiveAdv
OnBeforeTime
TimeAdj
ApproxPrep
ReflexivePrn
UniversalPrn
EmptyVerb
WhileSubordinator
TimeTime
Determiner_d
AdverbSplitInfin
NounTimeAdverbial
AdjSubjComp
Compromiser
OrphanPp
UselessPrepPhrase
CorrelConj
McIntroConj
PronounSubjPassive
FinalPrep
MannerAdverb
ModDetAdv
ComparativeInSubject
AdverbEndMc
CryptoAdv
WeakPrepSeq
HedgingVerb
VerbInit
TimeInSubjNp
Wordy
SweepNpTrash
VerbAtEnd
InfinInfin
TrashMc
Semicolons
TrashWholeSent
StrayAdverbial
CorrelConj Headline Thematic Reduction This is the last of three hierarchical reductions for a sentence. The new sentence is now reduced to a headline-style sentence, that is not necessarily grammatical nor logically correct. The following thematic contextual elements in the original sentence are tested and, if present, the cooresponding words removed from the sentence at this reduction level.

QuoteSource
ThatClauseAdj
TopicalClause
TrashStraySubj
AdvClauseInit
TrashBogusMc
Appositive
AdjectivalClause AdverbialClause
CryptoAdverbialInit
AdverbialNpInit
CryptoAdjClause
StrayAdverbial
PseudoMcBreak
CommentInit
ObjectAfterPp
StrandedInfinClause
StrandedNounClause
StrandedNounPhrase
WeakEquation
SubjectSplice
AdjAdvSubordination
PrepPhrases
WeakSubjComp
ElliptedPassive
Adverbs
InfinClauseAfterObj
TopicalizerPhrase
TimeInObject
PossProSubj
AdjDeterminer_b
DemonstrativeSubject
CryptoClause
WhElement
ComparativeInSubjComp
MoreThan
AdjectivalPrepPhrase
WeakAdj
AdvInNp
DemonstrativeModifier
AgoAdverbial
CryptoPrepPhrase
AdjectiveNotDet
PersonalRef
ThanPrepPhrase
BogusSubject
StrayAdj
AdverbInit
PrepPrep
TimeSubject
AdverbialBetweenCommas
NonRestrictiveRel
PureCoordConj
Article
PossProObj
BeVerb
SubjAdvVerb
Modal
DoVerb
RelThat
AdverbAfterVerb
NeuterProSubj
DemonsSubjBe
HaveAux
DemonsAdj
OneAdj
PreDetNp
OfInNp
ToInfinitive
ToneAdv
FocusAdv
AddAdv
Transition
Factive
HaveTo
HedgingWd
AttitudeAdv
ConcessiveAdv
OnBeforeTime
TimeAdj
ApproxPrep
ReflexivePrn
UniversalPrn
EmptyVerb
WhileSubordinator
TimeTime
Determiner_d
AdverbSplitInfin
NounTimeAdverbial
AdjSubjComp
Compromiser
OrphanPp
UselessPrepPhrase
CorrelConj
McIntroConj
PronounSubjPassive
FinalPrep
MannerAdverb
ModDetAdv
ComparativeInSubject
AdverbEndMc
CryptoAdv
WeakPrepSeq
HedgingVerb
VerbInit
TimeInSubjNp
Wordy
SweepNpTrash
VerbAtEnd
InfinInfin
TrashMc
Semicolons
TrashWholeSent
LowAdverbialClauses
WeakPrepPhrase
NegativePrnSubj
WhNounClause
BeVp
NegativeAdj
WhAdjClause MoreAdverbial
SweepNpTrash
UselessAdj
OrphanAdv
UselessPrnSubject
UselessPrnObj
TimeAdvInVp
StrayAdverbial As a final stage of processing in the kernel generation section, the punctuation for the sentence is rewritten in order to best reflect the new sentence structure.

Topic Extraction

After the new kernel sentences have been generated, five topic extraction routines will be generated. They locate the main, new topic in the sentence, extract its supporting context, and place the result in one or more of the five topic extraction areas. The five topic extraction areas are:

1. Main Thematic Topic Group
2. Main Thematic Topic
3. Secondary Thematic Topic
4. Main Developed Topic
5. Main Proximity-Developed Topic Main Thematic Topic Group This topic extraction routine looks for the main topic in the sentence, along with its most important supporting context. If the main topic has already been developed, it looks for a secondary topic. If there is not a suitable secondary topic, or if the secondary topic has also already been developed, then the original main topic is selected. There are three processing phases used in establishing the main topic. First, certain thematic assessments are checked, and any associated words removed if they contain the tested assessments. These tests are:

QuoteSource
ThatClauseAdj
TopicalClause
AdverbInit
CommentInit
Appositive
WeakSubjComp Second, the main topic is extracted from the sentence elements that remain after the previous reductions:

SaveTopic

Last, contextual elements of specific types are removed from the main topic:

PrepPrep
PrepPhrases
UselessPrepPhrase
SweepNpTrash
WeakAdj
PureCoordConj
UniversalPrn
ConjInNp
Transition
Factive
StrayAdj
DemonsAdj
DemonstrativeModifier
AdverbAfterVerb
AdvInNp
Compromiser
FocusAdv The result is now placed in the main topic extraction output area.

Main Thematic Topic

The main thematic topic is an extended classification of the previous thematic group. If the topic group is located in the actual 'thematic topic' position of the sentence, and not in a secondary focus position, then the main topic group is copied to this output area. This identifies the topic group not only as the main thematic topic of the sentence, but also indicates that it was in the strongest thematic position within the sentence.

Secondary Thematic Topic

The main thematic topic is copied to this output area, and any non-critical supporting information is removed. This moves the topic to just its main head, if possible. This is determined by checking the theme assessments for a 'strong noun' classification. If the topic's head noun is classified as a strong noun, then the supporting information is removed. Otherwise, it stays at this level. If there is nothing in the main thematic topic output area, this output area will also be empty.

Main Developed Topic

This output area copies the main thematic topic into it as long as the main thematic topic head has been a main thematic topic head within the last 20 topics. This indicates that this main topic is one that is not only prominent in the sentence, but also in the discourse at this point.

Main Proximity-Developed Topic

Whenever a main developed topic appears for a second time with a user specified range of text, it is output to the main proximity-developed topic. This output indicates that it is not only a main focal point within the document, but is being reinforced through the writing.

Content Extraction

The final phase of thematic output processing is to identify certain major thematic points in a sentence. This is a superset of the detailed thematic elements, being those that are notably important for turning free form text into structured database fields. The following outputs are produced:

Thematic Head Words
Proper Names
Descriptions
Named Topics
Topic Indicators
Definitions
Developed Proper Names Thematic Head Words This output indicates that the identified word locations is a main focul point for a strong noun phrase. A strong noun phrase can either be a strong noun head or a noun head with strong support. Only the actual head word is specifically identified. Certain words that were initially flagged as strong or strong with support are removed from this list. The logic for this output is as follows:

---

+noun and
−pronoun and
(+strong noun or +strong support or +knowledgebase concept or
(+gerund and simple subject)) and
−time noun and
−numbers and
−digits and -continued

```
(+knowledgebase concept or
   not ((+gerund or participle) and
      (-simple subject or -verb phrase))) and
-pro verb and
-perfective verb
```

If this condition is evaluated as true, then the word position is output to this area. Additionally, any adverbs that are marked as topicalizers are also flagged in this area. An example of these words is:

linguistically aerodynamically

Proper Names

In this output area all of the proper names and places in the sentence are stored. Time nouns are excluded.

Descriptions

The 'description' output specifically identifies every set of noun plus descriptor. These appear as an appositive. Both sides of the description are stored. They must be able to express an equation of 'term1 is a term2'. An example of such a sentence that would generate these conditions is:

John Smith, a market analyst at Big Company, said . . .

This sentence will generate:

Term1(John Smith) isa Term2(market analysts)

Named Topics

This output area indicates topics that are specifically named in the context of a sentence. An example is:

This is a story about bears.

'Bears' is assigned to this output area.

Topic Indicators

This output area contains all strong orienter words. These are words that indicate a field of study or industry, such as:

computer software prime interest rate terrorist abduction

These words indicate the highest possible thematic significance in sentences.

Definitions

This output stores words that are defined in the context of the sentence with a 'be' verb relationship. An example of such a sentence is:

A bear is an animal that lives in the forest.

This would generate two terms with an 'isa' relationship:

Term1(bears) isa Term2(animals)

Developed Proper Names

This output indicates each proper name identified in 'Proper Names' above that mentioned more than one time within a user specified length of text.

In addition to the grammatic tags and thematic tags, the structured output 230 also includes outputs for extracted topics, kernel sentences, and extracted content. The knowledge catalog processor 240 utilizes these output areas to generate the content carrying words found in the input discourse. The linguistic engine 220 further includes a topic extractor, that gives the topics of the text, a kernel generator, that generates summarized versions of the text, and a content extractor that identifies key content of the text. In addition, Appendix A, entitled "Theme Parser Code", contains a source code listing for implementing the Text Theme Parser. Appendix B, entitled "Code Headings", contains a list of defined source code headers corresponding to the theme parser source code of Appendix A. Also, for a further explanation of the thematic output, see the document, entitled "Oracle ConText™ Linguistics Toolkit, Guide and Reference, Release 1.1", which is expressly incorporated by reference.

Figure 5:
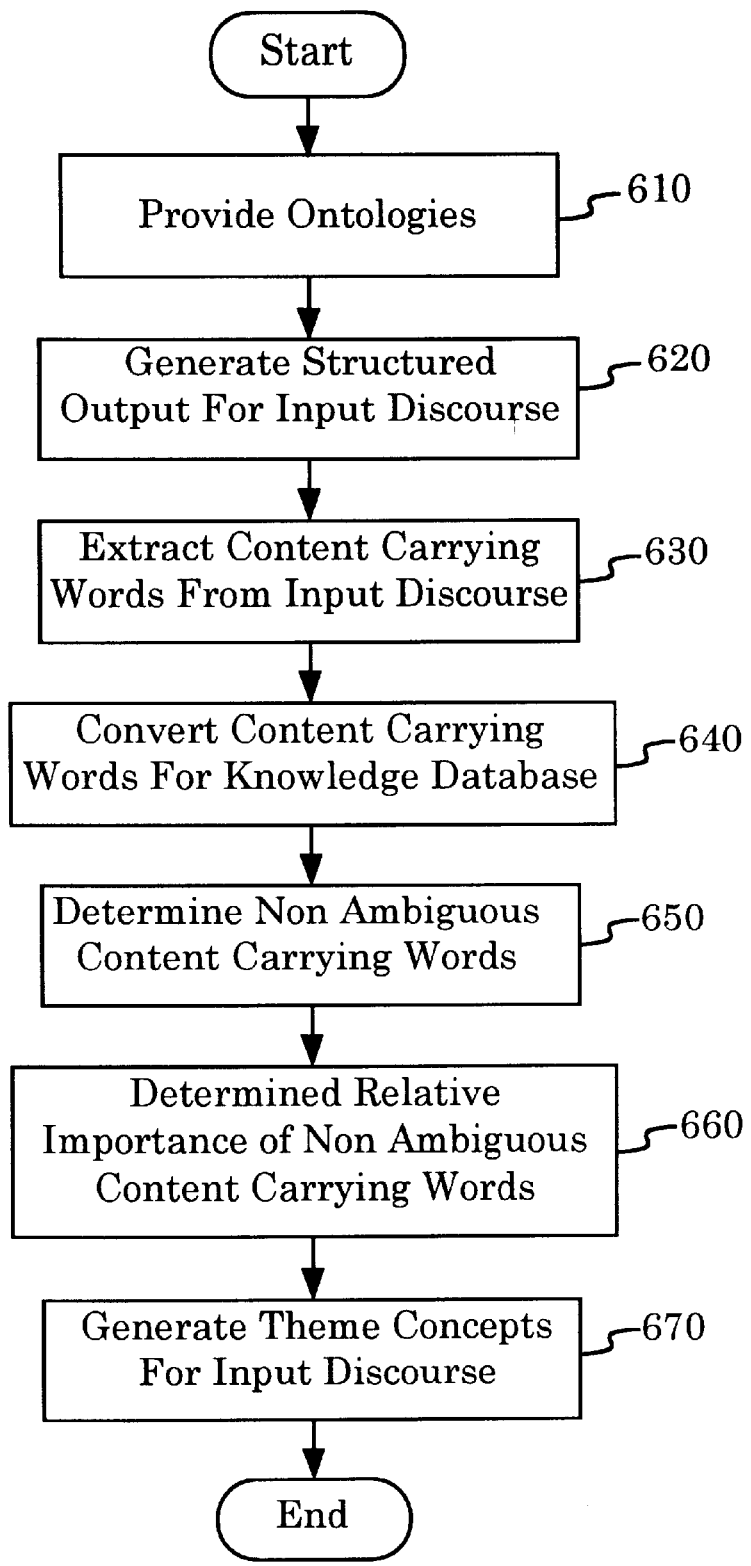
FIG. 5 illustrates a high level methodology for content processing including theme vector processing.

THEME VECTOR PROCESSING:

FIG. 5 illustrates a high level methodology for content processing including theme vector processing. The high level methodology illustrated in FIG. 5 is described in conjunction with the content processing system 200 shown in FIG. 2. The steps for the high level methodology disclosed in FIG. 5 were discussed above, however, FIG. 5 provides an overview of the content processing flow of the present invention. As shown in block 610, the ontologies that form the world view of knowledge are stored in the knowledge catalog 100. The input discourse is processed in the linguistic engine 220 to generate the structured output 230. Specifically, the linguistic engine 220 generates a plurality of thematic tags and contextual tags for the input discourse as shown in block 620. Also, the linguistic engine 220 extracts content carrying words from the input discourse by utilizing the thematic tags as shown in block 630.

The content carrying words from the linguistic engine 220 are input to the knowledge catalog processor 240. In part, the knowledge catalog processor 240 processes the content carrying words for direct use with the knowledge catalog 100 as shown in block 640. Specifically, the knowledge catalog processor 240 generates, as appropriate, the nominal or noun form of each content carrying word, as well as the count sense and mass sense of the word. Furthermore, the knowledge catalog processor 240 determines, from the knowledge catalog 100, which content carrying words are non ambiguous as shown in block 650.

The non ambiguous content carrying words are input to the theme vector processor 250. In addition, the theme vector processor 250 receives the structured output 230. The theme vector processor 250 determines the relative importance of the non ambiguous content carrying words in the input discourse as shown in block 660. In the preferred embodiment, the theme vector processor 250 generates a list of theme terms, including words and phrases, and assigns a relative theme strength to each theme term. Furthermore, as shown in block 670 on FIG. 5, the theme vector processor 250, through use of the ontologies, generates a theme concept for each theme term. The theme concepts indicate a general topic to identify the content of the input discourse.

Figure 6:
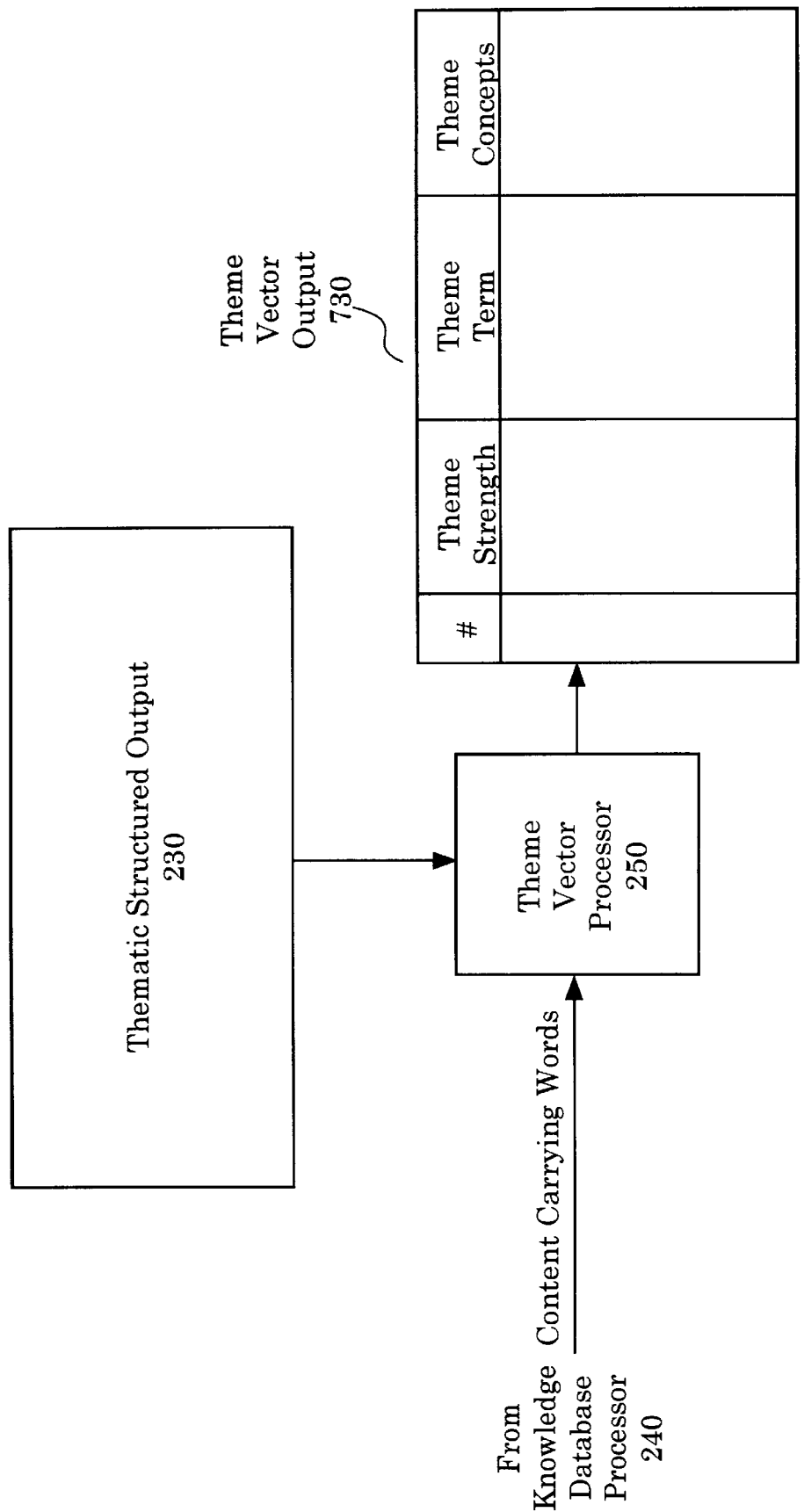
FIG. 6 is a block diagram illustrating the operational flow of theme vector processing.

FIG. 6 is a block diagram illustrating the operational flow of theme vector processing. As shown in FIG. 6, the theme vector processor 250 receives the thematic tags 710 and contextual tags 720 from the structured output 230. In addition, the theme vector 250 receives the content carrying words from the knowledge catalog processor 240. The content carrying words may include single words or phrases. Note that the content carrying words output from the knowledge catalog processor 240 are converted to the noun or nominal form. Also shown in FIG. 6, the theme vector processor 250 generates a thematic vector output 730. In a preferred embodiment, the theme vector output 730 contains, for each theme term, an importance number (#), a theme strength, a theme concept, and an overall capacity weight of collective content importance.

The theme vector output 730 presents a thematic profile of the content of input discourse (e.g. a sentence, paragraph, or document). The theme vector output 730 contains a list of nominalized words, labeled "Theme Term" in FIG. 6, that represent the major themes in the input discourse. In a preferred embodiment, the theme vector output includes up to sixteen of the most important themes for each sentence, paragraph and document. A theme term in a theme vector is typically based on an actual word or phrase that is contained in the text of the input discourse, or a nominal or plural form of a word. However, the word defining the theme concept may not appear in the input discourse. Instead, the theme concept is conceptualized from the theme term as set forth in a particular ontology stored in the knowledge catalog 100. Also, the theme concepts may become theme term entries when they are generalized.

In a preferred embodiment, each theme in the theme vector output 730 is assigned a normalized or relative theme strength. The normalized theme strength is calculated using the theme strengths of each theme term in the text that contribute to the particular theme. At the sentence level, the theme vector processor 250 calculates a theme strength for each content-carrying word in the sentence. The theme strength of the word measures the thematic weight of the word within the context of the sentence in which it appears. Prior to processing, each content carrying word receives a default theme strength that varies depending upon the word. As the theme vector processor 250 analyzes the surrounding text in the sentence to determine the thematic role of the word, it increases or decreases the theme strength for the word. For example, a theme grading determines how each word in s sentence is functioning within the context and structure of the sentence. The theme grading assigned to a word affects the theme strength for the word. For a description of theme gradings, see the document, entitled "Oracle ConText™ Linguistics Toolkit, Guide and Reference, Release 1.1", pages 2–8 to 2–13, which is expressly incorporated by reference.

In the preferred embodiment, the theme vector processor 250 executes a plurality of heuristic routines to generate the theme strengths for each theme. Appendix C, entitled "Theme Vector Code", contains a complete source code listing for theme vector processing of the present invention. The following source code illustrates the generation of the theme strengths in accordance with one embodiment. The source code that follows includes detailed comments to explain the operation of the code. Although the generation of the theme strengths is disclosed as computer source code, the theme strengths may be generated by any means, such as a hardware implementation, without deviating from the spirit or scope of the invention.

```
//if the word is in the complete subject and
//a main clause with a level one reduction,
//then it accumulates MnRx weight
        ThemeStrength[actual_position] = ThemeStrength[actual_position] +
            at4IT_IncreaseTheme (settings,CurrentParagraphNumber,
                CurrentSentenceNumber, (sb4)settings->thmstr_atis->MnRx_atits,
                actual_position); /* 50 */
        if (!prep_phrase[actual_position])
        {
        //if the word is not in a preposition phrase, then
        //it accumulates MnRxNoPrep weight
            ThemeStrength [actual_position] = ThemeStrength[actual_position] +
                at4IT_IncreaseTheme(settings,CurrentParagraphNumber,CurrentSentenceNumber,
                    (sb4)settings->thmstr_atis->MnRxNoPrep_atits,actual_position);
        }
        if (simple_subject[actual_position])
        {
        //if the word is the simple subject of the clause, then
        //it accumulates MnRxSimSubj weight
            ThemeStrength[actual_position] = ThemeStrength[actual_position] +
                at4IT_IncreaseTheme(settings,CurrentParagraphNumber,CurrentSentenceNumber,
                    (sb4)settings->thmstr_atis->MnRxSimSubj_atits,actual_position);
        }
}
if (complete_subject[actual_position] &&
        (!weak_n_table[actual_position] ||
        LEX(wd_orienter_phrase,actual_position)) &&
        (!(!subordinate_clause[actual_position] &&
        !read_codes[actual_position][0]))
{
//if the word is in the complete subject and a
//strong content carrying word, and part of the main
//clause and a level 1 reduction, then it accumulates
//SubSubjStr weight
        ThemeStrength[actual_position] = ThemeStrength[actual_position] +
            at4IT_IncreaseTheme(settings,CurrentParagraphNumber,
                CurrentSentenceNumber,(sb4)settings->thmstr_atis->SubSubjStr_atits,
                actual_position); /* 50 */
}
if (!subordinate_clause[actual_position] &&
            read_codes[actual_position][0])
{
//if the word is not in a subordinate clause and is part of
//the level one reduction, then it accumulates MnNoRx weight
        ThemeStrength[actual_position] = ThemeStrength[actual_position] +
            at4IT_IncreaseTheme(settings,CurrentParagraphNumber,
                CurrentSentenceNumber,(sb4)settings->thmstr_atis->MnNoRx_atits,
                actual_position); /* 50 */
}
if (ThemeStrength[actual_position] == 0)
```

-continued

```
        {
        //if the word has received no theme weight at this point,
        //then it accumulates nTheme weight
                ThemeStrength[actual_position] = ThemeStrength[actual_position] +
                        at4IT_IncreaseTheme(settings,CurrentParagraphNumber,
                                CurrentSentenceNumber,(sb4)settings->thmstr_atis->NTheme_atits,
                                actual_position); /* 5 */
        }
}
if (read_codes[actual_position][get_level] &&
        !LEX(wd_useless_phrase,actual_position) &&
        !LEX(wd_meaningless_word_phrase,actual_position))
{
//if the word is not marked with a useless or meaningless
//flag, then it is checked for the different reduction
//levels and a weight accumulated for each valid level.
//Each level is checked and accumulated through the setting
//'get_level'. These levels correspond to the levels from
//the theme parser final stage output.
        if (get_level == 0)
        }
        {
                ThemeStrength[actual_position] = ThemeStrength[actual_position] +
                        at4IT_IncreaseTheme(settings,CurrentParagraphNumber,
                                CurrentSentenceNumber,(sb4)settings->thmstr_atis->MnThm_atits,
                                actual_position); /*10 */
        }
        if (get_level == 1)
        {
                ThemeStrength[actual_position] = ThemeStrength[actual_position] +
                        at4IT_IncreaseTheme(settings,CurrentParagraphNumber,
                                CurrentSentenceNumber,(sb4)settings->thmstr_atis->SdThm_atits,
                                actual_position); /*15*/
        }
        if (get_level == 2)
        {
                ThemeStrength[actual_position] = ThemeStrength[actual_position] +
                        at4IT_IncreaseTheme(settings,CurrentParagraphNumber,
                                CurrentSentenceNumber,(sb4)settings->thmstr_atis->TrdThm_atits,
                                actual_position); /*20*/
        }
        if (get_level == 3)
        {
                ThemeStrength[actual_position] = ThemeStrength[actual_position] +
                        at4IT_IncreaseTheme(settings,CurrentParagraphNumber,
                                CurrentSentenceNumber,(sb4)settings->thmstr_atis->Context_atits,
                                actual_position); /*50*/
        }
        if (get_level == 4)
        {
                ThemeStrength[actual_position] = ThemeStrength[actual_position] +
                        at4IT_IncreaseTheme(settings,CurrentParagraphNumber,
                                CurrentSentenceNumber,(sb4)settings->thmstr_atis->MnPhr_atits,
                                actual_position); /*60*/
        }
        if (get_level == 5)
        {
                ThemeStrength[actual_position] = ThemeStrength[actual_position] +
                        at4IT_IncreaseTheme(settings,CurrentParagraphNumber,
                                CurrentSentenceNumber,(sb4)settings->thmstr_atis->MnTpc_atits,
                                actual_position); /*100*/
        }
        if (get_level == 6)
        {
                ThemeStrength[actual_position] = ThemeStrength[actual_position] +
                        at4IT_IncreaseTheme(settings,CurrentParagraphNumber,
                                CurrentSentenceNumber,(sb4)settings->thmstr_atis->SdTpc_atits,
                                actual_position); /*5*/
        }
        if (get_level == 7)
        {
                ThemeStrength[actual_position] = ThemeStrength[actual_position] +
                        at4IT_IncreaseTheme(settings,CurrentParagraphNumber,
                                CurrentSentenceNumber,(sb4)settings->thmstr_atis->MnDevTpc_atits,
                                actual_position); /*80*/
        }
        if (get_level == 8)
        {
                ThemeStrength[actual_position] = ThemeStrength[actual_position] +
                        at4IT_IncreaseTheme(settings,CurrentParagraphNumber,
```

-continued

```
                CurrentSentenceNumber,(sb4)settings->thmstr_atis->MnPrxDevTpc_atits,
                actual_position); /*100*/
        }
        if (get_level == 9 && (!weak_n_table[actual_position] ||
                LEX(wd_orienter_phrase,actual_position)))
        {
        //level 9 is further qualified by requiring the word
        //to be a strong content carrying word.
                ThemeStrength[actual_position] = ThemeStrength[actual_position] +
                    at4IT_IncreaseTheme(settings,CurrentParagraphNumber,
                        CurrentSentenceNumber,(sb4)settings->thmstr_atis->Hdwrds_atits,
                        actual_position);
        }
        if (get_level == 10)
        {
                ThemeStrength[actual_position] = ThemeStrength[actual_position] +
                    at4IT_IncreaseTheme(settings,CurrentParagraphNumber,
                        CurrentSentenceNumber,(sb4)settings->thmstr_atis->PrprNm_atits,
                        actual_position);
        }
        if (get_level == 11)
        {
                ThemeStrength[actual_position] = ThemeStrength[actual_position] +
                    at4IT_IncreaseTheme(settings,CurrentParagraphNumber,
                        CurrentSentenceNumber,(sb4)settings->thmstr_atis->Description_atits,
                        actual_position); /*50*/
        }
        if (get_level == 12)
        {
                ThemeStrength[actual_position] = ThemeStrength[actual_position] +
                    at4IT_IncreaseTheme(settings,CurrentParagraphNumber,
                        CurrentSentenceNumber,(sb4)settings->thmstr_atis->NmTpcs_atits,
                        actual_position); /*50*/
        }
        if (get_level == 13)
        {
        if (!LEX(wd_pp_noun,actual_position))
        {
        //level 13 gets a specific extra weight for proper nouns
                ThemeStrength[actual_position] = ThemeStrength[actual_position] +
                    at4IT_IncreaseTheme(settings,CurrentParagraphNumber,
                        CurrentSentenceNumber,(sb4)settings->thmstr_atis->TpcIndA_atits,
                        actual_position); /*200*/
        }
                ThemeStrength[actual_position] = ThemeStrength[actual_position] +
                    at4IT_IncreaseTheme(settings,CurrentParagraphNumber,
                        CurrentSentenceNumber,(sb4)settings->thmstr_atis->TpcIndB_atits,
                        actual_position); /*200*/
        }
        if (get_level == 14)
        {
                ThemeStrength[actual_position] = ThemeStrength[actual_position] +
                    at4IT_IncreaseTheme(settings,CurrentParagraphNumber,
                        CurrentSentenceNumber,(sb4)settings->thmstr_atis->Definition_atits,
                        actual_position); /*80*/
        }
        if (get_level == 15)
        {
                ThemeStrength[actual_position] = ThemeStrength[actual_position] +
                    at4IT_IncreaseTheme(settings,CurrentParagraphNumber,
                        CurrentSentenceNumber,(sb4)settings->thmstr_atis->DevPrprNm_atits,
                        actual_position);
        }
      }
     }
    }
 }
 }
//this concludes the main theme vector weight accumulation routines.
//The routines that follow add additional weights for special contexts.
//Accumulate the theme strengths for each word/phrase in each sentence.
//Each word/phrase is started with a zero strength.
for (x = 0; x < number_words; x++)
{
//First loop through all of the words and add the 'Orienter' strength
//for every word that is marked as an orienter in the lexicon.
    ThemeStrength[x] = 0;
    if (LEX(wd_orienter_phrase,x))
    {
        /* ThemeOrienter */
```

-continued

```
            ThemeStrength[x] = ThemeStrength[x] +
                at4IT_IncreaseTheme(settings,CurrentParagraphNumber,
                    CurrentSentenceNumber,(sb4)settings->thmstr_atis->Orienter_atits,x);
        }
    }
    for (get_level = 0; get_level < 16; get_level++)
    {
        for (actual_position = 0;
            actual_position < number_words;
            actual_position++)
        {
        //Now start the main loop checking certain contexts and accumulating
        // weights accordingly.
            if (!prep[actual_position] && !LEX(wd_conj,actual_position) &&
            //Exclude words functioning as prepositions and any word that
            //is potentially a conjunction of any type.
                !prn[actual_position] &&
                // exclude all words functioning as pronouns
                !(atusTD_TestDeterminer(actual_position) &&
                word_type_code[actual_position] > DEFAULT_NB) &&
                //exclude all words that are determiners
                !LEX (wd_det_group_a,actual_position) &&
                //exclude all group a determiners
                !(adv[actual_position] &&
                LEX(wd_intensifier_adverb,actual_position)) &&
                //exclude all intensifying adverbs
                !(atxwFAC_IsWordFactive(actual_position) &&
                !apunc[actual_position] && atxwOF_IsWordOf(actual_position+1)) &&
                //exclude all factives followed by no punctuation and 'of'
                !(actual_position == 0 && !apunc[0] && adj[0] && pp_noun[1] &&
                !pos_adv[0] && !pos_prep[0] && !pos_conj[0]
                && !atusTD_TestDeterminer(0)) &&
                //exclude all first words that do not have punctuation, that
                //are not adjectives,that are followed by proper nouns,
                //that cannot possibly be adverbs, that cannot possibly
                //be prepositions, that cannot possibly by conjunctions and
                //that are not determiners.
                !(!LEX(wd_orienter_phrase,actual_position)
                && adv[actual_position]) &&
                //exclude all non-orienting adverbs
                !LEX(wd_pre_det,actual_position) &&
                //exclude all pre determiners
                !(LEX(wd_dual_gender,actual_position) &&
                LEX(wd_subjective_view_adverb,actual_position) &&
                LEX(wd_not_index_head,actual_position)) &&
                //exclude all dual gender, weak nouns that cannot function
                //as index heads.
                !(!LEX(wd_c_noun,actual_position) && cm_noun
                [actual_position] &&
                LEX(wd_adj,actual_position) &&
                LEX(wd_noun_promotion_adj,actual_position) &&
                LEX(wd_subjective_view_adverb,actual_position)) &&
                //exclude all weak adjectives promoted to nouns.
                !(atusCAV_CheckAuxVerb(actual_position) && verb[actual_position]) &&
                //exclude all auxillary verbs
                !atxwNUM_IsWordNumber(actual_position) &&
                //exclude all numbers
                !LEX(wd_cardinal_noun,actual_position) &&
                //exclude all cardinal nouns
                !LEX(wd_ordinal_noun,actual_position) &&
                //exclude all ordinal nouns
                ISSETL(settings->thmctr_atis,atist_THMVEC) &&
                //make sure the settings say to run the theme vectors
                !atxwNUM_IsWordNumber(actual_position))
                //another test for numbers to exlcude
            {
                if (get_level == 0 && !LEX(wd_useless_phrase,actual_position) &&
                    !LEX(wd_meaningless_word_phrase,actual_position))
                {
                //if the first theme reduction level is tagged for the word and
                //if the word is not a useless phrase and if the word is
                //not a meaningless phrase then continue
                    if (complete_subject[actual_position] &&
                        !(!subordinate_clause[actual_position] &&
                            !read_codes[actual_position][0]))
                    {
```

Thus, a theme vector identifies the 16 strongest themes in a sentence, paragraph or document in proportion to the sentence, paragraph or document for which the theme vector output is generated.

The theme vector processor 250 returns the concept, if one exists, for each theme term in the theme vector. Similar to the theme terms, the theme concepts in the theme vector output 730 contain a theme strength. As the theme vector processor 250 identifies themes that have the same concept in the input discourse, the theme strength for the theme concept increases. This indicates that the theme concept is significantly developed in the input discourse. As a result, the theme vector processor 250 may promote the theme concept to a separate theme in the theme vector output 730 for the corresponding input discourse. For example, if the theme vector processor 250 determines that "printing press" is one of the theme terms in a paragraph, then the theme concept "printing" is assigned to the theme term "printing press." In addition, the theme vector processor 250 assigns a theme strength to the theme concept. The theme vector processor 250 increases the theme strength for "printing" if the paragraph contains other words such as "bold face" and "typesetting", that conceptualize to "printing." The theme concept "printing" may then appear as a theme term for the paragraph, along with its own theme concept, "publishing industry." In a preferred embodiment, the theme vector processor 250 includes input adjustments (not shown) to prevent promoting theme concepts in a theme vector output 730 to additional theme terms.

In addition to providing a theme strength for each theme term, the theme vector processor 250 calculates a theme capacity. In general, the theme capacity provides a quantitative measurement of the thematic weight or content of a sentence, paragraph, or document relative to other sentences, paragraphs, and documents with similar themes. For example, if two paragraphs discuss the prime interest rate for banks, then the theme vectors for both paragraphs list prime interest rate as one of the main themes. However, the first paragraph only lists the current prime interest rate, while the second paragraph lists the current rate, provides a definition of prime interest rate, and analyzes the fluctuations in the rate over the last two years. For this example, the theme vector processor 250 assigns a higher theme capacity to the second paragraph. When comparing the paragraphs from a content standpoint, both paragraphs are about the prime interest rate. In fact, the theme strength for prime interest rate in the first paragraph may be higher than in the second paragraph. However, note that the theme strength between vectors should not be compared because theme strength only measures thematic importance within the context of the containing paragraph. However, from the standpoint from understanding prime interest rates, the second paragraph clearly provides more information. Similar to theme terms, the theme capacity in a theme vector output 730 is affected by the theme strength of the words in the sentence, paragraph, or document.

The following example illustrates a theme vector output generated by the theme vector processor 250 for input discourse, such as a paragraph. The example paragraph is from a document about commercial banks lowering interest rates based on changes to the Federal funds rate.

> Treasury bill yields dropped substantially Friday morning in anticipation of further reductions in the Federal funds rate by the Fed, market watchers said. The 3-month bill fell 8 basis points to a discount equivalent rate of 7.70%, while the 1-year bill was down 12 basis points to 7.30%.

Table 1 illustrates the theme vector output for the example paragraph. As shown in Table 1, for each theme term, the theme vector output 30 includes a theme strength and a theme concept.

TABLE 1

Overall Theme Capacity
79,902

| # | Theme Strength | Theme Terms | Theme Concept |
|---|---|---|---|
| 1 | 43 | banking | finance and investment |
| 2 | 25 | basis points | stocks, bonds, and commodities |
| 3 | 24 | treasury bill yields | banking |
| 4 | 22 | stocks, bonds, and commodities | finance and investment |
| 5 | 22 | points | stocks, bonds, and commodities |
| 6 | 21 | yields | banking |
| 7 | 17 | bills | bills |
| 8 | 12 | federal funds rates | banking |
| 9 | 11 | reductions | banking |
| 10 | 10 | rates | banking |
| 11 | 9 | discount equivalent rates | commerce and trade |
| 12 | 9 | three-month | three-month |
| 13 | 8 | 1-year | 1-year |
| 14 | 8 | rates | commerce and trade |
| 15 | 7 | discounts | commerce and trade |
| 16 | 7 | equivalents | equivalencies |

Figure 7A:
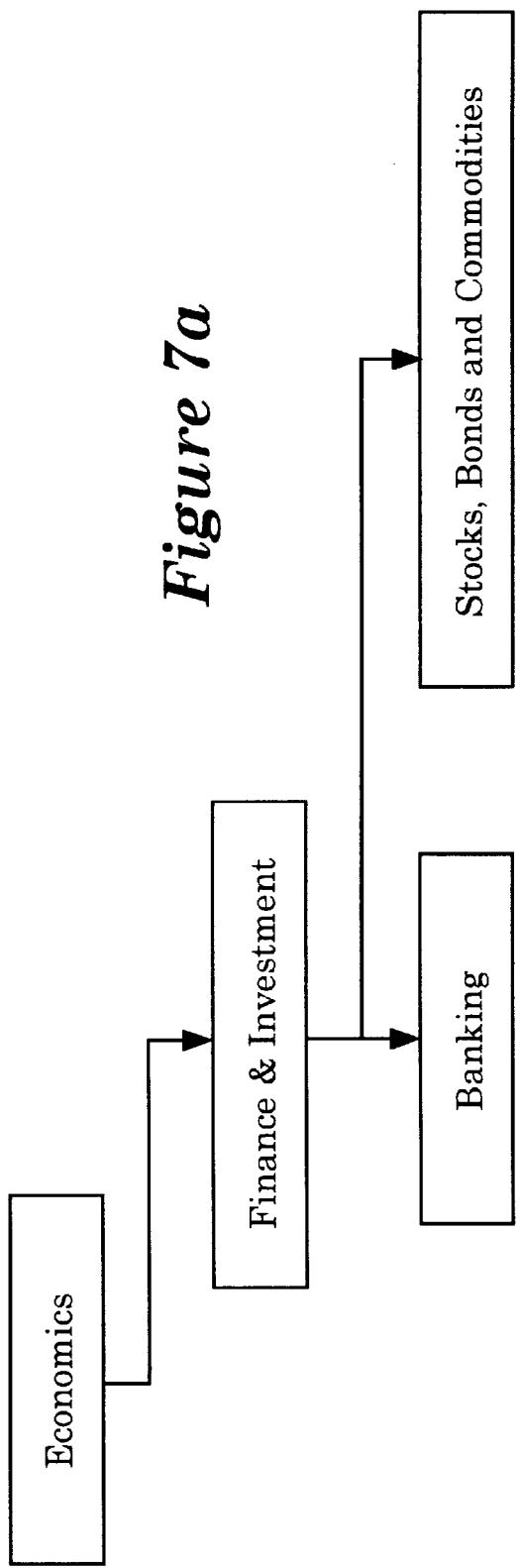
FIG. 7a illustrates a portion of a world view ontology for economics.
Figure 7B:
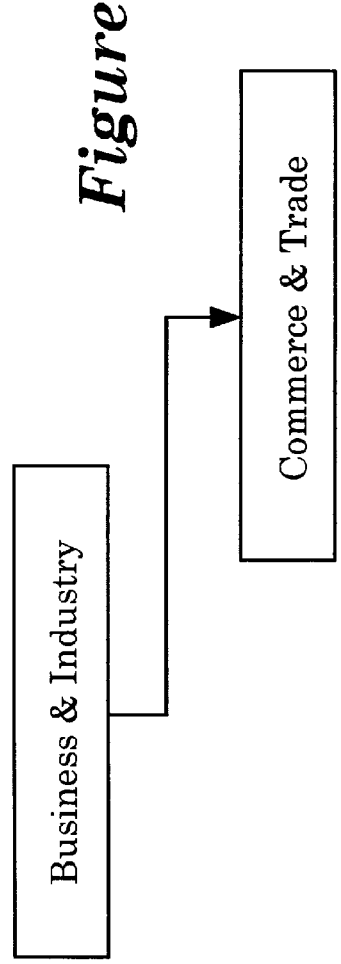
FIG. 7b illustrates a portion of a world view ontology for business and industry.

Based on the theme strength, the theme terms are listed in the order of importance or strength in the paragraph. Note that the term "banking" does not appear in the paragraph. However, because banking is a theme concept for several of the theme terms, the concept of "banking" is listed as a theme term itself. Based on the knowledge catalog 100, "banking" is conceptualized to "finance and investment" as shown in Table 1. FIG. 7a illustrates a portion of an ontology for "economics", and FIG. 7b illustrates a portion of an ontology for "business and industry." For this example, the theme vector processor 250 maps the theme terms to the above ontologies. This example illustrates the fact that a theme vector output may contain words that are not in the original input discourse. For example, the theme term "basis points" is conceptualized by the theme vector processor 250 to "stocks, bonds, and commodities." The term "stocks, bonds, and commodities" does not appear in the original input example. The theme vector processor 250 also determines that the theme concept "stocks, bonds, and commodities" is developed significantly enough to be designated as the fourth most important theme for the paragraph.

The theme vector processing of the present invention has application for use in document classification. The document, entitled "Creating a Virtual Bookshelf", discloses examples and use of a classification system utilizing the system of present invention, which is expressly incorporated by reference. In general, the theme vector processing of the present invention permits classification of documents according to the concepts in the document. For example, the theme vector processing determines the top one or two general concepts that best represent the content of each document. Consequently, the general concept information may be utilized to categorize the documents into one or more groups. For example, utilizing the theme vector output 730 (FIG. 6), a classification application may extract the concepts for the top one or two non ambiguous themes, then classify the document according to these concepts. For example, the theme vector processor 250 may determine that one of the top themes for a document is "Federal Fund Rates", a non ambiguous term, that is assigned the theme concept of banking for the economics ontology. For this example, the document may be classified under "banking."

If a theme concept becomes a theme term in the theme vector output, the higher level category from the corresponding ontology is returned as a theme concept. For example, the concept of "banking" is categorized under "finance and investment." If "banking" is a theme concept in the theme vector output, but is also promoted to a theme concept in the theme vector output, then "finance and investment" is returned as the theme concept in the theme vector output.

COMPUTER SYSTEM

Figure 8:
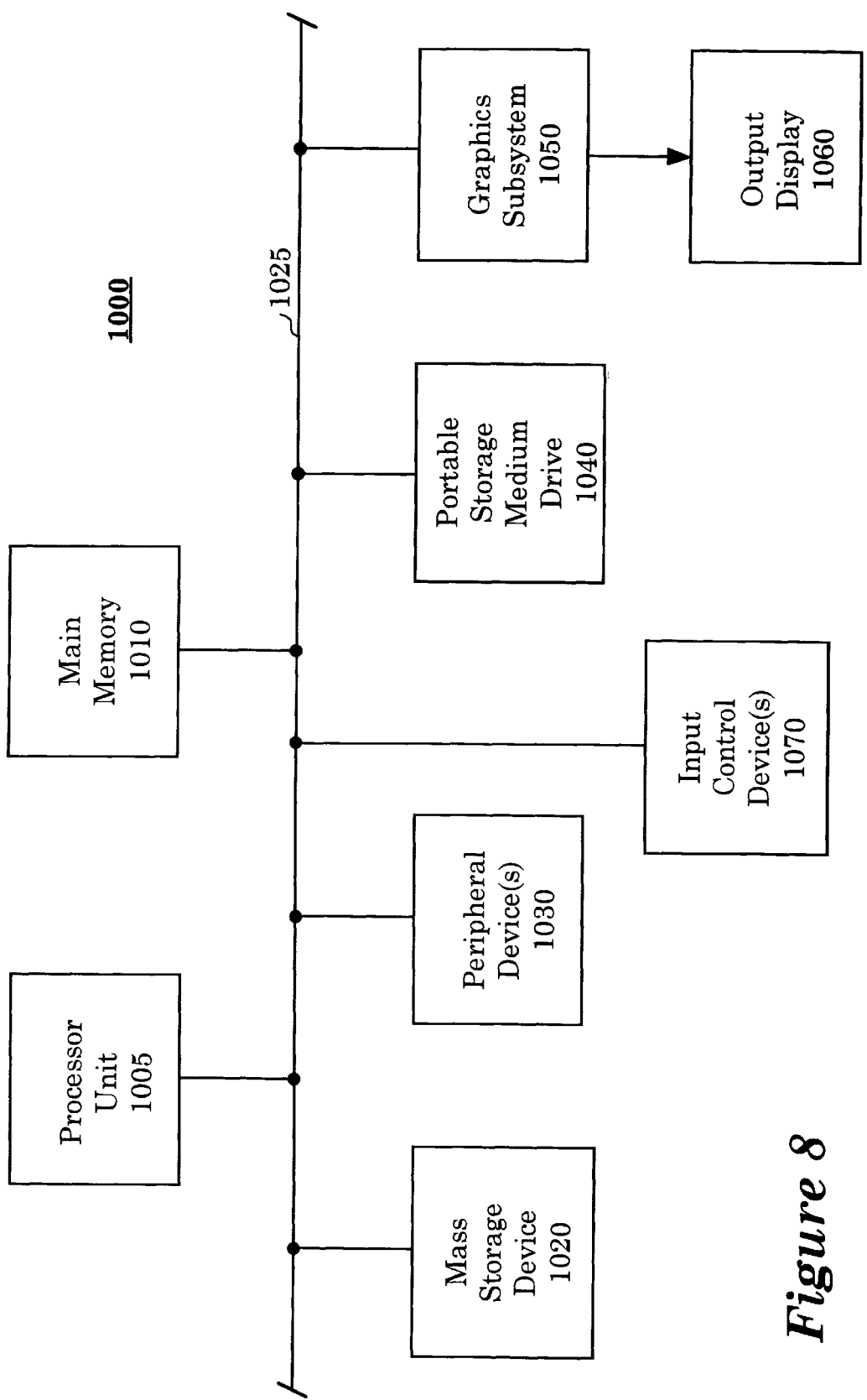
FIG. 8 illustrates a high level block diagram of a general purpose computer system in which the content processing system of the present invention may be implemented.

FIG. 8 illustrates a high level block diagram of a general purpose computer system in which the content processing system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the content processing system of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 8 as being connected via the bus 1025. However, the computer system 1025 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may implemented with a magnetic disk drive or an optical disk drive, is a non-volatile storage device for storing data and instructions for use by the processor unit 1005. In one embodiment, the mass storage device 1020 stores the content processing system software embodiment for loading to the main memory 1010.

The portable storage medium drive 1040 operates in conjunction with a portable non-volatile storage medium, such as a floppy disk or a compact disc read only memory (CD-ROM), to input and output encoded data and code to and from the computer system 1000. In one embodiment, the content processing system software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, the input discourse may be input to the computer system 1000 via a portable storage medium or a network for processing by the content processing system.

The input control device(s) 1070 provide a portion of the user interface for a user of the computer system 1000. The input control device(s) 1070 may include an alphanumeric keypad for inputting alphanumeric and other key information, and a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method for determining themes in an input discourse, said method comprising the steps of:

storing a thematic profile for said input discourse that includes a plurality of thematic tags for words in said input discourse, wherein said thematic tags indicate the existence or non-existence of a plurality of thematic constructions, and wherein said thematic constructions comprise a plurality of tests made against said words in the exact context of said discourse to determine thematic aspects or information about the overall theme of said discourse;

storing a lexicon comprising a plurality of words and definitional characteristics for said words; and generating theme terms from words in said input discourse based on existence or non existence of said thematic constructions as indicated by said thematic tags, and based on definitional characteristics of said words as indicated by said lexicon, wherein said theme terms identify overall content of said input discourse.

2. The method as set forth in claim 1, wherein the step of generating theme terms comprises the step of accumulating theme strengths for said words based on the existence or non existence of said thematic constructions as indicated by said thematic tags, wherein said theme strengths indicate relative importance among said theme terms in said input discourse.

3. The method as set forth in claim 2, wherein the step of generating theme terms comprises the step of accumulating theme strengths for said words on a sentence, paragraph, and document level.

4. The method as set forth in claim 1, further comprising the steps of:

storing a plurality of categories arranged hierarchically in a knowledge catalog; and classifying themes of said input discourse by mapping at least one theme term into a category of said knowledge catalog.

5. The method as set forth in claim 4, further comprising the step of generating a theme concept for said theme term by extracting a category from a higher level node in said knowledge catalog.

6. The method as set forth in claim 5, further comprising the step of adding a theme concept as a theme term if more than one theme term map to said theme concept.

7. The method as set forth in claim 1, further comprising the steps of:
- determining whether each theme term is essentially non-ambiguous such that said theme term is commonly recognized as having a single sense; and
- utilizing only non-ambiguous terms as theme terms.

8. A method for classifying themes of an input discourse, said method comprising the steps of:
- receiving a plurality of themes from said input discourse;
- storing, to represent a knowledge catalog, a plurality of categories arranged hierarchically such that child categories associated with parent categories include both semantic and linguistic associations, wherein said linguistic associations include associations between at least two concepts where a concept representing a child category is a type of a concept representing a parent category, and semantic associations include associations between at least two concepts, generally associated together in language usage, but concepts of child categories are not a type of concepts of parent categories; and
- classifying said themes of said input discourse by relating themes into categories of said knowledge catalog, wherein classification of said themes in categories of said knowledge catalog reflects semantic and linguistic relationships between said themes.

9. The method as set forth in claim 8, further comprising the step of generating a theme concept for said theme by extracting a category from a higher level in said knowledge catalog.

10. The method as set forth in claim 8, further comprising the steps of:
- determining whether each theme term is essentially non-ambiguous such that said theme term is commonly recognized as having a single sense; and
- classifying only non-ambiguous terms in said knowledge catalog.

11. A method for determining theme in input discourse, said method comprising the steps of:
- identifying a plurality of words or terms in said input discourse that define thematic content of said input discourse;
- determining whether words or terms identified are essentially non-ambiguous such that said words or terms are commonly recognized as having a single sense;
- selecting only non-ambiguous words or terms for processing to determine themes of said input discourse; and
- processing said non-ambiguous words or terms to determine themes of said input discourse.

* * * * *